United States Patent [19]
Fu

[11] Patent Number: 6,065,077
[45] Date of Patent: May 16, 2000

[54] APPARATUS AND METHOD FOR A CACHE COHERENT SHARED MEMORY MULTIPROCESSING SYSTEM

[75] Inventor: Daniel D. Fu, Sunnyvale, Calif.

[73] Assignee: HotRail, Inc., San Jose, Calif.

[21] Appl. No.: 08/986,430

[22] Filed: Dec. 7, 1997

[51] Int. Cl.[7] .................................................. G06F 12/08
[52] U.S. Cl. .............................. 710/100; 710/29; 710/30; 710/52; 709/233; 711/110; 711/131; 711/149
[58] Field of Search .............................. 710/52, 100, 29, 710/30; 709/233; 711/110, 131, 149

[56] References Cited

U.S. PATENT DOCUMENTS

| | | | |
|---|---|---|---|
| 4,315,308 | 2/1982 | Jackson | 364/200 |
| 4,438,494 | 3/1984 | Budde et al. | 364/200 |
| 4,480,307 | 10/1984 | Budde et al. | |
| 5,313,609 | 5/1994 | Baylor et al. | 395/425 |
| 5,335,335 | 8/1994 | Jackson et al. | 395/425 |
| 5,440,698 | 8/1995 | Sindhu et al. | 395/200.08 |
| 5,505,686 | 4/1996 | Tarui et al. | 395/448 |
| 5,511,226 | 4/1996 | Zilka | 395/823 |
| 5,513,335 | 4/1996 | McClure | 395/457 |
| 5,524,234 | 6/1996 | Martinez, Jr. et al. | 395/468 |
| 5,535,363 | 7/1996 | Prince | 395/474 |
| 5,537,569 | 7/1996 | Masubuchi | 395/468 |
| 5,537,575 | 7/1996 | Foley et al. | 395/468 |
| 5,553,310 | 9/1996 | Taylor et al. | 395/860 |
| 5,561,779 | 10/1996 | Jackson et al. | 395/449 |
| 5,568,620 | 10/1996 | Sarangdhar et al. | 395/285 |
| 5,574,868 | 11/1996 | Marisetty | 395/298 |
| 5,577,204 | 11/1996 | Brewer et al. | 395/200.01 |
| 5,581,729 | 12/1996 | Nishtala et al. | 395/470 |
| 5,588,131 | 12/1996 | Borrill | 395/473 |
| 5,594,886 | 1/1997 | Smith et al. | 395/463 |
| 5,606,686 | 2/1997 | Tarui et al. | 395/448 |
| 5,634,043 | 5/1997 | Self et al. | 713/503 |
| 5,634,068 | 5/1997 | Nishtala et al. | 712/1 |
| 5,644,754 | 7/1997 | Weber et al. | 395/500 |
| 5,655,100 | 8/1997 | Ebrahim et al. | 395/471 |
| 5,657,472 | 8/1997 | Van Loo et al. | 395/485 |
| 5,682,516 | 10/1997 | Sarangdhar et al. | 395/473 |
| 5,684,977 | 11/1997 | Van Loo et al. | 395/470 |
| 5,696,910 | 12/1997 | Pawlowski | 395/280 |
| 5,796,605 | 8/1998 | Hagersten | 711/143 |
| 5,829,034 | 10/1998 | Hagersten et al. | 711/141 |
| 5,895,495 | 4/1999 | Arimilli et al. | 711/156 |
| 5,897,656 | 4/1999 | Vogt et al. | 711/141 |
| 5,940,856 | 8/1999 | Arimilli et al. | 711/119 |
| 5,946,709 | 8/1999 | Arimilli et al. | 711/119 |

OTHER PUBLICATIONS

Technical White Paper, *Sun™ Enterprise™ 10000 Server*, Sun Microsystems, Sep. 1998.

Alan Charlesworth, *Starfire: Extending the SMP Envelope*, IEEE Micro, Jan./Feb. 1998, pp. 39–49.

Joseph Heinrich, *Origin™ and Onyx2™ Theory of Operations Manual*, Document No. 007–3439–002, Silicon Graphics, Inc., 1997.

White Paper, *Sequent's NUMA–Q SMP Architecture*, Sequent, 1997.

White Paper, *Eight–way Multiprocessing*, Hewlett–Packard, Nov. 1997.

(List continued on next page.)

*Primary Examiner*—Ayaz R. Sheikh
*Assistant Examiner*—Eric S. Thlang
*Attorney, Agent, or Firm*—Bennett Smith

[57] ABSTRACT

The system and method for operating a cache-coherent shared-memory multiprocessing system is disclosed. The system includes a number of devices including processors, a main memory, and I/O devices. Each device is connected by means of a dedicated point-to-point connection or channel to a flow control unit (FCU). The FCU controls the exchange of data between each device in the system by providing a communication path between two devices connected to the FCU. The FCU includes a snoop signal path for processing transactions affecting cacheable memory and a network of signal paths that are used to transfer data between devices. Each signal path can operate concurrently thereby providing the system with the capability of processing multiple data transactions simultaneously.

55 Claims, 160 Drawing Sheets

OTHER PUBLICATIONS

George White & Pete Vogt, *Profusion, a Buffered, Cache-Coherent Crossbar Switch*, presented at Hot Interconnects Symposium V, Aug. 1997.

Alan Charlesworth, et al., *Gigaplane–XB: Extending the Ultra Enterprise Family*, presented at Hot Interconnects Symposium V, Aug. 1997.

James Loudon & Daniel Lenoski, *The SGI Origin: A ccNUMA Highly Scalable Server*, Silcon Graphics, Inc., presented at the Proc. of the 24th Int'l Symp. Computer Architecture, Jun. 1997.

Mike Galles, *Spider: A High–Speed Network Interconnect*, IEEE Micro, Jan./Feb. 1997, pp. 34–39.

T.D. Lovett, R.M. Clapp and R.J. Safranek, *NUMA–Q: An SCI–based Enterprise Server*, Sequent, 1996.

Daniel E. Lenoski & Wolf–Dietrich Weber, *Scalable Shared–Memory Multiprocessing*, Morgan Kaufmann Publishers, 1995, pp. 143–159.

David B. Gustavson, *The Scalable Coherent Interface and Related Standards Projects*, (as reprinted in Advanced Multimicroprocessor Bus Architectures, Janusz Zalewski, IEEE Computer Society Press, 1995, pp. 195–207.).

Kevin Normoyle, et al., *UltraSPARC™ Port Architecture*, Sun Microsystems, Inc., presented at Hot Interconnects III, Aug. 1995.

Kevin Normoyle, et al., *UltraSPARC™ Port Architecture*, Sun Microsystems, Inc., presented at Hot Interconnects III, Aug. 1995, UltraSparc Interfaces.

Kai Hwang, *Advanced Computer Architecture: Parallelism, Scalability, Programmability*, McGraw–Hill, 1993, pp. 355–357.

Jim Handy, *The Cache Memory Book*, Academic Press, 1993, pp. 161–169.

Angel L. DeCegama, *Parallel Processing Architectures and VLSI Hardware, vol. 1*, Prentice–Hall, 1989, pp. 341–344.

| Initiator -> Target | Transaction |
|---|---|
| CIU -> FCU (cache hit)<br>CIU -> FCU -> MCU (cache miss) | Cacheable read<br>or<br>cacheable write |
| BBU -> FCU (cache hit)<br>BBU -> FCU -> MCU (cache miss)<br>CIU -> FCU -> BBU | I/O memory read or write |
| CIU -> FCU -> BBU | I/O read or write |
| CIU -> FCU | Read Invalidate |
| BBU -> FCU -> MCU | Non-cacheable read or write |
| CIU -> FCU -> MCU | Memory Writeback |

Fig. 3

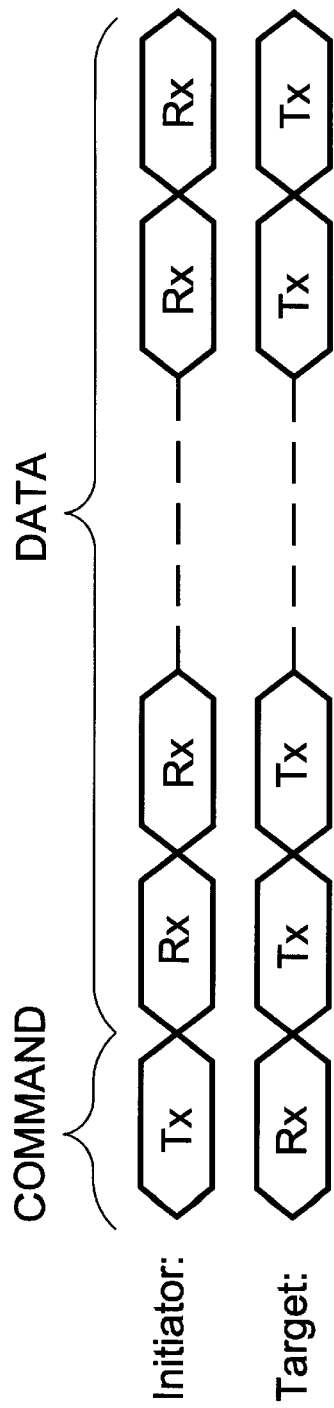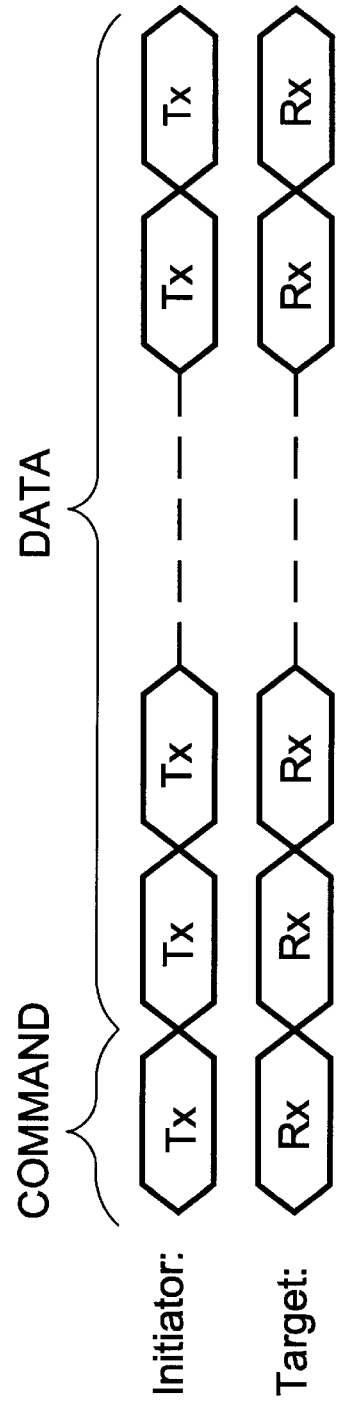
Fig. 11A
Fig. 11B

Fig. 25C

View A | View B

```
┌─────────────────────────────────────────┐
│  Command=cacheable write and state=E;   │
│  Command=I/O memory write and state=E   │
└─────────────────────────────────────────┘
                                         ╲522
                    │
                    ▼
┌─────────────────────────────────────────┐
│        Place device identifier on       │
│         STARGET_ID signal               │
└─────────────────────────────────────────┘
                                         ╲524
                    │
                    ▼
┌─────────────────────────────────────────┐
│        Await deferred write reply       │
│       from initiator interface device   │
└─────────────────────────────────────────┘
                                         ╲526
                    │
                    ▼
┌─────────────────────────────────────────┐
│     Respond to deferred write reply,    │
│            obtain channel,              │
│        write to external cache          │
└─────────────────────────────────────────┘
                                         ╲528
                    │
                    ▼
                 Return Fig. 35
```

CACHEABLE READ

CACHEABLE WRITE

INQUIRE L1, READ L2

INQUIRE L1, WRITE L2

I/O MEMORY READ

Fig. 53I

I/O MEMORY WRITE

| View A | View B |
|--------|--------|
| View C | View D |
| View E | View F |
| View G | View H |

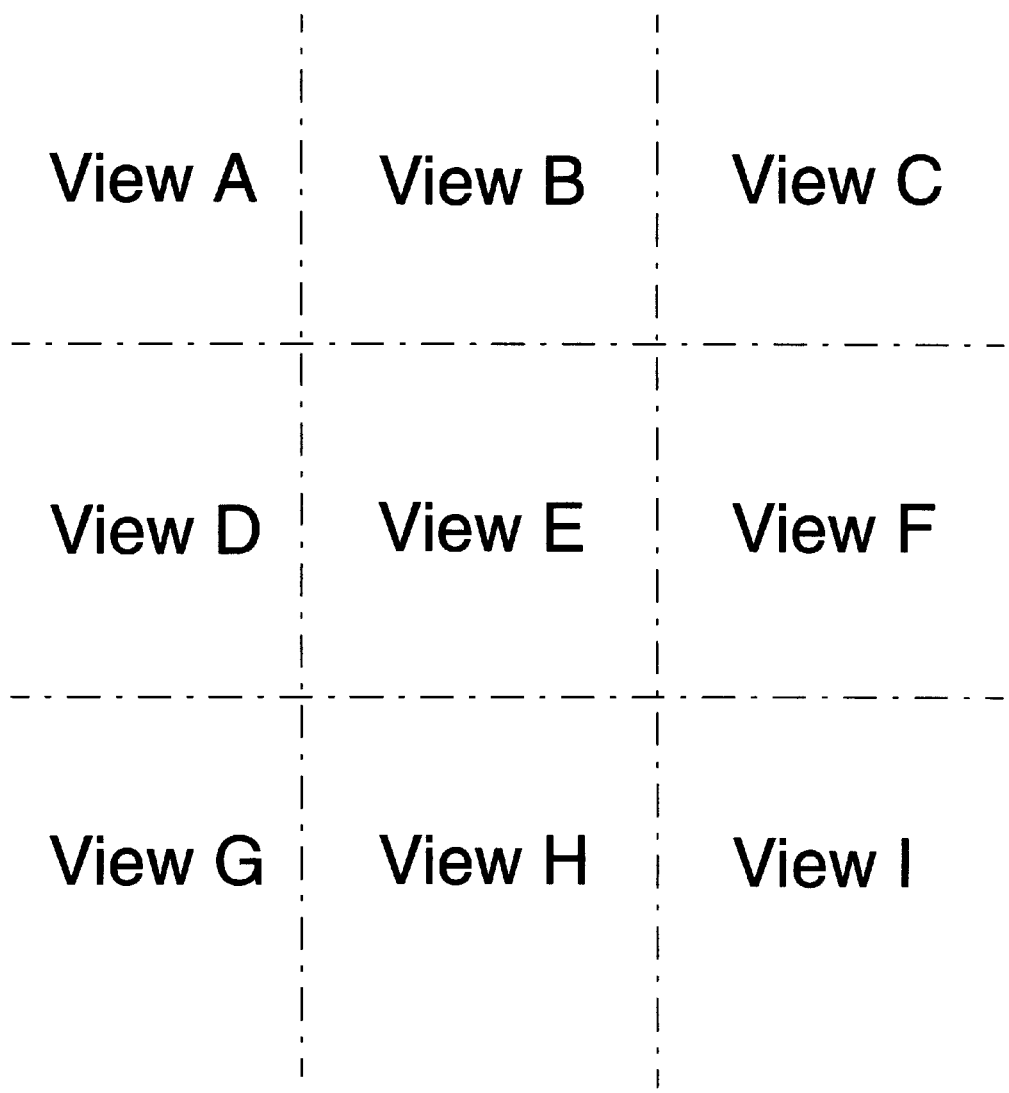

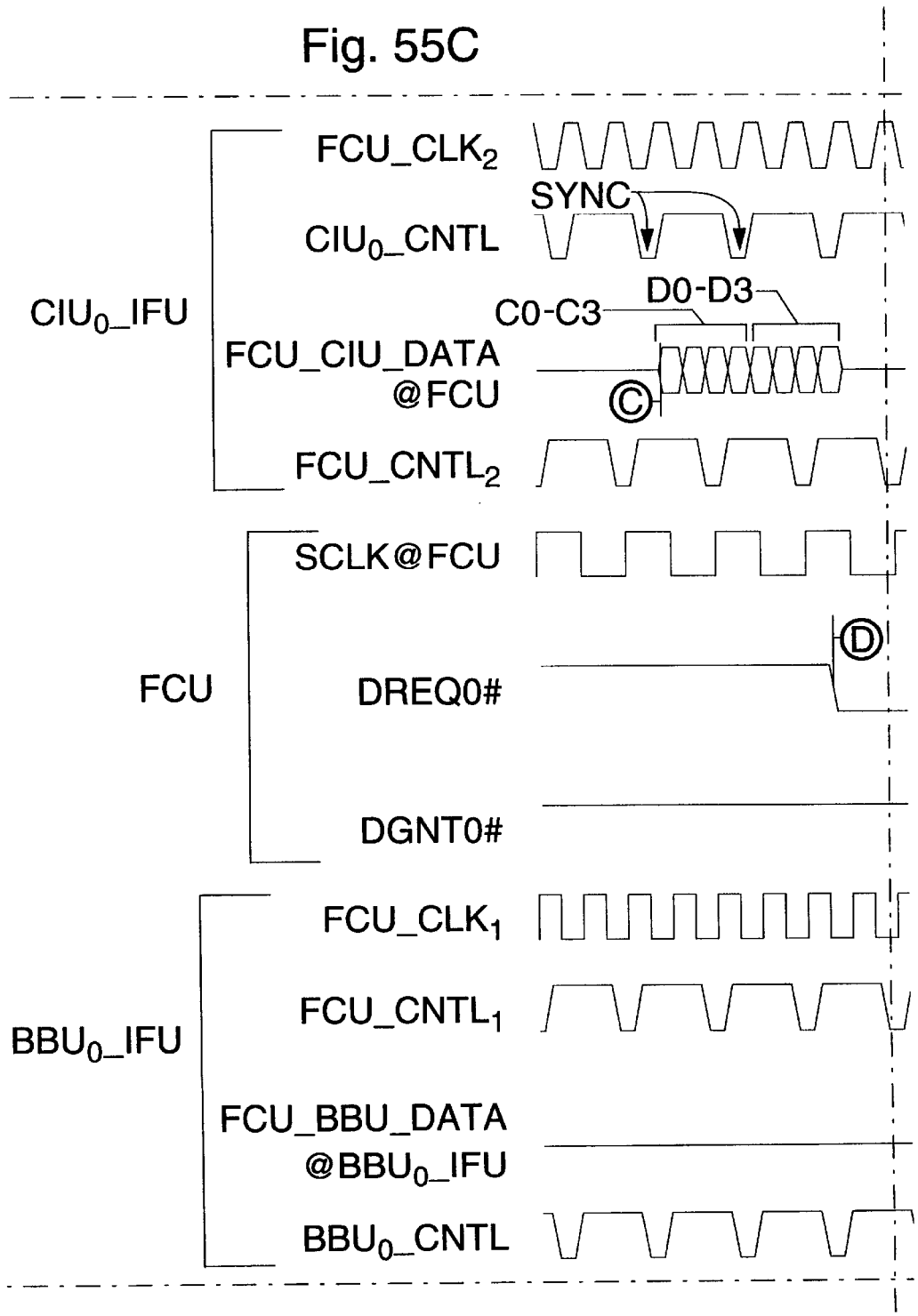

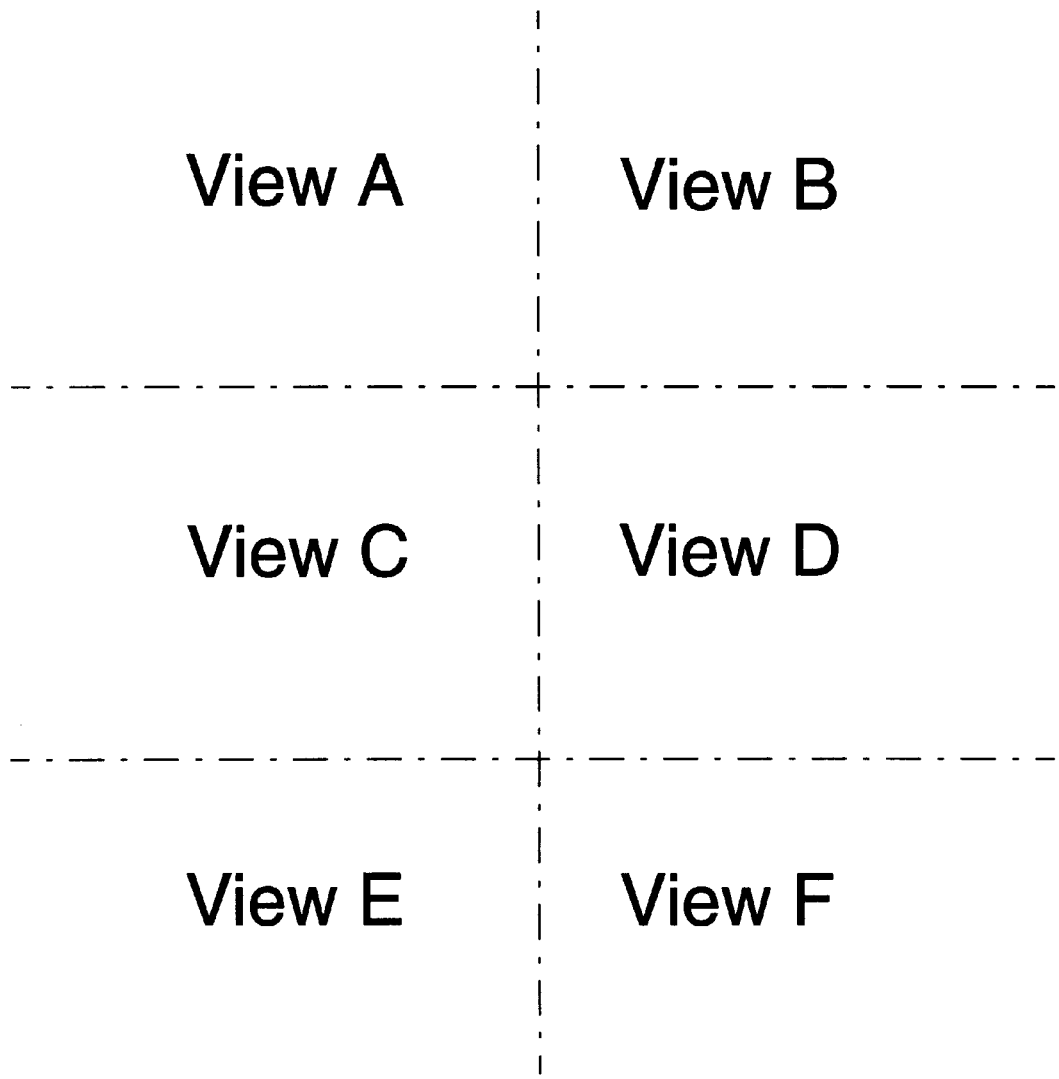

Fig. 56M

READ INVALIDATE

| View A | View B | View C |
|--------|--------|--------|
| View D | View E | View F |
| View G | View H | View I |
| View J | View K | View L |

MEMORY WRITEBACK

NON-CACHEABLE READ

NON-CACHEABLE WRITE

APPARATUS AND METHOD FOR A CACHE COHERENT SHARED MEMORY MULTIPROCESSING SYSTEM

BRIEF DESCRIPTION OF THE INVENTION

The present invention relates generally to multiprocessor systems and methods. More particularly, the invention relates to a shared memory cache coherent multiprocessor system utilizing a point-to-point interconnect architecture.

BACKGROUND OF THE INVENTION

The aim of parallel processing is to utilize a number of processing elements that can communicate and cooperate to solve a problem. In a highly parallel processing system, hundreds of processing elements are used to solve a problem that is spread over many processing elements. Not all of the processing elements are used to run a single problem and the system can be configured to execute multiple problems simultaneously. By contrast, in a low parallel processing system, tens of processing elements are used to solve an entire problem.

Symmetric multiprocessing (SMP) is one such type of low parallel processing system. A SMP system is characterized by "symmetric" processors that each have an equal share and access to the system resources, including memory and I/O. The processors are managed by a single operating system that provides an application program with a single view of the entire system.

FIG. 1 illustrates one such shared memory SMP 100. There is shown a number of symmetric processors 102A–102N interconnected by a bus 104. A main memory 106 is provided that is connected to the bus 104 and shared by each of the processors 102. In addition, I/O devices 108 are connected to the bus 104 and are accessible by each processor 102 and the main memory 106. Each of the components of the system 100 are synchronized to a common system clock 110.

In order to reduce the traffic to the main memory 106, each processor 102 has a local cache memory 112 that can contain shared data. Since the data in the each processor's cache 112 can be shared by each processor 102, the problem then becomes one of cache coherency. In most SMP systems, a snoopy bus protocol is used to maintain cache coherency. In a snoopy bus protocol, a memory access transaction, such as a read or write, is broadcasted to all the processors 102 connected to the bus 104. Each processor 102 monitors or "snoops" the bus 104 for a memory access transaction that pertains to a cache line that is associated with the processor's cache 112. When the processor 102 finds such a transaction, it takes appropriate action to ensure that each cache line is coherent within the system 100.

There are several disadvantages with this type of SMP system. The primary disadvantage is the use of the bus as the interconnect structure. Although the use of the bus provides cache coherency, it is a limiting factor for improving the system's throughput. First, the use of the bus constrains the number of transactions that can be processed simultaneously. The same bus is used to process both memory and I/O transactions initiated by each processor. As such, only one transaction can be processed at a time.

Second, the contention for the bus by each processor to access main memory unnecessarily increases the overhead in servicing a memory access transaction. Various approaches have been tried to overcome this limitation such as increasing the width of the bus, running the bus at a higher clock speed, and increasing the size of the caches. However, each of these approaches greatly increases the expense and complexity of the system.

Another limitation with the use of the bus are the well-known transmission line effects associated with buses. These transmission line effects are attributable to the complicated electrical phenomenon present in the connections made to each device coupled to the bus. These transmission line effects limit the speed at which the bus operates thereby reducing the system's throughput.

Accordingly, there exists a need for a SMP system that overcomes these shortcomings.

SUMMARY OF THE INVENTION

The present invention pertains to a system and method for operating a shared-memory multiprocessing system with cache coherency. The system includes a number of devices including several processors, a multiple accessible main memory, and several external I/O devices. Each device is connected to a flow control unit (FCU). The FCU controls the exchange of data between each device in the system. The FCU includes a snoop path for processing a first set of data transactions and one or more data paths that process a second set of data transactions. The snoop path and each of the data paths can operate concurrently thereby providing the system with the capability of processing multiple data transactions simultaneously thereby increasing the system's throughput.

Each device is connected to the FCU by means of a dedicated channel or point-to-point connection. The FCU has a dedicated interface unit for each device. A channel is used by one device and its associated interface unit in the FCU. Since the channel is not a bus, it does not experience the well known transmission line effects associated with buses, and as such, can operate at a high transfer rate. The improved speed of the channel increases the system's throughput.

In addition, the use of the channel does not require an arbitration phase or arbitration logic as is required in bus-based interconnect structures. The elimination of the arbitration logic reduces the complexity of the circuitry and the elimination of the arbitration phase increases the system throughput.

Each of the processors is associated with its own system clock and runs independent of other processor and the FCU. As such, the FCU can receive requests from each of the processors with a high degree of tolerance to clock skewing between the different devices.

In a preferred embodiment, the technology of the present invention can be utilized in a SMP environment. There can be n symmetric processors, n CPU interface units (CIU), l memory control units (MCU), and k bus bridge units (BBU) connected to the FCU. Each processor can have a L2 cache containing data that is shared amongst the processors. Each CIU is coupled to a processor bus and receives memory and I/O requests initiated by the processor to access data that is external to the processor. The CIU translates the processor bus cycles into channel cycles and vice versa.

Each MCU is connected to one or more memory devices and serves to control access between the FCU and the portion of main memory that is under its control. Each BBU serves to provide a communication path between one or more I/O buses interconnected to external I/O devices and the FCU. The BBU receives data requests from the FCU via the channel and from the I/O buses. The BBU converts the I/O bus cycles into channel cycles and vice versa.

The FCU processes memory and I/O transactions received from the devices. The memory transactions can be used to access data that resides in another processor's cache, to access data stored in main memory, to maintain cache coherency, and to access memory mapped I/O. Main memory can include portions designated as either cacheable memory, non-cacheable memory, and I/O addressable memory. The I/O transactions can be used to transfer data between the processor associated with a CIU and an external I/O device.

BRIEF DESCRIPTION OF THE DRAWINGS

For a better understanding of the nature and objects of the invention, reference should be made to the following detailed description taken in conjunction with the accompanying drawings, in which:

FIG. 3 is a table listing the transactions processed in a preferred embodiment of the present invention.

FIGS. 11A–11B illustrate the command and data phases associated with the channel protocol in a preferred embodiment of the present invention.

FIGS. 34–40 are flow charts illustrating the steps used by the CIU channel interface unit to process data received from the snoop path in a preferred embodiment of the present invention.

Like reference numerals refer to corresponding parts throughout the several views of the drawings.

DETAILED DESCRIPTION OF THE INVENTION

Computer Architecture Overview

Figure 1:
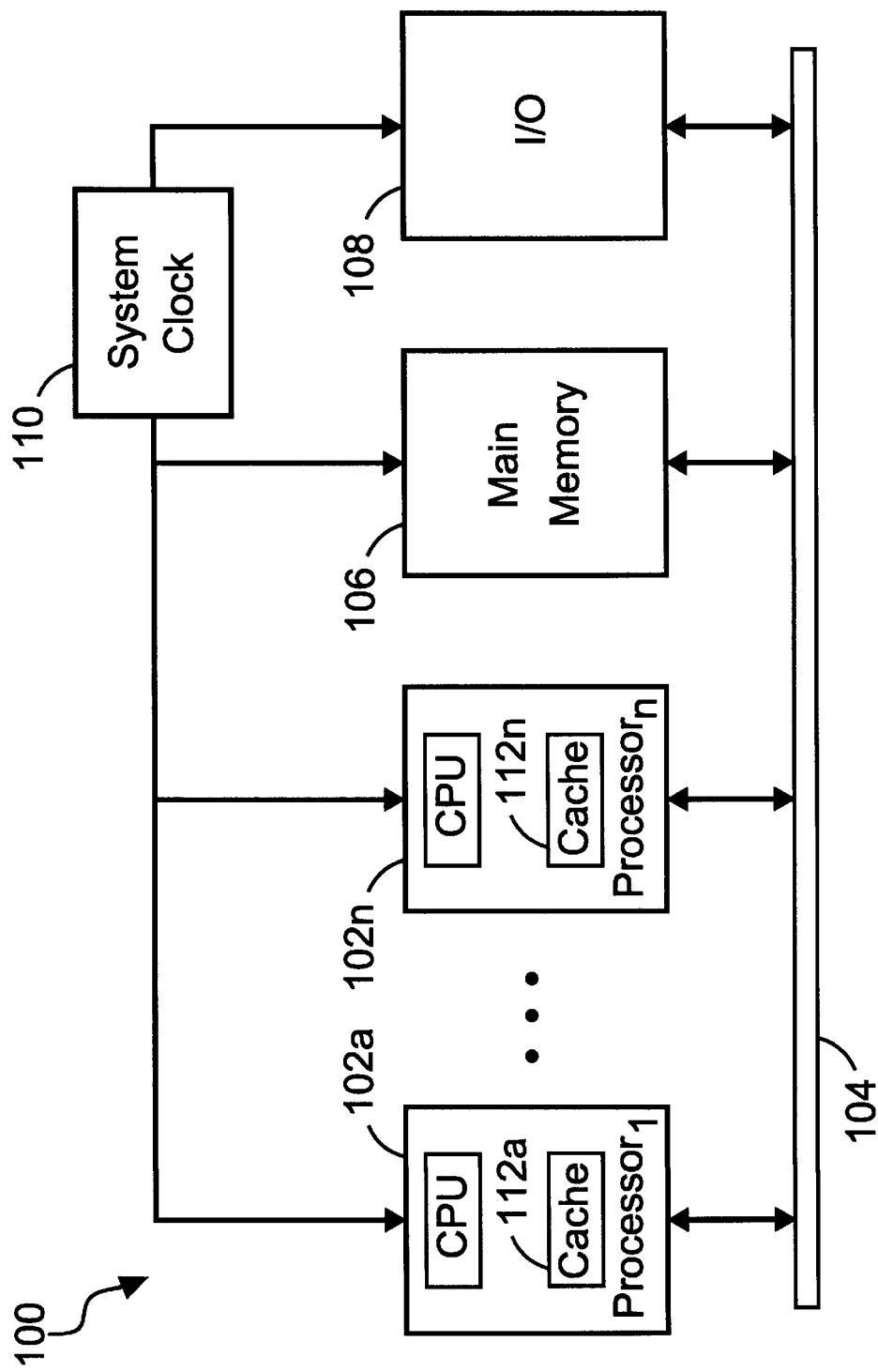
FIG. 1 illustrates a prior art shared memory SMP system.
Figure 2:
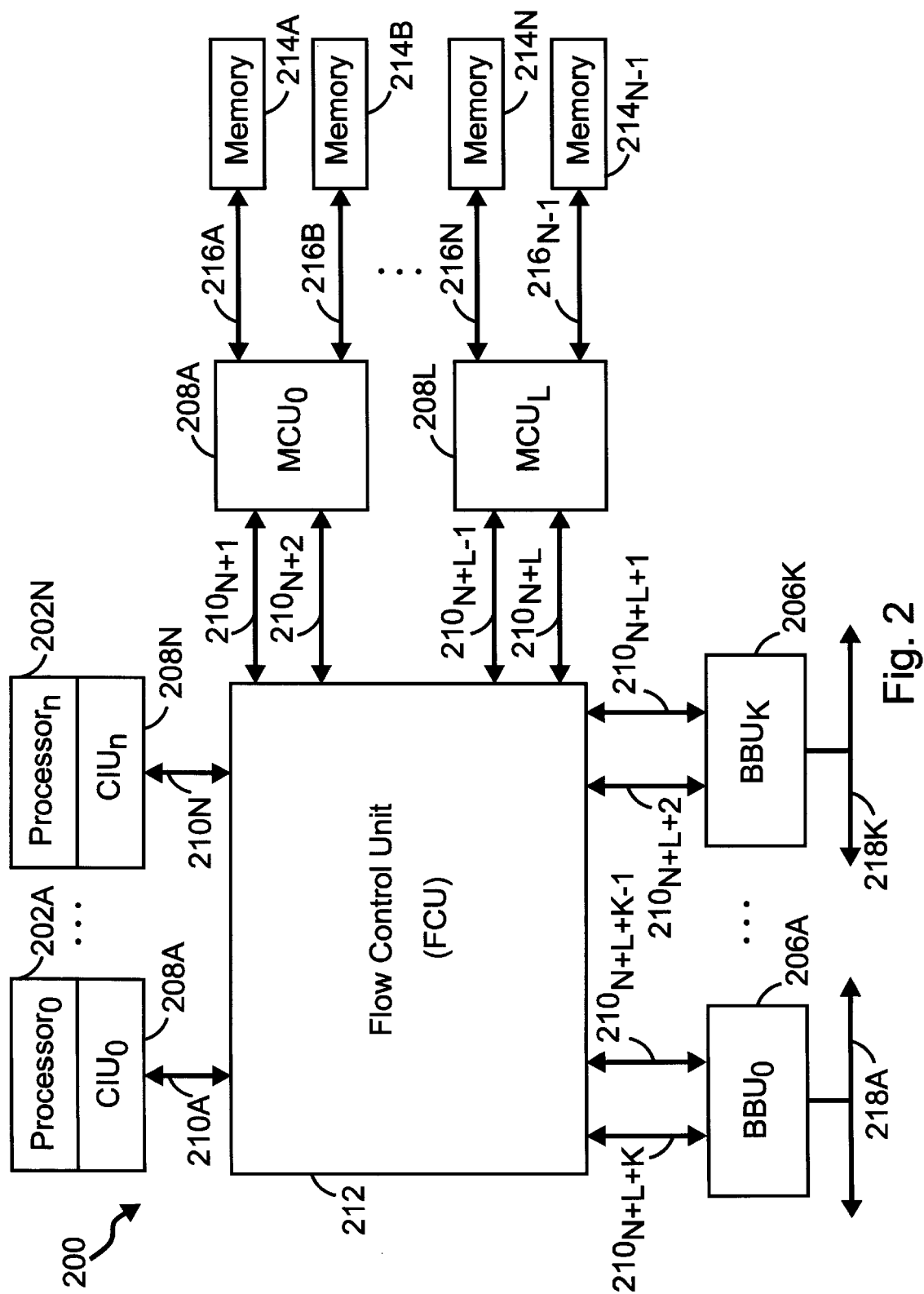
FIG. 2 illustrates the shared memory multiprocessor system of a preferred embodiment of the present invention.

FIG. 2 illustrates the multiprocessing system 200 of the present invention. The multiprocessing system 200 includes n processors 202A–202N, 1 memory control units 204A–204L, and k bus bridge units 206A–206K.

Preferably, each processor is symmetric, that being each processor has an equal share and access to the system resources, including memory and I/O. The processors 202 can be any type of processing unit having a CPU, such as but not limited to a microprocessor, and the like. In a preferred embodiment, a processor 202 can be a microprocessor such as but not limited to Intel's Pentium Pro Microprocessor, Advanced Micro Devices's (AMD) K6 or K7 microprocessors, Sun Microsystems SPARC microprocessor, and the like. It should be noted that the present invention is not limited to any particular type of processor design. In an alternate embodiment, processors having different clock speeds can be used as long as there is a common base clock frequency. Furthermore, the present invention is not constrained to symmetric processor systems.

Each processor 202 is coupled to a CPU Interface Unit (CIU) 208. The CIU 208 is coupled to a channel 210 that serves as a point-to-point connection to a flow control unit (FCU) 212. The CIU 208 translates data received from the processor 202 into a format that is suitable for the channel 210 and translates data received from the channel 210 into a format recognizable by the processor 202. In a preferred embodiment, the processor 202 utilizes a 64-bit data format and the channel utilizes a 16-bit data format. It should be noted that the present invention is not constrained to any particular data format.

Each CIU 208 has a point-to-point connection or channel 210 to the FCU 212. The channel 210 enables the transfer of data between a specific CIU 208 and the FCU 212 and operates at a high transfer rate. Preferably, the channel 210 operates at a data transfer rate of 1.6 Gbytes/second with a channel clock speed of 400 MHz.

The FCU 212 controls the flow of data between the devices. The FCU 212 includes a snoop path and several data paths. A snoop path is provided that is used to process certain types of transactions that operate on cacheable memory or maintain cache coherency. Each device connected to the FCU 212 can transmit these transactions simultaneously to the FCU 212. However, these transactions will be processed sequentially since there is at least one snoop path.

In addition, the FCU 212 includes several data paths. Each device connected to the FCU 212 can use the data paths. The data paths provide a direct connection between two devices connected to the FCU 212 and are used to service certain types of transactions. Since there are multiple data paths, these transactions can be processed simultaneously in conjunction with those transactions using the snoop path, thereby providing the system with the capability to process multiple transactions simultaneously.

For example, a memory writeback transaction can be processed using a data path simultaneously as a snoop operation is performed and while other transactions using the data paths are executed. This could not be achieved by the prior art SMP systems since the use of the bus permits the execution of a single transaction at a time. Thus, in the prior art, the memory writeback transaction would be processed through the snoop bus and sequentially with respect to other snoop operations.

The FCU 212 is coupled to a series of l memory controllers (MCUs) 204A–204L and a series of k bus bridge units (BBU) 206A–206K. Each MCU 204 can be connected to one or more designated memory devices 214A–214L. A MCU 204 serves as a bridge between the FCU 212 and the memory devices 214 and regulates access to the data in the designated memory devices 214.

Preferably, the multiprocessing system is configured to have one or two MCUs 204. Each MCU 204 can service two memory devices 214. In a preferred embodiment, the memory device 214 is made of synchronous dynamic random access memories (SDRAMs) ranging in sizes from 16 Mbit to 64 Mbits. Thus, each MCU 204 supports a maximum memory size of 1 GB using 16 Mbit DRAM chips and a maximum memory size of 4 GB using 64 Mbit DRAM chips. However, it should be noted that the present invention is not limited to this particular type of memory device and that any other type can be used.

There can be two independent channels per MCU 204, each of which can be 8-bits or 16-bits wide. Each MCU 204 has two independent 72-bit SDRAM interface ports or memory buses 216 referred to as $port_0$ and $port_1$. Each memory bus provides access to a designated portion of the memory device 214.

Each BBU 206 is coupled to the FCU 212 by one or more channels 210. A BBU 206 is also coupled to a group of external I/O devices through a port that is connected to a data bus 218 associated with a group of external I/O devices. Each BBU 206 translates data received by an external I/O device into a format for the channel 210 and translates data received from the channel 210 into a format for the external I/O device.

The channel 210 serves as a point-to-point connection from the BBU 206 to the FCU 212. The channel 210 enables the BBU 206 to establish a communication path with the FCU 212 in order to transfer data between any device connected to the FCU 212 and the external I/O devices connected to a BBU 206. Preferably, the channel 210 can utilize an 8-bit or 16-bit data format and the data formats from the various data buses can range from 16-bits to 64-bits. The channel 210 operates at a high transfer rate, preferably at a data transfer rate of 1.6 Gbyte/second with a 400 MHz channel clock speed.

The foregoing has presented an overview of the computer system of the present invention. Attention now turns to the flow control that the foregoing computer system supports.

The FCU 212 controls the flow of data between each of the devices. A device can exchange data with another device connected to the FCU 212 by transferring a transaction to the FCU 212. FIG. 3 lists the transactions that can be processed by the FCU 212. These transactions can be categorized into the following classifications: (1) cacheable read and write transactions; (2) I/O memory read and write transactions; (3) I/O read and write transactions; (4) read invalidate transaction; (5) memory writeback transaction; and (6) non-cacheable read and write transactions. It should be noted that the present invention is not limited to these classifications and that others are provided to perform other functions. Examples of such transactions include but are not limited to transactions that flush the tag memories, transactions that configure the FCU, transactions that indicate the shutdown of a processor, transactions that acknowledge an interrupt and so on.

Figure 4A:
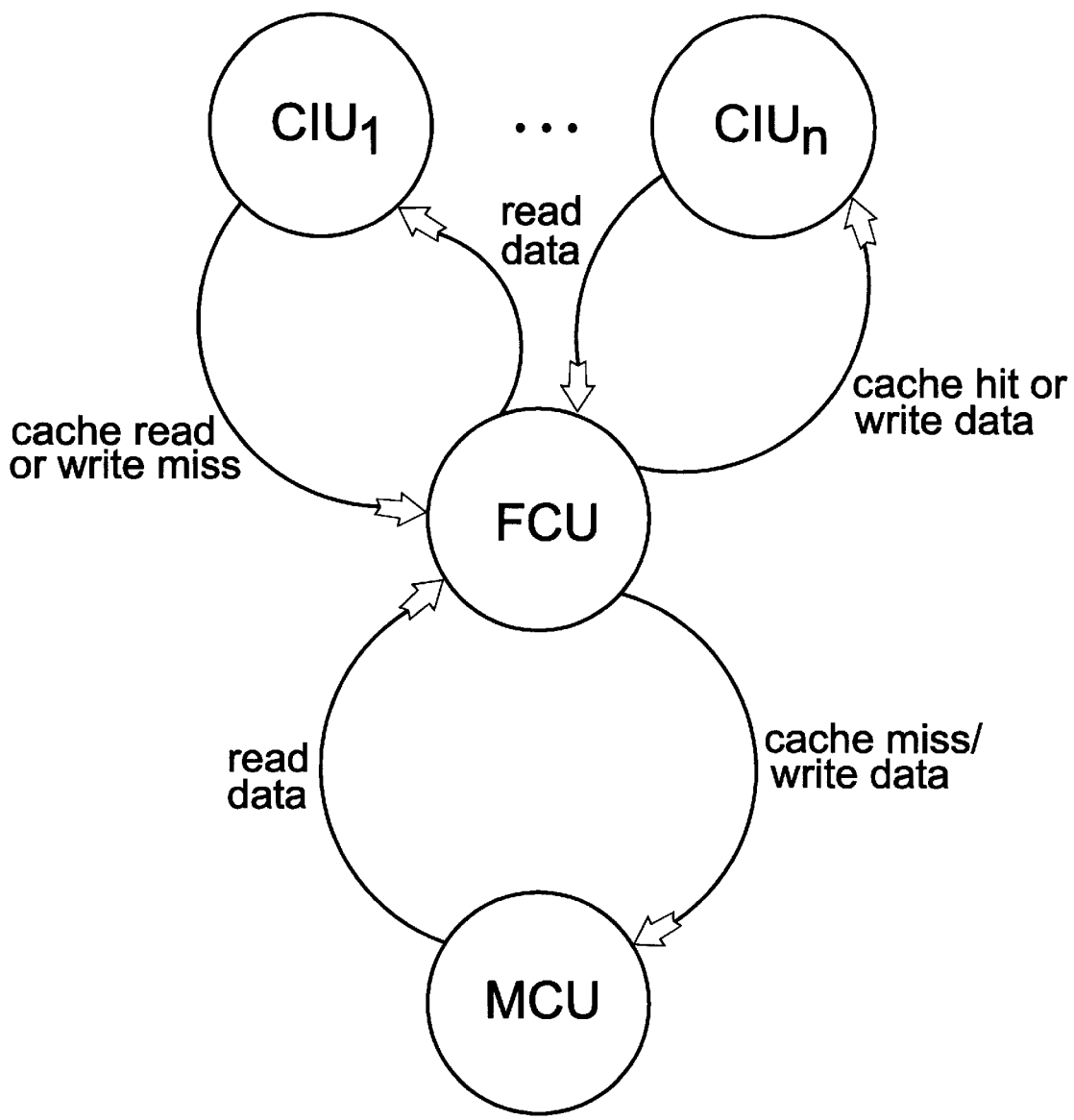
FIGS. 4A–4G illustrate the flow of the transactions listed in FIG. 3 in a preferred embodiment of the present invention.

FIG. 4A illustrates the flow control of the cacheable read and write transaction. A cacheable read and write transaction deals with cacheable memory that can reside in any of the caches or in the cacheable section of memory. A cacheable read and write transaction can be initiated by a CIU 208 and transmitted to the FCU 212. Typically, this occurs when the processor 202 encounters a cache miss. A cacheable read and write transaction requires that the cache associated with each CIU 208 be searched for the intended data. When the requested data is not found in another cache, main memory is then accessed through the MCU 204.

Figure 4B:
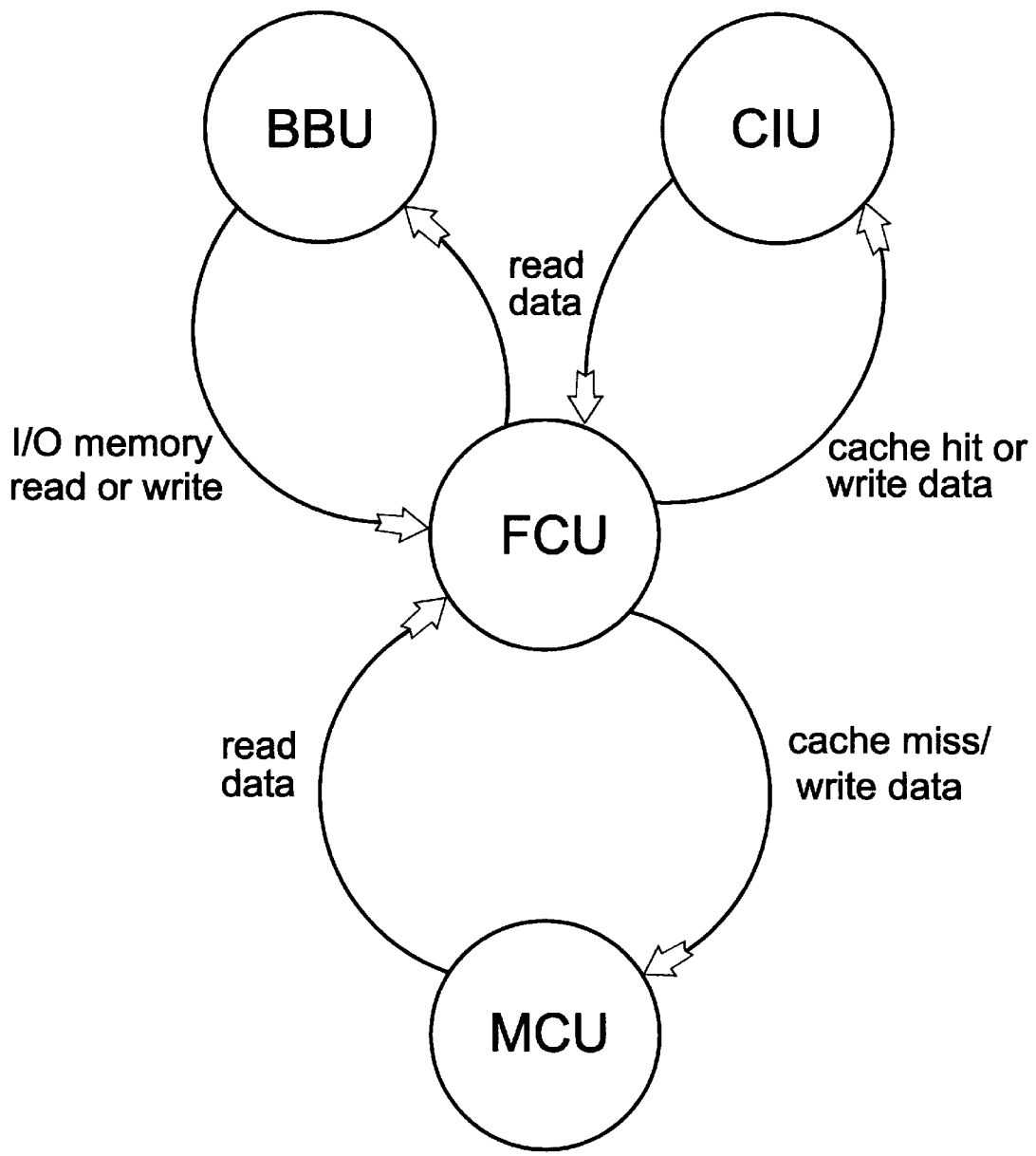

FIG. 4B illustrates the flow control of an I/O memory read and write transaction that is initiated by the BBU 206. An I/O memory read and write pertains to data that is in an I/O address space that is memory mapped to the I/O devices. The BBU 206 does not cache the data however the data can be cached by the processors. Thus, the requested data can reside in any of the caches or main memory. When the requested data is not found in any of the caches, main memory is then accessed through the MCU 204.

Figure 4C:
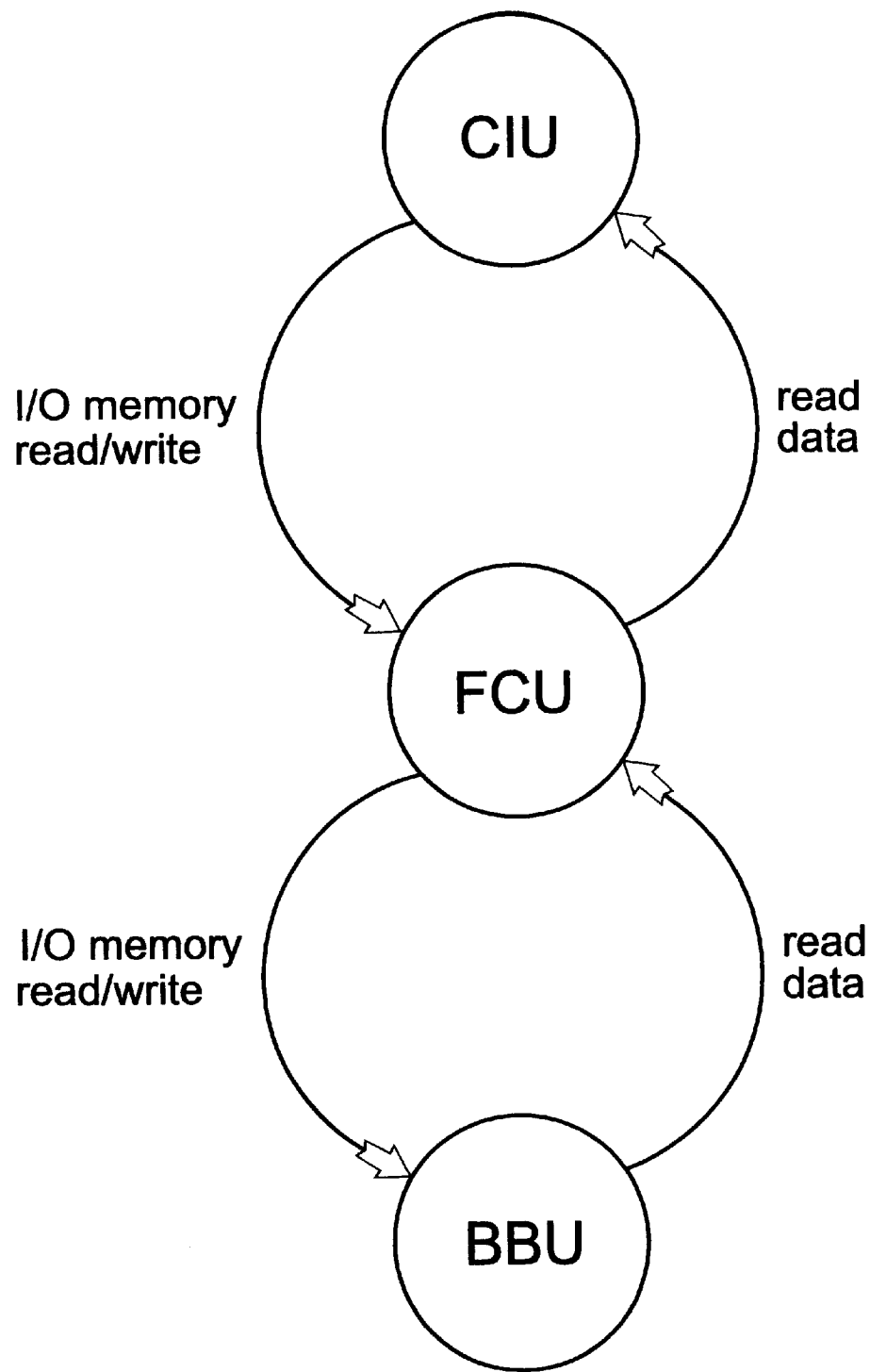

FIG. 4C illustrates the flow control of an I/O memory read and write transaction that is initiated by the CIU 208. The BBU 206 associated with the I/O device associated with the requested the data is accessed.

Figure 4D:
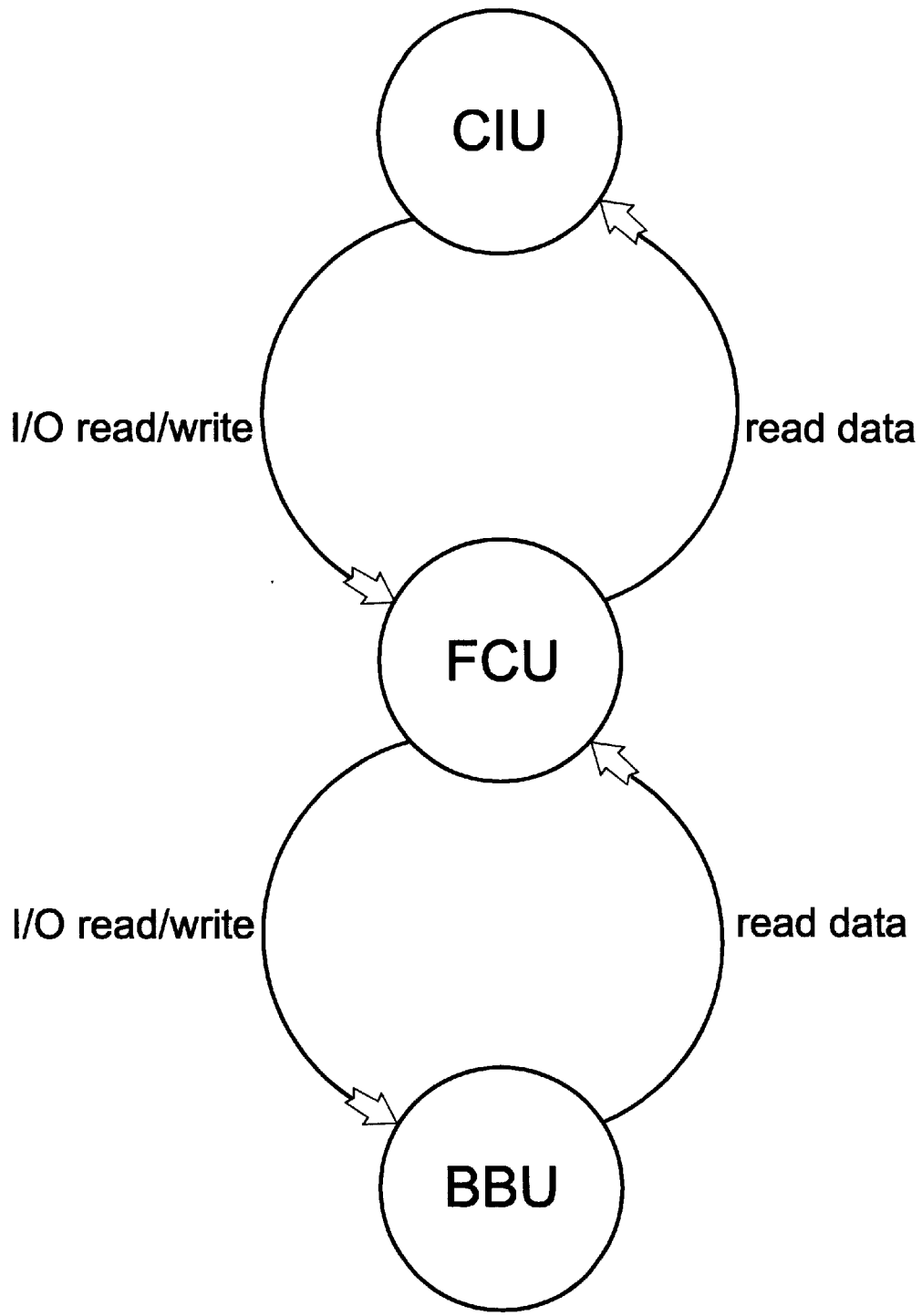

FIG. 4D illustrates the flow control of an I/O read and write transaction. An I/O read and write transaction is initiated by the CIU 208 to read or write data in an I/O device in communication with a BBU 206. The transaction is transmitted from the CIU 208 to the FCU 212 which in turns provides the data path to the intended BBU 206. In the case of an I/O read, the data read from the I/O device is transmitted to the BBU 206 and then the FCU 212. The FCU 212 provides a data path to the respective CIU 208.

Figure 4E:
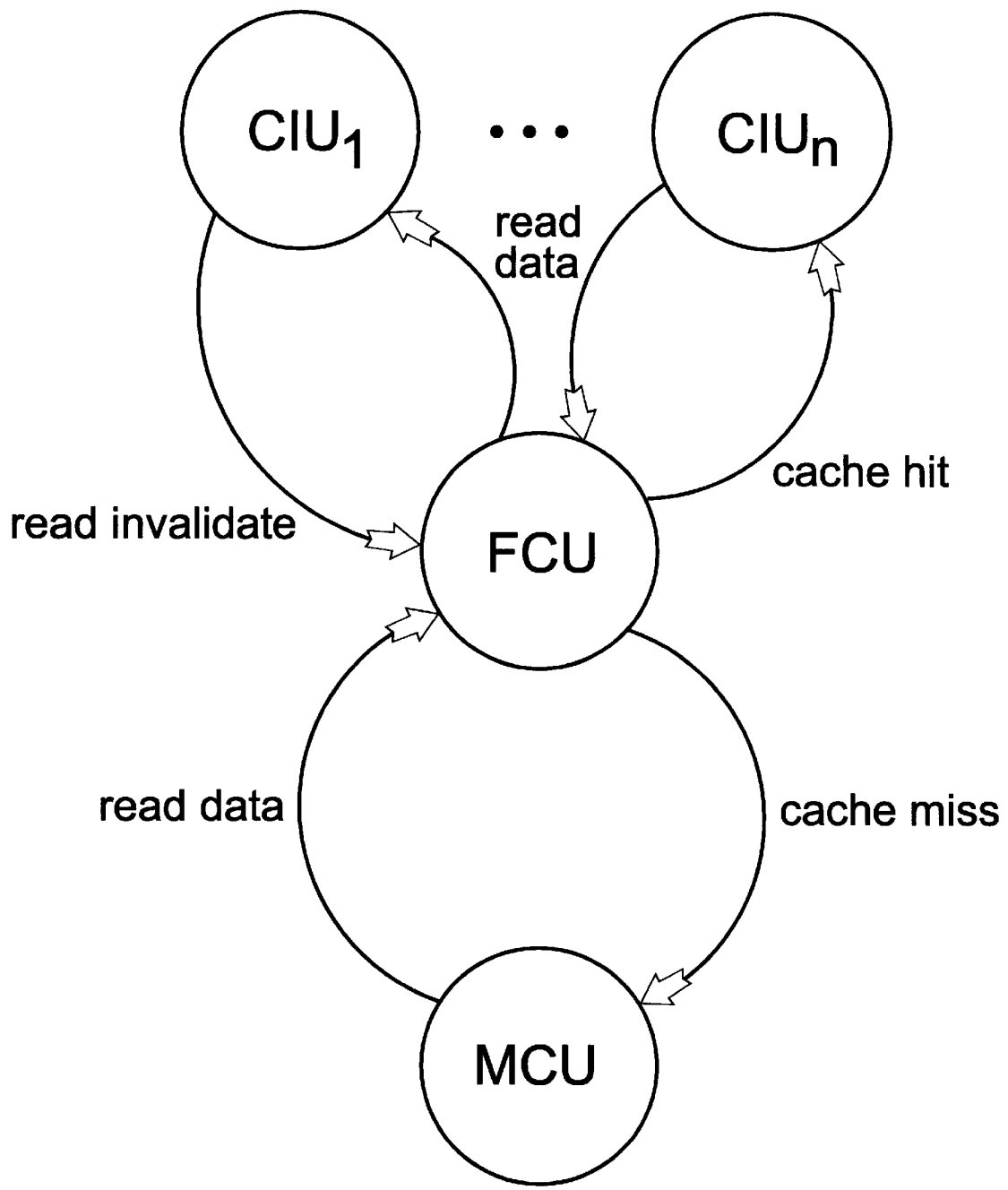

FIG. 4E illustrates the flow control of the read invalidate transaction. The read invalidate transaction is initiated by the CIU 208 and can obtain the requested data from either one of the caches or from main memory and can invalidate the state of the cache line in the other caches.

Figure 4F:
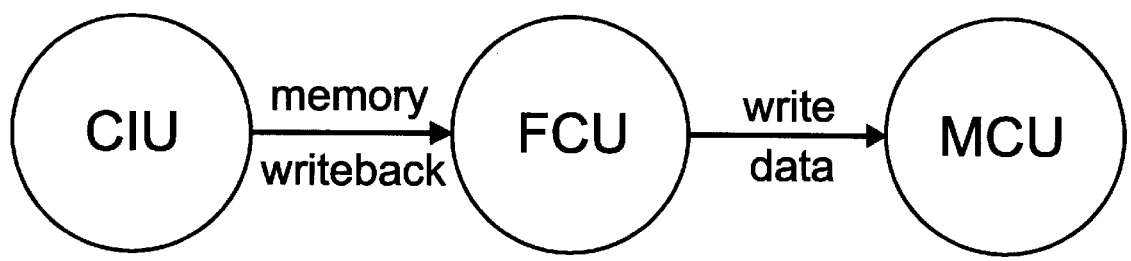

FIG. 4F illustrates the flow control of the memory writeback transaction that is used to write a cache line back to main memory. The memory writeback transaction is initiated by the CIU 208 and transmitted to the FCU 212 which in turn provides a data path to the intended MCU 204 that can write the data to the target memory.

Figure 4G:
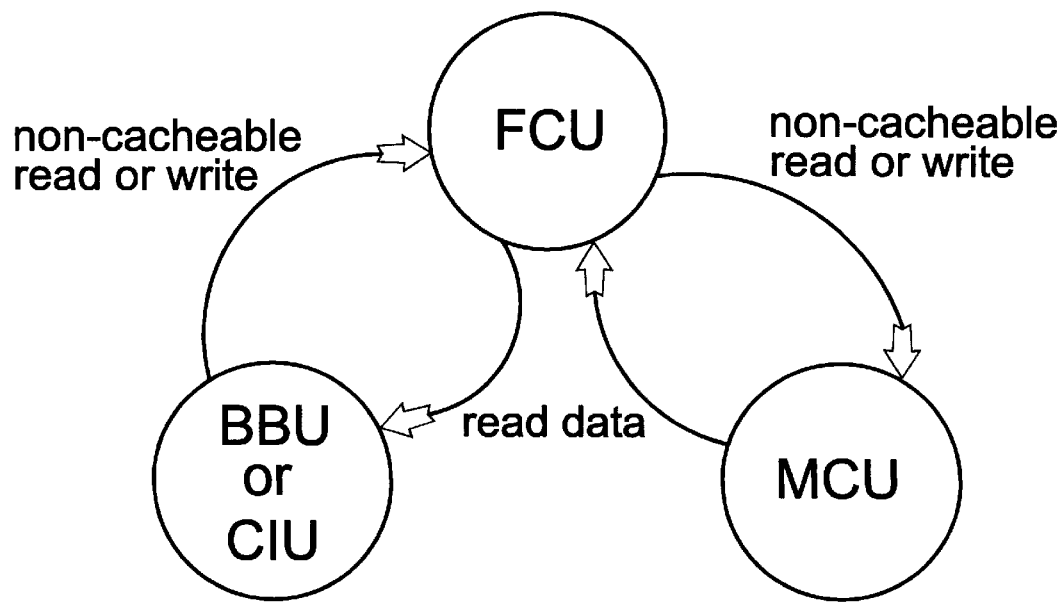

FIG. 4G illustrates the flow control of the non-cacheable memory read and write transactions. These transactions can be initiated by either the CIU 208 or the BBU 206 and transmitted to the FCU 212. The FCU 212 provides a data path to the intended MCU 204 that can access the target memory.

The foregoing overview has briefly described the basic component and flow control of the architecture of the multiprocessor system of the present invention. Attention now turns to a more detailed description of the components of the system as well as the operation of the system.

CPU Interface Unit

Figure 5A:
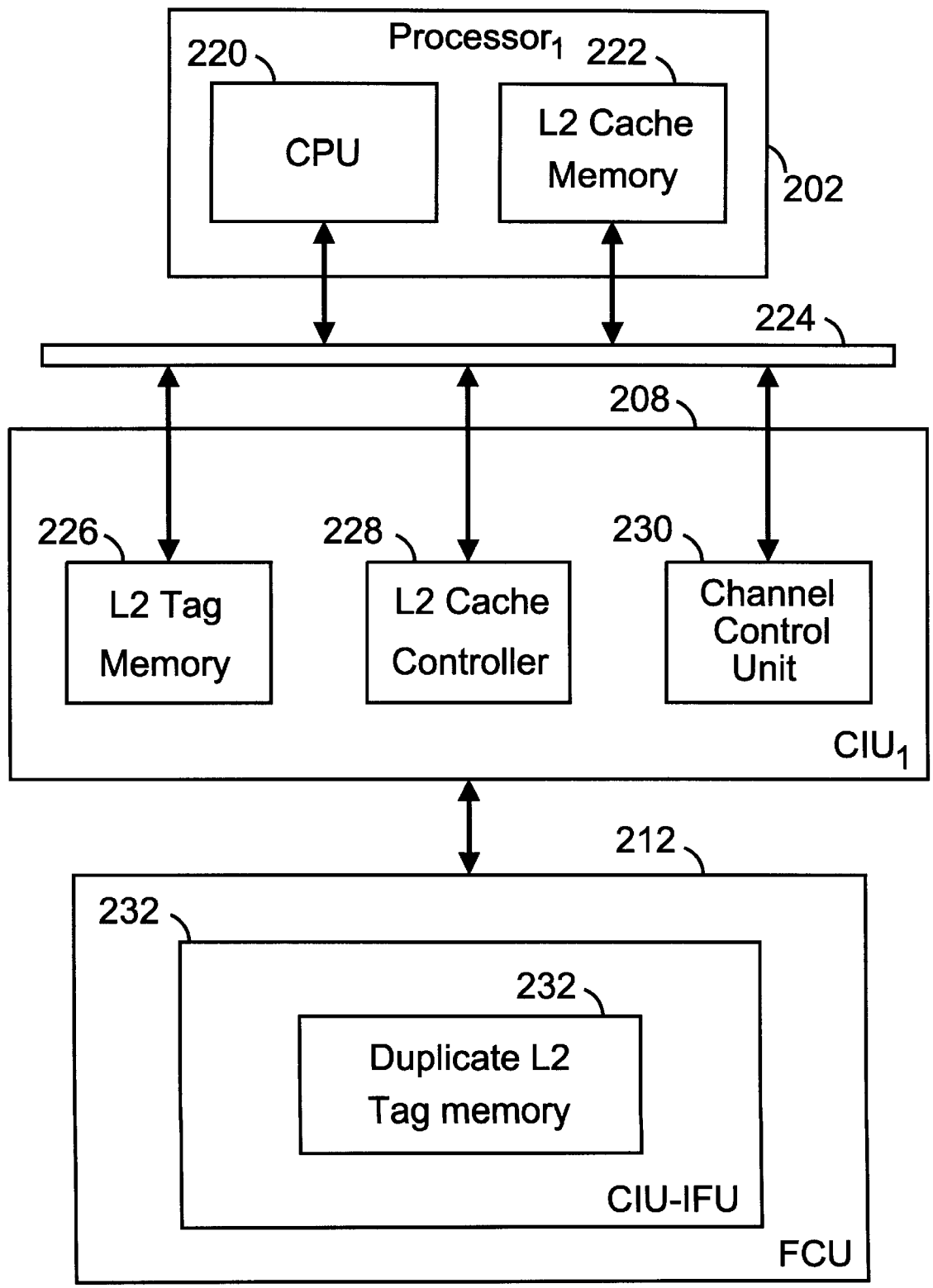
FIG. 5A illustrates a first preferred embodiment of a processor and CIU shown in FIG. 2.

FIG. 5A illustrates a first preferred embodiment of the CIU 208. The processor 202 includes a CPU 220 and a second level (L2) cache memory 222 that is external to the CPU 220. The CPU 220 and the L2 cache memory 222 can each be a separate integrated circuit. The CPU 220 can include a L1 cache and other elements not shown. The L1 cache is local to the processor 202 and can contain data that is stored in the L2 cache memory 202. The L2 cache memory 222 includes data that can be shared by one or more of the other processors 202.

The processor bus 224 is connected to the CIU 208. The CIU 208 includes a L2 tag memory 226, a cache controller 228, and a channel control unit 230. The L2 tag memory 226 includes a set of cache tags, one for each data block stored in the L2 cache memory 222. The L2 cache controller 228 includes L2 cache transaction request logic for processing L2 cache requests initiated by the processor 202. The L2 cache controller 228 will process a L2 cache request in accordance with the preferred cache coherency model. In a preferred embodiment, the L2 cache 222 follows a modified exclusive shared invalid (MESI) cache coherency model. However, it should be noted that the present invention is not limited to this particular cache coherency model and others can be used such as but not limited to MOSI, MOSEI, and the like.

The channel 210 associated with the processor 202 is connected to the FCU 212. The FCU 212 includes a CIU 232 which will be described in more detail below. For the purposes of describing the CIU 208, FIG. 5A only shows the CIU 232 including a duplicate L2 tag memory 234. The duplicate L2 tag memory 234 contains a set of duplicate cache tags, one for each data block in the processor's L2 cache memory 222. The L2 cache controller 228 receives requests from the processor for data in the L2 cache 222. The L2 cache controller 228 services certain transactions and transfers other transactions to the corresponding CIU 232 in the FCU 212. Control logic in the CIU 232 will take the appropriate action to service those transactions transmitted to the FCU 212.

The channel control unit 230 packs data received from the processor bus 224 into a format used by the FCU 212 and packs data received from the FCU 212 into the format used by the processor bus 224. The data can include commands and/or write/read data. Packing the data in this manner enables the FCU 212 to achieve fast access to the main memory and allows the FCU 212 to perform fast command decoding.

Figure 5B:
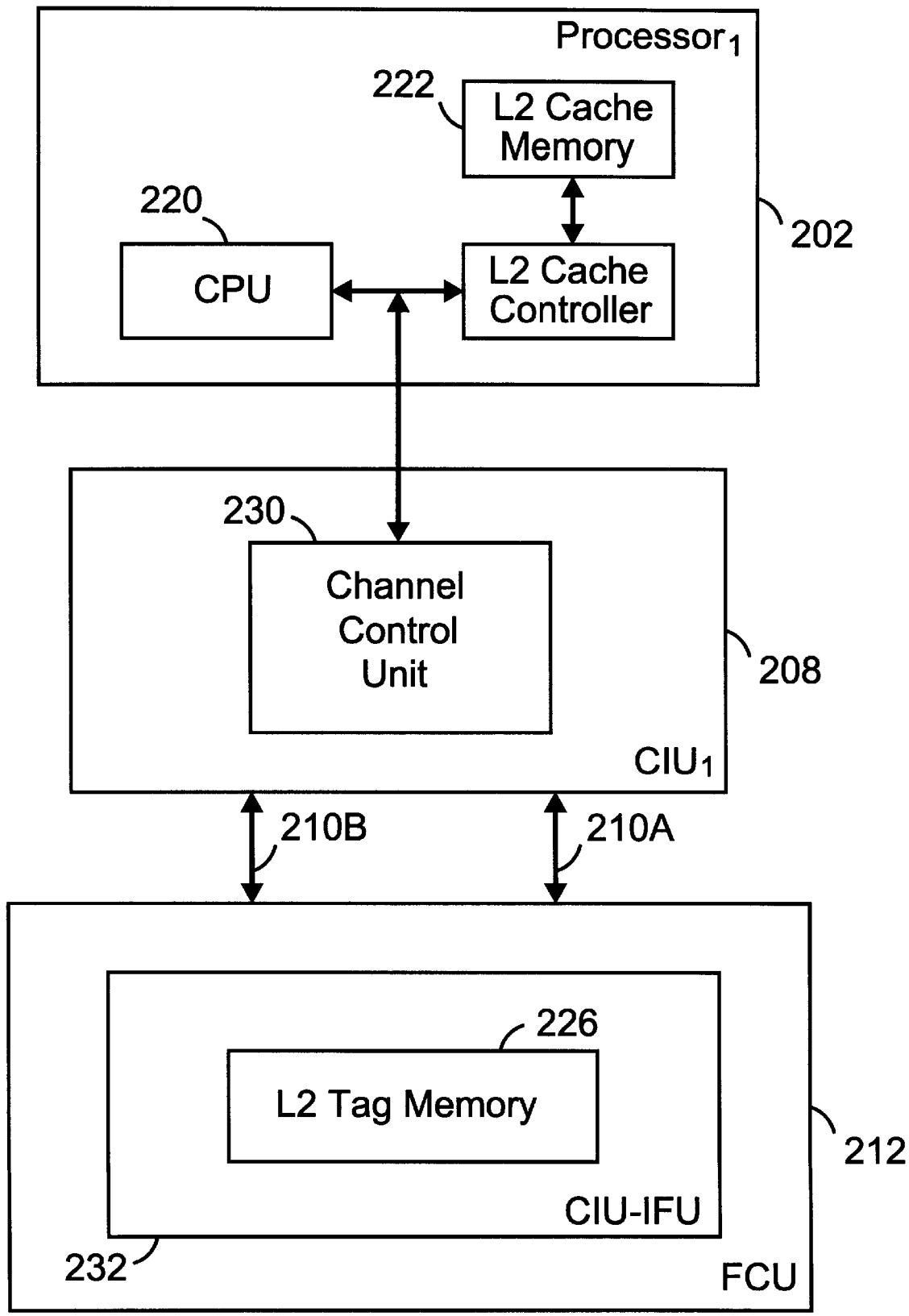
FIG. 5B illustrates a second preferred embodiment of a processor and CIU shown in FIG. 2.

FIG. 5B illustrates a second preferred embodiment of the processor 202 and CIU 208. In this embodiment, the processor 202 includes a CPU 220 and a second level (L2) cache memory 222 that is external to the CPU 220. The CPU 220 can include a first level (L1) cache and other elements not shown. The L1 cache is local to the processor 202 and can contain data that is stored in the L2 cache memory 222. The L2 cache memory 222 contains data that is shared by one or more of the other processors 202. A L2 cache controller 228 is provided which is also external to the CPU 220.

The L2 cache controller 228 services requests from the CPU 220 for data in the L2 cache memory 222. The L2 cache controller 228 includes L2 cache transaction request logic for processing L2 cache requests initiated by the CPU 220. The L2 cache controller 228 processes the requests in accordance with the preferred cache coherency model. In a preferred embodiment, the L2 cache 222 follows a modified exclusive shared invalid (MESI) cache coherency model. However, it should be noted that the present invention is not limited to this particular cache coherency model as noted above.

The processor 202 communicates with the CIU 208 through a processor bus 224. Preferably, the processor bus 224 can support 32-bit or 64-bit data transfers. The CIU 208 is coupled to a channel 210 which in a preferred embodiment can support either 8-bit or 16-bit data transfers. The CIU 208 includes a channel control unit 230 that packs data obtained from the processor bus 224 into a format used by the FCU 212 and vice versa.

The channel 210 associated with the processor 202 is connected to the FCU 212. The channel 210A includes a set of clock, data and control signals which are described in more detail below. In addition, the channel includes a set of local response signals 210B which are used to transmit the results of the tag comparison back to the CIU. Preferably, the response signals can include a clock signal and a control signal indicating the MESI state as well as other information.

The FCU 212 includes a CIU 232 which will be described in more detail below. For the purposes of describing the CIU 208, FIG. 5B shows the CIU 232 including a L2 tag memory 226. The L2 tag memory 226 contains a set of cache tags, one for each data block in the processor's L2 cache memory 222. The L2 cache controller 228 will receive requests from the processor for data in the L2 cache 222. The L2 cache controller 228 will transfer these requests through the CIU 208 and channel 210 to the associated L2 tag memory 222 in the FCU 212. Control logic in the CIU 232 will determine whether the requested data is in the L2 cache memory 222 and take the appropriate action to service the request. These actions will be described in more detail below.

Figure 5C:
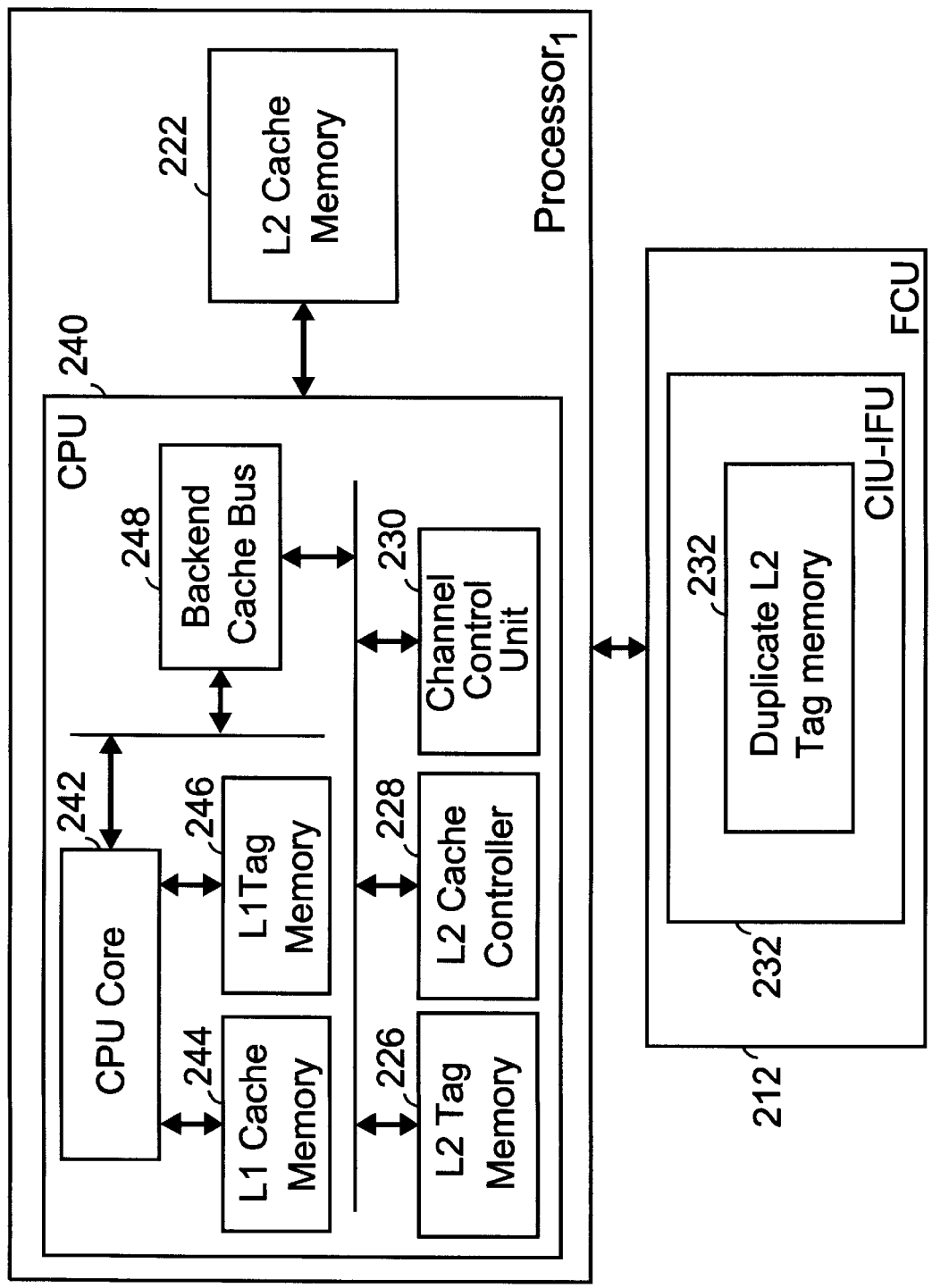
FIG. 5C illustrates a third preferred embodiment of a processor and CIU shown in FIG. 2.

FIG. 5C illustrates a third preferred embodiment of the CIU. In this embodiment, the components and functionality of the CIU 208 is integrated within the processor 202. The processor 202 can include a CPU 240 including a CPU core 242, a L1 cache memory 244, a L1 tag memory 246, a L2 cache controller 228, a channel control unit 230, a backend cache bus 248, L2 tag memory 226 and other elements not shown. An external L2 cache memory 222 is also provided. The L1 cache memory 222 is local to the processor 202 and can contain data that is stored in the L2 cache 222. The L2 cache memory 222 includes data that can be shared by one or more of the other processors 202.

The channel control unit 230 is coupled to the channel 210 and the processor bus 250. The channel control unit 230 packs data obtained from the processor bus 250 into a format used by the FCU 212 and vice versa.

The channel 210 is connected to the FCU 212. The FCU 212 includes a CU 232 which will be described in more detail below. For the purposes of describing this embodiment, FIG. 5C only shows the CIU 232 including a duplicate L2 tag memory 234. The duplicate L2 tag memory 234 contains a set of duplicate cache tags, one for each data block in the processor's L2 cache memory 222. The L2 cache controller 228 receives requests from the processor for data in the L2 cache 222. The L2 cache controller 228 services certain transactions and transfer other transactions to the duplicate L2 tag memory 234. Control logic in the CIU 232 takes the appropriate action to service those transactions transmitted to the FCU 212.

It should be noted that the present invention is not constrained to the processor cache hierarchy described in the preferred embodiments. The present invention can be practiced with any cache configuration which can include any number of internal and/or external caches.

The foregoing has described the various embodiments of the CIU. Attention now turns to the cache coherency model.

Cache Coherency Model Overview

In a preferred embodiment of the present invention, each of the processors 202 and the FCU 212 utilize the MESI cache coherency model. The cache coherency model will dictate the actions that the L2 cache controller 227 performs when servicing a processor's request for data from the L2 cache 222 and whether the request requires actions by the FCU 212. The FCU 212 is used to access data in another processor's cache, to access data from main memory or from a memory region associated with an I/O device, to change the state of a cache line in one or more of the processor caches, to maintain cache coherency, and the like.

Preferably, the different levels of caches operate in accordance with the inclusion principle. Data that is included in both the L1 and L2 caches are maintained in a consistent state. Data that is fetched from the L2 cache is returned to the processor and stored in the L1 cache. If the cache line is in both the L1 and L2 caches, when the processor modifies the data in the L1 cache the corresponding cache line in the L2 cache is also modified. Similarly, when data in the L2 cache is modified and concurrently stored in the L1 cache, the L1 cache is modified to reflect the modification.

Briefly, in the MESI cache coherency model, each cache line is associated with one of the four states: invalid, shared, exclusive, and modified. In addition, cacheable main memory can be classified as being either in write-through or copy-back mode. In write-through mode, the modified data is updated to both the cache and the main memory. In copy-back mode or write-back mode, the modified data is written to the cache. The corresponding main memory location is updated with the modified data when the modified data is replaced.

Based on the state of the cache line, the type of access (i.e., read or write), and the memory mode, the L2 cache controller 228 can either service the request immediately or transmit an associated memory transaction to the FCU which in turn services the request. The following description briefly summarizes the various actions that can occur when a L2 cache controller 228 accesses a cache line in its associated L2 cache 222. A more detailed description of the MESI cache coherency protocol can be found in Flynn, et al., Computer Architecture, published by Jones and Bartlett, 1995, which is hereby incorporated by reference.

Invalid (I): This state indicates that the cache line is not available in the L2 cache. A read to this line will cause a read miss and the cache line can be read from another cache or main memory. A write to this line will cause a write miss. In both these cases, the CIU 208 will transmit the miss transaction to the FCU 212.

Shared (S): This state indicates that the line is shared with other caches and that the cache line is consistent with main memory. A read hit to a S state cache line will not generate a transaction to the FCU 212. A read miss to a S state cache line will cause a transaction to be transmitted to the FCU 212. The FCU 212 will retrieve the cache line and return it to the L2 cache 222. The state of the cache line will then be set to either in a E or S state based on whether the system is operating in copy-back or write-through mode.

A write to a S-state cache line will update the L2 cache 222. This will generate a transaction to the FCU 212. If the cache line is associated with write-through mode, the FCU 212 will write the cache line to main memory and initiate a read invalidate transaction to invalidate this cache line in other caches (i.e., change the state from S to I). If the cache line is associated with copy-back mode, the state of the cache line in the L2 cache 222 is changed to the M state and the FCU 212 will initiate a read invalidate transaction to invalidate this cache line in other caches.

Exclusive (E): This state indicates that this line is exclusive to a particular cache and that the cache is claiming ownership of the cache line. The cache line is consistent with main memory. A read hit to a E state cache line does not generate a transaction to the FCU 212. A read miss generates a transaction to the FCU 212 to obtain the requested cache line from main memory. A write will cause the cache line to be updated. In copy-back mode, the state of the cache line will be changed to a M state and does not require a transaction to the FCU 212 to service the transaction.

Modified (M): This state indicates that this line is exclusive to a particular cache and that the particular cache is claiming ownership of the cache line. However, the cache line differs from main memory. A read hit does not generate a transaction to the FCU 212. A read miss generates a transaction to the FCU 212 to obtain the cache line from main memory. The state of the cache line is changed to the S state. A write causes the cache line to be updated and the state of the cache line to remain in the M state. The contents of the old cache line is written out to main memory. A memory writeback transaction is transmitted to the FCU 212 to perform this operation.

The foregoing has described the cache coherency model used in a preferred embodiment of the present invention. Attention now turns to the bus bridge unit.

Bus Bridge Unit

Figure 6A:
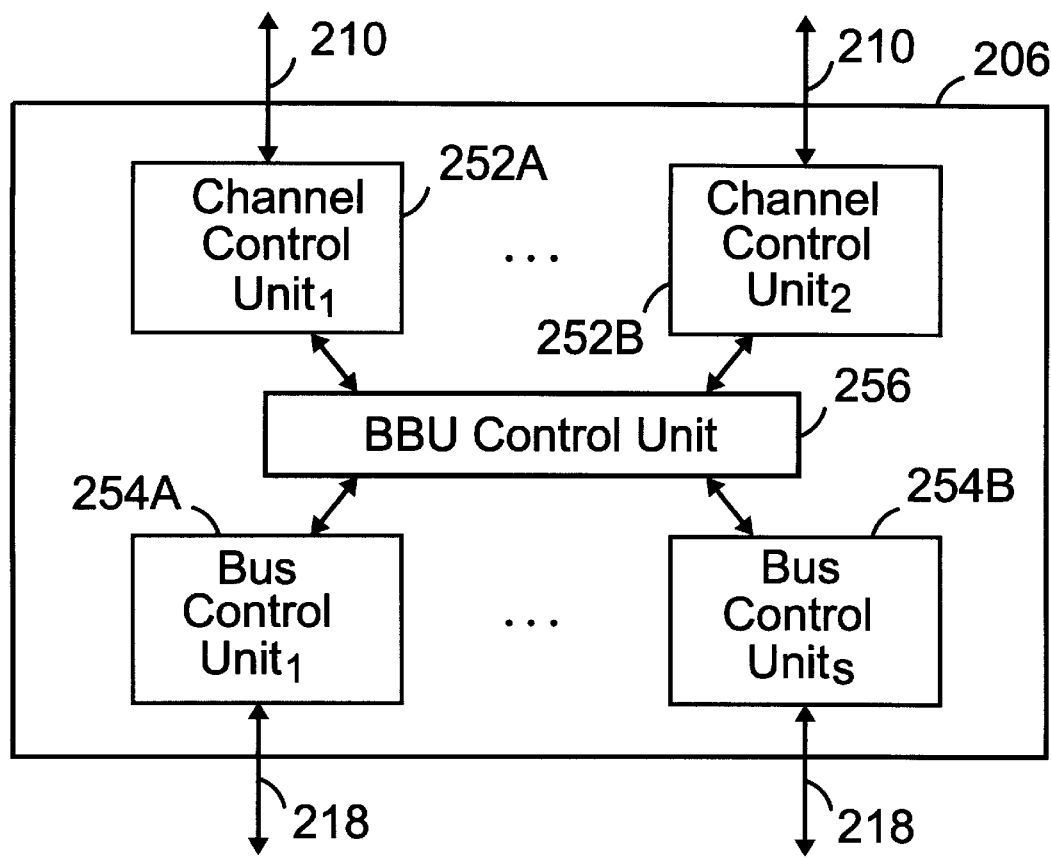
FIG. 6A illustrates a first preferred embodiment of a BBU shown in FIG. 2.

FIG. 6A illustrates a first preferred embodiment of the BBU 206. In this embodiment, the BBU 206 is connected to the FCU 212 by means of one or more channels 210 and is connected to one or more external I/O buses 218. For each channel 210, the BBU 206 contains a channel control unit 252 that serves to establish communication with the channel 210. For each external I/O bus 218, the BBU 206 includes a bus control unit 254 that is tailored to communicate with a specific I/O bus. An external I/O bus 218 can be a 32-bit peripheral component interconnect (PCI) bus, a 64-bit PCI bus, an Accelerated/Advanced Graphics Port (AGP), and the like. The channel 210 can operate to transfer 8-bit or 16-bit data. The BBU control unit 256 serves to pack data received from the channel 210 into the format of the I/O bus 218, to pack data received from the I/O bus 218 into a format for the channel 210, and to provide a communication path for each received transaction. The channel control unit 252 and the bus control unit 254 can include buffers that temporarily store transmission data, that being data in transmit between the external I/O device and the FCU 212.

Figure 6B:
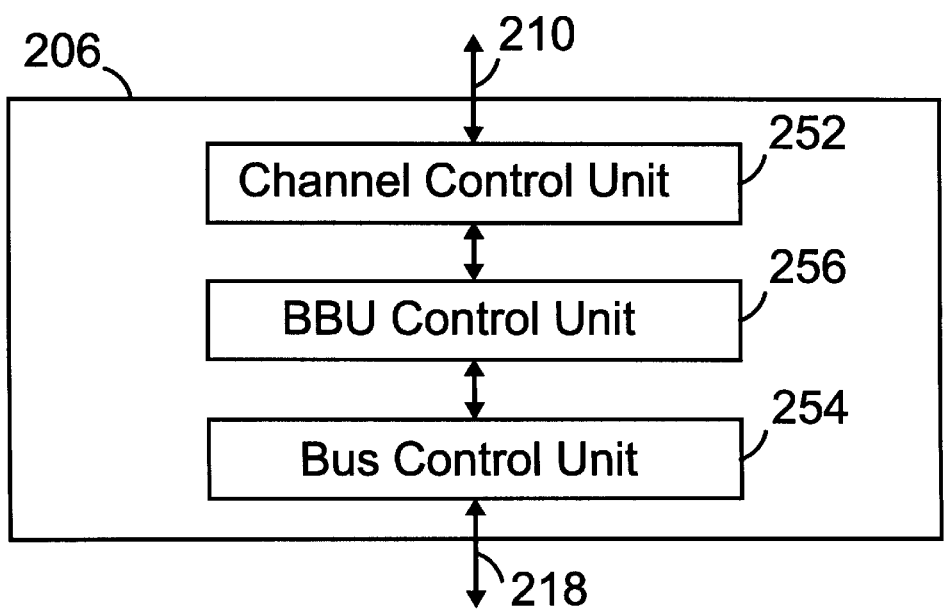
FIG. 6B illustrates a second preferred embodiment of a BBU shown in FIG. 2.

FIG. 6B illustrates a second preferred embodiment of the BBU 206. In this embodiment, the BBU 206 is connected to the FCU 212 by means of a single channel 210 and is connected to an external I/O bus 218 providing access to external I/O devices not shown. The external I/O bus 218 can be a 32-bit peripheral component interconnect (PCI) bus, a 64-bit PCI bus, an Accelerated/Advanced Graphics Port (AGP), and the like. The channel 210 can operate to transfer 8-bit or 16-bit data. The BBU control unit 256 serves to pack data received from the channel 210 into a format recognizable by the I/O bus 218 and to pack data received from the I/O bus 218 into a format recognizable by the channel 210. The BBU control unit 256 includes a channel control unit 252 that serves to establish the channel connection and a bus control unit 254 that serves to establish a connection with the I/O bus 218. The channel control unit 252 and the bus control unit 254 can contain buffers that temporarily store transmission data.

The foregoing has described the various embodiments of the BBU 206. Attention now turns to the memory control unit.

Memory Control Unit

Figure 7:
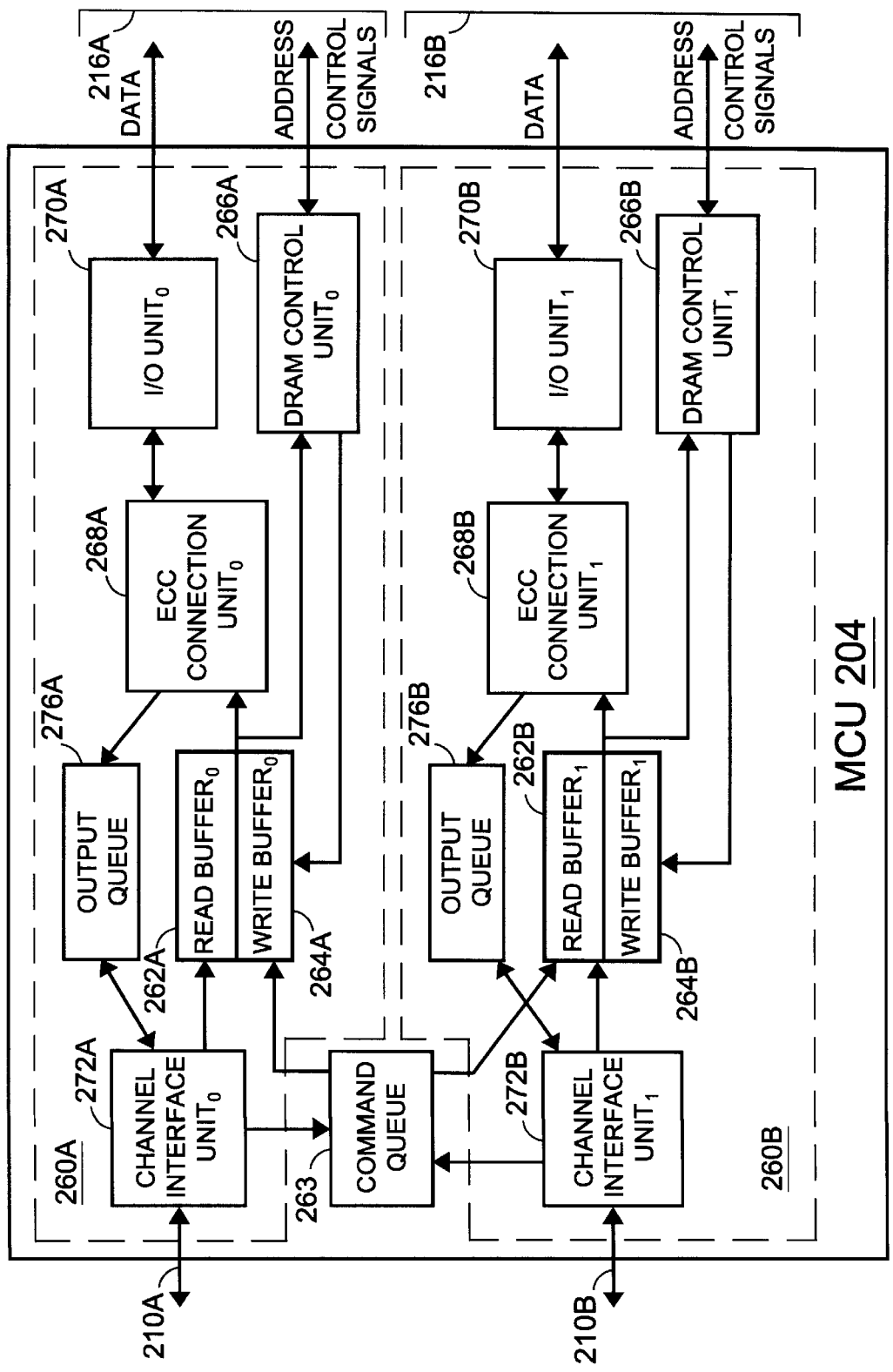
FIG. 7 illustrates a preferred embodiment of a MCU shown in FIG. 2.

FIG. 7 illustrates a first preferred embodiment of the MCU 204. The MCU 204 functions as two independent memory controllers 260A–260B where each memory controller 260 is designed to provide an access path from a specific channel 210 to a specific port or dedicated memory bus 216. In a first embodiment, data that is read from $port_0$ 216A will only utilize the first channel, $CH_0$ 210A, and not the second channel, $CH_1$ 210B. Likewise, data that will be written into a memory device that is accessible by $port_0$ 216A will be transmitted to $CH_0$ 210A. Similarly, data that is read from $port_1$ 216B will only utilize $CH_1$ 210B to return the data to the FCU 212 and data that will be written to a memory device that is accessible by $port_1$ 216B will be transmitted to $CH_1$ 210B.

Each memory controller 260 inside the MCU 204 includes a read buffer 262, a write buffer 264, a DRAM control unit 266, an error correction code (ECC) unit 268, an I/O unit 270, a channel interface unit 272. The read buffer 264 is used to hold incoming read commands. The write buffer 264 is used to hold incoming data that is to be written to a DRAM. The output queue 276 temporarily stores deferred read data. The ECC unit 268 is used to generate ECC bits that are appended to the data written to a DRAM and to correct bit errors from the data read from a DRAM. The I/O unit 270 is used to interface with a particular DRAM in order to transmit data to a DRAM and to receive data from a DRAM. The DRAM control unit 266 is used to generate the appropriate address and control signals to access a DRAM.

A command queue 263 is coupled to each set of read and write buffers 262, 264 and to each channel interface unit 272. The command queue is to store incoming commands and routes the command to the appropriate memory controller 260.

In an alternate embodiment of the MCU 204, either channel 210 can accept a data request regardless of whether the channel 210 receiving the request will be used to service the data request. For instance, channel 210B can be used to accept a data request that will utilize $port_0$ 216A and channel 210A can be used to accept a data request that will utilize $port_1$ 216B. The command queue determines which port will service the memory request received from the channel 210 and route the request to the appropriate read buffer 262.

Figure 8:
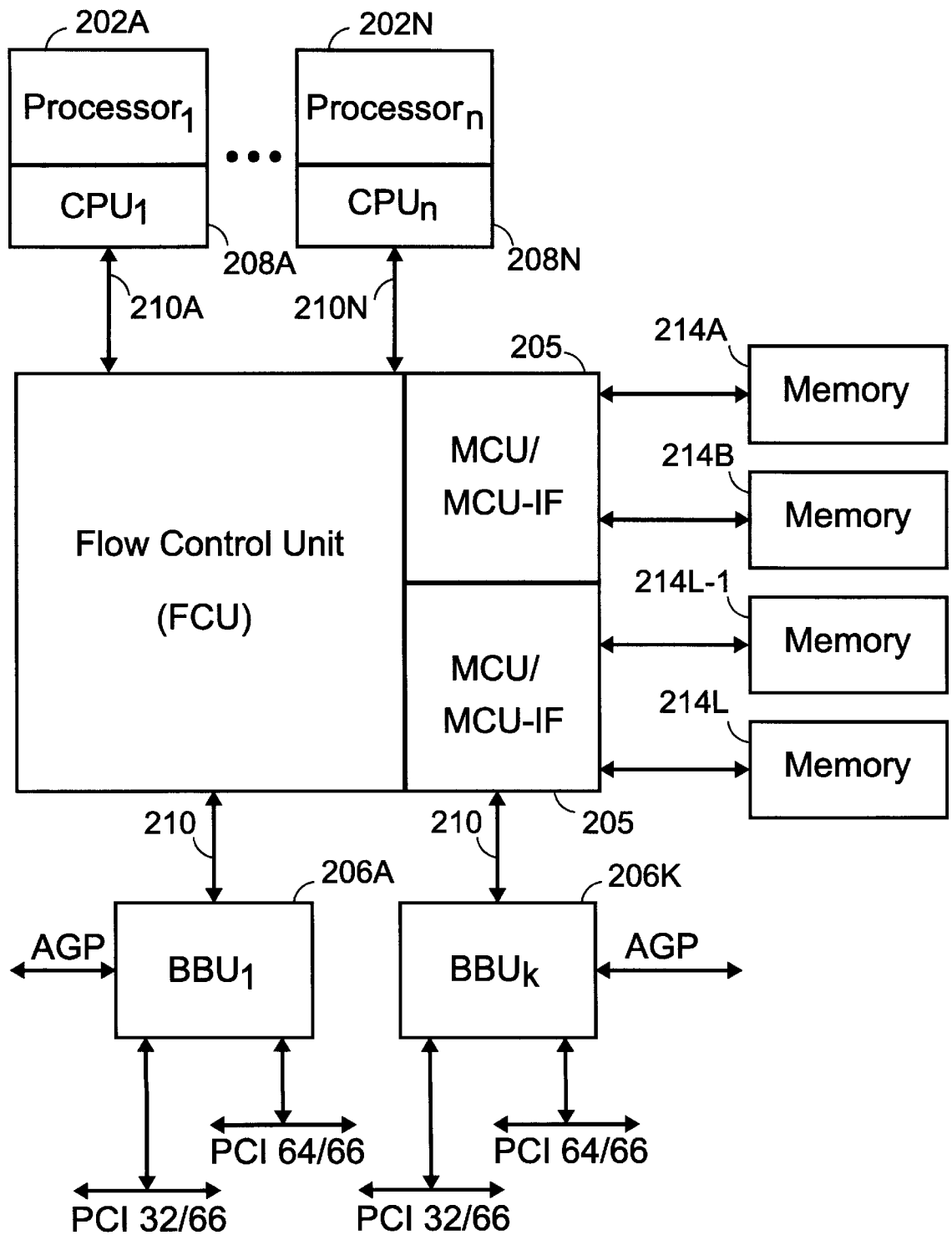
FIG. 8 illustrates a second preferred embodiment of the MCU shown in FIG. 2.

FIG. 8 illustrates an alternate embodiment where the MCU and MCU-IFU are combined into a single unit 205 which 4 is included in the FCU 212. The memory and channel are replaced by high speed narrow channel-based DRAM devices such as but not limited to the RAMBUS™ approach (http://www.rambus.com) or the SLDRAM approach (http://www.sldram.com).

The foregoing has described the various embodiments of the MCU. Attention now turns to the channel.

Channel

A channel 210 is a point-to-point connection between the FCU 212 and either a CIU 208, BBU 206 or MCU 204. A point-to-point connection is a statically-configured communication link between two devices. The channel 210 provides a direct communication path and is only used by the two connected devices. As such, the channel 210 differs from most common types of shared or dynamically-configurable interconnect structures such as a bus, network, ring, crossbar switch network, and the like.

The channel 210 is configured to operate at a transfer rate that maintains the overall system's throughput. For example, when the processor bus is 64-bits wide and the channel is 8-bits wide, the channel operates at 8 times the transfer rate of the processor. Likewise, when the processor bus is 64-bits wide and the channel is 16-bits wide, the channel operates at 4 times the processor's transfer rate.

Figure 9:
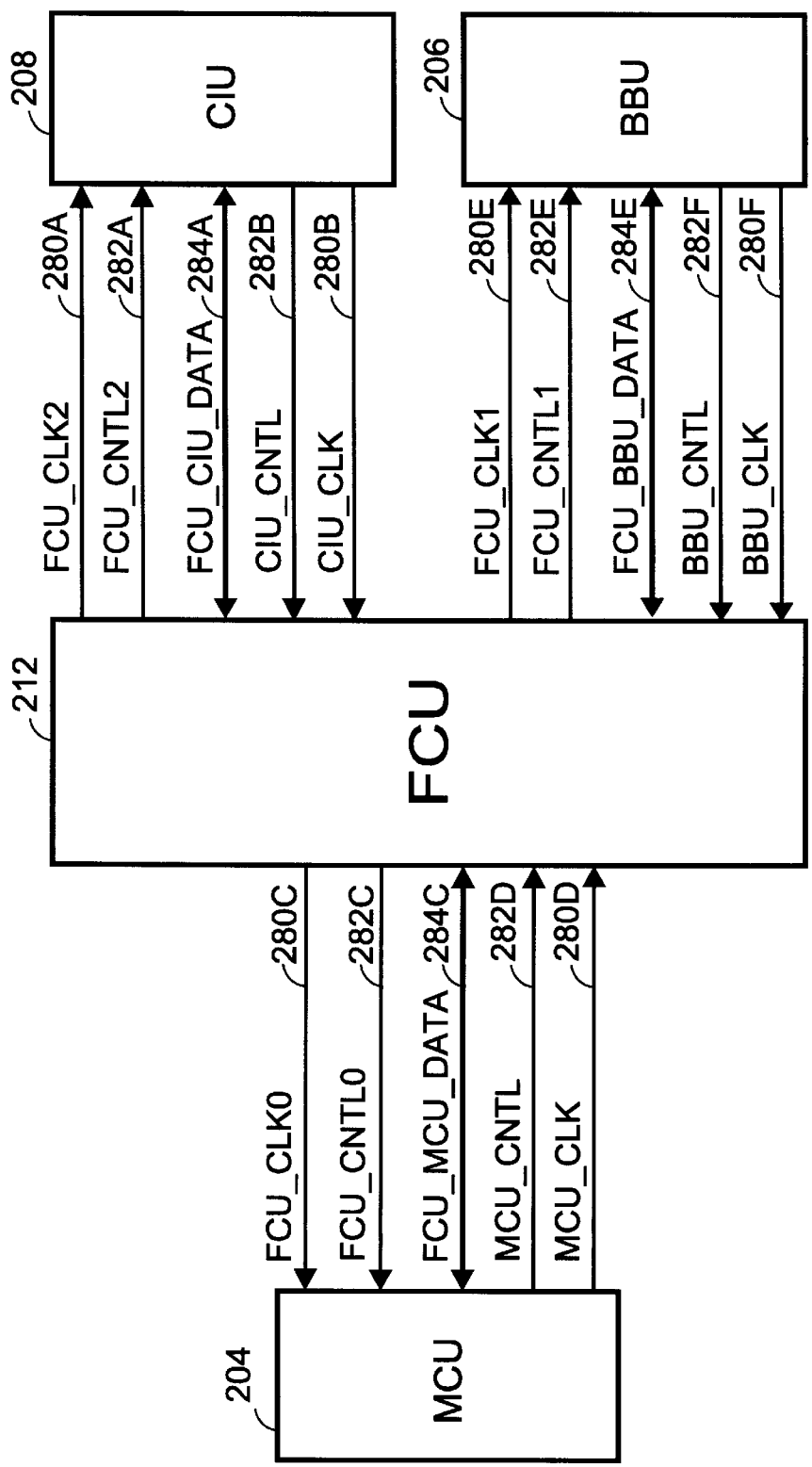
FIG. 9 illustrates a preferred embodiment of the channel signal lines in accordance with a preferred embodiment of the present invention.

In a preferred embodiment of the present invention, the channel 210 consists of three sets of signal lines as shown in FIG. 9. FIG. 9 shows a set of clock signals 280, a set of control signals 282, and a set of data signals 284.

The clock signals 280 can include two unidirectional clock signals. Each clock signal 280 is dedicated to the transmission of data in one direction. A clock signal 280 is transmitted along with the transmitted data in order to ensure that the data is received correctly at the receiving device.

The control signals 282 include two unidirectional control signals. The control signals 282 are used to arbitrate access to the channel 210 in order to prevent collisions and to control the communication between the receiving and transmitting devices. The transmitting device drives one of the control signals as it is transmitting data to the receiving device. The transmitted control signal sends to the receiving device information pertaining to the transmitted data. Likewise, the receiving device drives the other control signal and this control signal sends to the transmitting device information related to the received data.

There is no arbitration phase associated with the channel. As such, collisions in transmitting data through the channel can occur. The channel uses a collision detection protocol that detects when a collision occurs and determines the manner in which the collision is handled.

The data signals 284 represent the data. In a preferred embodiment, there are seventeen signal lines configured such that sixteen signals represent data and one signal is used for parity. In an alternate embodiment, there can be nine signal lines configured such that eight signals represent data and one signal is used for parity. The data signal lines are bidirectional.

Figure 10:
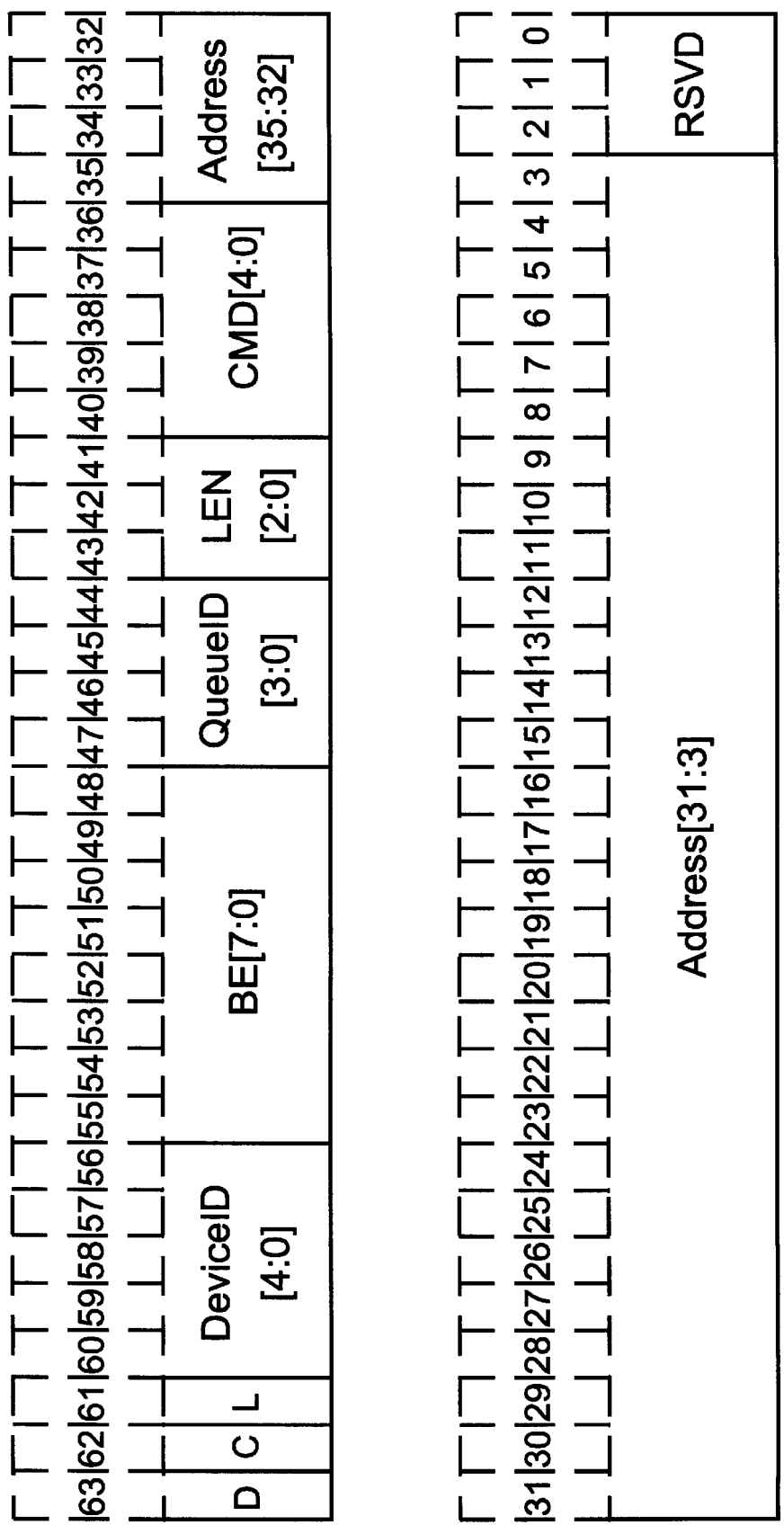
FIG. 10 illustrates a preferred embodiment of the format of transaction or command packet in accordance with the present invention.

The channel protocol can consist of two phases: a command phase, where a command is transmitted; and a data phase, where data is transmitted. A command phase is followed by a data phase which consists of a variable length of data packets. In one embodiment of the present invention, a command can consist of 64 bytes as shown in FIG. 10 that are transmitted across the channel in 8 or 16-bit packets. The data phase ranges from zero to 64 packets. A zero data packet indicates that there is no data phase.

Referring to FIG. 10, a command can consist of the following fields:

| Field Name | Description | Bit Positions |
|---|---|---|
| D | Deferred Reply Cycle | [63] |

This bit when set to one indicates that the current cycle is a deferred reply cycle and when set to zero indicates that the current cycle is a command phase.

| | | |
|---|---|---|
| C | Cancel Current Request | [62] |

This bit applies to the MCU interface unit and when set to one indicates that the current command is canceled.

| | | |
|---|---|---|
| L | Lock | [61] |

This bit indicates the current transaction is a locked transaction.

| | | |
|---|---|---|
| DeviceID[4:0] | Device Id | [60:56] |

These five bits are the identification number of the initiating device. An initiating device can be either one of the CIUs, MCUs, or BBUs.

| | | |
|---|---|---|
| BE[7:0] | Byte Enable | [55:48] |

These bits are used when the data phase consists of one data packet.

| | | |
|---|---|---|
| QueueID[3:0] | Queue ID | [47:44] |

These bits represent the queue identification number for the current transaction. Each initiating device maintains an internal request queue to keep track of the pending transactions. The QueueID identifies the position of the current transaction in this internal request queue.

| | | |
|---|---|---|
| LEN[2:0] | Transaction Length | [43:41] |

These bits indicate the number of packets that will be transferred in the data phase and adhere to a coding scheme that can range from 0 to 64.

| | | |
|---|---|---|
| CMD[4:0] | Transaction Type | [40:36] |

These bits determine the transaction type which is detailed in FIG. 9.

| | | |
|---|---|---|
| Address[35:3] | Address | [35:3] |

This field contains the 36-bit target address for the current transaction.

| | | |
|---|---|---|
| Rsvd[2:0] | Reserved | [2:0] |

This field represents reserved address bits.

The channel transactions can be classified into two types of cycles: a read cycle and a write cycle. Each cycle can have a command phase and a data phase. In each phase, the channel 210 can operate in either a transmit mode (Tx) or a receive mode (Rx). FIGS. 11A–11B illustrate the modes that an initiating device and a target device utilize in a read and write cycle. FIG. 11A refers to a read transaction and FIG. 11B refers to a write transaction.

Referring to FIG. 11A, in the command phase of the read cycle, the initiating device or initiator (e.g., CIU, BBU, FCU, or MCU) is in the transmit mode (Tx) and the target device or target (e.g., CIU, BBU, FCU, or MCU) is in the receive mode (Rx). In the command phase, the initiator will transmit (Tx) the command packet and the target will receive it (Rx). In the data phase, the initiator is in the receive mode since it will receive the data (Rx) and the target is in the transmit mode (Tx) since it becomes the transmitter (Tx) that sends the data.

Referring to FIG. 11B, in a command phase of the write cycle, the initiator (e.g., CIU, BBU, FCU, or MCU) is in the transmit mode (Tx) and the target device or target (e.g., CIU, BBU, FCU, or MCU) is in the receive mode (Rx). In the data phase, the initiator remains in the transmit mode since it will send the data (Tx) and the target is in the receive mode (Rx) since it becomes the recipient of the data.

Each control signal 282 can operate in either a transmit mode or a receive mode. A control signal 282 is in transmit mode when its associated device (e.g., CIU, BBU, FCU, or MCU) is driving the data bus and transmitting data. A control signal 282 is in the receive mode when its associated device (e.g., CIU, BBU, FCU, or MCU) is listening to the data bus and receiving data. The control signals 282 in either mode are time multiplexed into four control bits per packet. The control bits that are sent in transmit mode are referred to as transmit mode control bits and the control bits that are sent in receive mode are referred to as receive mode control bits.

Figure 12A:
FIGS. 12A–12B illustrate the transaction and receive modes associated with the channel protocol in a preferred embodiment of the present invention.

FIG. 12A illustrates the transmit mode bits that are sent when a device is driving the data bus. The SYNC# control bit is used to indicate the beginning of a packet. The TCTL#0 and TCTL1# control bits are used to signify the start of a new transaction, that the current packet contains valid data, or that the packet is invalid and should be ignored. The BUSY# control bit is used to indicate that the data bus is being driven by the transmitter and should not be used by another device.

Figure 12B:

FIG. 12B illustrates the control bits used to acknowledge the received data. The SYNC# control bit is used to indicate the beginning of a packet. The RCTL0# and RCTL1# control bits are used to indicate one of the following: (1) the current transaction is backed off and will be retried later by the transmitter; (2) there is a request pending inside the receiver and the receiver is requesting the channel; (3) the receiver is not ready to receive the packet; (4) there is a parity error in the current packet and that the transmitter will resend the current packet; (5) the current command packet has been successfully accepted by the receiver; (6) the transmitter is in the command phase and waiting for the control signals from the receiver; (7) the receiver is not requesting the channel; and (8) the current packet has been successfully accepted by the receiver and the transmitter will send the next data packet.

The foregoing has described the basic components and workings of the channel. Attention now turns to the FCU.

Flow Control Unit

The FCU 212 provides multiple signal paths for each device in the system to communicate with another device. The FCU 212 has multiple data paths, a snoop path, a system clock, a snoop path arbitrator, a data path switch controller, and interface units that are dedicated to a particular device. It should be noted that each of the paths in the FCU 212 are referred to as the signal paths.

Figure 13:
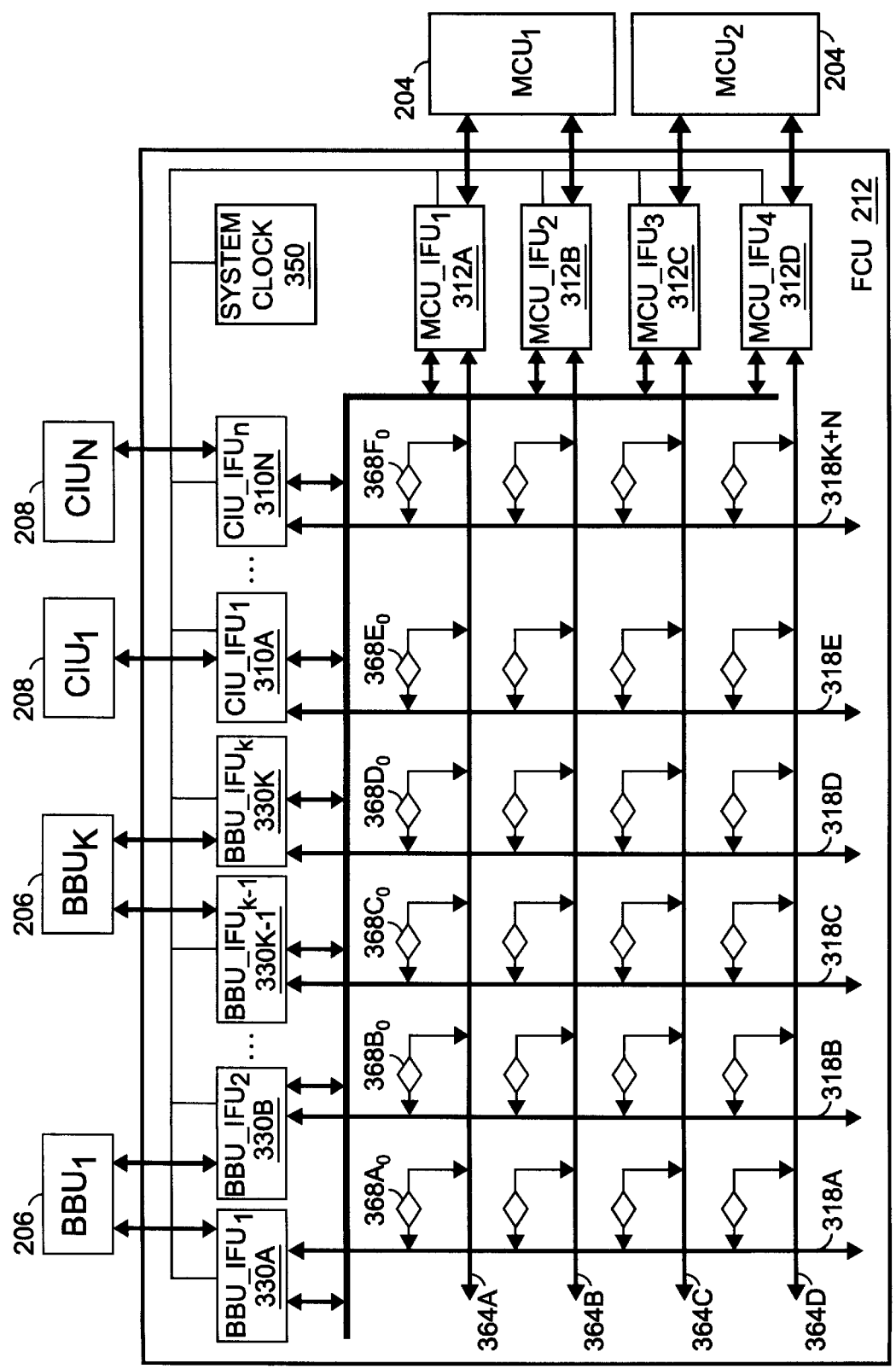
FIG. 13 illustrates some of the components of the FCU in a preferred embodiment of the present invention.

FIG. 13 illustrates the signal paths and the interface units in the FCU 212. Each device that is connected to the FCU 212 has an associated interface unit in the FCU 212. In a preferred embodiment, each of the k BBUs 206 is connected by two channels 210 to a corresponding BBU interface unit 300 (BBU-IFU). Each of the n CIUs 208 is connected by a single channel 210 to an associated CIU 310 (CIU-IFU). Similarly, each of the MCUs 204 is connected by two channels 210 to a respective memory control unit interface unit (MCU-IFU) 312.

Interface Units

Figure 14:
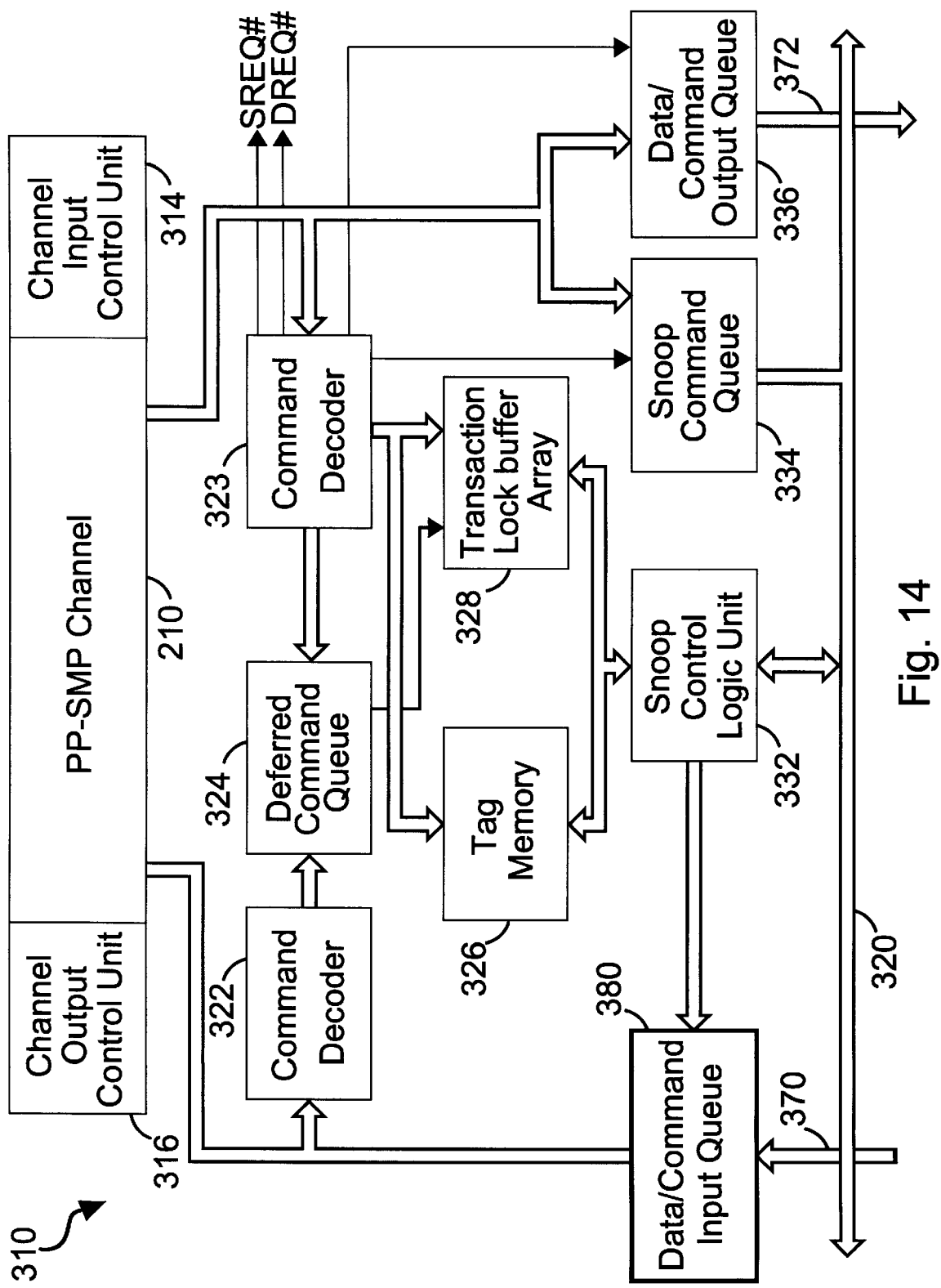
FIG. 14 illustrates the components of the CIU-IFU in a preferred embodiment of the present invention.

FIG. 14 illustrates the components of the CIU-IFU 310. There is shown a channel 210, a channel output control unit 316, a channel input control unit 314, a first command decoder 322, a deferred command queue 324, a second command decoder 323, a tag memory 326, a transaction lock buffer array 328, a data/command input queue 330, a snoop control logic unit 332, a snoop command queue 334, and a data/command output queue 336.

The channel input control unit 314 is coupled to the channel 210 and is used to receive data from the channel 210. The channel output control unit 316 is coupled to the channel 210 and used to transmit data to an associated CIU 208.

A data/command input queue 330 is coupled to an input interface data path signal 370 and the channel 210. The queue 330 is under the control of a snooping control logic unit 332 and the incoming command and data transmitted from the input interface data path signal 370. The data/command input queue 330 receives data and/or commands from the associated input interface data path 370 which is transferred through the channel to the associated CIU 208.

A data/command output queue 336 is coupled to an output interface data path signal 372 and the channel 210. The queue 336 is under the control of the command decoder 323. The data/command output queue unit 336 receives data and/or commands from the channel which are transferred through the output interface data path 373 to a destination device.

A deferred command queue 324 stores those transactions awaiting a deferred reply. The deferred command queue 324 is coupled to the first command decoder 322, the second command decoder 323, and the transaction lock buffer array 328. The first command decoder 322 transmits to the deferred command queue 324 those transactions received from the interface data path that are a deferred reply. These transactions are then removed from the deferred command queue 324 and released from the transaction lock buffer array 328 when the deferred reply has been received by the data/command input queue unit 330.

The second command decoder 323 is coupled to the channel 210, the deferred command queue 324, the transaction lock buffer array 328, a tag memory 326, a snoop command queue 334, and a data/command output queue 336. The second command decoder 323 receives transactions from the channel 210. For those transactions requiring the snoop path 320, the command decoder 323 asserts the SREQ# signal and places the command in the snoop command queue 334. Once access to the snoop path 320 is obtained, the requested address associated with the transaction is stored in the transaction lock buffer array 328 and the command is placed on the snoop path 320.

For those commands requiring access to the interface data path, the command decoder 323 asserts the DREQ# signal and places the command and/or data in the data/command output queue 336. Once access to the interface data path is obtained, the data and command is released from the data/command output queue 336 and placed onto the output interface data path signal 372.

In the event the transaction requires a deferred reply, the command decoder 323 places the command in the deferred command queue 324. Furthermore, the command decoder 323 accesses the tag memory 326 in order to process certain transactions.

The tag memory 326 includes a set of tags, each tag associated with a cache line resident in the external cache. In a preferred embodiment, the tag memory 326 can include a set of duplicate cache tags. The tag memory 326 can be 4K by 40 bits. However, it should be noted that the present invention is not constrained to any particular size for the tag memory.

A transaction lock buffer array 328 is used to store the addresses of those transactions currently being processed by the CIU-IFU 310. Since the FCU 212 can process several transactions concurrently, the lock buffers 328 prevent two transactions from concurrently affecting the same address. In some cases, the address will represent a cache line yet in other cases, the address will represent an I/O memory address. Each lock buffer 328 includes a valid bit and an address. A valid bit set to one indicates that the corresponding transaction address is locked and a valid bit set to zero indicates that the transaction address is unlocked.

The address of a transaction is placed into one of the lock buffers 328 when access to the snoop path or data path is granted. The CIU-IFU 310 initiating a transaction is responsible for placing the address in a lock buffer 328 and for setting the valid bit to one. When the transaction completes, the initiating CIU-IFU 310 is also responsible for unlocking the corresponding transaction line lock buffer 328 by setting the valid bit to zero.

The snoop control logic unit 332 is coupled to the tag memory 326, the transaction lock buffer array 328, the data/command input queue 330, and the snoop path 320. The snoop control logic unit 332 interfaces with the snoop path 320 broadcasting snoop requests and snooping for transactions affecting memory addresses associated with the cache lines in its tag memory 326. The snoop control logic unit 332 latches in transactions broadcasted on the snoop path 320 and searches the tag memory 326 and the transaction lock buffer array 328 for the corresponding cache line. The snoop control logic unit 332 adheres to the snoop protocol which is described in more detail below.

Figure 15:
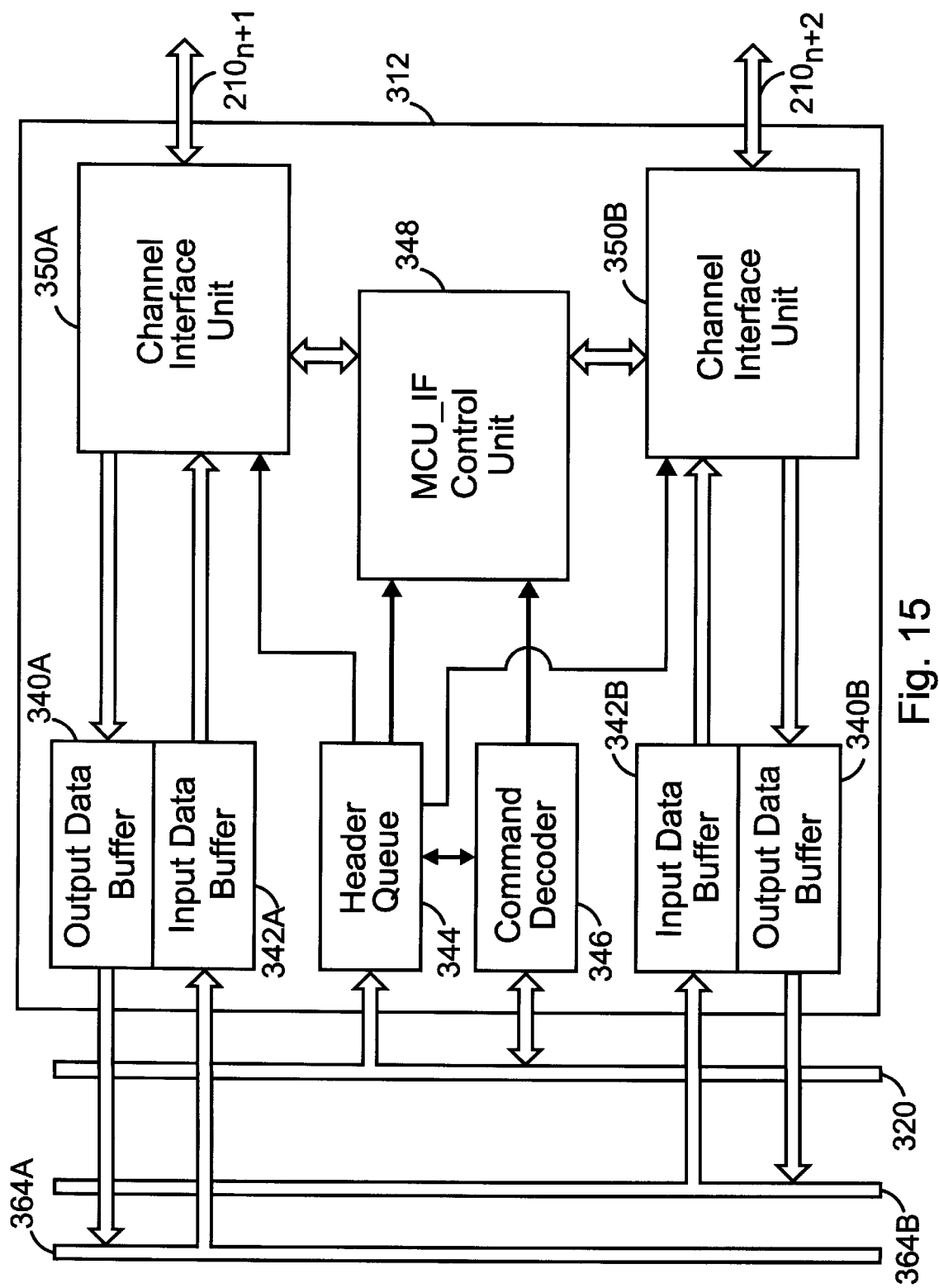
FIG. 15 illustrates the components of the MCU-IFU in a preferred embodiment of the present invention.

FIG. 15 illustrates the components of the MCU-IFU 312. The MCU-IFU 312 is shown coupled to the snoop path 320, to two memory data paths 364A–364B, and to two channels $210_{n+1}$, $210_{n+2}$. For each memory data path connection, there is an input data buffer 342 and an output data buffer 340. The input data buffer 342 is used to store data received from the corresponding memory data path 364 and the output data buffer 340 is used to store data that will be transmitted on the corresponding memory data path 364. Each set of input and output data buffers is coupled to a respective channel interface unit 350. A channel interface unit 350 is connected to a channel 210 and used to transmit and receive data through the channel 210.

A header queue 344 and a command decoder 346 are provided and coupled to the snoop path 320. The header queue 344 receives transactions snooped from the snoop path 320. The header queue 344 is coupled to a control unit 348, to each channel interface unit 350, and to a command decoder 346. The command decoder 346 is used to decode the transactions that are snooped from the snoop path 320. The command decoder 346 is coupled to the control unit 348 and to the header queue 344.

The control unit 348 controls the operation of the MCU-IFU 312. The control unit 348 is coupled to the command decoder 346, the header queue 344, and each of the channel interface units 350. The control unit 348 receives the command from the command decoder 346 and activates the appropriate channel interface unit 350 to transmit a transaction and/or data to a corresponding channel 210.

Figure 16:
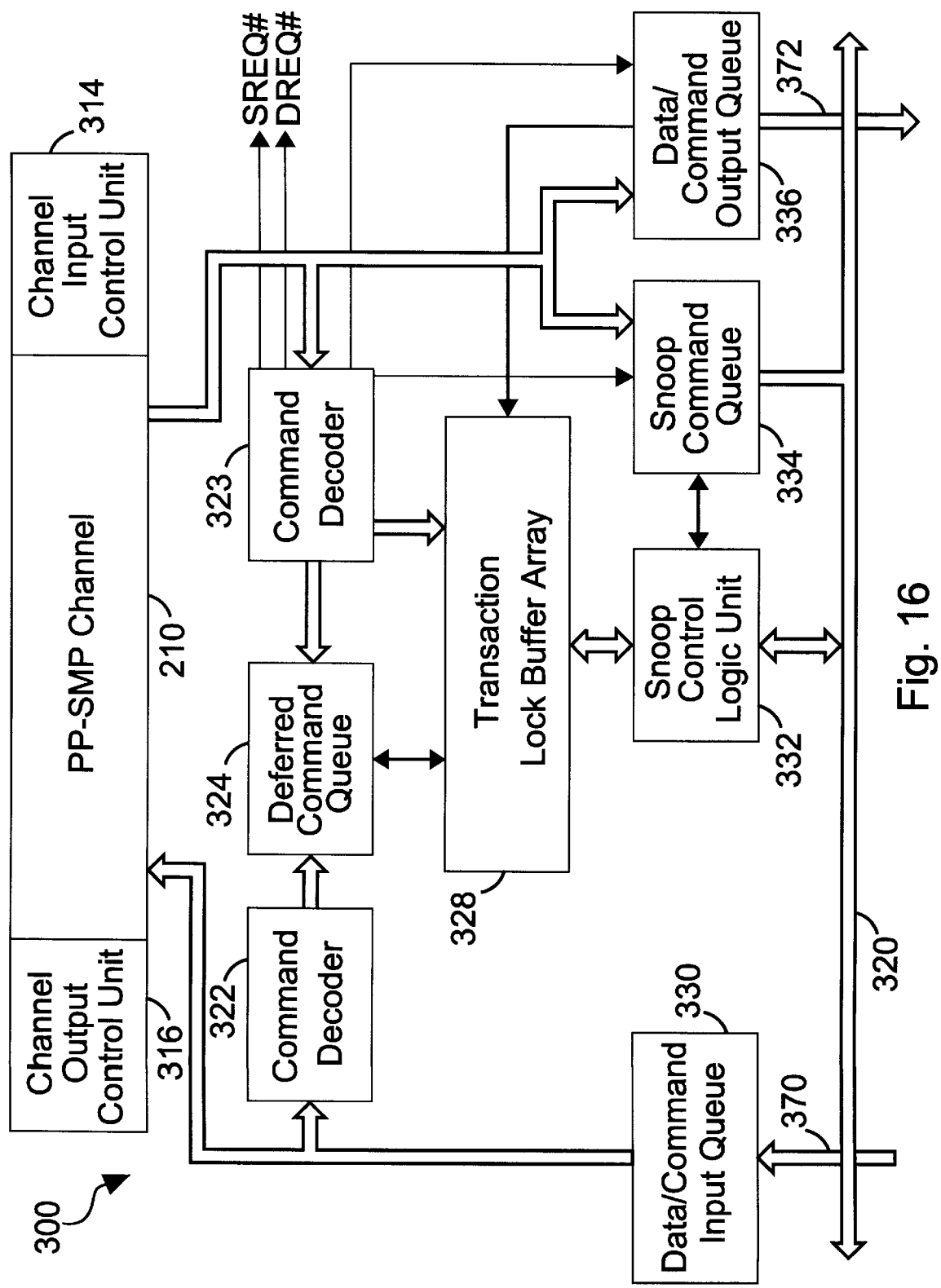
FIG. 16 illustrates the components of the BBU-IFU in a preferred embodiment of the present invention.

FIG. 16 illustrate the components of the BBU interface unit 300. There is shown a channel 210, a channel output control unit 316, a channel input control unit 314, a first command decoder 322, a deferred command queue 324, a second command decoder 323, a transaction lock buffer array 328, a data/command input queue 330, a snoop control logic unit 332, a snoop command queue 334, and a data/command output queue 336.

The channel input control unit 314 is coupled to the channel 210 and is used to receive data from the channel 210. The channel output control unit 316 is coupled to the channel 210 and used to transmit data to an associated CIU 208.

A data/command input queue 330 is coupled to an input interface data path signal 370 and the channel 210. The queue 330 is under the control of the incoming command and data received from the input interface data path signal 370. The data/command input queue 330 receives data and/or commands from the associated input interface data path 370 which is transferred through the channel to the associated CIU 208.

A data/command output queue 336 is coupled to an output interface data path signal 372 and the channel 210. The queue 336 is under the control of the command decoder 323. The data/command output queue unit 336 receives data and/or commands from the channel which are transferred through the output interface data path 372 to a destination device.

A deferred command queue 324 stores those transactions awaiting a deferred reply. The deferred command queue 324 is coupled to the first command decoder 322, the second command decoder 323, and the transaction lock buffer array 328. The first command decoder 322 transmits to the deferred command queue 324 those transactions received from the interface data path that are a deferred reply. These transactions are then removed from the deferred command queue 324 and released from the transaction lock buffer array 328.

The second command decoder 323 is coupled to the channel 210, the deferred command queue 324, the transaction lock buffer array 328, a snoop command queue 334, and a data/command output queue 336. The second command decoder 323 receives transactions from the channel 210. For those transactions requiring the snoop path 320, the command decoder 323 asserts the SREQ# signal and places the command in the snoop command queue 334. Once access to the snoop path 320 is obtained, the requested address associated with the transaction is stored in the transaction lock buffer array 328 and the command is placed on the snoop path 320. In the event the transaction requires a deferred reply, the command decoder 323 places the command in the deferred command queue 324.

For those commands requiring access to the interface data path, the command decoder 323 asserts the DREQ# signal and places the command and/or data in the data/command output queue 336. Once access to the interface data path is obtained, the data and command is released from the data/command output queue 336 and placed onto the output interface data path signal 372. In the event the transaction requires a deferred reply, the command decoder 323 places the command in the deferred command queue 324.

A transaction lock buffer array 328 is used to store the addresses of those transactions currently being processed by the CIU-IFU 310. Since the FCU 212 can process several transactions concurrently, the lock buffers 328 prevent two transactions from concurrently affecting the same address. In some cases, the address will represent a cache line yet in other cases, the address will represent a non-cacheable memory address (e.g., I/O memory address). Each lock buffer 328 includes a valid bit and an address. A valid bit set to one indicates that the corresponding transaction address is locked and a valid bit set to zero indicates that the transaction address is unlocked.

The address of a transaction is placed into one of the lock buffers 328 when access to the snoop path or data path is granted. The CIU-IFU 310 initiating a transaction is responsible for placing the address in a lock buffer 328 and for setting the valid bit to one. When the transaction completes, the initiating CIU-IFU 310 is also responsible for unlocking the corresponding transaction line lock buffer 328 by setting the valid bit to zero.

The snoop control logic unit 332 is coupled to the transaction lock buffer array 328, the data/command input queue 330, and the snoop path 320. The snoop control logic unit 332 interfaces with the snoop path 320 broadcasting snoop requests and snooping for transactions affecting memory addresses associated with the cache lines in its tag memory 326. The snoop control logic unit 332 latches in transactions broadcasted on the snoop path 320 and searches the transaction lock buffer array 328 for the corresponding cache line. The snoop control logic unit 332 adheres to the snoop protocol which is described in more detail below.

The foregoing has described the interface units in the FCU. Attention now turns to the system clock.

System Clock

Referring to FIG. 13, the FCU 212 includes a system clock 350 that is connected to each of the interface units 300, 310, 312. The system clock 350 synchronizes the operations of the FCU 212 and controls the speed at which these operations occur.

Figure 17:
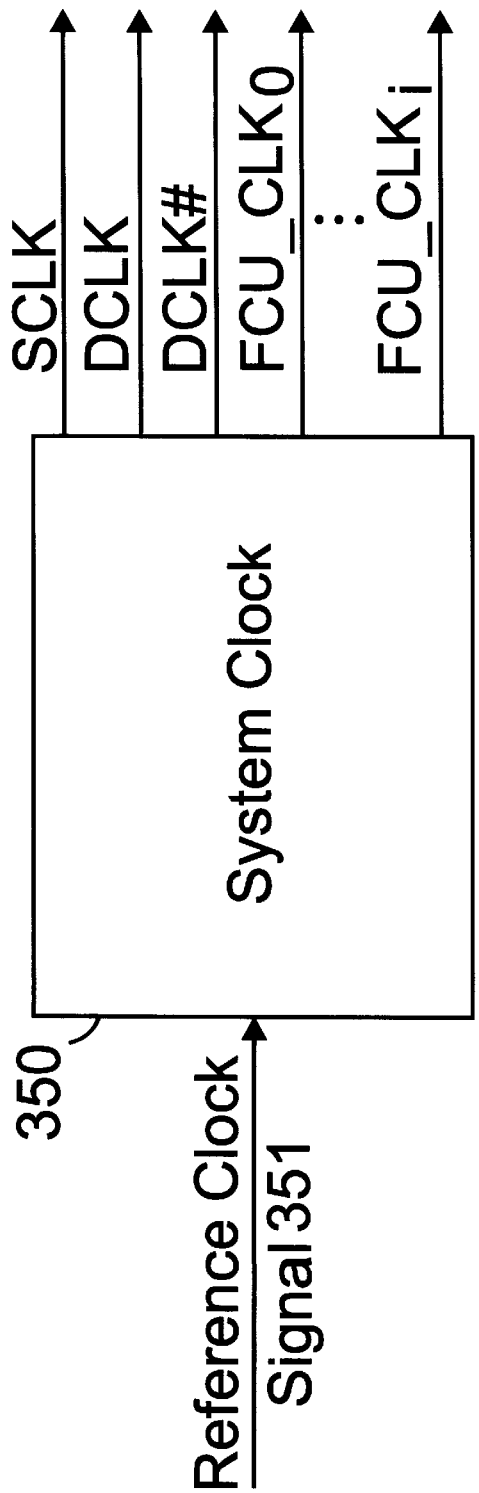
FIG. 17 illustrates the signals generated by the system clock in a preferred embodiment of the present invention.

FIG. 17 illustrates the input and output signals of the system clock 350 in a preferred embodiment of the present invention. A reference clock signal 351 is received by the system clock 350 and used as a base frequency from which several clock signals are generated. The SCLK signal is used in the operation of the snoop path 320, the DCLK and DCLK# signals are used in the operation of the data paths, and the FCU_CLK signals are used in the operation of the channels. Preferably, the SCLK signal is at the same clock frequency of the reference clock signal 351, the DCLK and DCLK# signals are at twice the frequency of the reference clock signal 351, and the FCU_CLK signals are at four times the frequency of the reference clock signal 351. The reference clock signal 351 is relative to a base frequency of each processor's clock. Preferably, the reference clock signal 351 is set to twice the base frequency of the processor's clock.

Figure 18:
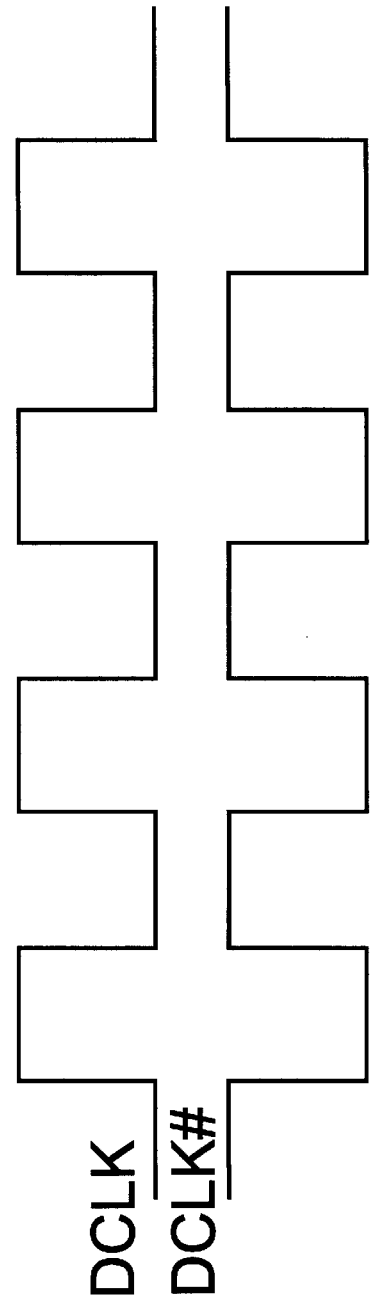
FIG. 18 is a timing diagram of the two-phase clock signals generated by the system clock shown in FIG. 17.

The DCLK and DCLKA signals are used in the operation of the data paths. FIG. 18 illustrates a preferred timing of these signals. As shown in FIG. 18, the system clock 350 generates a two phase clock signal including a first signal 354 (DCLK), and a second signal 356 (DCLK#) that is phased-shifted by 180° from the first signal.

Figure 19:
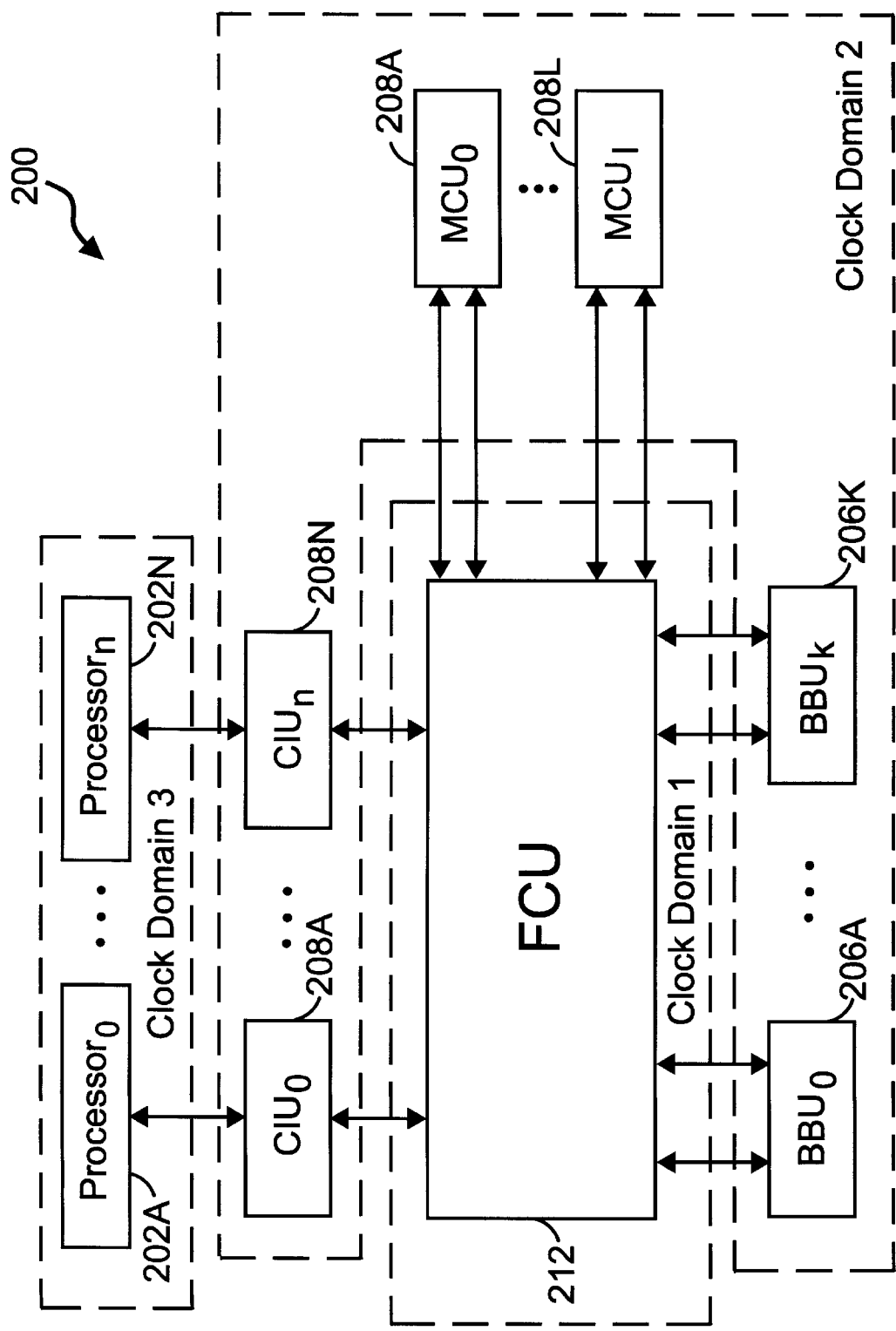
FIG. 19 illustrates the various clock domains within the system of the present invention.

FIG. 19 illustrates the various clock domains that exist within the multiprocessing system 200. The FCU 212 is associated with a first clock domain, referred to as clock domain 1, which operates in a synchronized manner in accordance with the system clock 350. The second clock domain (i.e., clock domain 2) includes the CIUs 208, the MCUs 204, and the BBUs 206 which operate at the channel clock speed. The devices in the second clock domain do not experience any timing skew problems which was present in the prior art bus based systems. This is attributable to the use of the point-to-point interconnect structure. The third clock domain (i.e., clock domain 3) includes the processors 202 which operate at the processor's clock speed. Since the reference clock signal in the FCU 212 is based on the frequency of the processor's clock speed, the system can function in a coordinated manner.

However, it should be noted that the use of the channels as the interconnect structure eliminates the well-known timing skew problem associated with bus interconnect structures. In the prior art SMP systems, the use of the bus interconnect structure limited the execution speed of the overall system due to the timing skew as well as other factors. In the present invention, the use of the channels eliminates the skew between processors thereby allowing the system to achieve a higher transfer rate.

Data Paths

Referring to FIG. 13, there are l memory data paths (i.e., horizontal signal paths) 364A–364D and k+n interface data paths 318A–318K+N (i.e., vertical signal paths). Each BBU-IFU 300 and CIU-IFU 310 is connected to a dedicated interface data path 318. Each MCU-IFU 312 is connected to a dedicated memory data path 364. Each interface data path 318 has a connection to each memory data path 364 through a node switch 368. The interconnection of the memory data paths 364 and the interface paths 318 in this manner provides a direct connection between each device connected to the FCU 212.

In a preferred embodiment, each memory data path 314 is associated with a specific memory address range or window size. Each memory data path 364 is connected to a specific MCU-IFU 312 that in turn is connected to a MCU 204 having access to the range of memory locations specified within the memory address range. When an interface unit 300, 310, 312 intends to access a specific memory address location, the interface unit 300, 310, 312 will use the memory data path associated with the specific memory address.

In a preferred embodiment, each memory data path 364 is associated with a memory address range or window size based on the following mathematical relation:

Memory data path window size=cache line size*N,
where N is the data block size that can have one of the following values=$\{1, 2, 4, 8, 32, 64, 128\}$ Thus, in order to determine which memory data path 364 should be used given a particular address, the following mathematical relations can be used:

memory data path=[address modula (MOD) (cache line size*N*M)]/(cache line size*N),
where M=number of memory data paths,
address is the memory address to be accessed, and
N is the data block size that can have one of the following values=$\{1, 2, 4, 8, 32, 64, 128\}$.

In the case where there are four memory data paths, the following mathematical relations indicate the memory addresses that are associated with each memory data path:

memory data $path_0$=address MOD [cache line size*N*1]
memory data $path_1$=address MOD [cache line size*N*2]
memory data $path_2$=address MOD [cache line size*N*3]
memory data $path_3$=address MOD [cache line size*N*4].

Figure 20:
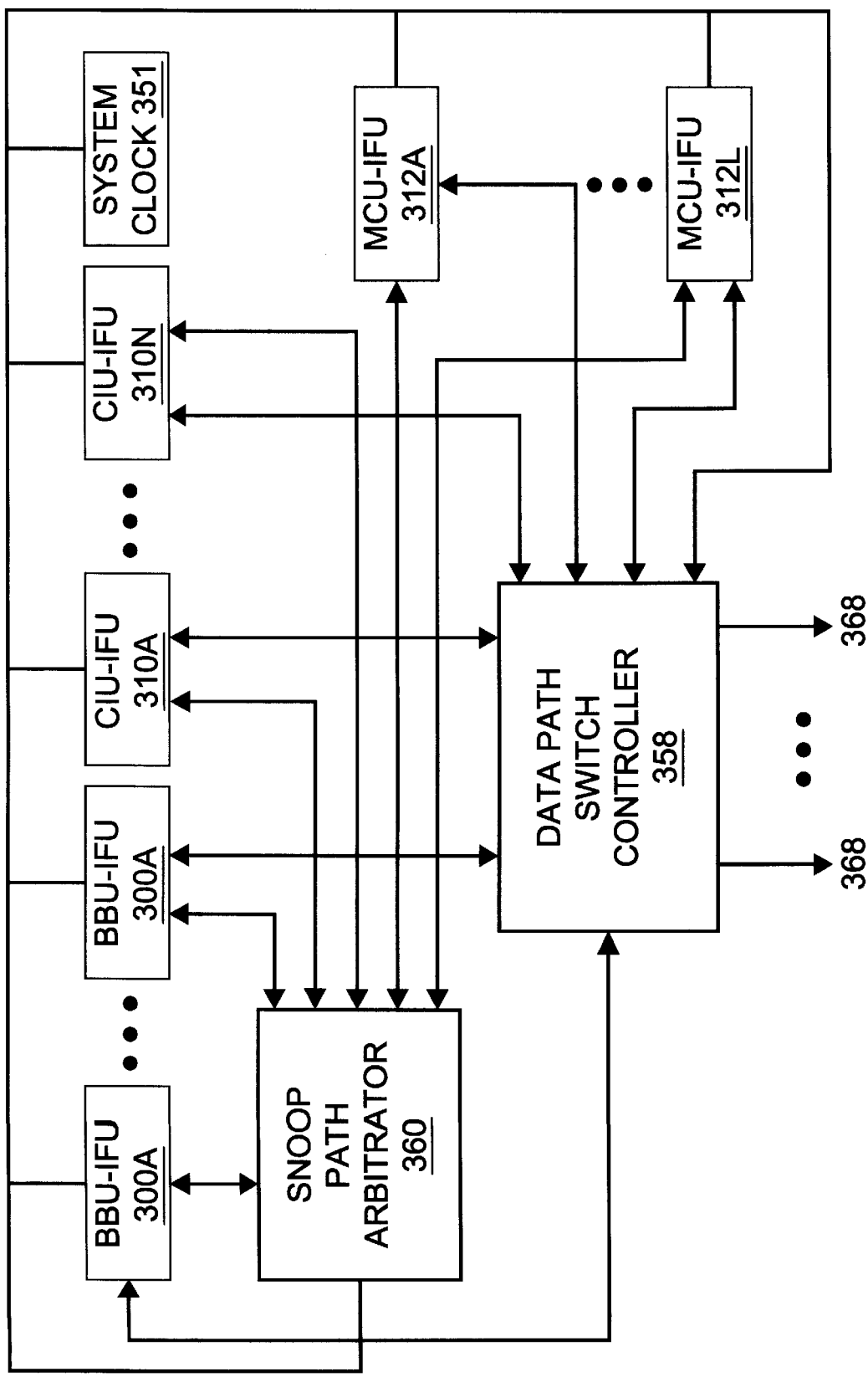
FIG. 20 illustrates additional components of the FCU in a preferred embodiment of the present invention.

FIG. 20 shows additional components of the FCU 212. A data path switch controller 358 is connected to each interface unit 300, 310, 312 and to each node switch 368. The data path switch controller 358 is responsible for providing a communication path between two devices connected to the FCU 212. For those transactions not requiring cache coherency (including deferred replies) or requiring access to main memory, the data path switch controller 358 will use the memory data path 364 associated with a particular memory address. For those transactions not requiring memory access or cache coherency, the data path switch controller 358 will s elect any available data path that provides the requested communication path.

Figure 21:
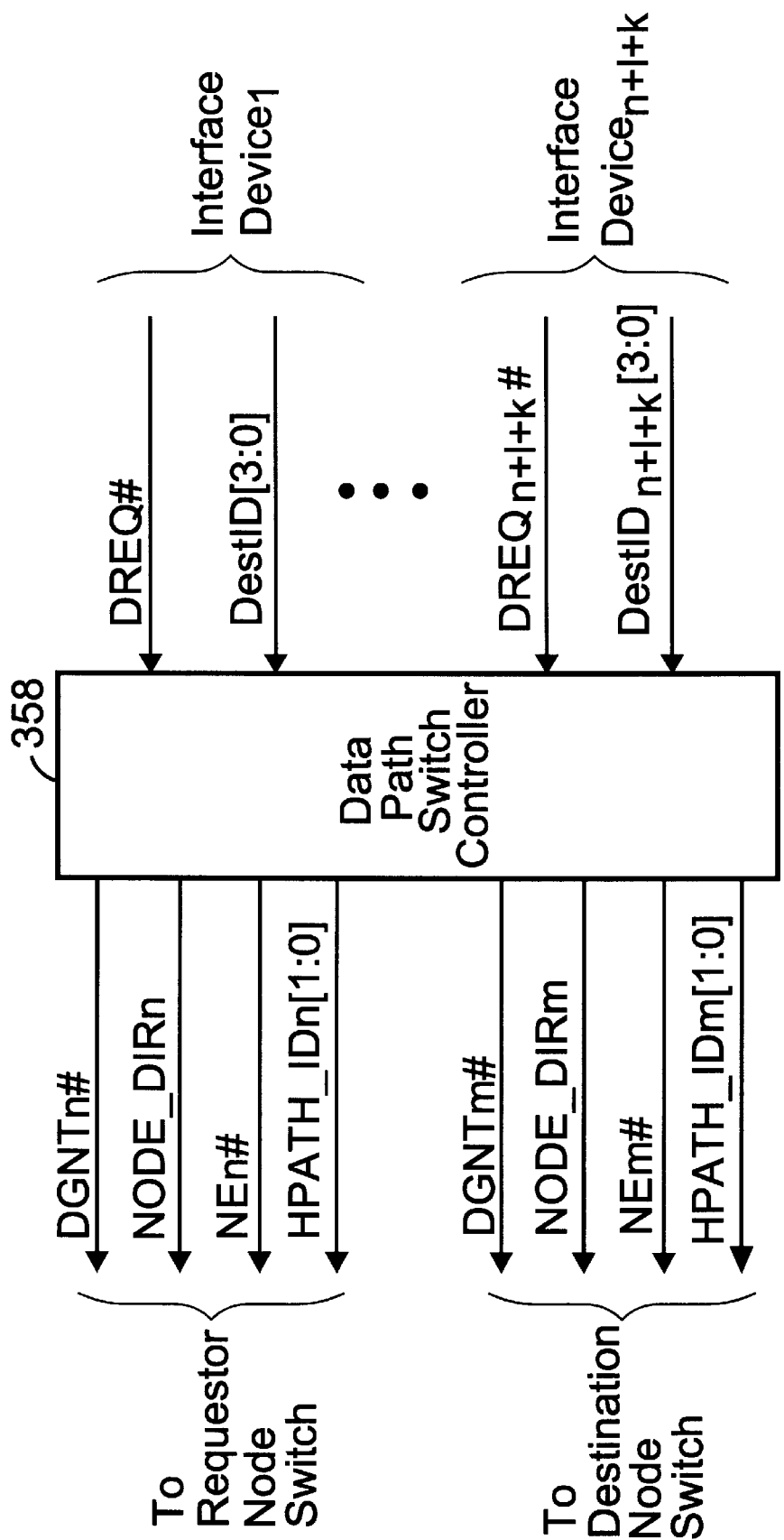
FIG. 21 illustrates the signals used by the data path switch controller in a preferred embodiment of the present invention.

FIG. 21 illustrates the signals received and generated by the data path switch controller 358. A requesting interface device (e.g., MCU-IF, CIU-IFU, or BBU-IFU) requests from the data path switch controller 358 a communication path to a destination interface device (e.g., MCU-IF, CIU-IFU, or BBU-IFU). This request is made to the data path switch controller 358 through a set of signals that are referred to as DREQ# and DestID. T he data path switch controller 358 informs the re questing interface device when the communication path is established through a first data path grant signal referred to as DGNT#n and informs the destination interface device of the request through a second data path grant signal referred to as DGNT#m. If the data path switch controller 358 cannot service the request, the requesting interface device waits until the data path switch controller 358 is able to service the request.

Referring back to FIG. 21, the signal s received and generated by the data path switch controller 358 are described as follows:

DREQ#: Data path request signal. Each device within the FCU 212 is assigned a unique data path request signal which is referred t o as DREQ#. This signal indicates to the data path switch controller 358 that there is a data path request and indicates the device making the request. In a preferred embodiment, the DREQ# signal remains asserted until the data transfer is completed. When the data path switch controller 358 indicates backoff (i.e., DBOFF# asserted) to the requesting device, the requesting device must clear the DREQ# signal.

DestID[3:0]: Destination identifier signal. Each device within the FCU 212 is assigned a unique destination identifier. These four signals are used to identify a particular destination identifier.

DGNT#: Data path grant signal. A first data path grant signal (i.e., DGNTn#) is used to indicate to the requesting device that a data path was granted. A second data path grant signal (i.e., DGNTm#) is used to indicate to the destination device that a data request is forthcoming.

NODE_DIR: Node direction signal. A first node direction signal (i.e., NODE_DIRm) is used to indicate to a destination node switch the direction of the data flow and a second node direction signal (i.e., NODE_DIRn) is used to indicate to a requesting node switch the direction of the data flow. If NODE_DIR is set to one, the node switch is in output mode and when set to zero, the node switch is in input mode as will be described in more detail below.

NE#: Node enable signal. The node enable signal is used to enable a particular node switch. One node enable signal is transmitted to the requesting node switch and a second node enable signal is transmitted to the destination node switch.

HPATH_ID[1:0]: Data path identifier signal. The data path identifier signal is used to indicate the identity of a particular data path to a requesting and destination node switch.

In a preferred embodiment, each memory data path is configured to be a single bi-directional signal path and each interface data path is configured to include two uni-directional signal paths. There is no mechanism for an interface device to use the same interface data path that it receives data from to transmit data to the initiator interface device (i.e., turn around capability). Each interface device must specify the identifier of the interface device that will receive the transmitted data. This was done in order to eliminate the extra clock cycle required for the turn around capability.

The data path switch controller 358 receives data path request signals from each interface device. The data path switch controller 358 uses an arbitration process to determine the interface device that will acquire a data path. In a preferred embodiment, a two-level priority scheme is used. Each MCU-IFU 312 has higher priority over the CIU-IFU 310 and BBU-IFU 300. The lower priority level is rotated amongst the CIU-IFUs 310 and BBU-IFUs 300. Each of the CIU-IFUs 310 and BBU-IFUs 300 are assigned a rotating priority that indicates the priority of a device amongst the other devices. In a preferred embodiment, the sequence of the rotating priority can be CIU-IFU$_1$, . . . , CIU-IFU$_n$, BBU$_1$, . . . , BBU-IFU$_L$. It should be noted that the present invention is not constrained to this particular arbitration priority scheme and that others can be used.

At least one node switch 368 needs to be enabled in order to establish a communication path. For example, referring to FIG. 13, for BBU-IFU, 300A to communicate with MCU-IFU, 312A, the communication path would consist of interface data path 318A and memory data path 364A which are enabled through node switch 368A. By way of another example, for BBU-IFU$_1$ 300A to communicate with CIU-IFU, 310A, the communication path would consist of interface data path 318A, memory data path 364A, and interface data path 318E which are all enabled through node switch 368A and node switch 368E. If BBU-IFU$_1$ 300A is considered the requesting device and CIU-IFU$_1$ 310A is considered the destination device, then node switch 368A is considered the requesting node switch and node switch 368E is considered the destination node switch. In order to establish this communication path, the data path switch controller 358 enables the requesting node switch 368A through a set of signals referred to as NODE_DIRn, NE#n, and HPATH_IDn[1:0] and enables the destination node switch 368E through a set of signals referred to as NODE_DIRm, NE#m, and DBUS_IDm[1:0].

Figure 22:
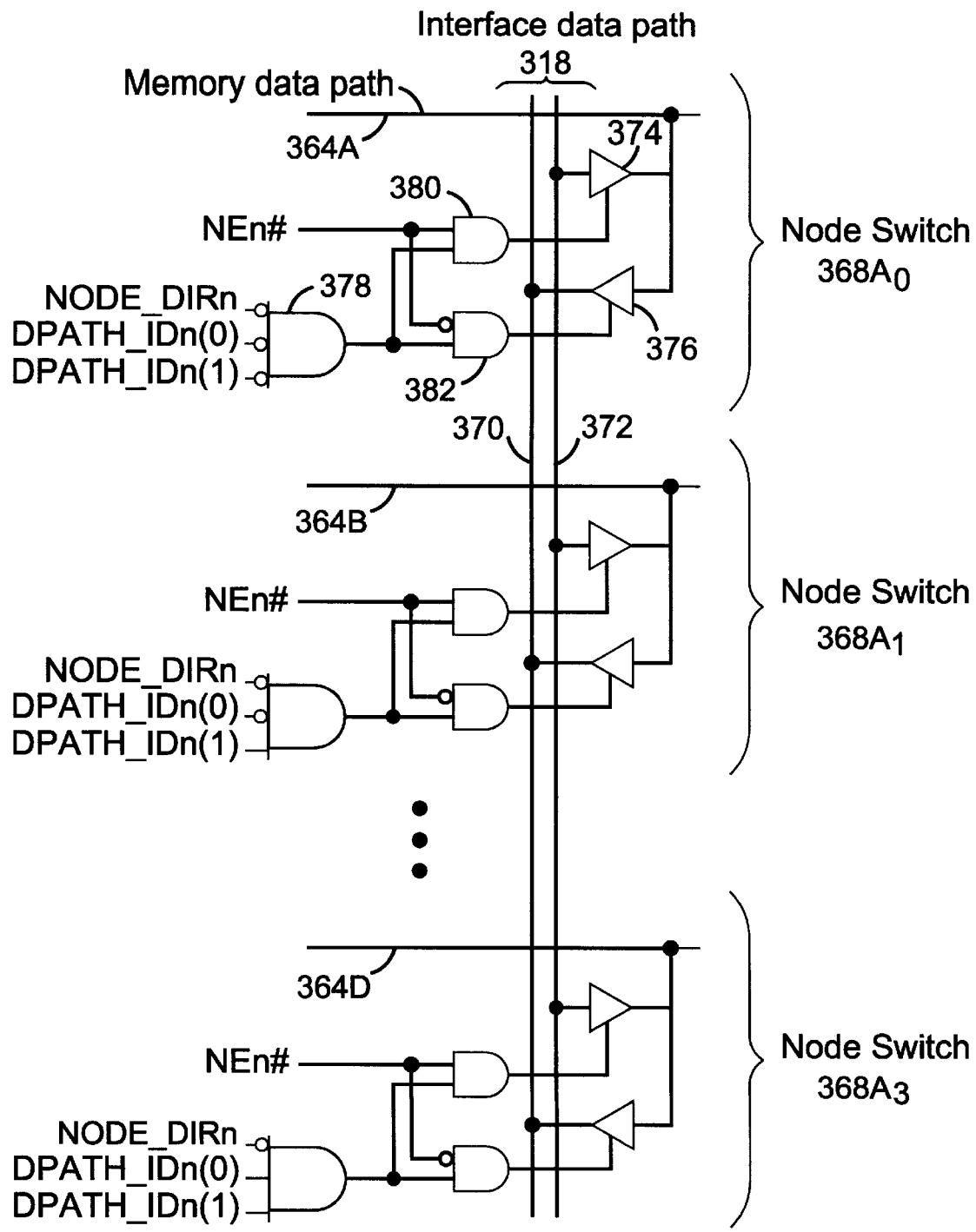
FIG. 22 illustrates an exemplary configuration of the node switches used in a preferred embodiment of the present invention.

FIG. 22 illustrates a set of node switches 368 coupled to an interface data path 318 and several memory data paths 364. There is shown a memory data path 364 consisting of a single bidirectional signal path and an interface data path 318 consisting of two unidirectional signal paths 370, 372. In a preferred embodiment, each memory data path 364 includes a 32-bit bi-directional signal path and each interface data path 318 includes two 32-bit unidirectional signal paths. An output tri-state buffer 374 is provided which is coupled to one of the interface signal paths 372 and the memory data path 364. The output tri-state buffer 374 receives data from the interface data path 318 which is transmitted to the memory data path 364. An input tri-state buffer 376 is provided which is coupled to a second one of the interface signal paths 370 and the memory data path 364. The input tri-state buffer 376 receives data from the memory data path 364 which is transmitted to the interface data path 318.

The buffers 374, 376 are controlled by a logic mechanism that receives as input signals the NE# signal, the NODE_DIR signal, and the HPATH_ID[0:1] signals which were described above. In a preferred embodiment, the logic mechanism includes three AND gates. The first AND gate 378 is tailored to the inputs of the HPATH_ID signals associated with each node switch 368. For example, the first AND gate of node switch 368A$_0$ receives the inverse of the NODE_DIR and HPATH_ID[0:1] signals and its output signal is set to a high state whenever all three input signals are set to zero. The HPATH_ID signals for the first node switch are set to zero in order to activate the first node switch 368A$_0$. The output of the first AND gate 378 is coupled to a second 380 and third 382 AND gate. The second AND gate 380 is coupled to the output tri-state buffer 374 and is used to activate the output tri-state buffer 374. The third AND gate 382 is coupled to the input tri-state buffer 376 and is used to activate the input tri-state buffer 376.

Figure 23:
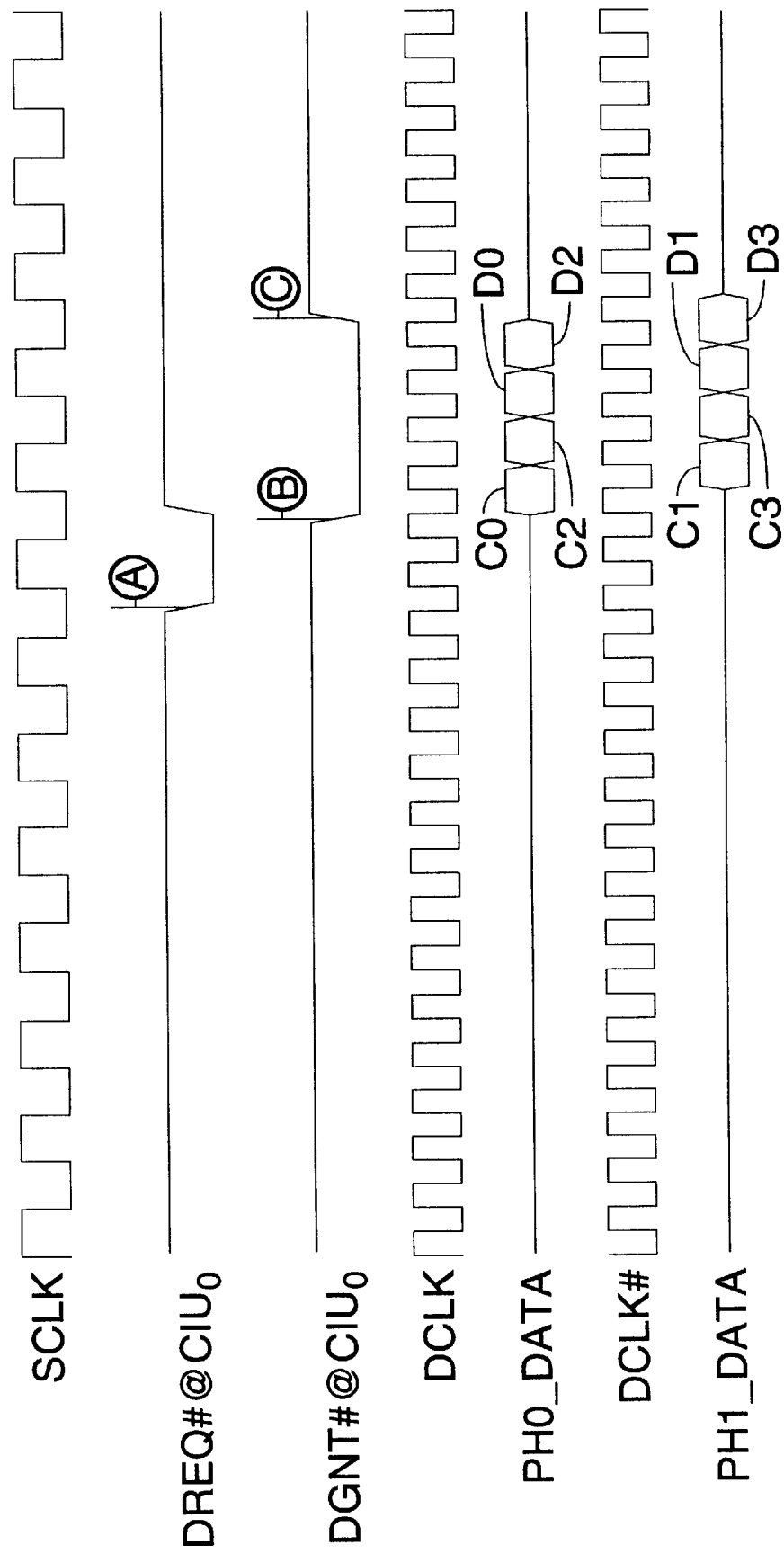
FIG. 23 is a timing diagram of the data transfer phase used to transmit data through the data paths in a preferred embodiment of the present invention.

FIG. 23 is a timing diagram illustrating the transmission of data along a communication path formed of several data paths. In a preferred embodiment, each 32-bit signal path can be composed of two 16-bit signal paths, referred to as PH0_DATA and PH1_DATA. As shown in FIG. 23, at time point A, CIU$_0$ 208 requests a communication path from the data path switch controller 358 by lowering its DREQ# signal. At time point B, the corresponding DGNT# signal is lowered indicating that the data path switch controller 358 has enabled the appropriate signals to activate the communication path. These signals include the NODE_DIR signal, NE# signal, and HPATH_ID[1:0] signals for the requester node switch 368 and if applicable, the NODE_DIR signal, NE# signal, and HPATH_ID[1:0] signals for the destination node switch. At the tick of each clock signal cycle, data is alternately transferred on each data path signal. As shown in FIG. 23 at time point B, at the falling edge of the first clock signal, DCLK, data (i.e., command packet C0) is transmitted on data path signal, PH0_DATA. Since the clock signals are 180° out of phase, the next falling edge is the second clock signal, DCLK#, and data (i.e., command packet C1) is transmitted on data path signal, PH1_DATA. The process continues with the data alternately transmitted on each data path signal. The transmission is terminated when the DGNT# signal is deasserted as shown at time point C.

The transmission of the data in this manner has several benefits. Switching noise is reduced and transmission latency is minimized since the data is quickly transmitted from the channel once it arrives.

It should be noted that the data path configuration is not a crossbar switch network. A crossbar switch network has a switching element at each juncture of a vertical and horizontal data bus. Typically, the switching element includes an arbiter logic unit and a bus connection logic unit. The arbiter logic unit is used to arbitrate between conflicting access requests for a bus and the bus connection logic unit is used to enable the connection to a bus. The data path configuration of the present invention differs since there is a central data path switch controller that performs the arbitration and enables the appropriate node switches thereby eliminating the need for these functions to be performed at each node.

Figure 24:
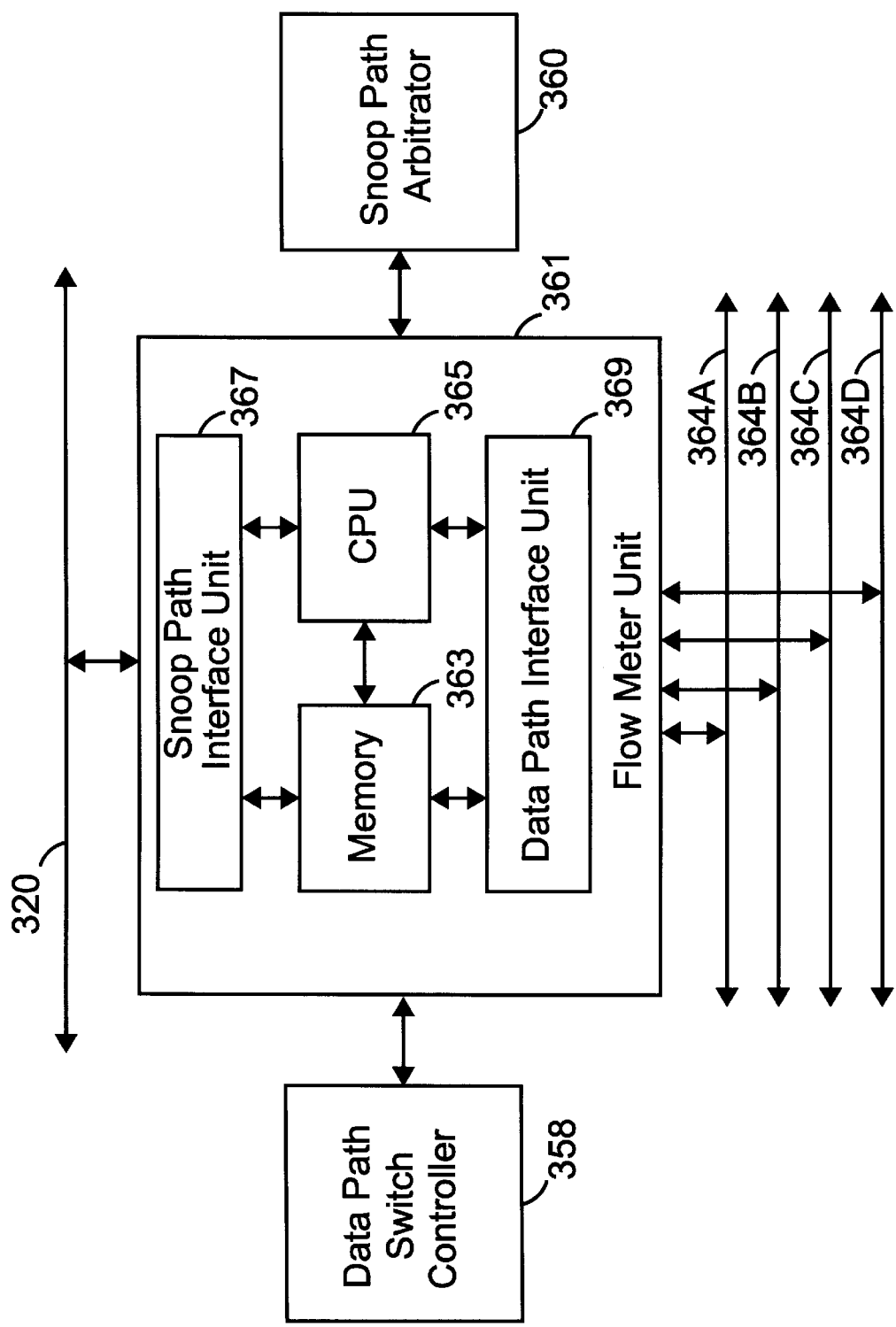
FIG. 24 is a block diagram illustrating a flow meter unit in a preferred embodiment of the present invention.

FIG. 24 illustrates a flow meter unit 361 that is used to monitor the activity on the snoop path 320 and the memory data paths 364 in order to alter the priority scheme used in granting access to the snoop path 320 and the data paths 364. In addition, the flow meter unit 361 can be used to alter the window size of each memory data path 364. This is beneficial since it provides the system with the capability to accommodate various types of application demands such as but not limited to low latency applications, high I/O bandwidth applications, and the like.

The flow meter unit 361 includes a memory 363 for storing data retrieved from the snoop and data paths, a CPU 365 for processing the data, a snoop path interface unit 367 that interfaces with the snoop path 320, and a data path interface unit 369 that interfaces with the memory data paths 364. The flow meter unit 361 can be located in one of the interface units (e.g., BBU-IFU 330, MCU-IFU 312, CIU-IFU 310) or as a separate unit in the FCU 212. The flow meter unit 361 is coupled to the snoop path 320, to each of the memory data paths 364, to the snoop path arbitrator 360, and the data path switch controller 358.

The function of the flow meter unit 361 is to monitor the activity on the snoop path 320 and the memory data paths 364. This monitoring activity can be event triggered by specified transactions or the like or clock triggered at certain specified time intervals or the like. The data is collected, stored, and analyzed in order to determine whether the priority scheme used to grant access to the snoop path and data paths should be modified in order to optimize the traffic on these signal paths. At certain time points, the flow meter unit transmits a signal to the data path switch controller 358 indicating an intended reorder of the priority scheme used by the data switch controller 358 and transmits a signal to the snoop path arbitrator 360 indicating an intended reorder of the priority scheme used by the snoop path arbitrator 360.

Snoop path

The snoop path 320 processes those transactions involving cacheable memory and cache coherency. The snoop path 320 is connected to each interface unit 300, 310, 312. A CIU-IFU 310 uses the snoop path 320 to determine whether or not requested data resides in another processor's L2 cache and how to maintain the states of the cache lines in its tag memory. The MCU-IFU 312 uses the snoop path 320 to determine if the requested address coincides with its access range. The MCU-IFU 312 monitors the response from the snoop request and in certain instances initiates access to main memory in order to service the request. A BBU-IFU 300 is connected to the snoop path 320 in order to facilitate data transfers for cacheable memory, to ensure cache consistency, and to ensure that pending transactions are not affected by incoming transactions.

In addition, the snoop path 320 is used to broadcast 110 data that is used to configure the BBUs 206 for multiple I/O buses. In order to differentiate when the snoop path 320 is used to broadcast a snoop transaction rather than an 110 operation, a snoop-I/O signal is used to indicate the nature of the data that is broadcasted on the snoop path.

The following is a description of the signals used to implement a snoop operation:

SCLK: Snoop path clock signal.

SA[63:0]: Snoop address and transaction command. In a preferred embodiment, the snoop address and transaction command is 64-bits and can have the same format shown in FIG. 9.

SNOOP_HIT[3:0]: Snoop hit status signal. These lines indicate the state of a cache line that is located in a particular CIU IFU's L2 tag memory. In a preferred embodiment, a cache line can be in one of the following transient states: Modified, Exclusive, Shared, Invalid, Modified Clean, Shared Write Through, or Invalid Write Through. In a preferred embodiment, these states can be reflected by the encoding of the SNOOP_HIT signals.

STARGET_ID[4:0]: Snoop target identifier signal. The snoop target identifier signal is used for cacheable write transactions (e.g., cacheable write or I/O memory write). A CIU-IFU having a requested cache line in the M or E state places its device identifier on the STARGET_ID signal. The receiving device uses this signal in order to transmit the write data back to the requesting device via a communication path including one or more of the data paths.

SCYCLE#: Snoop path cycle signal. The snoop path cycle signal indicates the start and length of a snoop cycle.

SBOFF#: Snoop backoff signal. The snoop backoff signal indicates that one of the snooping devices is not able to respond to the current snoop request. This can occur when the CIU-IFU or BBU-IFU is busy. A MCU-IFU can assert the snoop backoff signal when the command is a read, the request queue is full, and the result of the snoop hit signal does not indicate a modified or an exclusive state.

SLOCK#: Snoop path lock signal. The snoop path lock signal is used in an alternate embodiment where there are no transaction lock buffers or other such means to serialize transactions on the snoop path. In this alternate embodiment, a path is locked during an entire read-modify-write sequence in order to ensure that another device cannot effect the transaction.

SREQ#: Snoop path request signal. There are n+k+l snoop path request signals, one for each interface device in the FCU. An interface device uses its snoop path request signal to request the snoop path.

SGNT#: Snoop path grant signal. There are n+k+l snoop grant signals, one for each device in the FCU. Access to the snoop path is granted to an interface device through its corresponding snoop path grant signal.

SNOOP-I/O#: Snoop path indication signal. This signal is used to indicate whether the snoop path is being used to broadcast a snoop transaction or an I/O operation.

A snoop operation can consist of three phases: a request phase, an address phase, and a result phase. The request phase is used to request access to the snoop path 320. Once access to the snoop path 320 is granted, the address phase proceeds. In the address phase, an address and command is broadcasted to each snooping device through the snoop address path (SA). In the result phase, the appropriate response is determined by interpreting the snoop back off signal (SBOFF#) and the snoop hit signals (SNOOP_HIT).

On the rising edge of a first SCLK# signal when the SCYCLE# signal is asserted, all interface devices (i.e., CIU-IFUs, BBU-IFUs, and MCU-IFUs) latch in the data from the snoop address path. Each CIU-IFU 310 searches for the address in its lock buffer and associated tag memory, each BBU-IFU 300 searches for the address in its lock buffer, and each MCU-IFU 312 decodes the address and determines if the address is within its respective memory access range. If the interface device cannot service the request or has the address in its lock buffer, the interface device asserts the SOFF# signal. If a CIU-IFU 310 finds the requested cache line in its tag memory, the SNOOP_HIT signal is asserted with the state of the cache line. The SNOOP_HIT signals can be set to one of the following transient states: Modified (M), Exclusive (E), Shared (S), Invalid (I), Modified Clean (MC), Shared Write Through (SWT), or Invalid Write Through (IWT).

At the rising edge of the second SCLK# signal, the results from each interface device are posted. The result can be a "backoff", a "hit" or a combination of both a "backoff" and "hit." The response is seen through the SBOFF# signal and the SNOOP_HIT signals. A "backoff" (i.e., the SBOFF# signal set to low) indicates that any one of the interface units is not ready to perform a tag lookup, that the address is associated with a transaction that is currently being processed, or that the MCU-IFU 312 cannot service the cache miss at this time. The SBOFF# signal will be asserted by a MCU-IFU 312 when its request queue is full and when there is a cache read miss (i.e., SNOOP_HIT signal does not reflect an E or M state and the command involves a read operation). When a backoff is asserted, the current snoop cycle is terminated and retried later.

During the second clock cycle, the MCU-IFU 312 will initiate a read operation if the snooped address is within the interface device's memory access range, no backoff has been requested, and there is a cache read miss.

During the second clock cycle, the initiator CIU-IFU 310 that broadcasted a cacheable write transaction that is resident in another processor's cache in the Exclusive or Modified state will sample the STARGET_ID signal for the target identifier of the interface device claiming sole ownership of the cache line, The initiator CIU-IFU 310 will then use the target identifier to obtain a communication path to the destination interface device in order to transmit the write data.

In a preferred embodiment of the present invention, the cache controller can operate in either write-through mode or copy-back mode. In write-through mode, modified data is updated to both the cache and the main memory. In copy-back mode or write-back mode, modified data is written to the cache. The corresponding main memory location is updated with the modified data when the modified data is replaced. In the write-through mode, only one cache can possess a cache line in the exclusive 'E' or modified 'M' state.

Since the cache controller can operate in either one of these modes, the snoop hit signals present one of seven possible transient states. A transient state indicates the respective MESI state that the cache line will have when the snoop operation is completed. The transient states of M, MC, E, S, and I pertain to the copy-back mode and the transient states of SWT and IWT pertain to the write-through mode.

FIG. 23 illustrates three snoop operations denoted as snoop operation₁, snoop operation₂, and snoop operation₃. At time point A in snoop operation₁, the first interface unit requests access to the snoop path 320 by asserting its snoop request signal, SREQ₁#. The request is granted at time point B when the requesting interface unit's snoop grant signal, SGNT₁#, is deasserted. When the request is granted, the first interface unit latches the address onto the snoop address signal, SA, on the first rising edge of the snoop path clock SCLK# signal when the SCYCLE# signal is asserted, which is denoted as time point C. At this point, the snoop control logic unit in each interface unit latches the address and transaction command from the snoop address path. Each interface unit submits the address to its respective control logic unit which initiates a lookup in its lock buffer for the requested address and/or its associated tag memory. The result of this lookup is presented in the result phase.

As shown in FIG. 23, for the first snoop cycle, the request phase begins at the second rising edge of the snoop path clock, which is referred to as time point D. In this case the snoop hit signal indicates a cache hit in the shared state. At this point in time, the snoop cycle is completed.

The second snoop operation illustrates the case where the STARGET_ID is asserted during the second clock cycle along with the SNOOP_HIT signal. Typically, this occurs in the case of a cacheable write or I/O memory write transactions where the requested cache line is stored in another cache in either a 'E' or 'M' state. In this case, the initiator interface device needs to know the identity of the interface device storing the cache line so that the initiator interface device can transmit the data to the destination interface device. As noted above, the data paths are unidirectional and do not allow an interface device the capability to return data on the same communication path that was used to transmit data to the device. This is because this "turn around" capability entail an extra cycle. As such, the use of the STARGET_ID signal eliminates the need for this extra cycle thereby achieving a higher transfer rate. As shown in snoop operation₂ at time point E, an interface device asserts the SNOOP_HIT signal with the 'E' state and with the STARGET_ID representing the respective device identifier.

The third snoop operation illustrates the case where a SNOOP_HIT signal and the SBOFF# signal are both asserted at time point F. In this case, the snoop cycle is abandoned and the initiating interface unit will retry the request at a later time.

The result of a snoop cycle can affect the actions of the initiator interface unit initiating the request and the state of the cache lines in each of the other snooping caches. There are several possible actions which can result and which are enumerated in the following table. The initiator cache is associated with the CIU-IFU 310 requesting the transaction. The snoop cache is associated with the other cacheable devices connected to the snoop path.

TABLE I

| Transaction | Snoop Result | Effect |
| --- | --- | --- |
| Memory read | Hit on I line. | The data is read from main memory. In write-through mode, the data is placed in the initiator cache in the S state. In copyback mode, the data is placed in the initiator cache in the E state. |
| Memory read | Hit on E line. | The data is read from the snoop cache having the data. The data is placed in the initiator cache in the S state. The snoop cache having the cache line in the E state, changes the cache line to S (i.e., E -> S). |
| Memory read | Hit on S line. | The data is read from main memory and the initiator cache stores the |

TABLE I-continued

| Transaction | Snoop Result | Effect |
|---|---|---|
| | | line in the S state. |
| Memory read | Hit on M line. | Modified line is supplied to the initiator cache by the snoop cache. The snoop cache changes the state of the cache line to I state. The initiator cache stores the line in the M state. In the case where the MCU-IFU is programmed to write back to the main memory the modified line, the initiator snoop cache stores the read data in the S state and the modified line in stored in the main memory. The snoop cache alters the state of the cache line to shared. |
| Memory write | Hit on I line. | The write data is written to main memory. |
| Memory write | Hit on E line. | The write data is written to the snoop cache having the cache line. The state of the snoop cache line is changed to modified (i.e., E –> M). The state of the initiator's cache line is set to I. |
| Memory write | Hit on S line. | The write data is written to main memory. The snoop caches alter the state of the cache line to invalid. |
| Memory write | Hit on M line. | The write data is transmitted to the snoop cache having the cache line and remains in the M state. The state of the initiator's cache is set to I. |

In an alternate embodiment, the SLOCK# signal is used to serialize the transactions using the snoop path 320 in addition to the transaction lock buffers. When the SLOCK# signal is asserted, the snoop path 320 is not granted to any of the interface devices. An interface device having been granted access to the snoop path 320 can assert the SLOCK# signal for more than one cycle and does not need to check its SGNT# signal before starting a new cycle. In order to lock the snoop path 320, an interface device asserts the SLOCK# in the address phase and keeps it asserted until the last cycle. The snoop path lock is released by deasserting the SLOCK# signal at the same time the SCYCLE# signal is asserted. In this manner, arbitration for access to the snoop path 320 can occur in parallel during the last cycle.

For some transactions, the initiator interface device may not be capable of deciding whether it requires the snoop path lock until after the start of a snoop operation. In these cases, the initiator interface device may deassert the SLOCK# signal immediately after the result phase.

The foregoing description has described the components and workings of the FCU 212. In a preferred embodiment, the FCU 212 can be a single integrated circuit. In an alternate embodiment, the FCU 212 can be composed of one or more integrated circuits or chips that are coupled to each other. Each FCU chip can be connected to one or more devices and the coupled FCU chips provide the communication paths needed to transmit data between the devices.

Attention now turns to a more detailed operation of the computer system of the present invention.

Operation of the Multiprocessor System

The devices connected to the FCU 212 communicate with each other through transactions that are transmitted to the FCU 212. These transactions are typically associated with accessing data stored in the various memory regions. In a preferred embodiment, the memory within the system can be partitioned into cacheable memory, non-cacheable memory, and a memory mapped I/O address space. The cacheable memory can be stored in each processor's cache and/or the main memory. The cacheable memory is shared amongst the processors and maintained in accordance with the prescribed cache coherency protocol. Main memory has a region partitioned as non-cacheable memory that can be accessed by each of the devices connected to the FCU 212. The I/O address space is used to communicate with I/O ports associated with external I/O devices.

Each transaction is composed of a number of operations that need to be performed in order to process the transaction. For example, a cacheable read transaction is composed of the following operations: (1) a snoop operation that determines where the requested cache line resides; (2) a read external cache operation that is transmitted from the FCU 212 to a target CIU 208 associated with the cache line in order to read the cache line from the external cache; (3) a deferred read reply generated from the target CIU-IFU 310 to the initiator CIU-IFU 310 that transmits the read data to the initiator CIU-IFU 310; and (4) a deferred read reply that transmits the read data to the initiator CIU 208.

In addition to these operations, additional operations are performed that maintain the cacheable memory in accordance with the cache coherency protocol. This includes operations that change the state of a cache line in the duplicate tag memory, in the primary tag memory, in the external cache, and in the internal cache.

Attention now turns to a description of the operations used to process each transaction.

CIU-IFU

FIGS. 26–40 are flow charts illustrating the steps used by the CIU-IFU 310. FIGS. 26–33 illustrate the steps used by the CIU-IFU 310 to process a transaction received from the channel. FIGS. 34–40 illustrate the steps used by the CIU-IFU 310 in response to data snooped from the snoop path 320.

Figure 26:
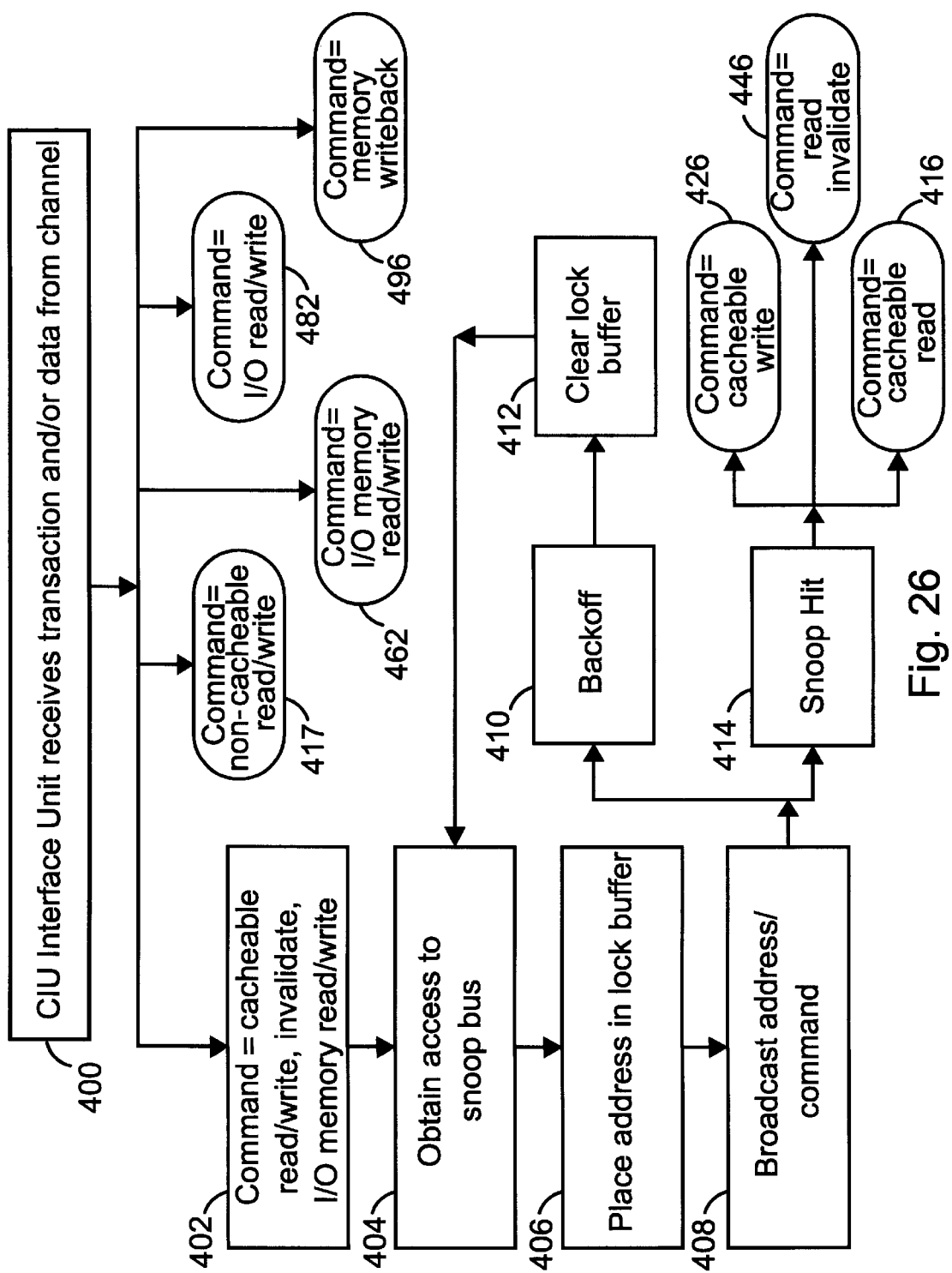
FIGS. 26–33 are flow charts illustrating the steps used by the CIU channel interface unit to process transactions received from a channel in a preferred embodiment of the present invention.

Referring to FIG. 26, the CIU-IFU 310 can receive a transaction and/or data from the channel. The format of the transaction is shown in FIG. 10 and includes an address identifying a memory location and a command that identifies the type of transaction. The CIU-IFU 310 can receive the following transactions: (1) cacheable read/write transactions; (2) I/O memory read/write transactions; (3) I/O read/write transactions; (4) memory writeback transactions; and (5) read invalidate transactions.

A cacheable read transaction is used to read a cache line from a cacheable memory region that can be located in any of the cache memories or in the cacheable memory region of main memory. A cacheable write transaction is used to write data to cacheable memory that can be resident in another cache or the cacheable memory region of main memory. An I/O memory read is used to read data from the memory mapped I/O address space and an I/O memory write is used to write data to the memory mapped I/O address space. An I/O read/write transaction is used to read or write data from a processor and an I/O port and from an I/O port to a processor. A memory writeback transaction is used by the processor to write a modified cache line back to main memory. A read invalidate transaction is used by a processor to read cacheable data that will be stored exclusively by the initiator processor. In this case, other caches containing the cache line invalidate their copy.

Figure 25A:
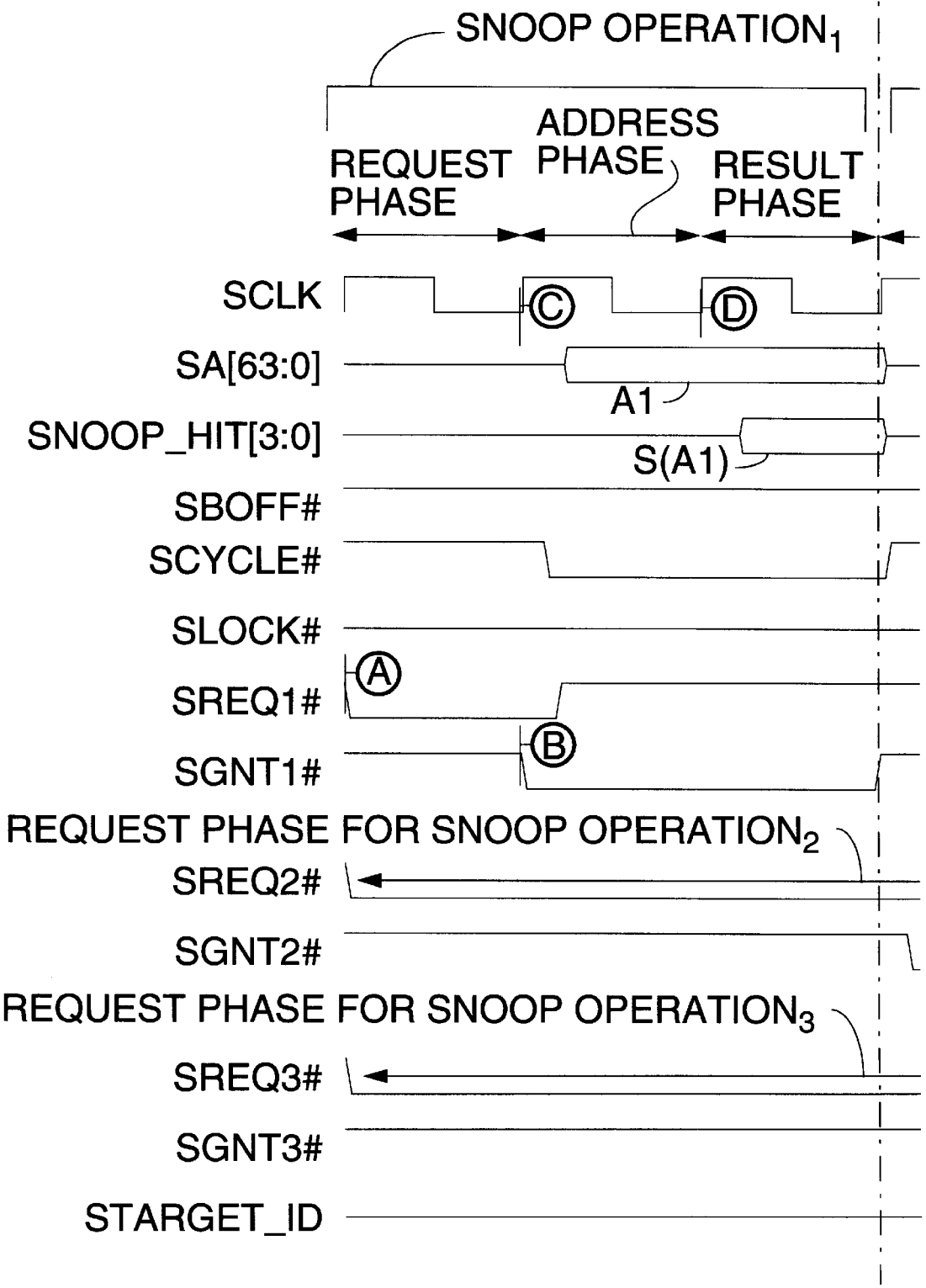
FIG. 25 is a timing diagram of a snoop operation in a preferred embodiment of the present invention.
Figure 25B:
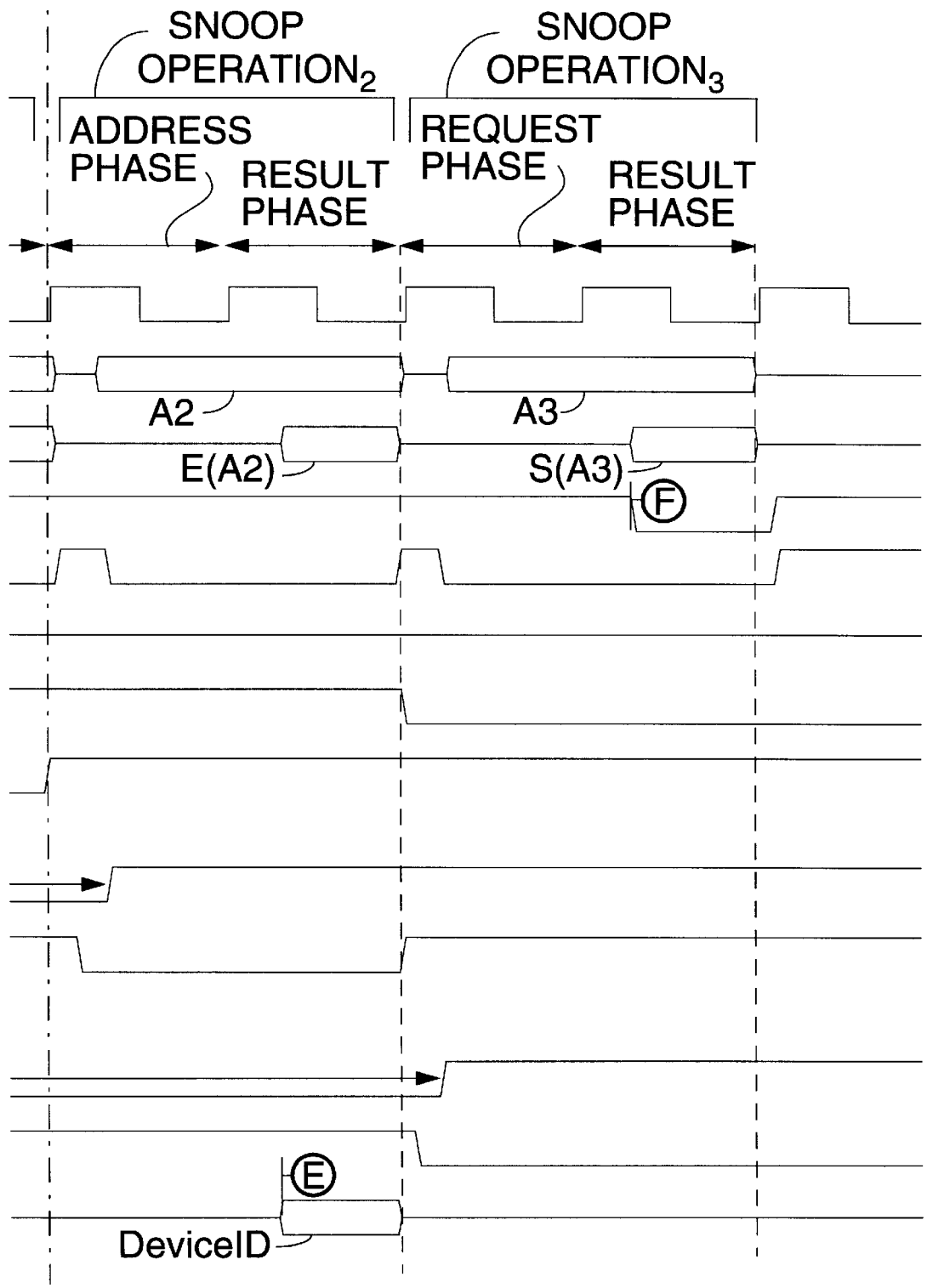
Figure 25C:
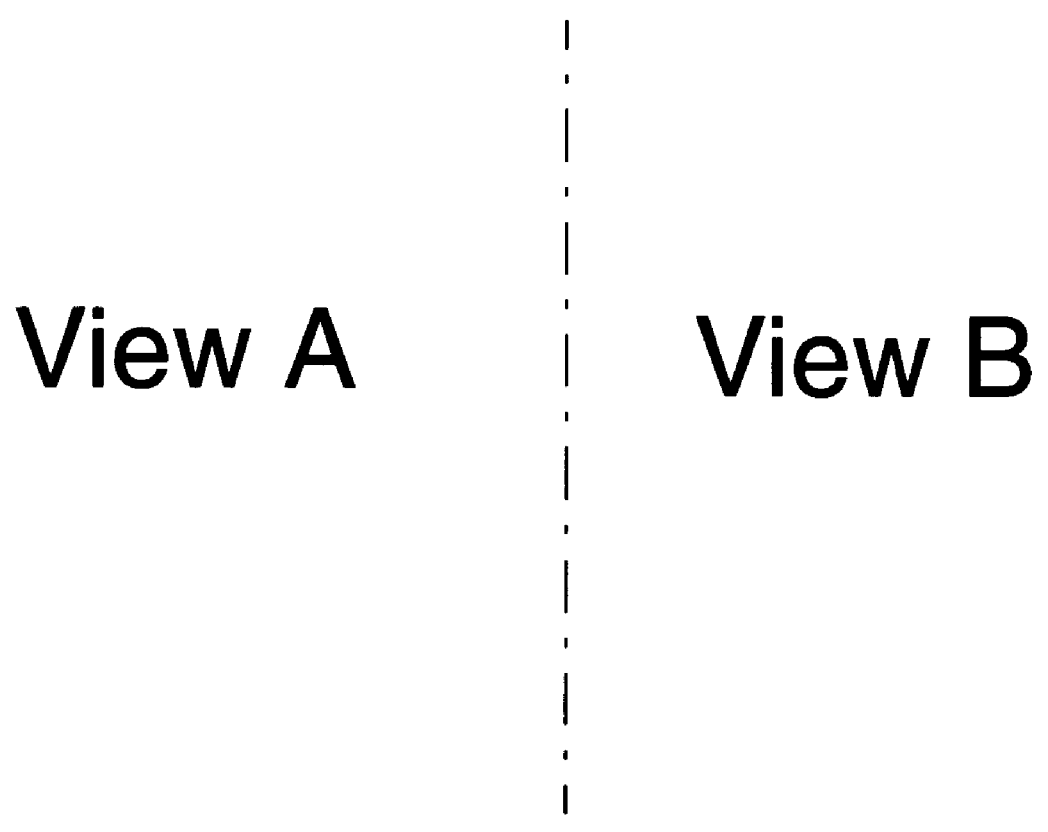

Referring to FIG. 26, when the transaction represents a cacheable read or write, or read invalidate command (step 402), a snoop operation is initiated. The snoop operation was described above with respect to FIG. 25. The initiating CIU-IFU 310 requests access for the snoop path 320 (step 404). When access is granted, the initiator CIU-IFU 310 stores the address in a lock buffer (step 406). This will prevent another transaction from altering the cache line associated with the address while the current transaction is processing. The initiator CIU-IFU 310 then broadcasts the address and command on the snoop address signal path (step 408). The CIU-IFU 310 then monitors the backoff and snoop hit signals for a response. If the backoff signal is asserted (step 410), the CIU-IFU 310 clears the address associated with the transaction from the lock buffer (step 412) and reinitiates the snoop operation at a later time. Otherwise, there was a snoop hit (step 414) and the processing proceeds based on the transaction.

Figure 27:
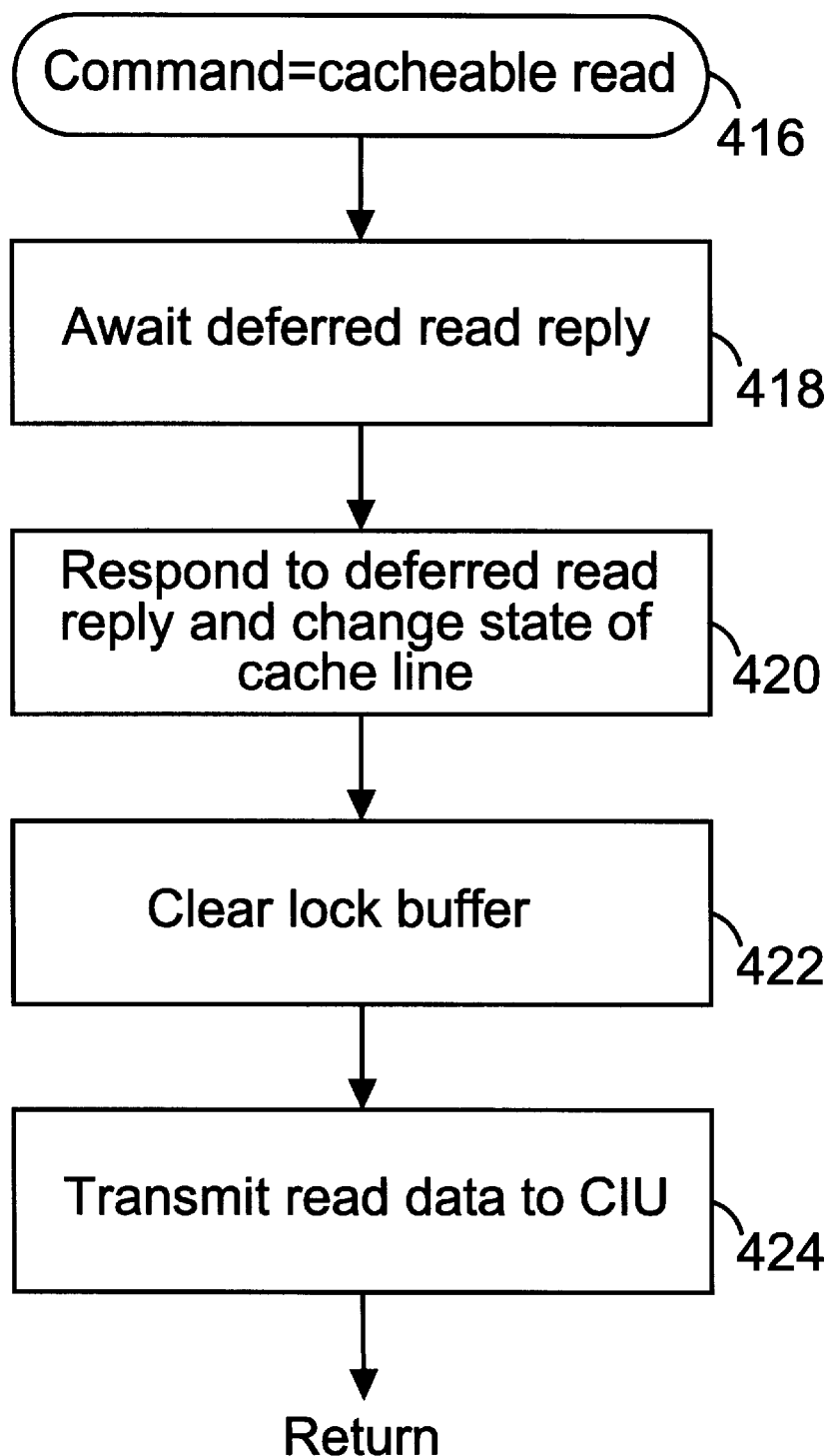

FIG. 27 illustrates the case where there is a snoop hit and the command is a cacheable read transaction. The read data can be obtained from either another cache (SNOOP_HIT= M/MC/E) or from main memory (SNOOP_HIT=S/SWT/I/ IWT). The read data is transmitted to the initiator CIU-IFU through a deferred read reply. The deferred read reply is received on the interface data path associated with the initiator CIU-IFU (step 418). The initiator CIU-IFU then alters the state of the associated tag in the duplicate tag memory (step 420). In the case where the previous state was E/S/SWT/MC/IWT, the state is set to shared. In the case where the previous state was invalid, the state is set to exclusive, modified or shared based on the caching protocol and in the case where the previous state was modified, the state is unchanged. The address associated with the transaction is cleared from the lock buffer (step 422) and the read data is transmitted to the initiator CIU 208 (step 424). The initiator CIU-IFU 310 obtains access to the appropriate channel and transmits the read data to the initiator CIU 208 through the channel 210. The initiator CIU 208 receives the data and places it on the processor bus. The read data is then stored in the external cache and the state of the associated cache line is updated in the tag memory as well.

Figure 28:
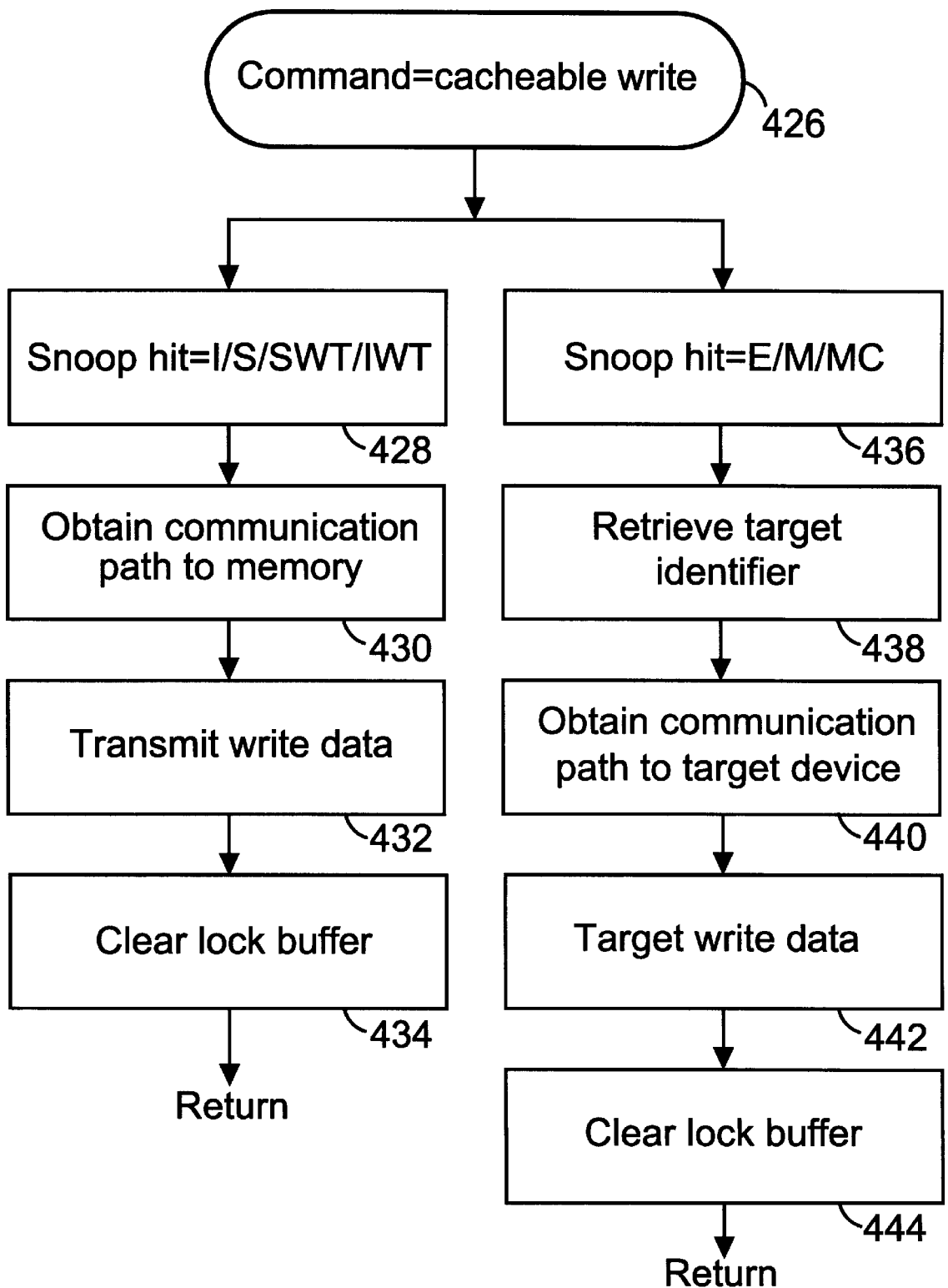

FIG. 28 illustrates the steps used by the initiator CIU-IFU 310 to process a cacheable write transaction. The write data can be written to a single cache claiming ownership of the cache line (SNOOP_HIT=E/M/MC) or to the main memory when the cache line is shared by more than one cache or not found in any cache (i.e., SNOOP_HIT=I/S/SWT/IWT) (step 428). In the latter case, the initiator CIU-IFU 310 requests from the data path switch controller 358 a communication path to the MCU-IFU 312 associated with the requested memory address (step 430). The data path switch controller 358 will enable the appropriate data paths which includes the interface data path 318 associated with the initiator CIU-IFU 310 and the memory data path 364 associated with the appropriate MCU-IFU 312. The CIU-IFU 310 uses this communication path to transmit the write data to the MCU-IFU 312 (step 432) and then clears the address from the lock buffer (step 434).

In the case where the write data is written to another cache (i.e., SNOOP_HIT=E/M/MC) (step 436), the initiator CIU-IFU 310 retrieves the target CIU-IFU identifier from the snoop path 320 (i.e., STARGET_ID signal) (step 438). This identifier is used by the initiator CIU-IFU 310 to request from the data path switch controller 358 a communication path to the target CIU-IFU 310 (step 440). The communication path includes the interface data path 318 of the initiator CIU-IFU 310, the interface data path 318 associated with the target CIU-IFU 310, and one of the memory data paths 364. When the communication path is granted, the write data is transmitted (step 442) and the initiator CIU-IFU 310 clears the address from the lock buffer (step 444).

Figure 29:
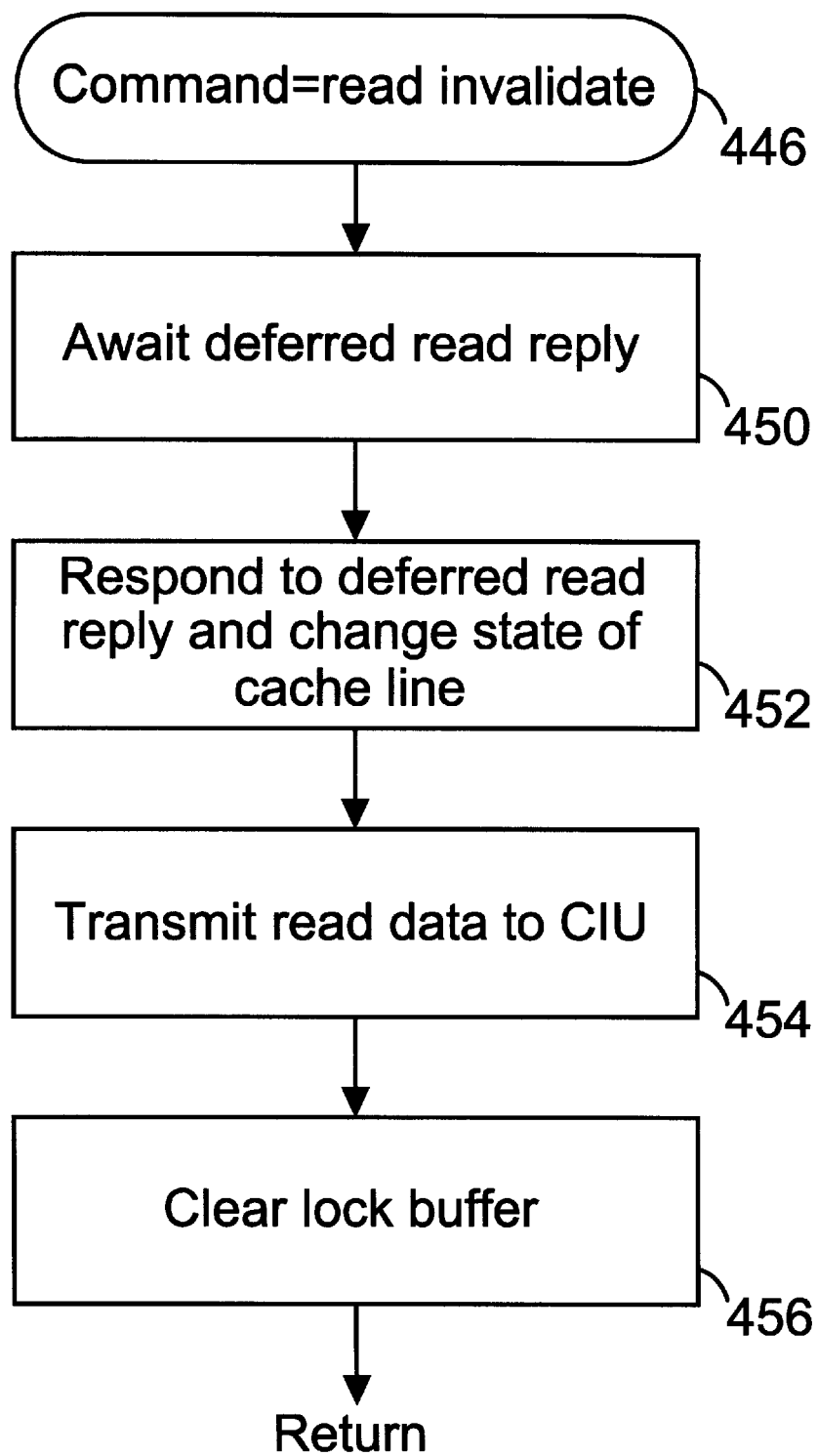

FIG. 29 illustrates the steps used by the CIU-IFU 310 to process a read invalidate transaction (step 446). The read invalidate transaction is used to obtain a cache line in an exclusive state by the initiator processor. The snoop operation is used to broadcast the address of the cache line to other caches. The cache line is retrieved from either another cache or main memory and invalidated by the other caches.

The initiator CIU-IFU 310 awaits a deferred read reply from the interface device associated with the cache line (step 450). The initiator CIU-IFU 310 responds to the deferred read reply and changes the state of the associated tag in the duplicate tag memory (step 452), transmits the read data to the initiator CIU 208 (step 454), and clears the address from the lock buffer (step 456). The initiator CIU-ICU 310 changes the state of the associated tag to either exclusive or modified. If the cache line state is in the modified state, the initiator CIU-IFU 310 stores the tag in the modified state otherwise, the initiator CIU-IFU 310 stores the tag in the exclusive state.

Figure 30:
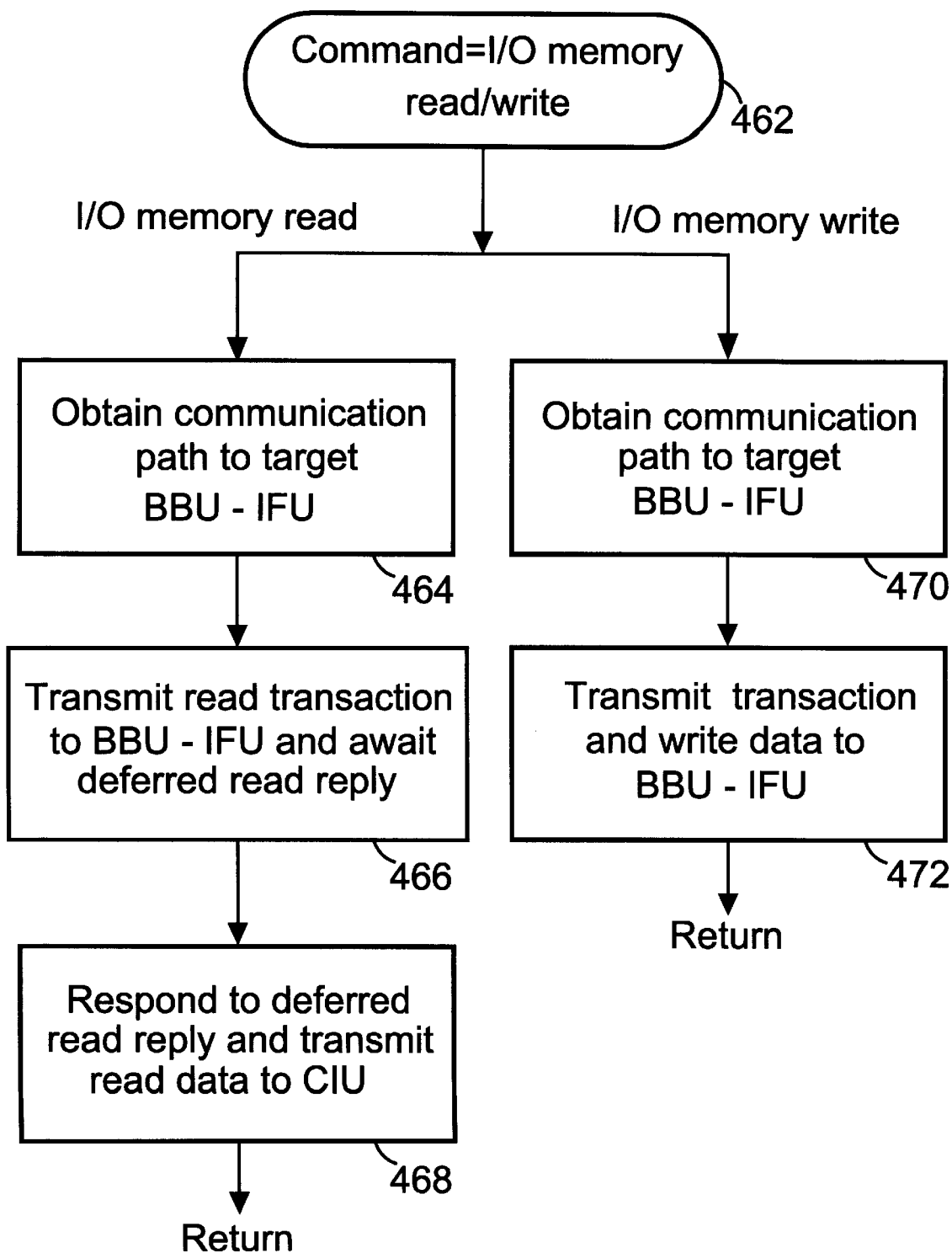

FIG. 30 illustrates the steps used by an initiator CIU-IFU 310 to process a I/O memory read or write transaction (step 462). The data is memory mapped to an I/O device that is associated with a BBU-IFU 330.

In the case of an I/O memory read, the initiator CIU-IFU 310 obtains a communication path to the target BBU-IFU 330 (step 464) and transmits the read transaction to the target BBU-IFU 330 (step 466). The initiator CIU-IFU 310 then awaits the deferred read reply (466), responds to the deferred read reply and transmits the read data to the associated CRU 208 (step 468).

In the case of an I/O memory write, the initiator CIU-IFU 310 obtains a communication path to the target BBU-IFU 330 (step 470) and transmits the write transaction and the write data to the target BBU-IFU 330 (step 472).

Figure 31:
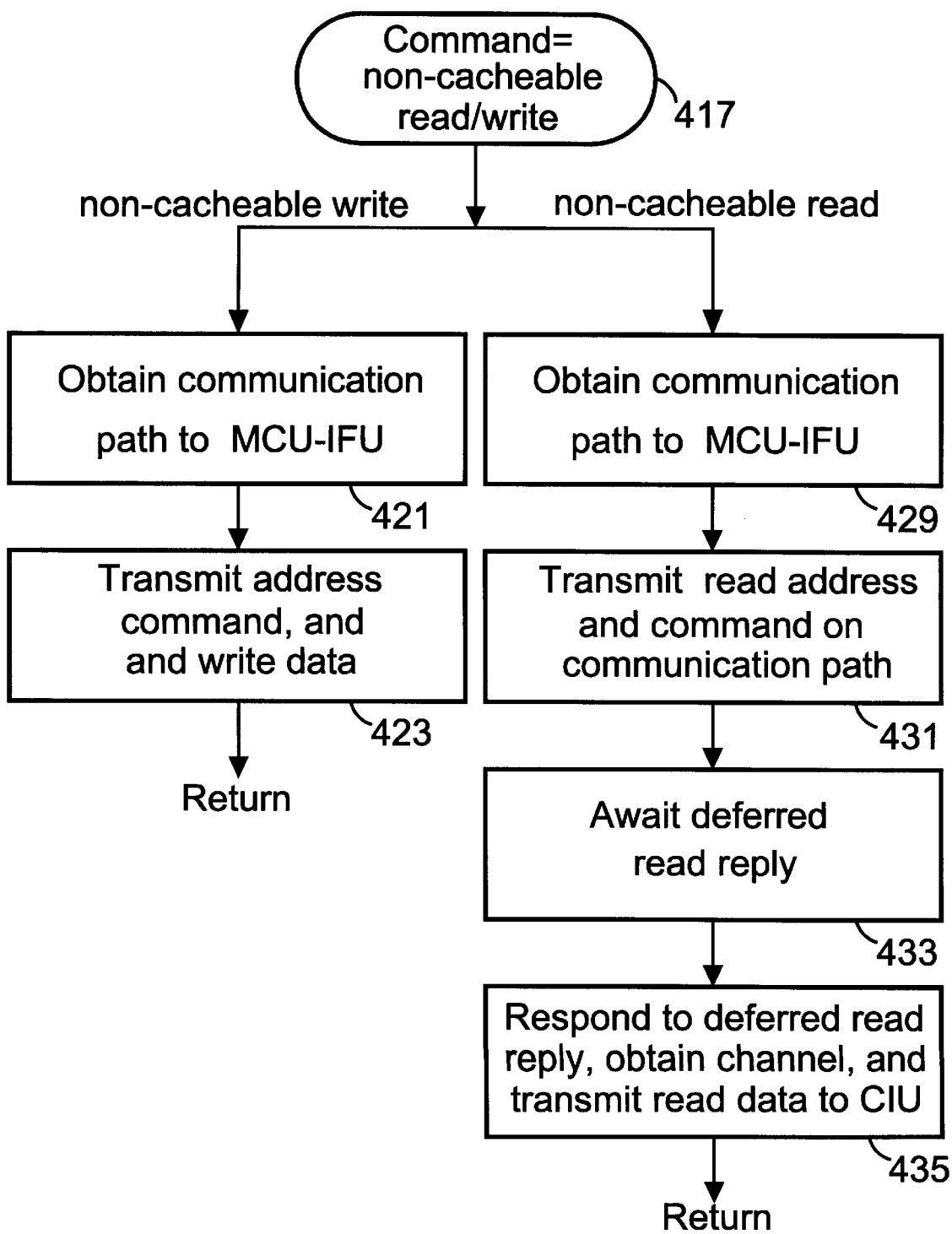

FIG. 31 illustrates the steps used by an initiator CIU-IFU 310 to process a non-cacheable read and write transaction. A non-cacheable read and write transaction accesses data in the non-cacheable region of memory. As such, there is no snoop operation associated with these transactions.

In the case of a non-cacheable write, the CIU-IFU 310 requests from the data path switch controller 358 a communication path to the MCU-IFU 312 associated with the requested memory address (step 421). When the communication path is granted, the address, command, and write data is transmitted to the target MCU-IFU 312 (step 423). The MCU-IFU 312 transmits the write data to the intended memory location.

In the case of a non-cacheable read transaction, the initiator CIU-IFU 310 requests from the data path switch controller 358 a communication path to the MCU-IFU 310 associated with the requested memory address. The data path switch controller 358 enables the appropriate data paths which can include the interface data path 318 associated with the initiator CIU-IFU 310 and the memory data path 364 associated with the requested address (step 429). The initiator CIU-IFU 310 uses this communication path to transmit the address and command to the MCU-IFU 312 (step 431). The initiator CIU-IFU 310 awaits a deferred read reply from the target MCU-IFU 312 (step 433). The initiator CIU-IFU 310 responds to the deferred read reply and transmits the read data to the initiator CIU 208 (step 435).

Figure 32:
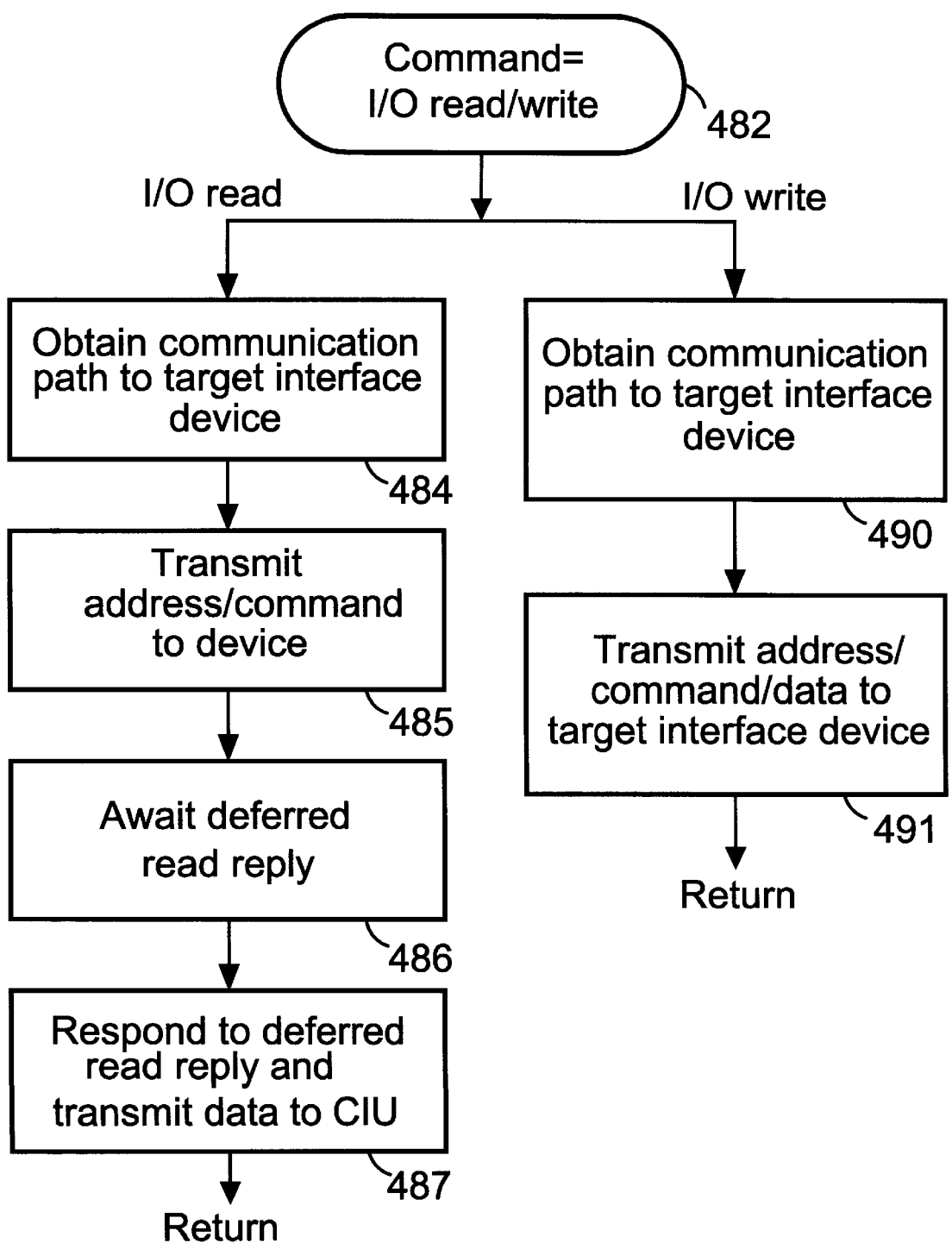

FIG. 32 illustrates the steps used by an initiator CIU-IFU 310 to process an I/O read and write transaction. An I/O read and write transaction accesses data in the I/O memory address space associated with an external I/O device. In the case of an I/O read, the initiator CIU-IFU 310 requests from the data path switch controller 358 a communication path to the BBU-IFU 300 associated with the requested memory address (step 484). The data path switch controller 358 enables the appropriate data paths which can include the interface data path 318 associated with the initiator CIU-IFU 310, a memory data path 364, and the interface data path 318 associated with the target BBU-IFU 300 (step 484). The initiator CIU-IFU 310 uses this communication path to transmit the address and command to the BBU-IFU 300 (step 485). The initiator CIU-IFU 310 awaits a deferred read reply from the target BBU-IFU 300 (step 486). The initiator CIU-IFU 310 responds to the deferred read reply and transmits the read data to the initiator CIU 208 as described above with respect to the cacheable read transaction (step 487).

In the case of an I/O write, the CIU-IFU 310 requests from the data path switch controller 358 a communication path to the BBU-IFU 300 associated with the requested memory address (step 490). When the communication path is granted, the address, command, and write data is transmitted to the target BBU-IFU 300 (step 491). The BBU-IFU 300 transmits the write data to the intended I/O port.

Figure 33:
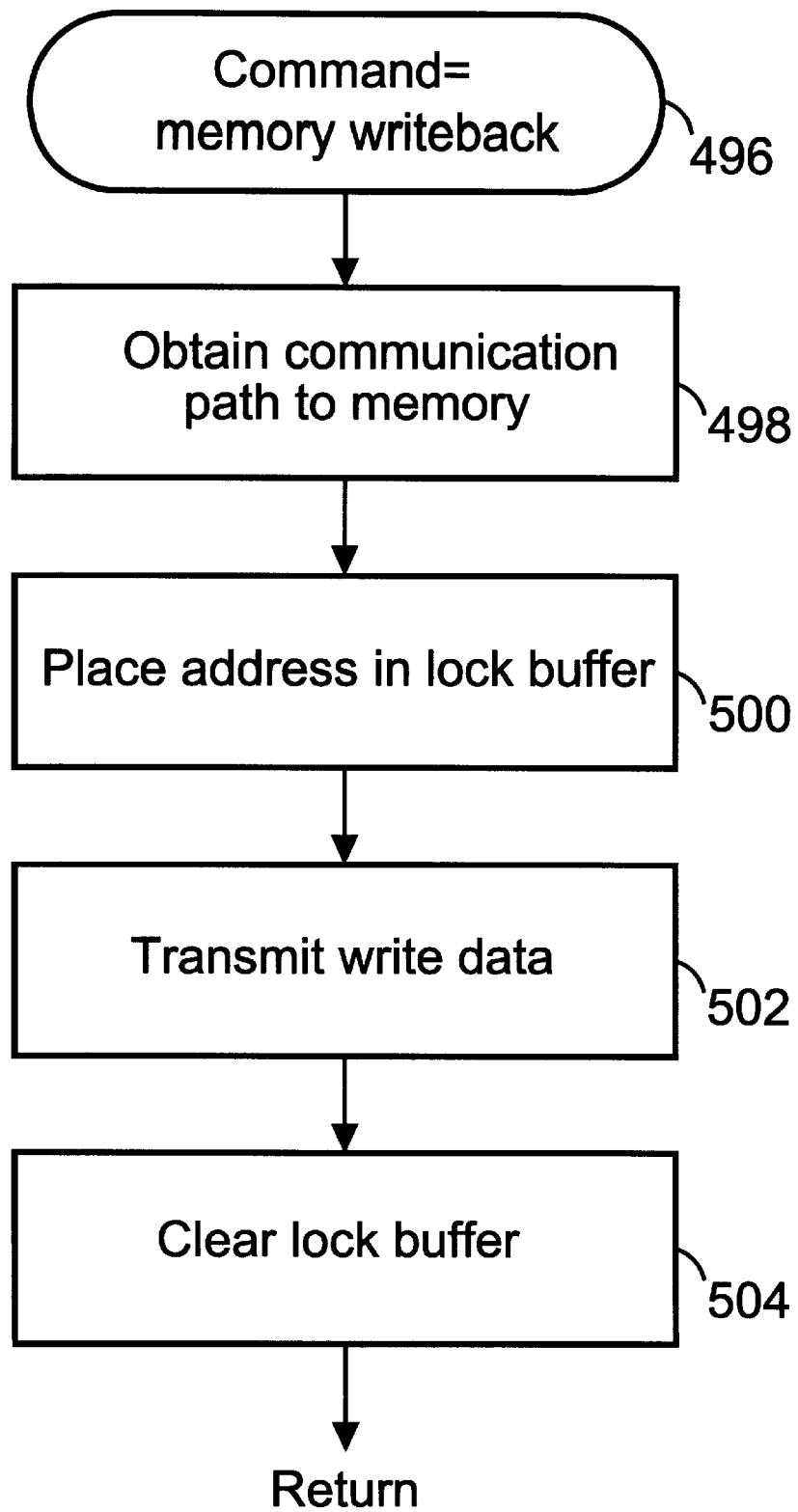

FIG. 33 illustrates the steps used by the CIU-IFU 310 to process a memory writeback transaction. The memory writeback transaction is initiated by a processor to write out a modified cache line to main memory. As such, this transaction does not involve a snoop operation. The initiator CIU-IFU 310 requests from the data path switch controller 358 a communication path to the MCU-IFU 312 associated with the requested memory address (step 498). When the communication path is granted, the address associated with the transaction is stored in the lock buffer (step 500), the address, command, and write data is transmitted to the intended MCU-IFU 312 (step 502), and the corresponding lock buffer is cleared (step 504).

FIGS. 34–40 illustrate the steps used by the CIU-IFU 310 in response to transactions snooped from the snoop path 320. These transactions can be initiated by an initiator CIU-IFU 310 or by an initiator BBU-IFU 300.

Figure 34:
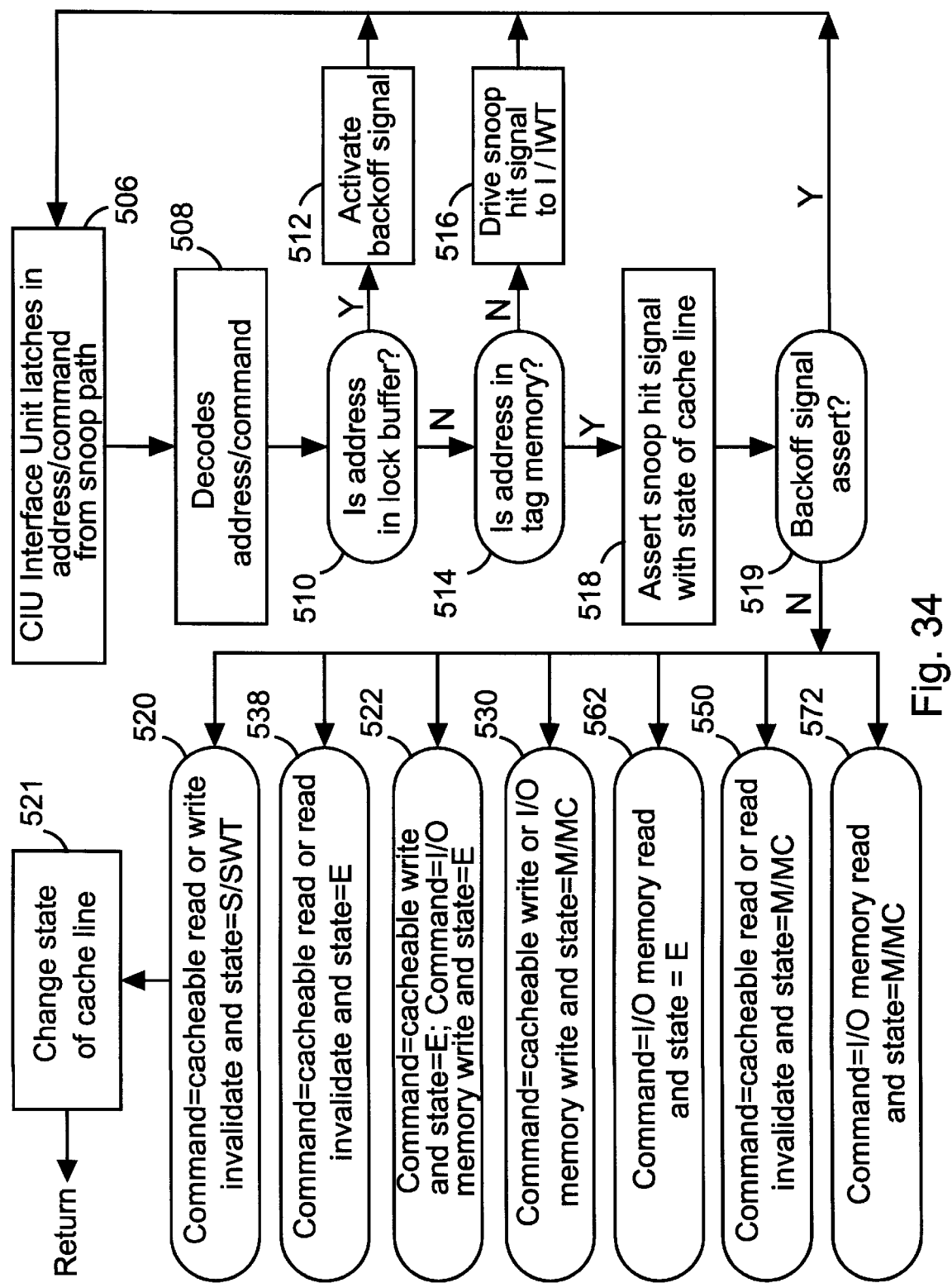

Referring to FIG. 34, the CIU-IFU 310 latches in the address and command from the snoop path (step 506) and decodes the address and command (step 508). The CIU-IFU 310 determines whether the address is in the lock buffer (step 510). If the requested address is contained in the lock buffer (step 510-Y), the interface unit activates the backoff signal (step 512). The presence of the requested address in the lock buffer indicates that another transaction is being processed that affects the cache line with the requested address. As such, the current transaction will be delayed or "backoff" until the previous transaction completes.

Otherwise (step 510-N), the CIU-IFU 310 determines whether the address is in its associated tag memory (step 514). If not (step 514-N), the CIU-IFU 310 drives the snoop hit signal with the invalidate state. In the case where the cache controller is operating in write-through mode, the CIU-IFU 310 drives the snoop hit signal with the invalid-write-through state and when in copy-back mode, the CIU-IFU 310 drives the snoop hit signal with the invalid state (step 516). When the address is in the CIU-IFU's tag memory (step 514-Y), the CIU-IFU 310 asserts the snoop hit signal with the state of the cache line (step 518).

The CIU-IFU 310 then checks the snoop backoff signal (i.e., SBOFF#) to determine if the snoop backoff signal has been asserted (step 519). If the snoop backoff signal has been asserted (step 519-Y), the CIU-IFU 310 awaits for the next snoop operation (step 506). Otherwise (step 519-N), the interface unit proceeds to further process the transaction based on the associated command.

In the case where the snooped command is a cacheable write or read invalidate and the state of the cache line is S/SWT (step 520), the snoop CIU-IFU 310 initiates the appropriate actions to change the state of the cache line in the external L2 cache, L1 cache and the corresponding tag memories as shown in Table 1 (step 521).

FIG. 35 illustrates the steps used by the CIU-IFU 310 when the snooped command is a cacheable write or a I/O memory write command and the state of the cache line is exclusive (E) (step 522). The cacheable write command can be initiated from an initiator CIU-IFU 310 and the I/O memory write command can be initiated from an initiator BBU-IFU 300. In the latter case, the initiator BBU-IFU 300 does not cache the data and as such, the state of the cache line is not affected by the transaction.

In this case, the target CIU-IFU 310 claims sole ownership of the cache line and the initiator interface device transmits the write data to the target CIU-IFU 310. The target CIU-IFU 310 places its device identifier on the STARGET_ID signal (step 524). This informs the initiator interface device the identity of the target CIU-IFU 310 so that the initiator interface device can request a communication path to transmit the write data to the target interface device. The target CIU-IFU 310 awaits the deferred write reply from the initiator interface device (step 526) and once received, responds to the deferred write reply (step 528). The target CIU-IFU 310 obtains the channel and transmits the write data to the external cache associated with the corresponding processor (step 528).

Figure 36:
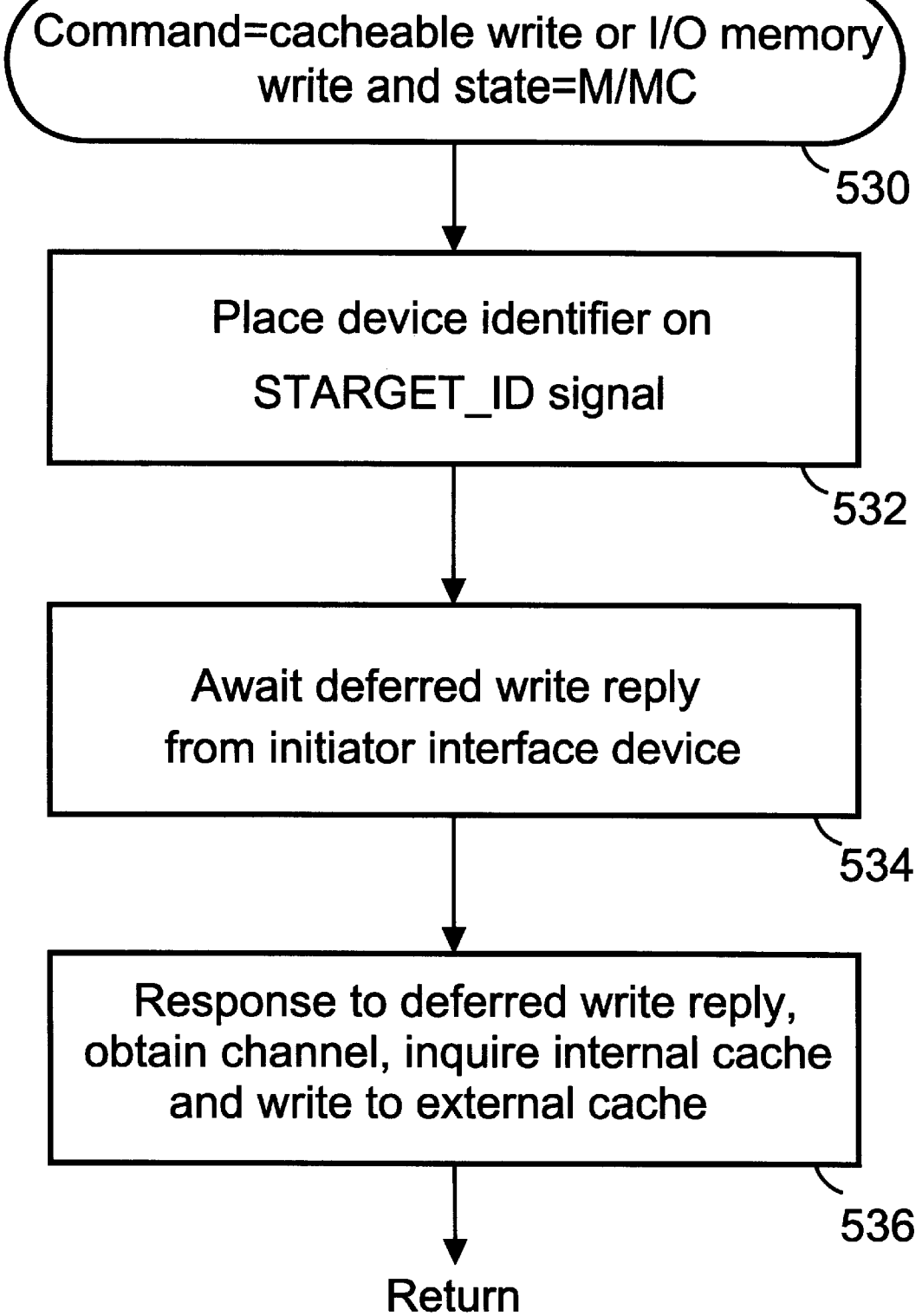

FIG. 36 illustrates the steps used by the CIU-IFU 310 when the snooped command is a cacheable write or a I/O memory write command and the state of the cache line is M or MC (step 530). The cacheable write command can be initiated from an initiator CIU-IFU 310 and the I/O memory write command can be initiated from an initiator BBU-IFU 300. In the latter case, the initiator BBU-IFU 300 does not cache the data and as such, the state of the cache line is not affected by the transaction.

In this case, the target CIU-IFU 310 claims sole ownership of the cache line and the initiator interface device transmits the write data to the target CIU-IFU 310. The target CIU-IFU 310 places its device identifier on the STARGET_ID signal (step 532). This informs the initiator interface device the identity of the target CIU-IFU 310 so that the initiator interface device can request a communication path to transmit the write data to the target interface device. The target CIU-IFU 310 awaits the deferred write reply from the initiator interface device (step 534) and once received, responds to the deferred write reply (step 536). The target CIU-IFU 310 also obtains the channel in order to transmit the write data to the corresponding CIU 208. The corresponding CIU 208 then initiates an inquire internal cache (i.e., Inquire L1) operation which invalidates the cache line in the internal cache and initiates an external write cache (i.e., L2 Write) operation which writes the write data to the external cache associated with the processor (step 536).

Figure 37:
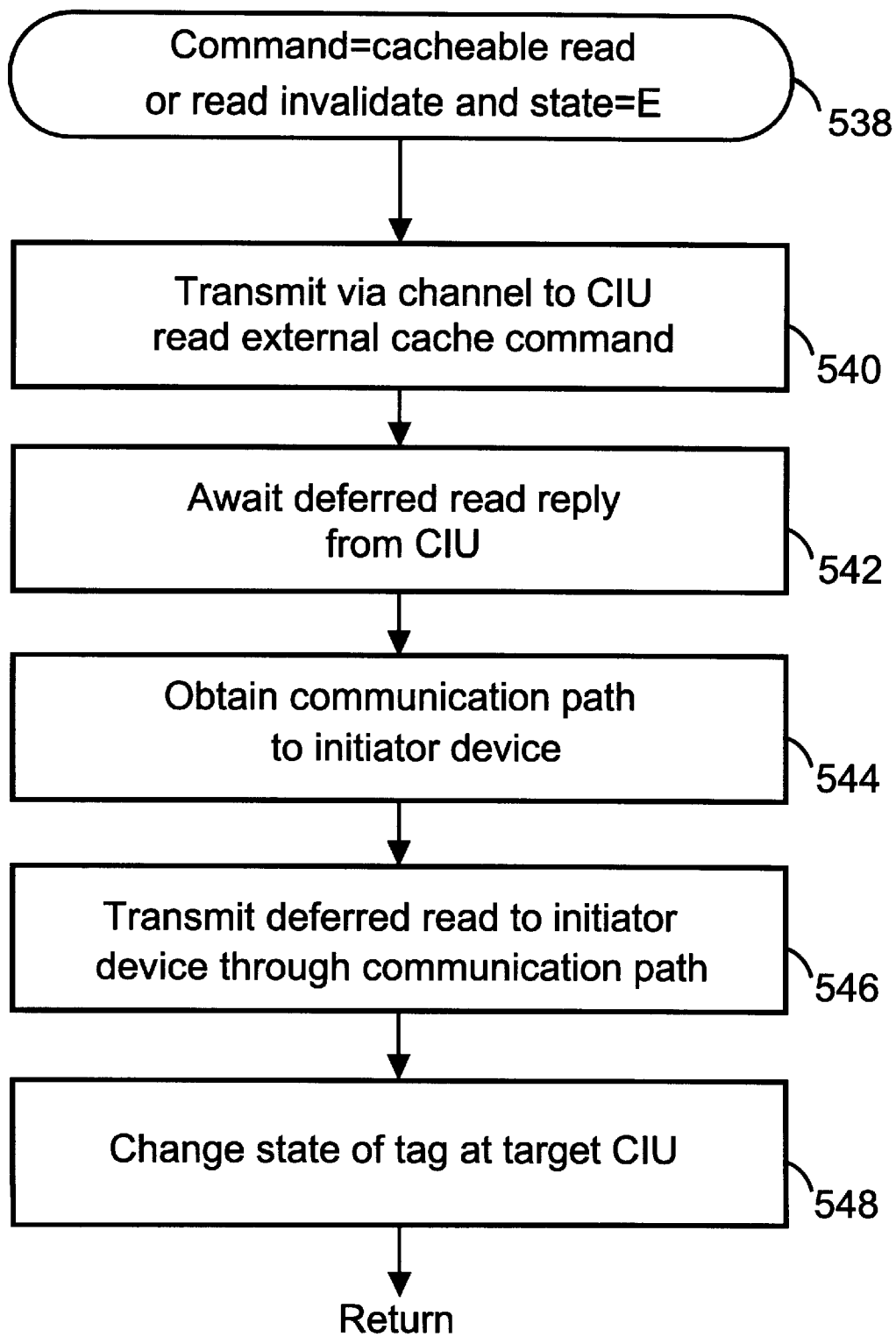

FIG. 37 illustrates the steps used by the CIU-IFU 310 when the snooped command is a cacheable read or read invalidate command and the state of the cache line is exclusive. The cacheable read and read invalidate command are initiated from an initiator CIU-IFU 310.

In this case, the target CIU-IFU 310 obtains the channel and transmits to the corresponding CIU 208 a command indicating that the CIU 208 should read the requested data from the external cache (step 540). The target CIU-IFU 310 then awaits a deferred read reply from the CIU 208 including the read data (step 542). The target CIU-IFU 310 then requests from the data path switch controller 358 a communication path to the initiator CIU-IFU 310 (step 544). Once the path is obtained, the target CIU-IFU 310 transmits a deferred read reply including the read data to the initiator CIU-IFU 310 (step 546). The target CIU-IFU 310 then changes the state of the cache line in the duplicate tag memory from exclusive to shared in the case of the cacheable read transaction and in the case of the read invalidate transaction to the invalid state (step 548).

Figure 38:
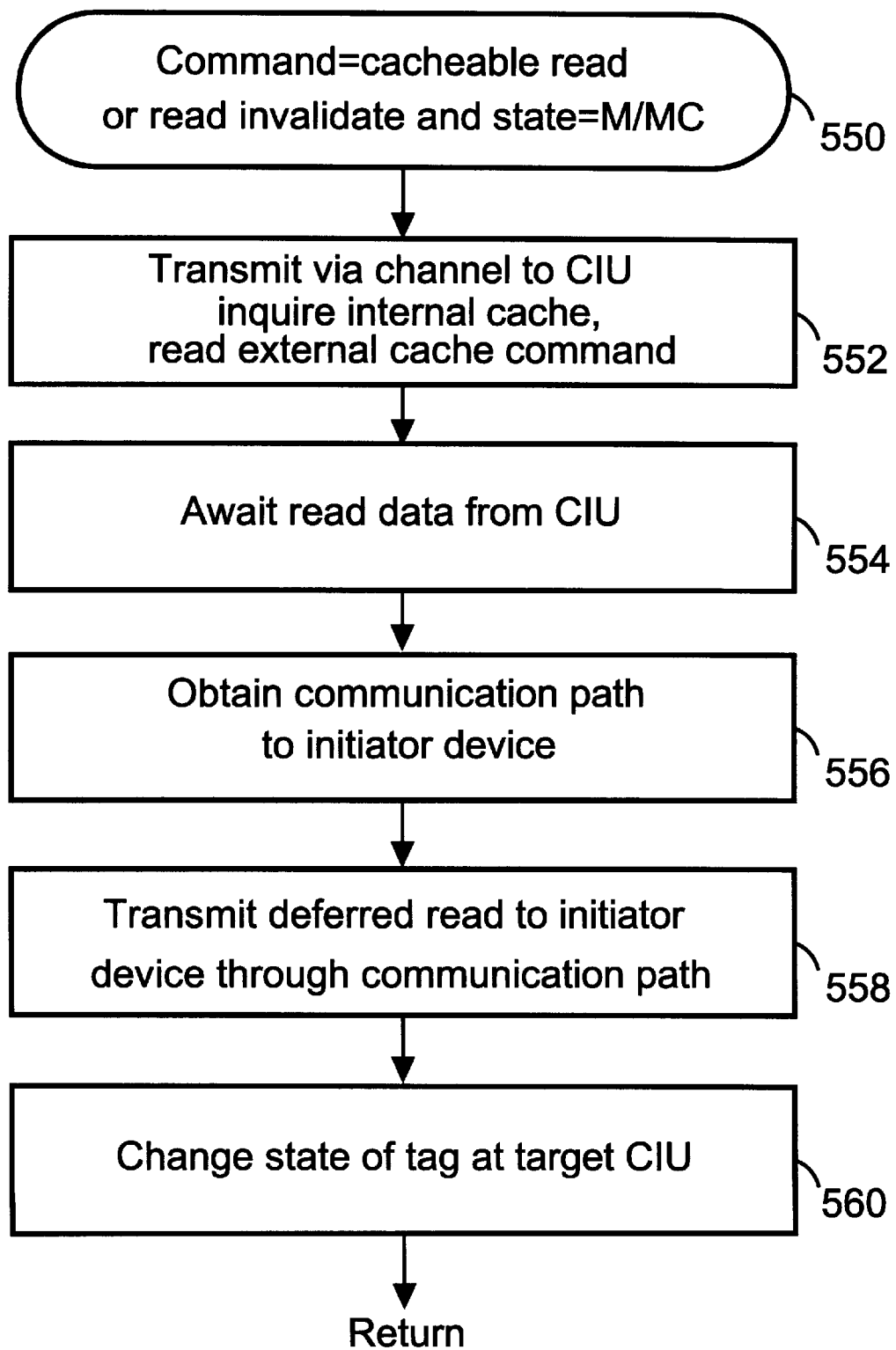

FIG. 38 illustrates the steps used by the CIU-IFU 310 when the snooped command is a cacheable read or read invalidate command and the state of the cache line is M or MC (step 550). The cacheable read and read invalidate command are initiated from an initiator CIU-IFU 310.

In this case, the target CIU-IFU 310 obtains the channel 210 and transmits to the corresponding CIU 208 an inquire internal cache and read external cache command (step 552). This command specifies that the cache line in the L1 cache is invalidated and that the requested cache line is read from the L2 cache. The target CIU-IFU 310 awaits a deferred read reply from the CIU 208 associated with the read data (step 554). The target CIU-IFU 310 then requests from the data path switch controller a communication path to the initiator CIU-IFU 310 (step 556). Once the path is obtained, the target CIU-IFU 310 transmits a deferred read reply including the read data to the initiator CIU-IFU 310 (step 558). The target CIU-IFU 310 then changes the state of the cache line in the duplicate tag memory from modified to invalid or shared as shown in Table I in the case of a cacheable read transaction and to invalid in the case of a read invalidate transaction (step 560).

Figure 39:
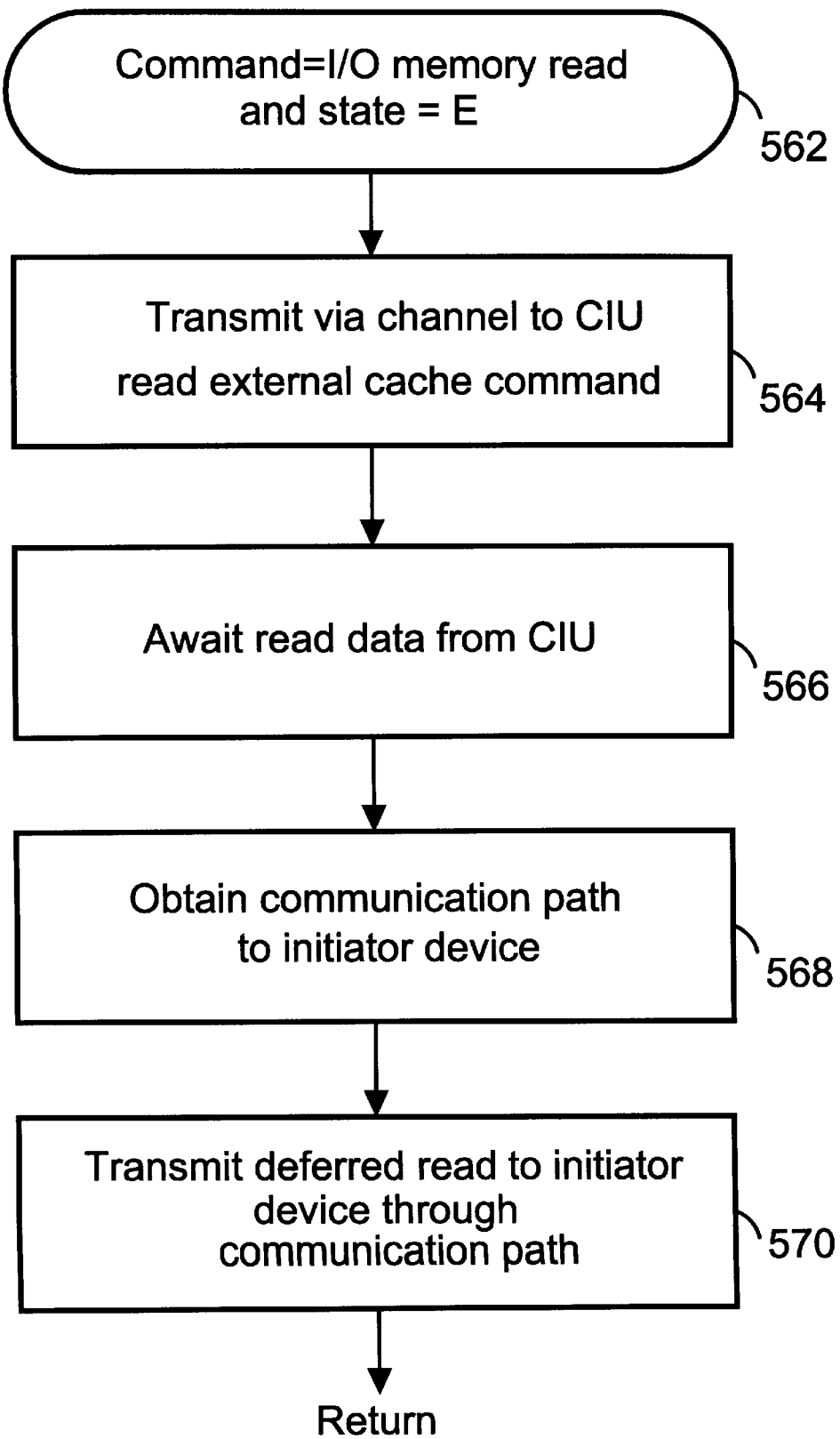

FIG. 39 illustrates the steps used by the CIU-IFU 310 when the snooped command is an I/O memory read and the state of the cache line is exclusive. The I/O memory read command is initiated from an initiator BBU-IFU 300 that does not cache the data. As such, the state of the cache line is not affected.

In this case (step 562), the target CIU-IFU 310 supplies the read data by obtaining the channel and transmitting to the corresponding CIU 208 a read external cache command that is used to obtain the read data from the external cache. The target CIU-IFU 310 then awaits a deferred read reply from the CIU 208 that includes the read data (step 564). The target CIU-IFU 310 then requests from the data path switch controller a communication path to the initiator CIU-IFU 310 (step 568). Once the path is obtained, the target CIU-IFU 310 transmits a deferred read reply including the read data to the initiator CIU-IFU 310 (step 570).

Figure 40:
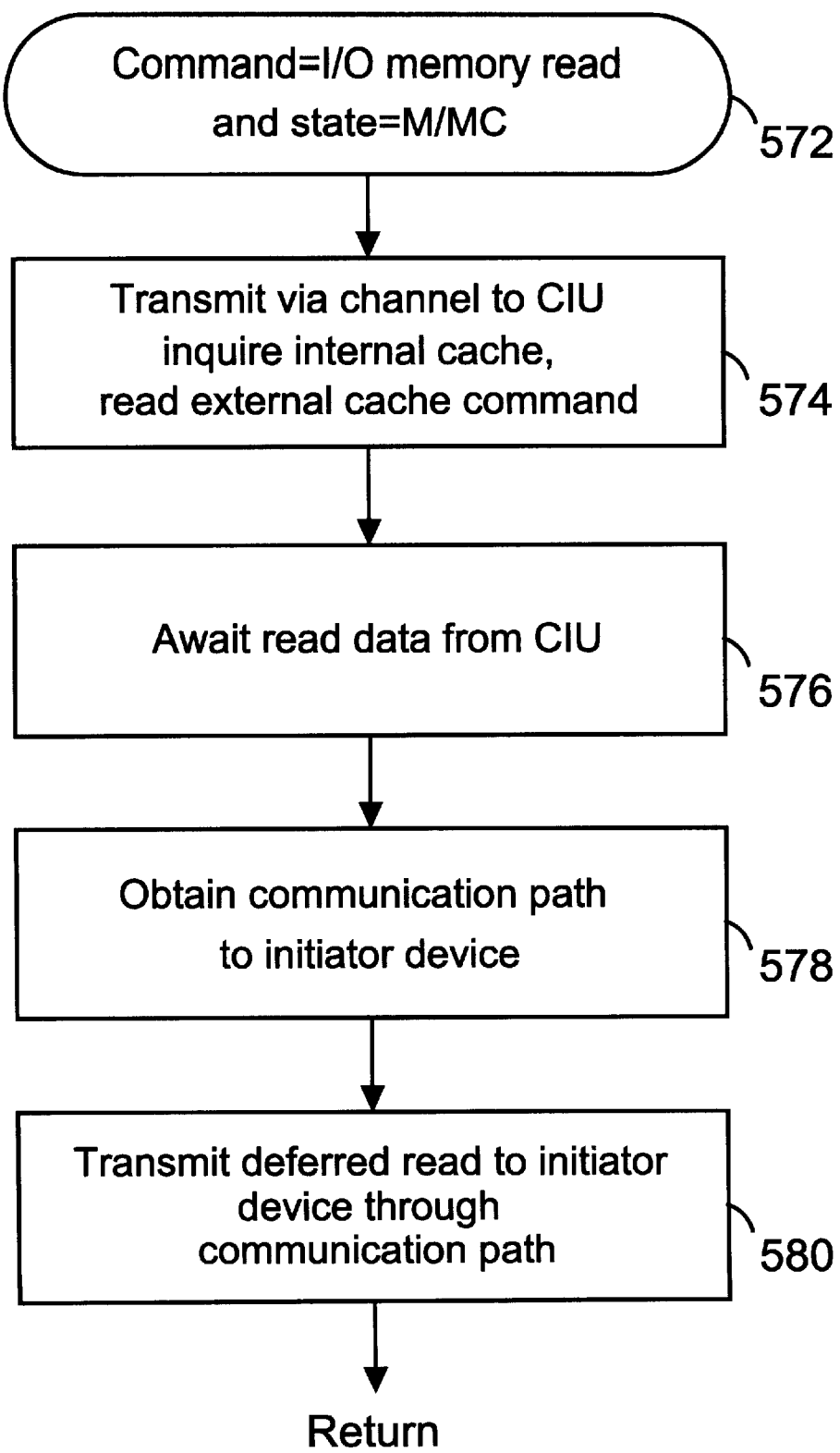

FIG. 40 illustrates the steps used by the CIU-IFU 310 when the snooped command is an I/O memory read and the state of the cache line is M or MC (step 572). The I/O memory write command is initiated from an initiator BBU-IFU 300 that does not cache the cache line. As such, the state of the cache line is not affected by this transaction.

In this case, the target CIU-IFU 310 supplies the read data and obtains the channel in order to transmit to the corresponding CIU 208 an inquire internal cache and read external cache command (step 574). The inquire internal cache command invalidates the requested cache line in the internal cache and the read external cache command obtains the read data. The target CIU-IFU 310 then awaits a deferred read reply from the CIU 208 which includes the read data (step 576). The target CIU-IFU 310 then requests from the data path switch controller 358 a communication path to the initiator CIU-IFU 310 (step 578). Once the path is obtained, the target CIU-IFU 310 transmits a deferred read reply including the read data to the initiator CIU-IFU 310 (step 580).

BBU-IFU

Figure 41:
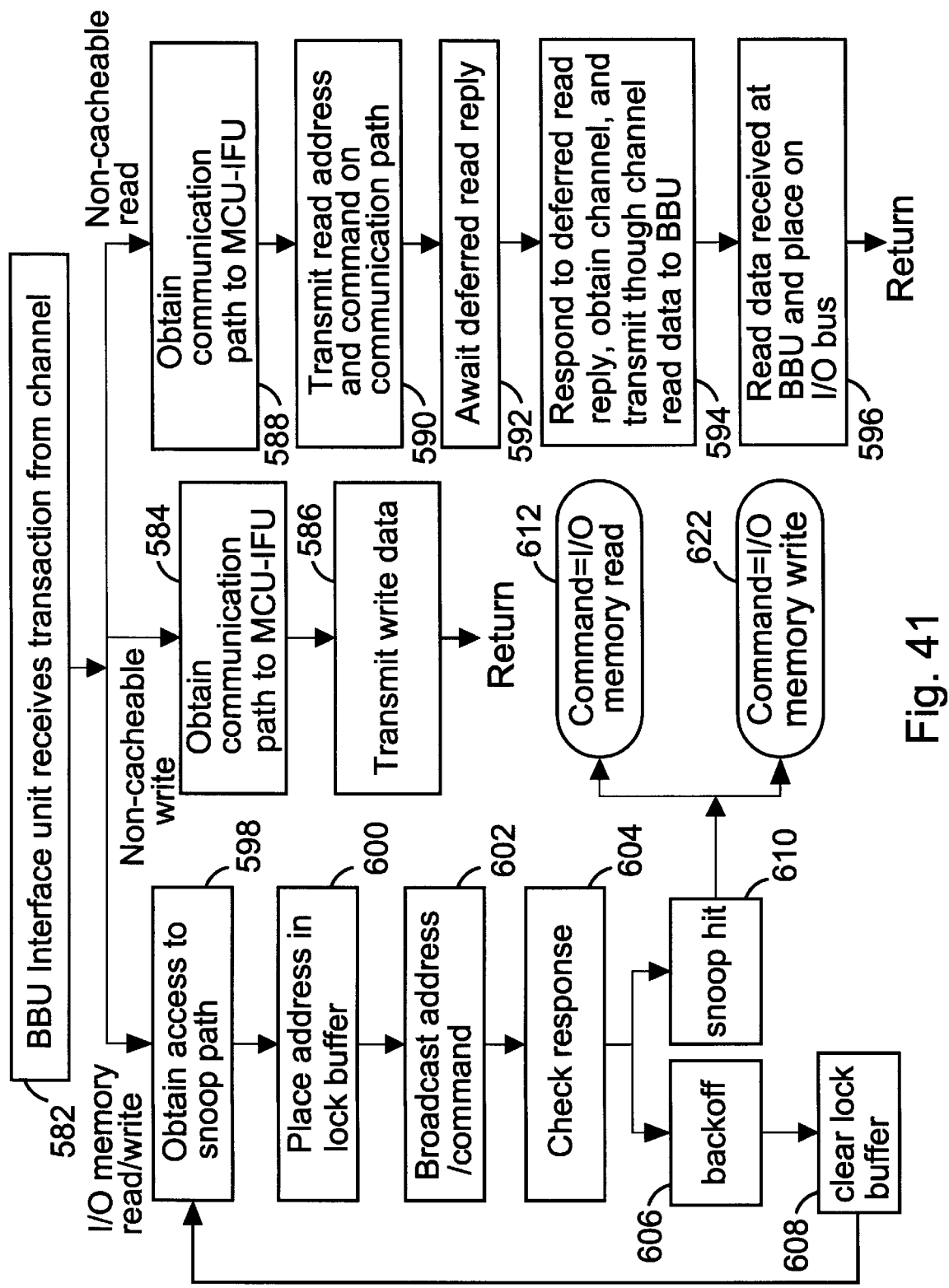
FIGS. 41–44 are flow charts illustrating the steps used by the BBU interface unit to process data received from the snoop path and channel in a preferred embodiment of the present invention.
Figure 42:
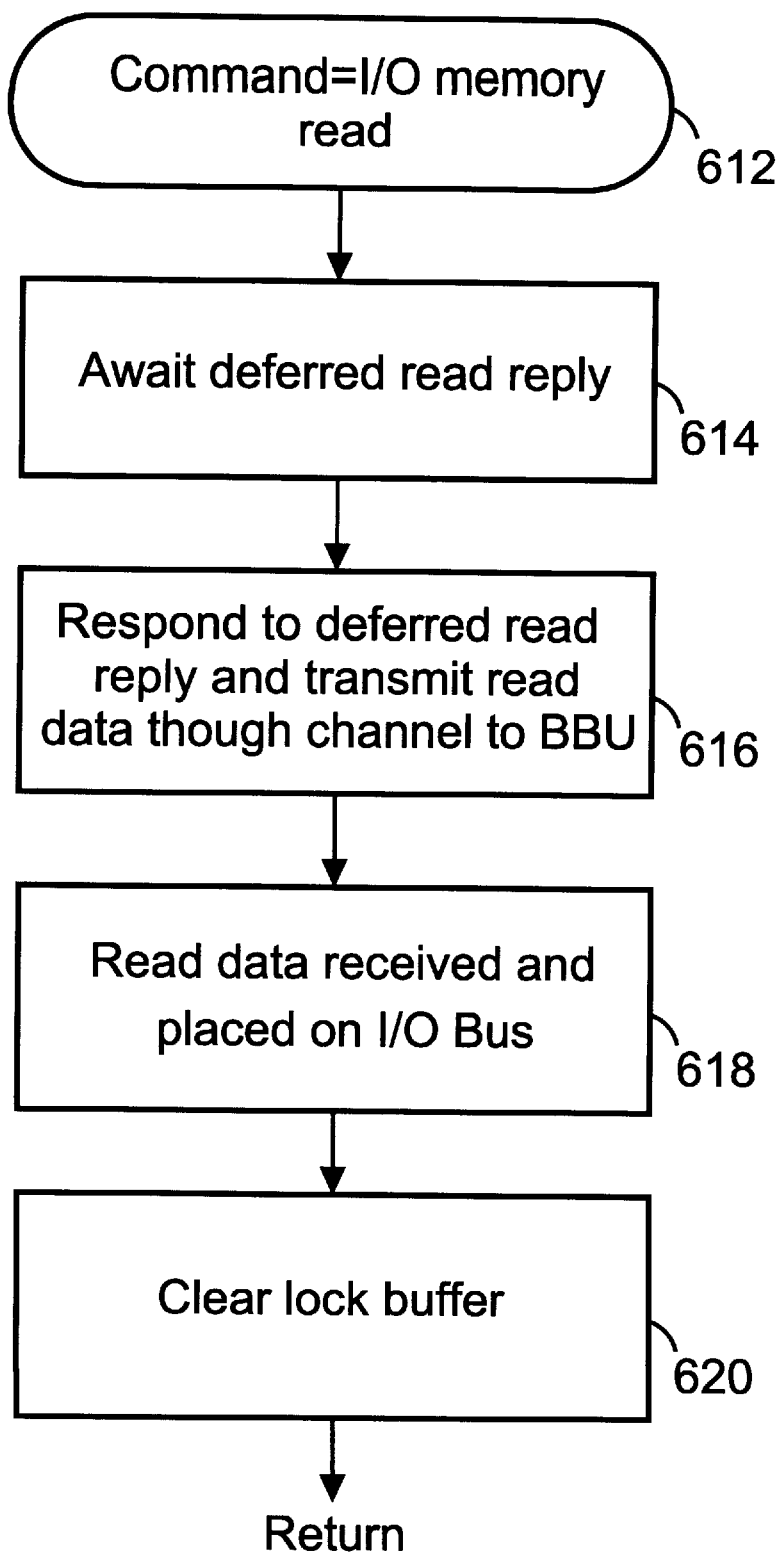
Figure 43:
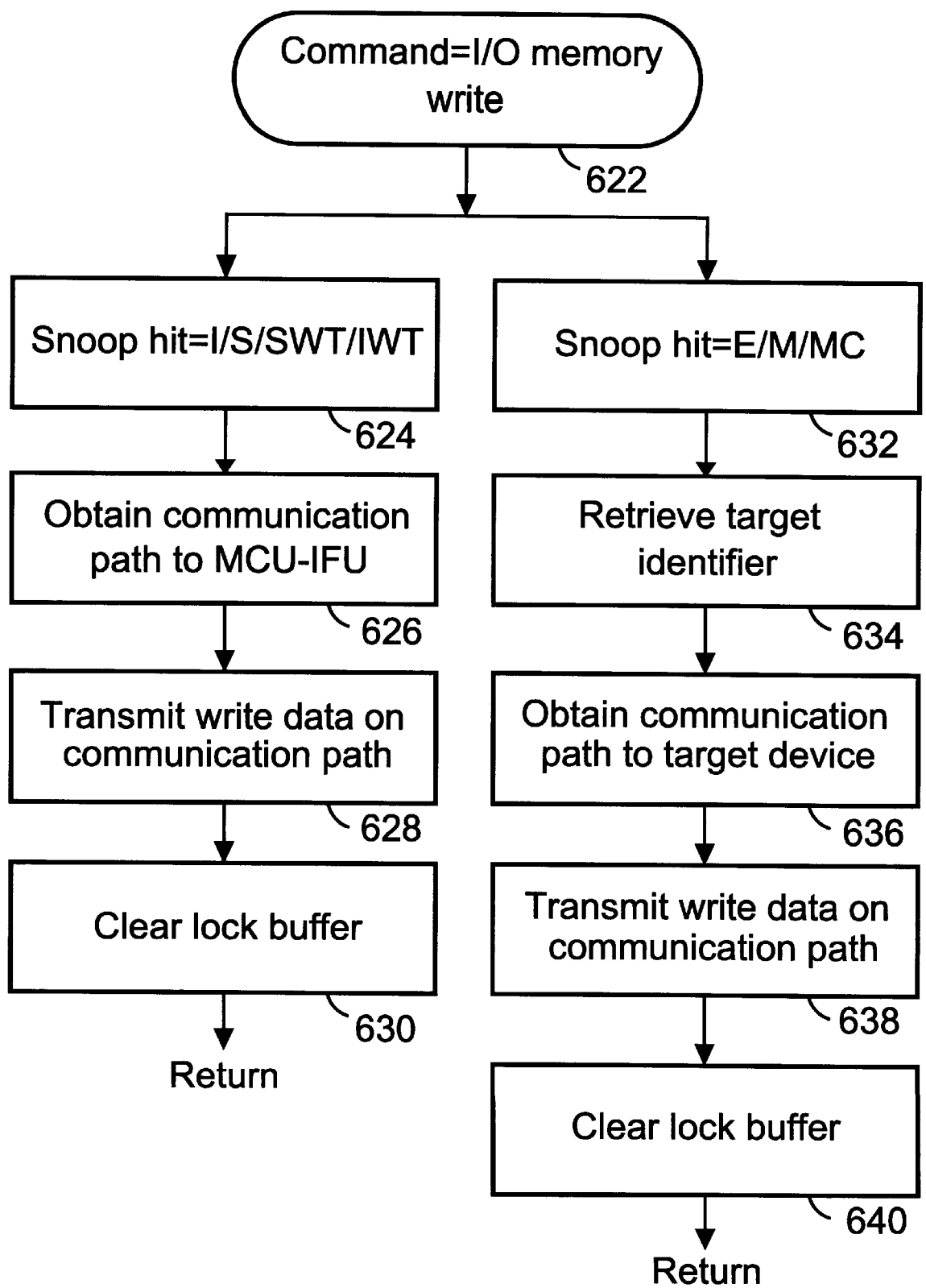
Figure 44:
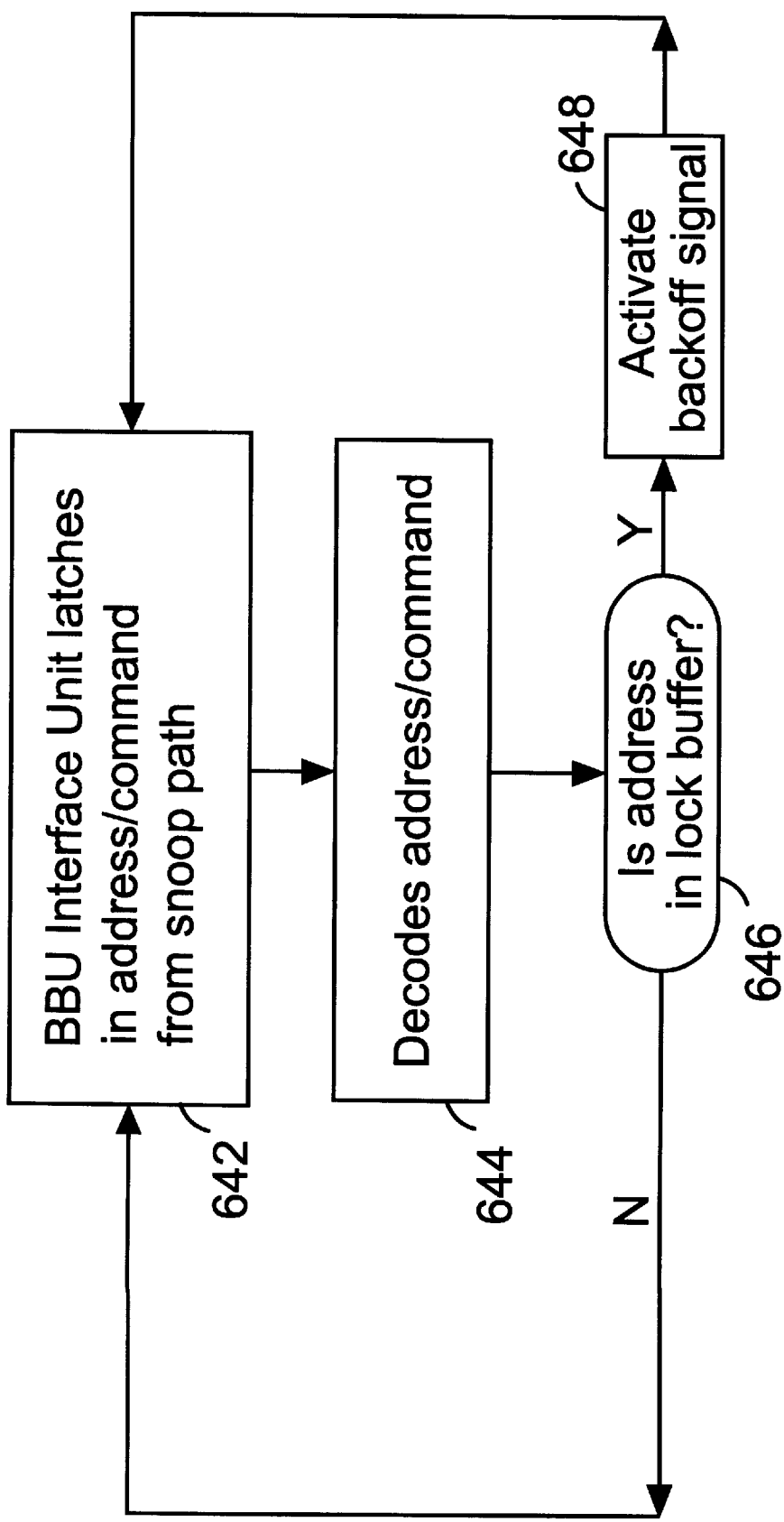

FIGS. 41–44 are flow charts illustrating the steps used by the BBU-IFU 300. FIGS. 41–43 illustrate the steps used by the BBU-IFU 300 to process a transaction received from the channel 216. FIG. 44 illustrates the steps used by the BBU-IFU 300 in response to data snooped from the snoop path 320.

Referring to FIG. 41, the BBU-IFU 300 can receive the following transactions through the channel 210 from a BBU 206: (1) I/O memory read/write transactions; and (2) non-cacheable write/read transactions. When the BBU-IFU 300 receives from the channel a non-cacheable write transaction, the BBU-IFU 300 obtains from the data path switch controller a communication path from the BBU-IFU 300 to the MCU-IFU 312 associated with the requested address (step 584). Once the communication path is granted, the BBU-IFU 300 transmits the write command and write data to the appropriate MCU-IFU 312 (step 586).

When the BBU-IFU 300 receives from the channel 210 a non-cacheable read transaction, the BBU-IFU 300 obtains from the data path switch controller 358 a communication path from the BBU-IFU 300 to the MCU-IFU 312 associated with the requested address (step 588). Once the communication path is granted, the BBU-IFU 300 transmits the read command to the appropriate MCU-IFU 312 (step 596) and awaits a deferred read reply from the MCU-IFU 312 (step 592). The BBU-IFU 300 responds to the deferred read reply and obtains access to the channel 210 and transmits the read data through the channel 210 to the initiator BBU 206 (step 594). The initiator BBU 206 receives the read data, obtains access to the associated I/O bus, and transmits the read data to the initiator I/O device (step 596).

The I/O memory read/write transactions pertain to cacheable memory and as such requires access to the snoop path 320. When access to the snoop path 320 is granted (step 598), the address associated with the transaction is placed in a lock buffer (step 600). The BBU-IFU 300 then broadcasts the address and command onto the snoop path 320 (step 602). The BBU-IFU 300 checks for a response (step 604). If backoff is asserted by one of the devices (i.e., the SBOFF# signal is asserted) (step 606), then the lock buffer containing the address is cleared (step 608) and the snoop operation is reinitiated at a later time.

FIG. 42 illustrates the steps used by the BBU-IFU 300 when there is a snoop hit (step 610) and the command is an I/O memory read (step 612). The read data can be obtained from an external cache or from the cacheable region of the main memory. In either case, the BBU-IFU 300 awaits a deferred read reply (step 614). The BBU-IFU 300 responds to the deferred read reply and obtains access to the channel in order to transmit the read data to the initiator BBU 206 (step 616). The initiator BBU 206 receives the read data and places the read data on the respective I/O bus (step 618). The BBU-IFU 300 clears the address from the lock buffer (step 620).

FIG. 43 illustrates the steps used by the BBU-IFU 300 when there is a snoop hit and the command is an I/O memory write. The write data can be written to an external cache (i.e., SNOOP_HIT=E/M/MC) or to main memory (i.e., SNOOP_HIT=I/S/SWT/IWT). When the write data is written to main memory (step 624), the initiator BBU-IFU 300 requests from the data path switch controller a communication path to the MCU-IFU 312 associated with the requested memory address (step 626). This communication path includes the interface data path associated with the initiator BBU-IFU 300 and the memory data path associated with the appropriate MCU-IFU 312. Once access to the communication path is obtained, the BBU-IFU 300 transmits the write data on the communication path to the appropriate MCU-IFU 312 (step 628) and clears the address associated with the transaction from the lock buffer (step 630).

When the write data is written to another cache (SNOOP_HIT=E/M/MC) (step 632), the initiator BBU-IFU 300 retrieves the target identifier (STARGET_ID) from the snoop path 320 (step 634) and uses the target identifier to request a communication path from the data path switch controller 358 from the BBU-IFU 300 to the target CIU-IFU 310 (step 636). The write data is transmitted through the communication path to the target CIU-IFU 310 (step 638) and the corresponding lock buffer is cleared (step 640).

FIG. 44 illustrates the steps used by the BBU-IFU 300 in snooping address and command data from the snoop path 320. Since the BBU-IFU 300 does not contain a tag memory, the BBU-IFU 300 snoops for transactions having an address that may correspond to a pending transaction initiated by the BBU-IFU 300 which is contained in its lock buffer. Once the BBU-IFU 300 latches in (step 642) and decodes the address and command data from the snoop path (step 644), the BBU-IFU 300 checks if the address is contained in the lock buffer (step 646). If the BBU-IFU 300 finds the address in its lock buffer (step 646-Y), the BBU-IFU 300 asserts the backoff signal (step 648). Otherwise, the BBU-IFU 300 continues to snoop from the snoop path.

MCU-IFU

Figure 45:
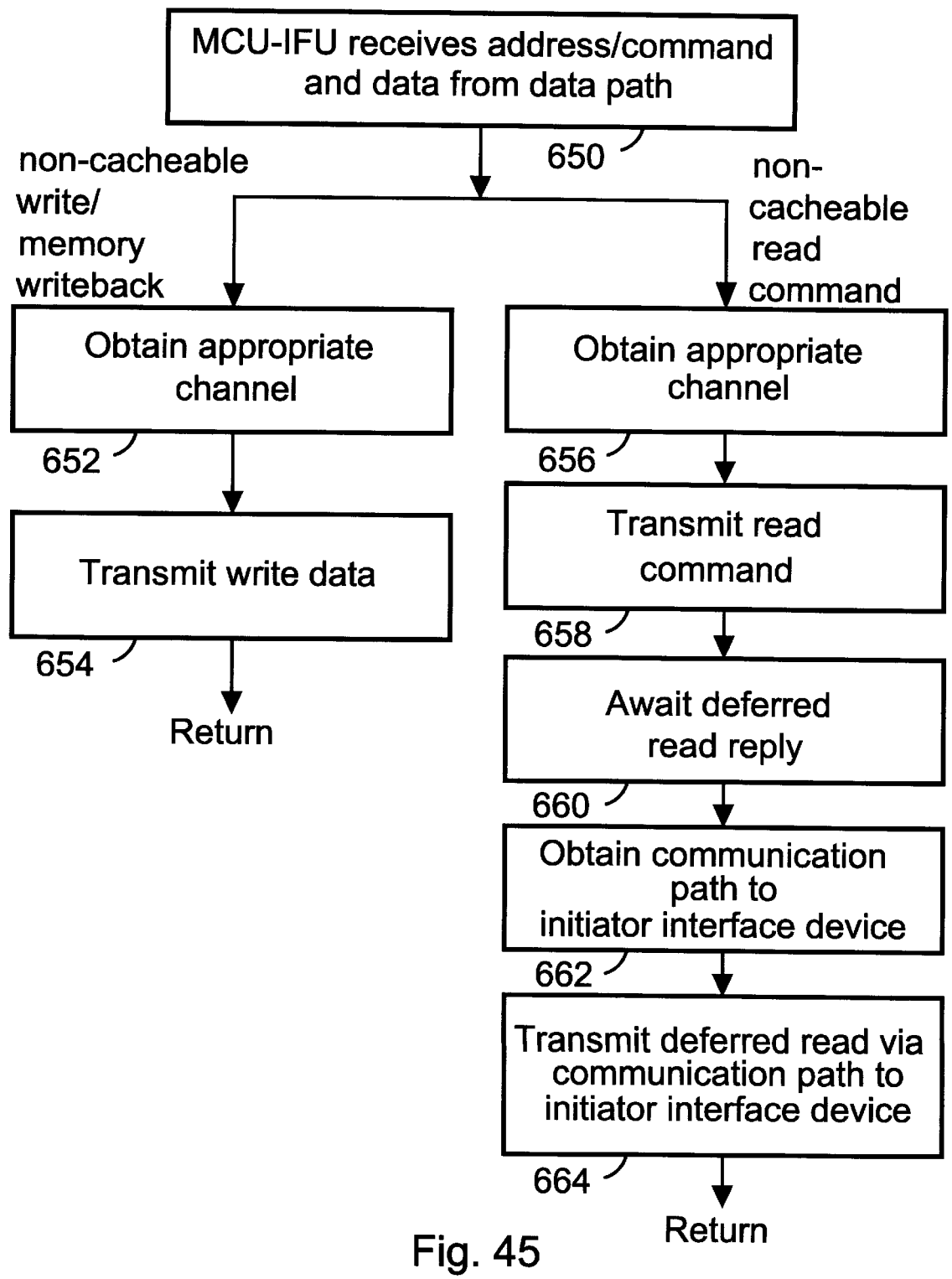
FIGS. 45–47 are flow charts illustrating the steps used by the MCU interface unit to process data received from the snoop path, data path, and channel in a preferred embodiment of the present invention.
Figure 46:
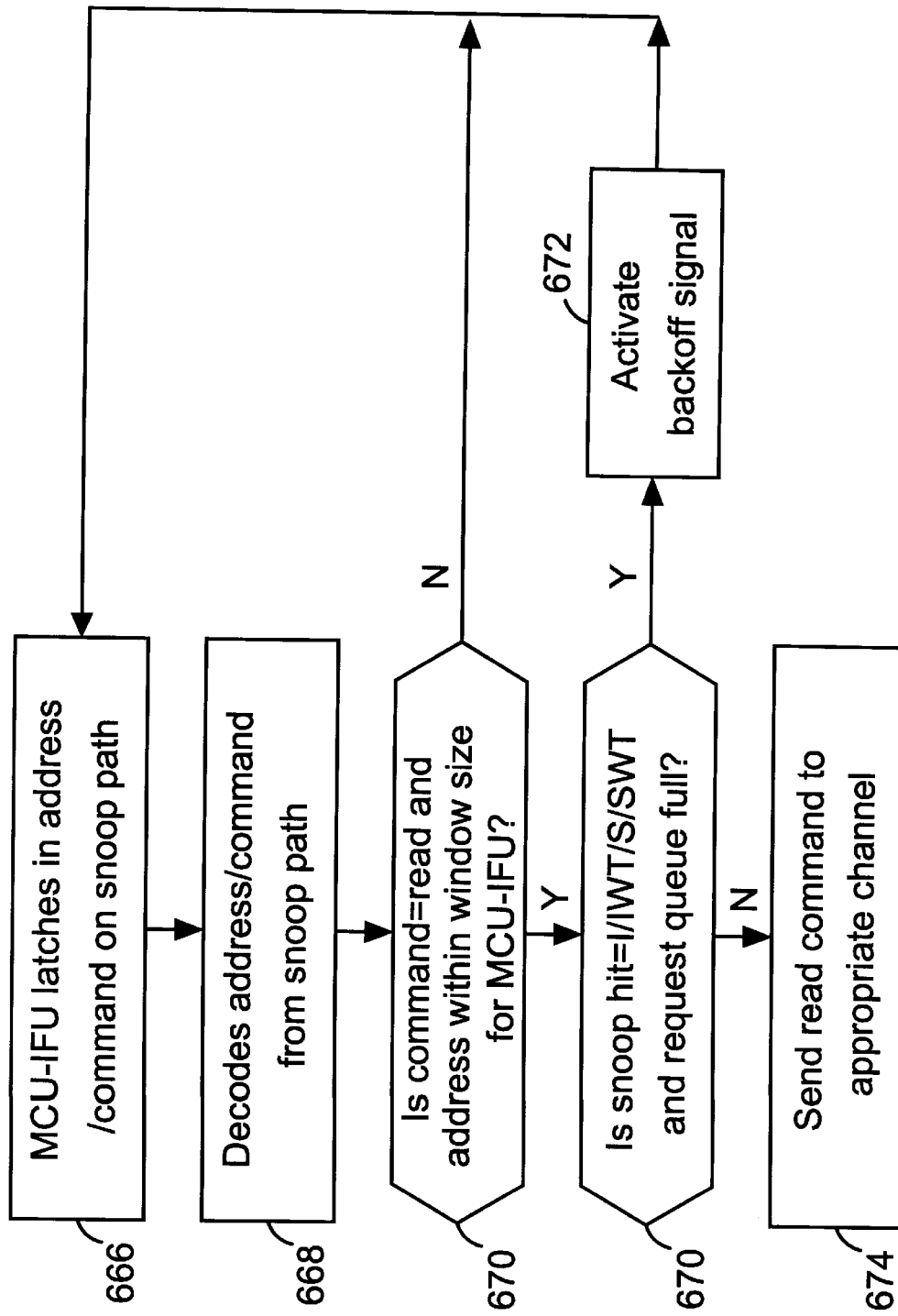
Figure 47:
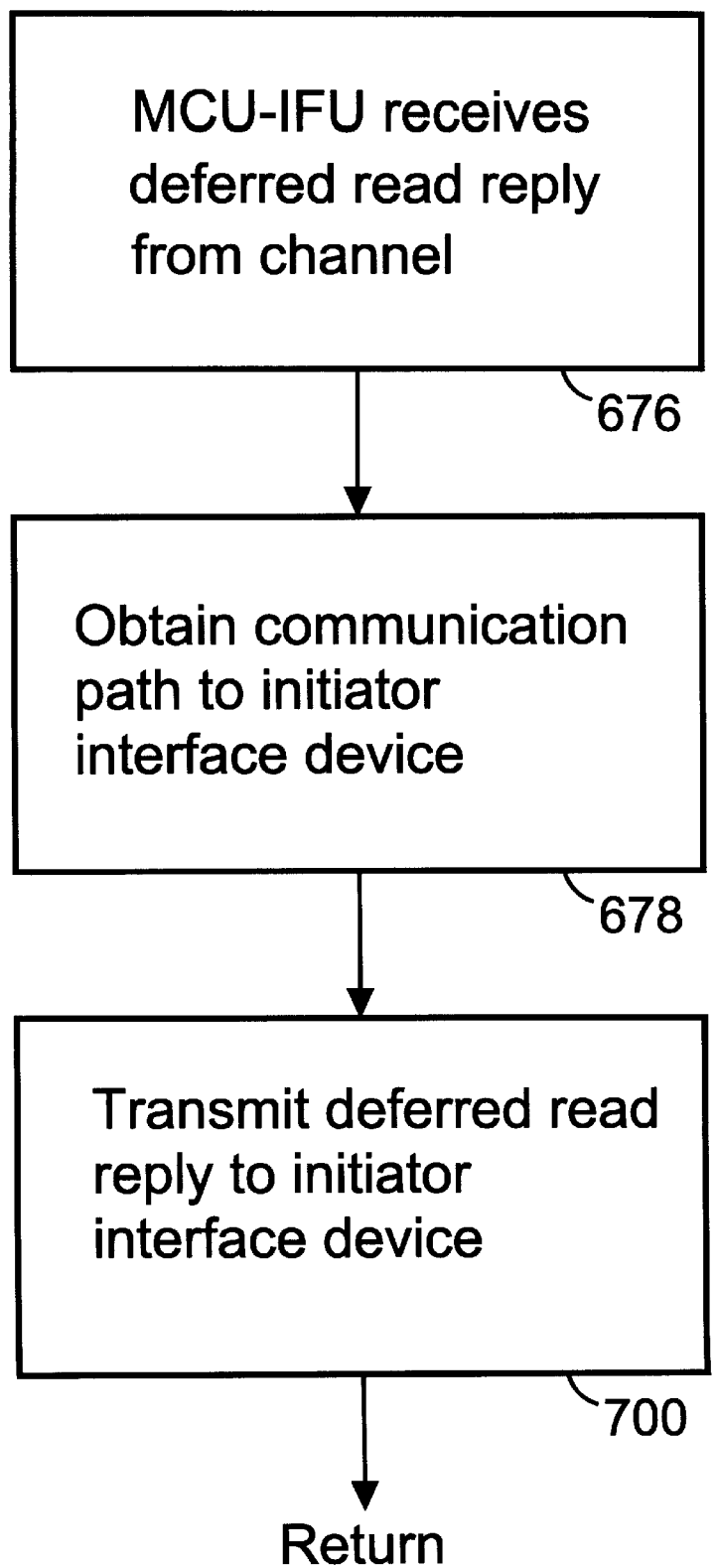

FIG. 45 illustrates the steps used by the MCU-IFU 312 to process data received from its associated memory data path 364. FIG. 46 illustrates the steps used by the MCU-IFU 312 to snoop data off the snoop path 320. FIG. 47 illustrates the steps used by the MCU-IFU 312 to process a deferred read reply received from the associated channel 120 connected to the main memory.

Referring to FIG. 45, the MCU-IFU 312 receives from its associated memory data path 364 non-cacheable read/write transactions and memory writeback transactions (step 650). The non-cacheable read/write transactions can be initiated by a BBU-IFU 300 and the memory writeback transaction can be initiated by a CIU-IFU 310. In the case of a non-cacheable write or memory writeback command, the MCU-IFU 312 obtains the appropriate channel associated with the memory address (step 652) and transmits the write data through the appropriate channel 120 to the associated MCU 204 (step 654). In the case of a non-cacheable read command, the MCU-IFU 312 obtains the appropriate channel associated with the memory address (step 656) and transmits the read command to the MCU 204 (step 658). The MCU-IFU 312 then awaits for the deferred read reply including the requested read data (step 660). The MCU-IFU 312 responds to the deferred read reply, obtains a communication path to the initiator interface device (step 662), and transmits the read data through the communication path to the initiator interface device (step 664).

Referring to FIG. 46, the MCU-IFU 312 is connected to the snoop path 320 and snoops for those read commands that require access to main memory that are within the memory address range of the MCU-IFU 312. The MCU-IFU 312 initiates the read request at the second clock cycle when it determines that access to memory is required. The MCU-IFU 312 latches in (step 666) and decodes address and command data from the snoop path 320 (step 668). If the command does not pertain to a read operation and the address is not within the memory address range or window size associated with the MCU-IFU 312 (step 670-N), the MCU-IFU 312 ignores the transaction and awaits the next snoop operation. Otherwise (step 670-Y), the MCU-IFU 312 determines whether it cannot respond to the transaction, and if so, asserts the snoop backoff signal (step 672). This occurs when the MCU-IFU 312's request queue is full and if the result of the snoop indicates that there is a cache miss (i.e., SNOOP_HIT=I/IWT) or that main memory needs to be accessed (i.e., SNOOP_HIT=S/SWT). Otherwise (step 670-N), the MCU-IFU 312 transmits the read command to the appropriate channel (step 674).

Referring to FIG. 47, the MCU-IFU 312 can receive a deferred read reply from the channel 210 in response to a previously requested read command (step 676). The MCU-IFU 312 responds to the deferred read reply, obtains a communication path from the data path switch controller 358 from the MCU-IFU 312 to the initiator interface device (step 678), and transmits the deferred read reply through the communication path to the initiator interface device (step 700).

The foregoing description details the processing steps used by the various interface devices in the FCU 212 to process the transactions. Attention now turns to exemplary timing diagrams illustrating the manner in which the transactions are processed.

Transaction Processing

The following description focuses on exemplary timing diagrams that illustrate the operation of the FCU 212 in processing the various transactions.

Cacheable Read

Figure 48A:
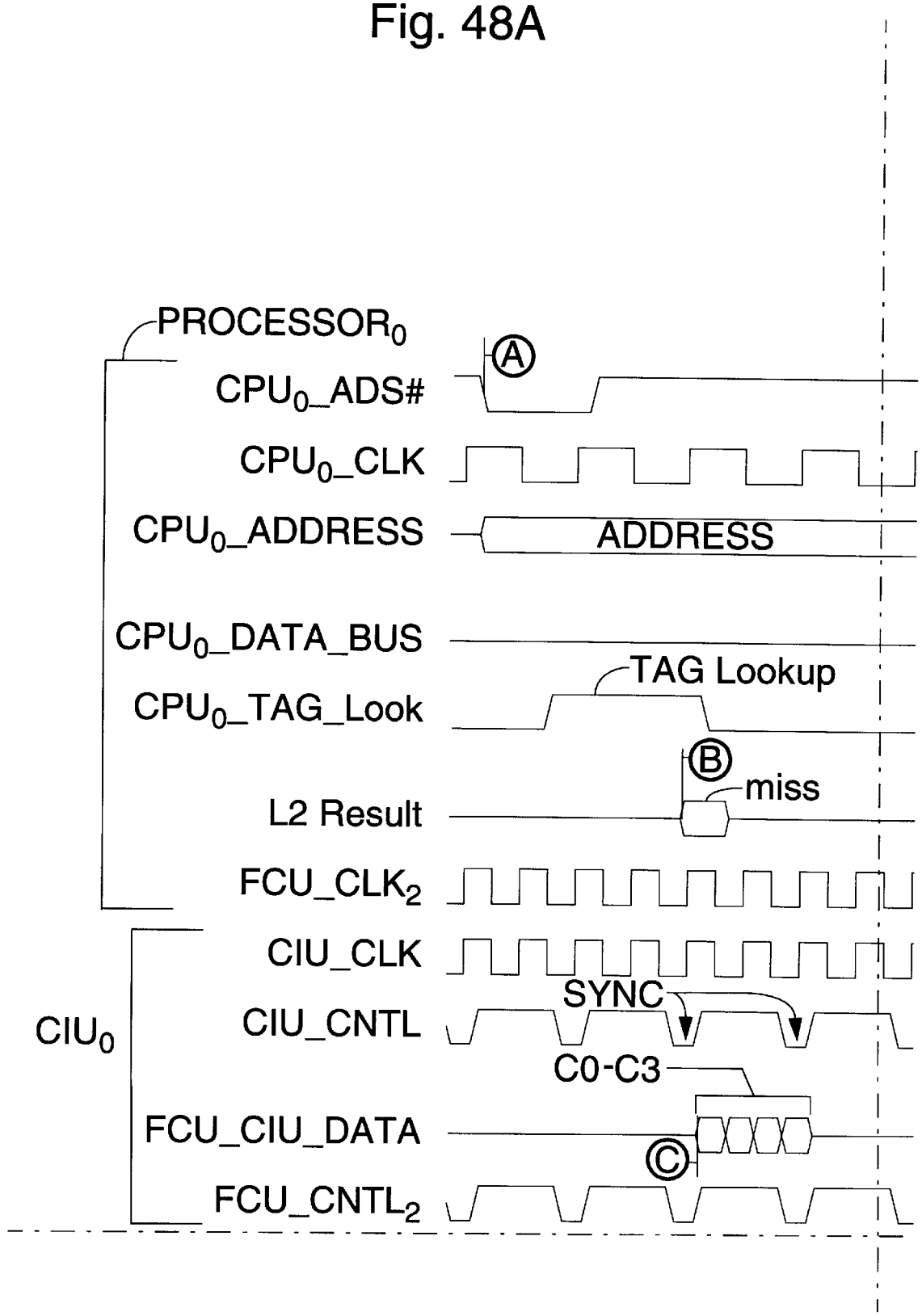
FIGS. 48–59 are exemplary timing diagrams illustrating the operation of the shared memory multiprocessor system of FIG. 2.
Figure 48B:
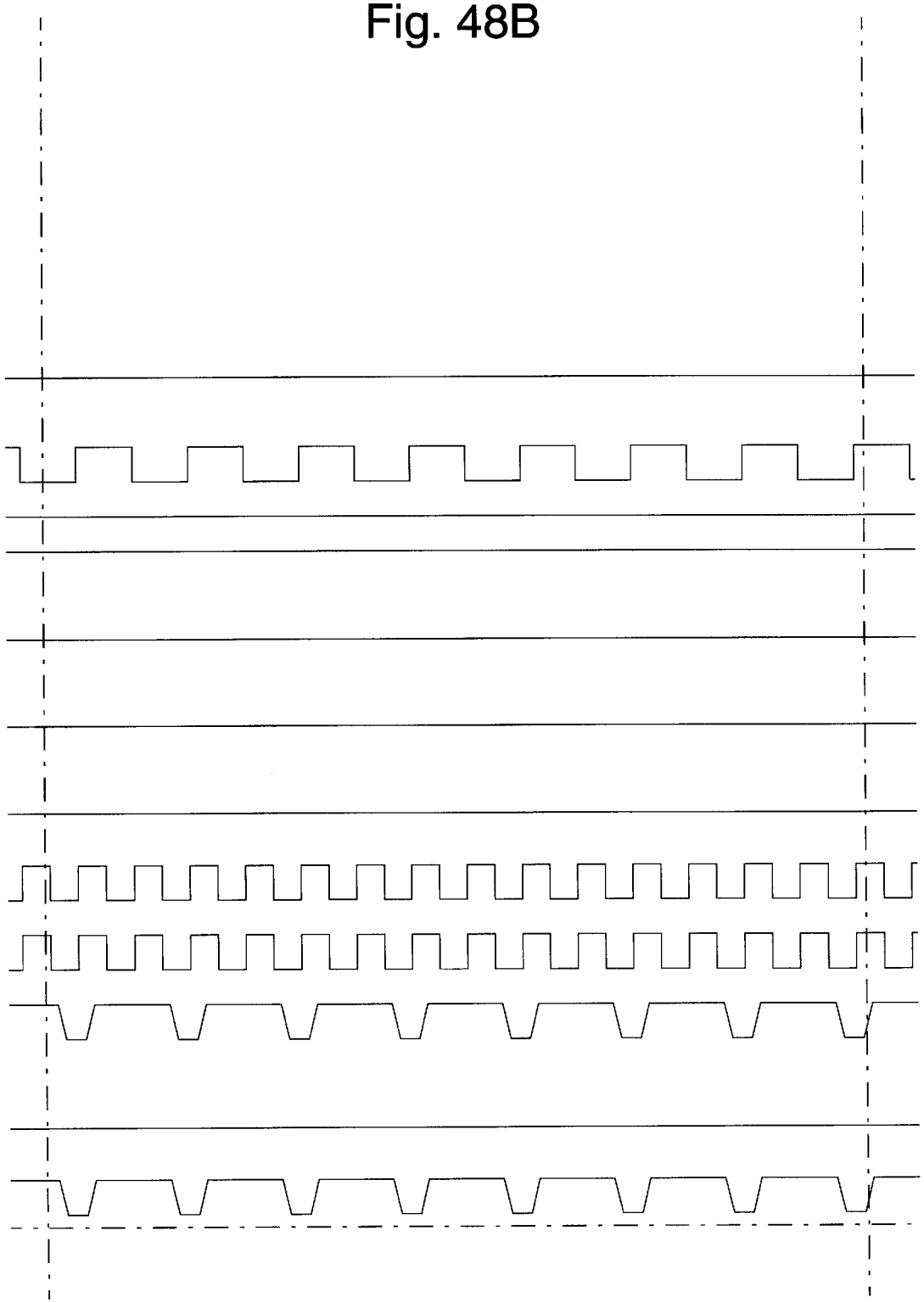
Figure 48C:
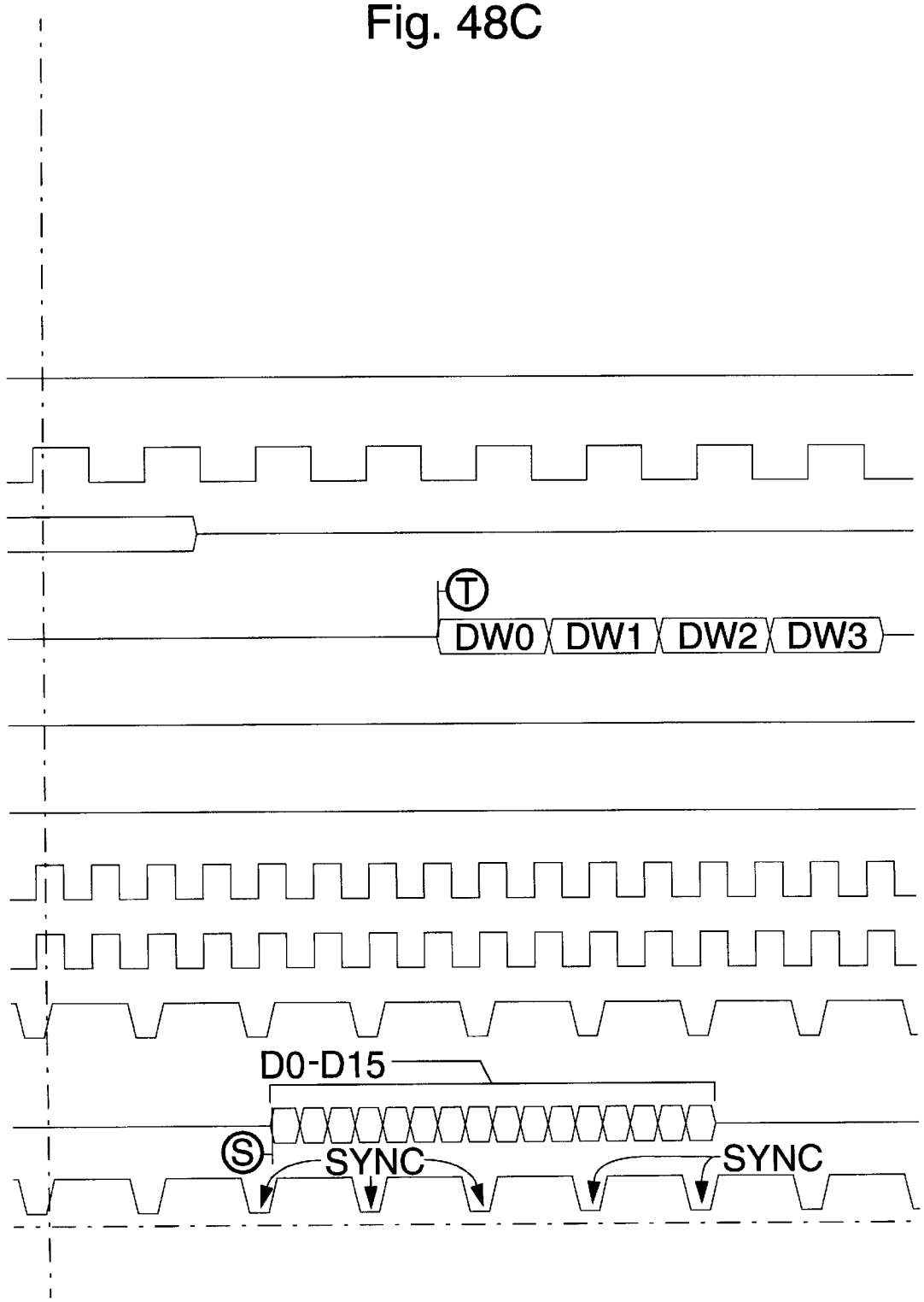
Figure 48D:
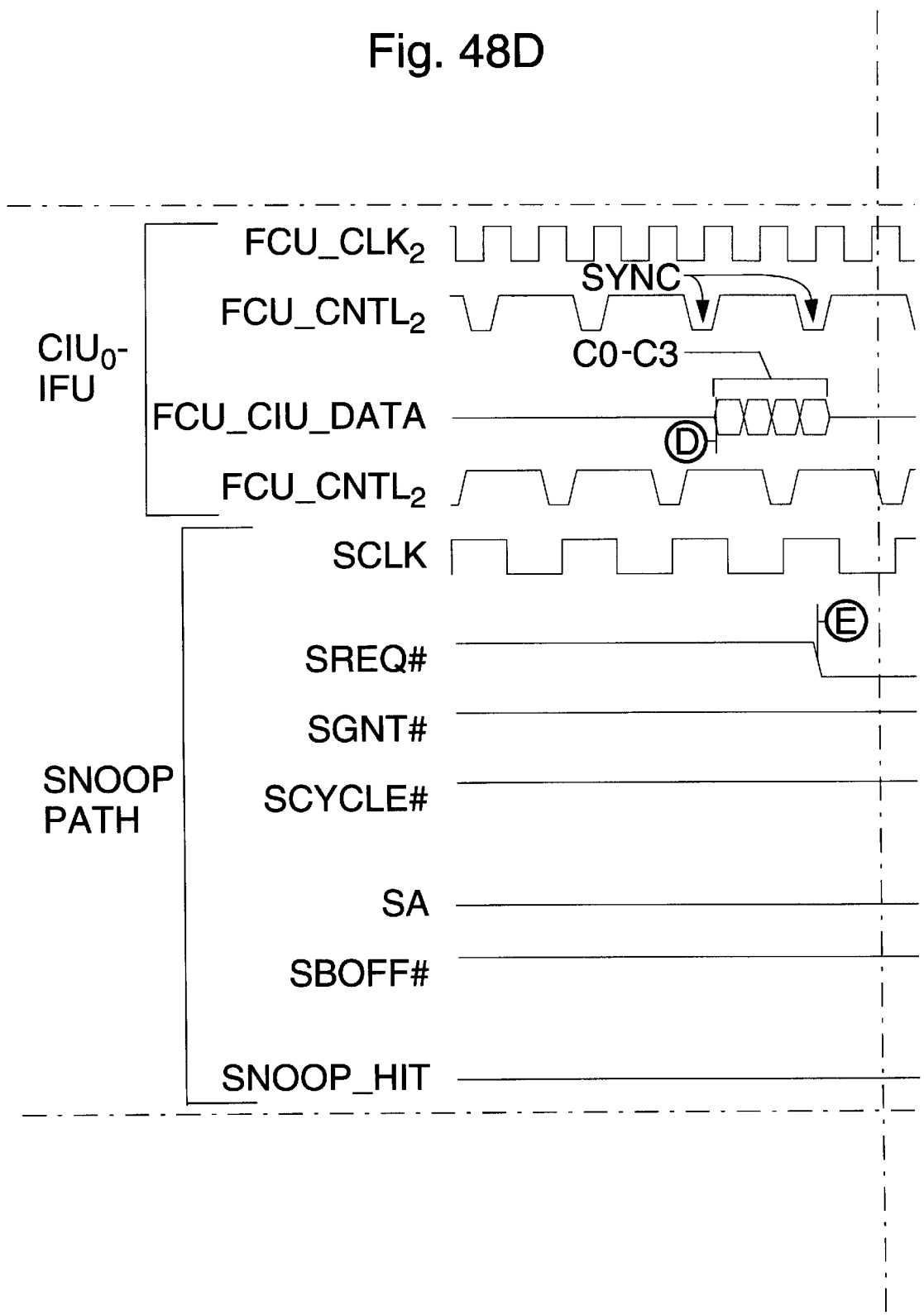
Figure 48E:
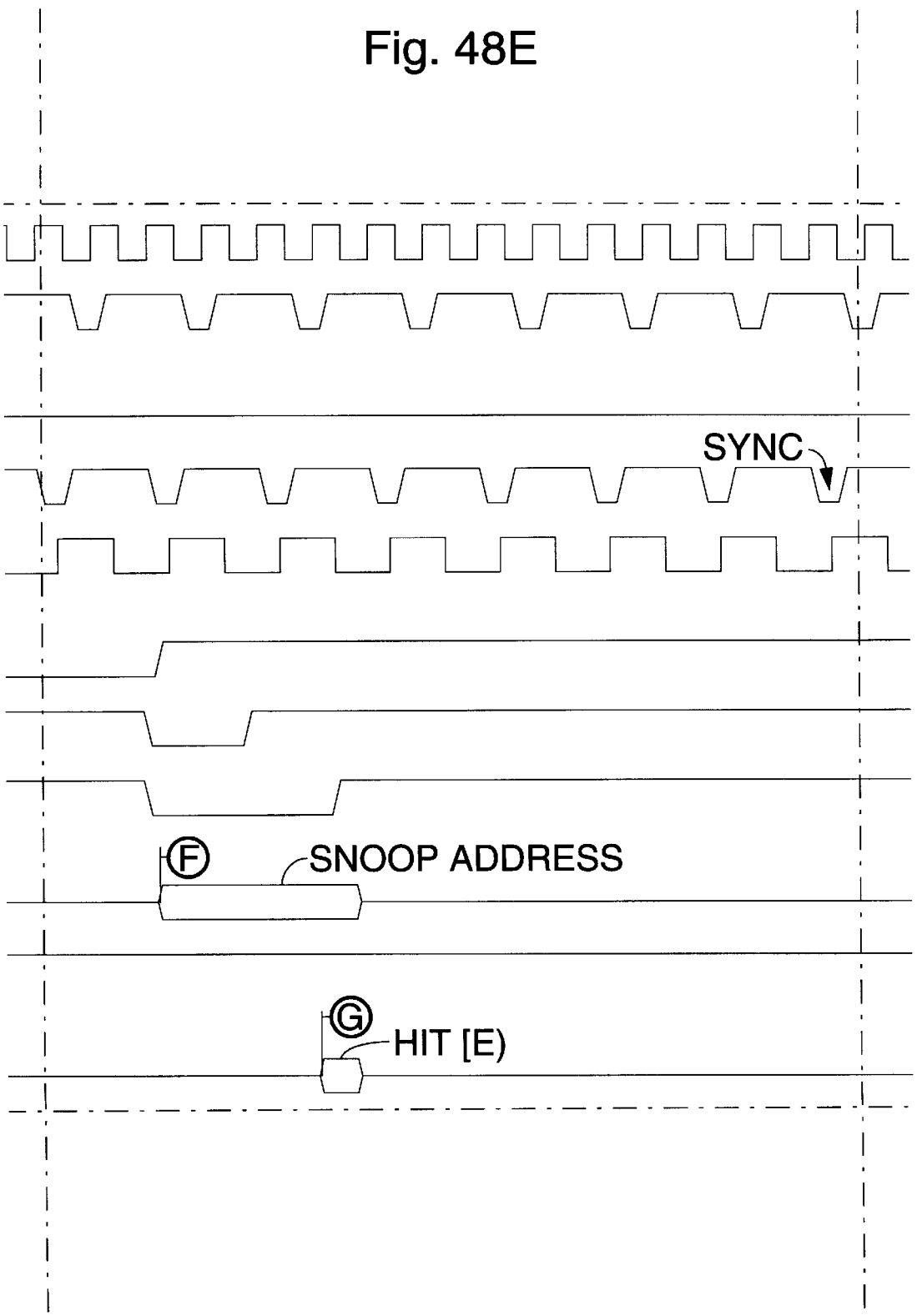
Figure 48F:
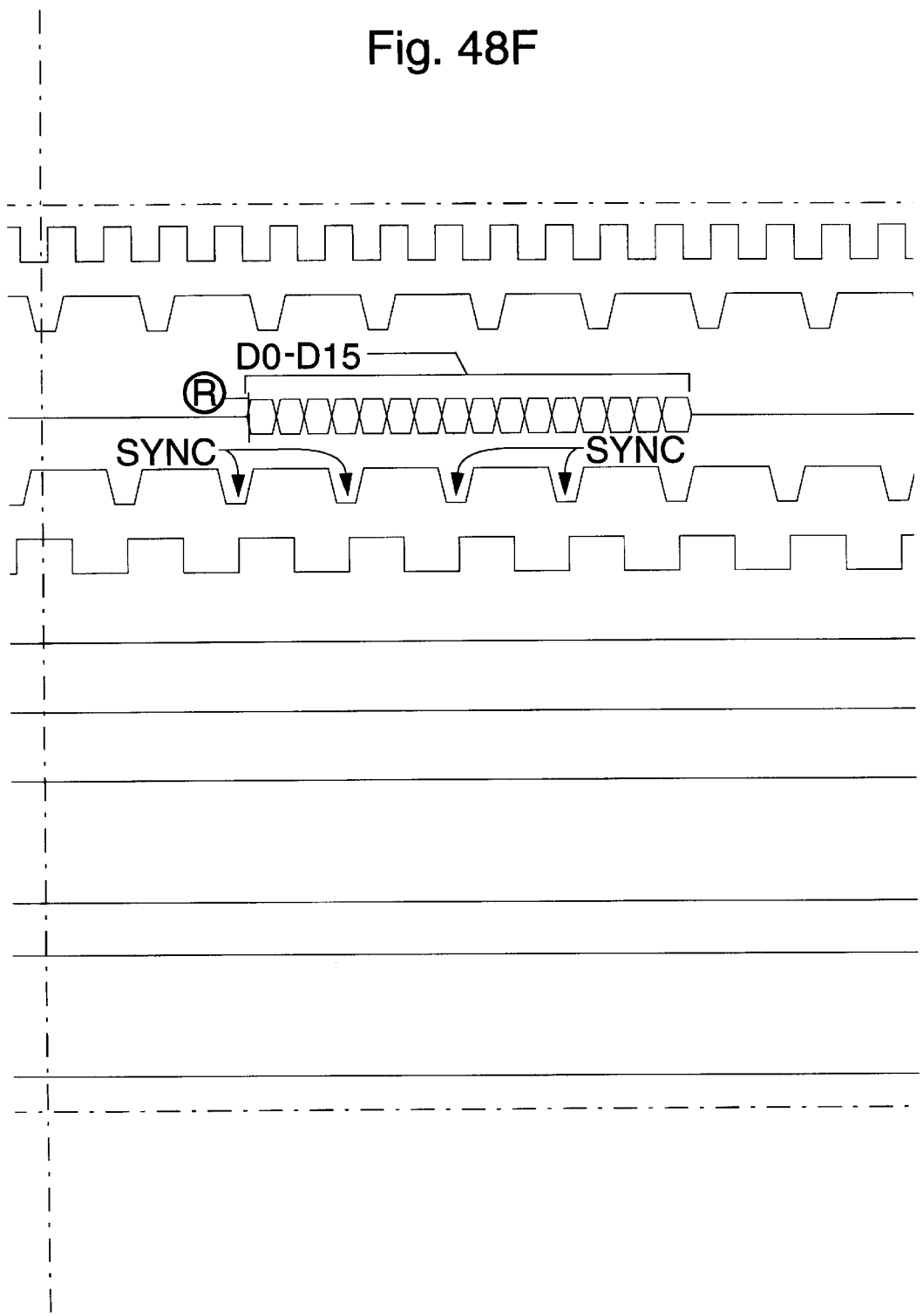
Figure 48G:
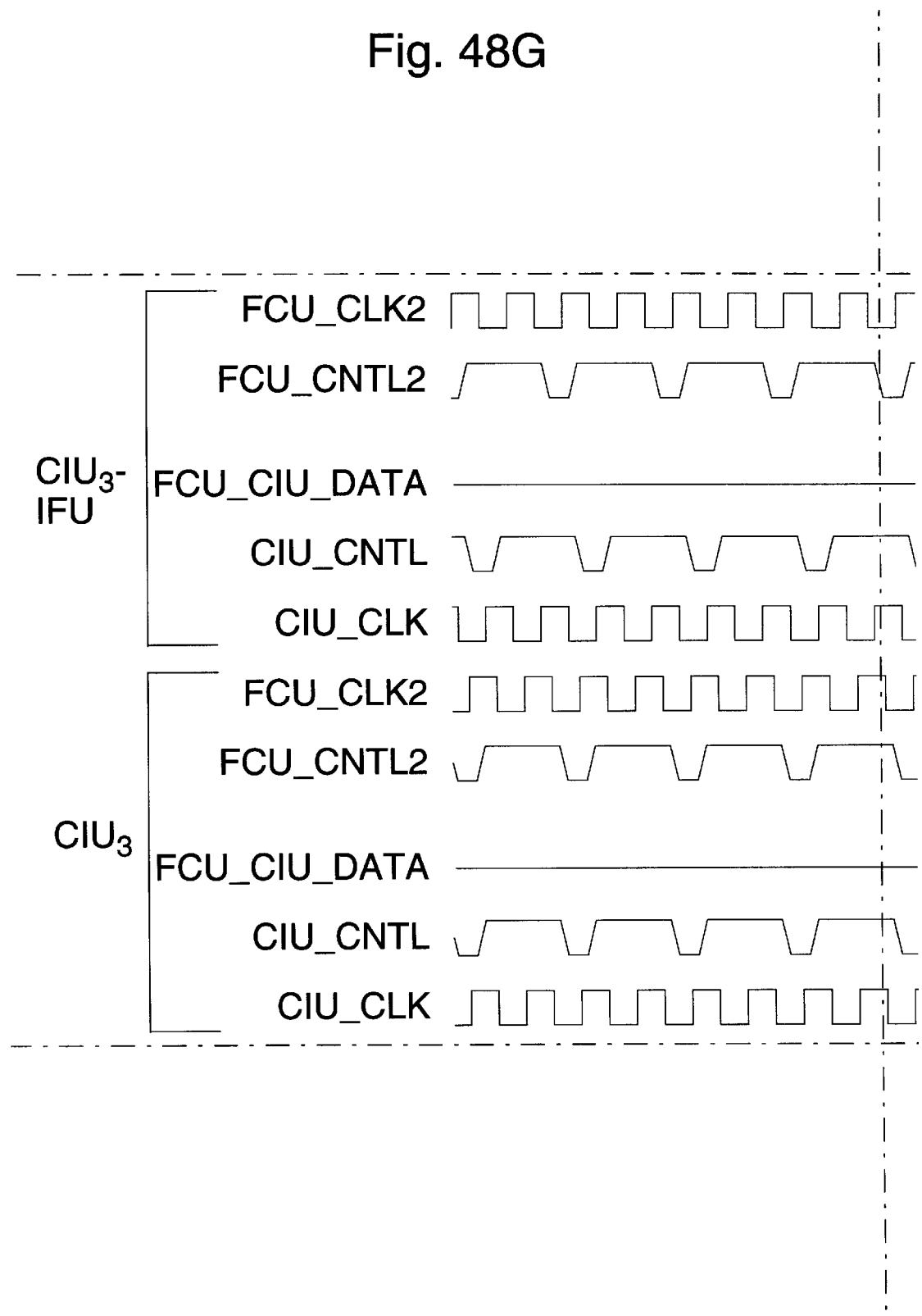
Figure 48H:
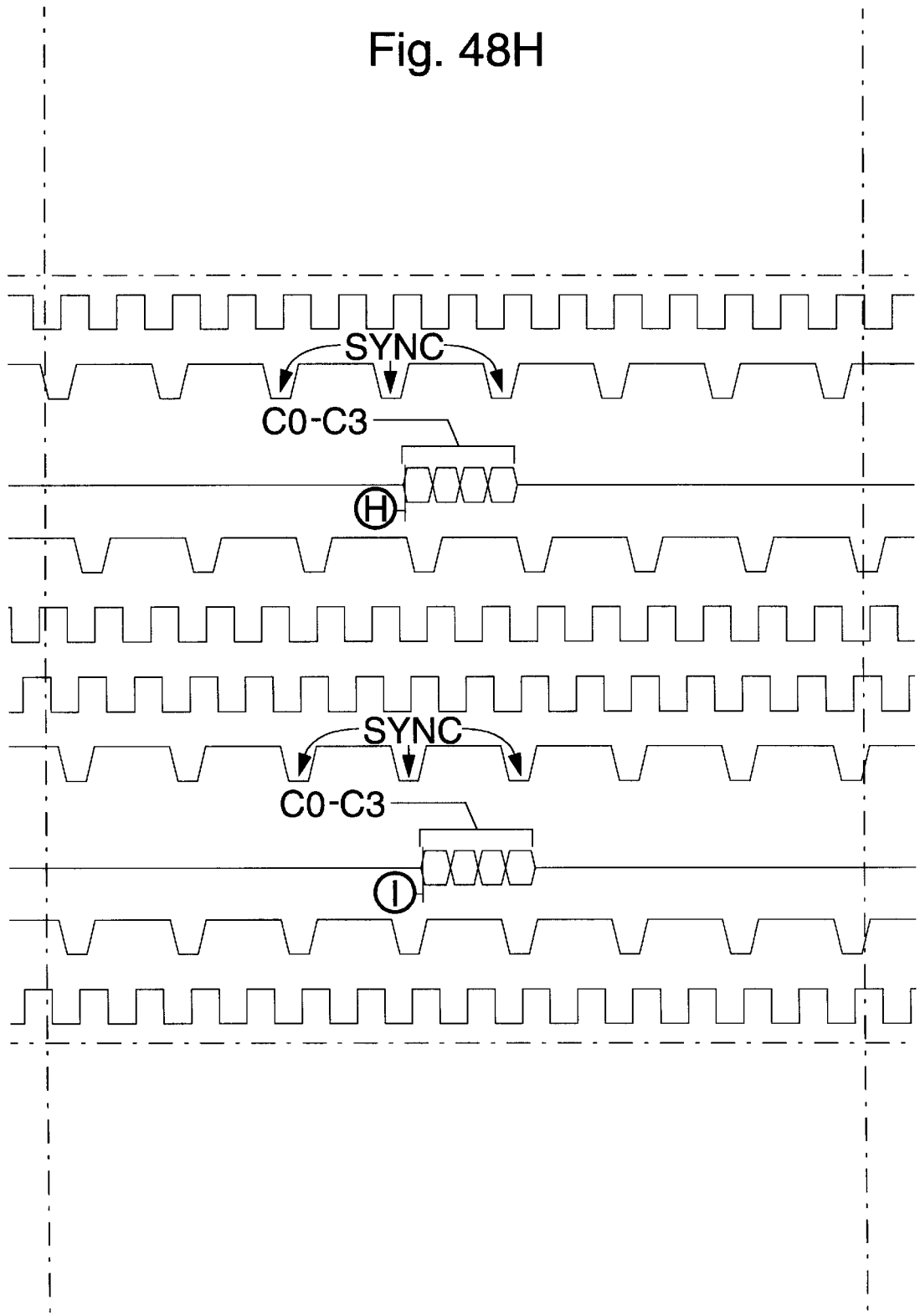
Figure 48I:
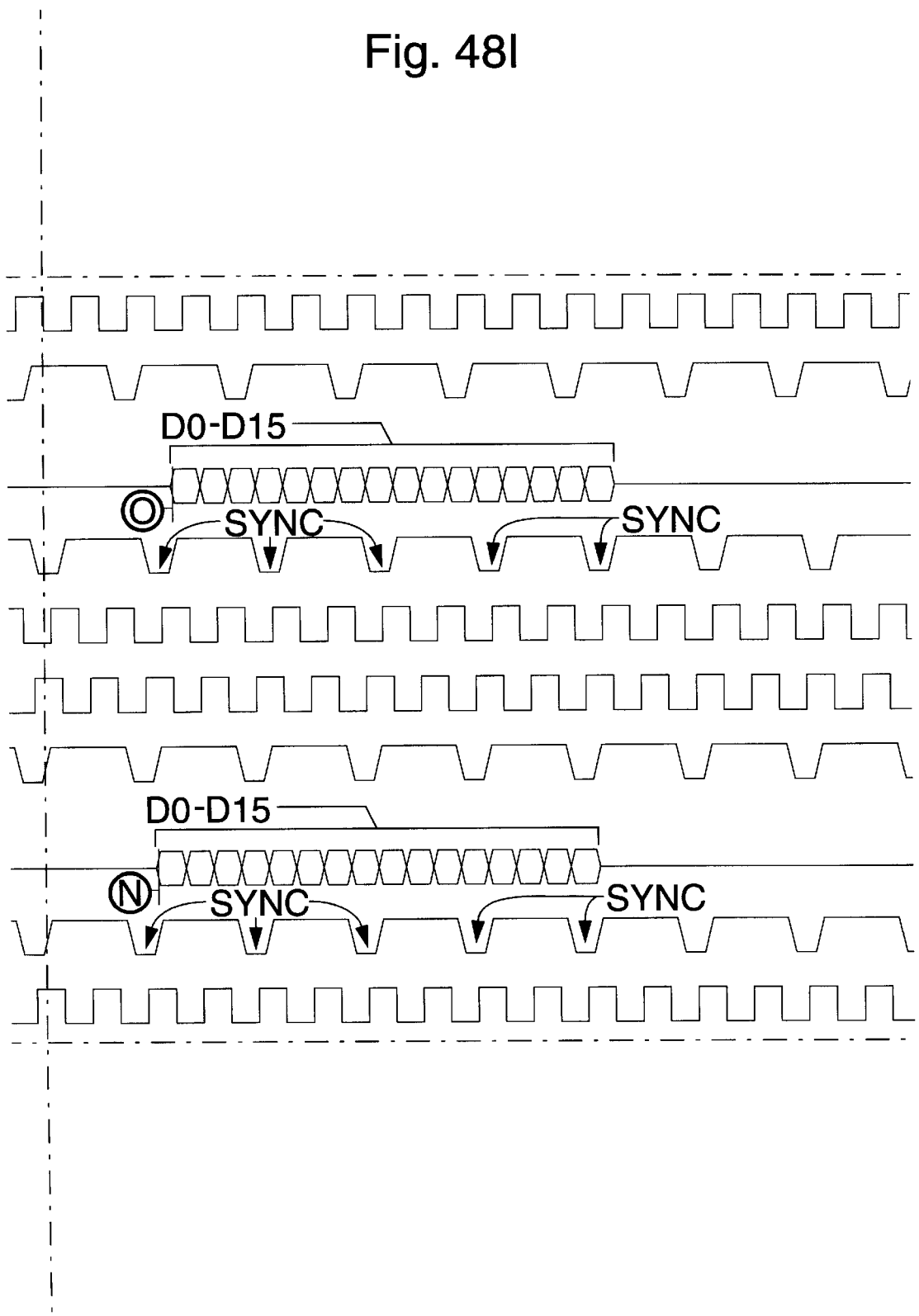
Figure 48J:
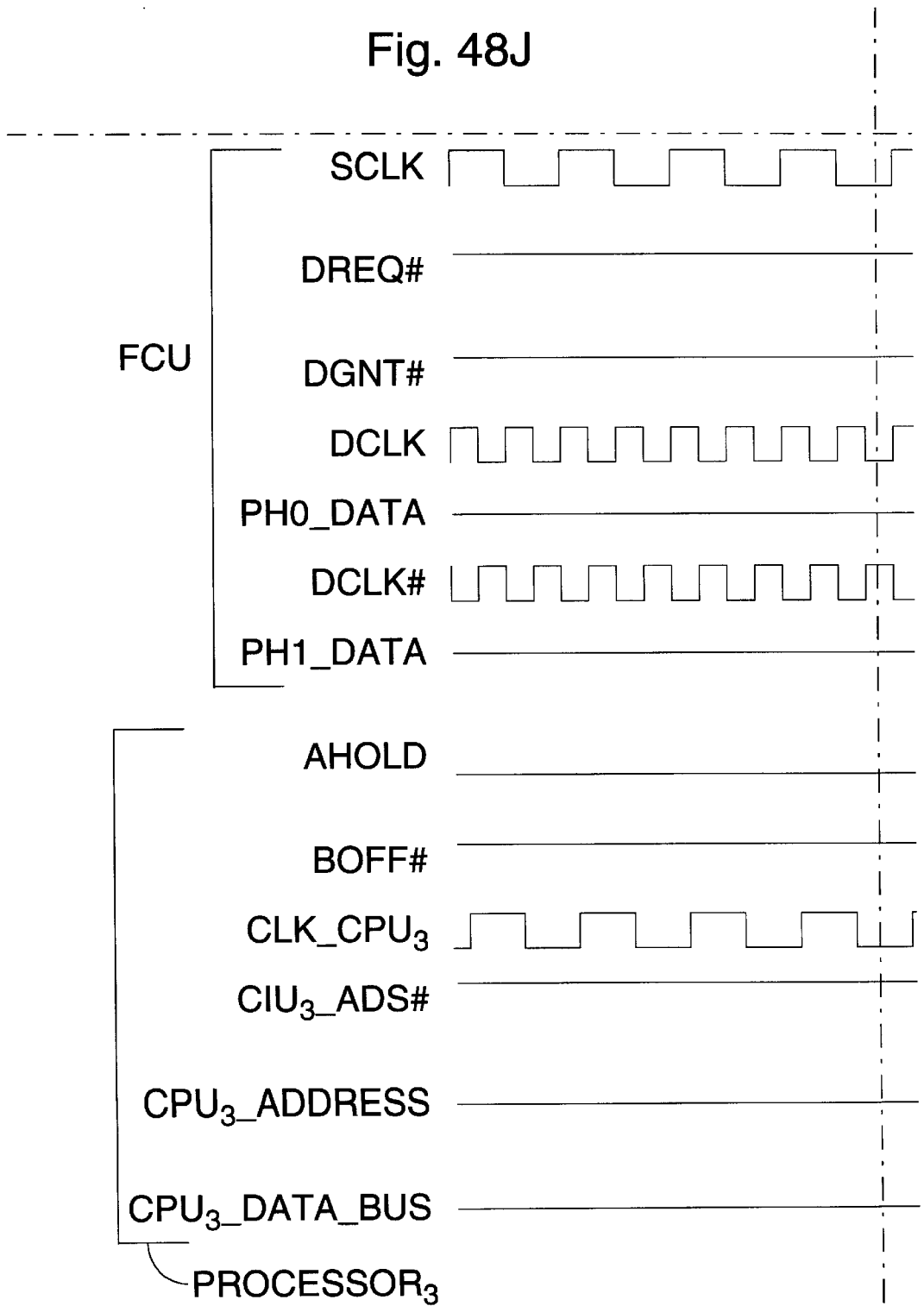
Figure 48K:
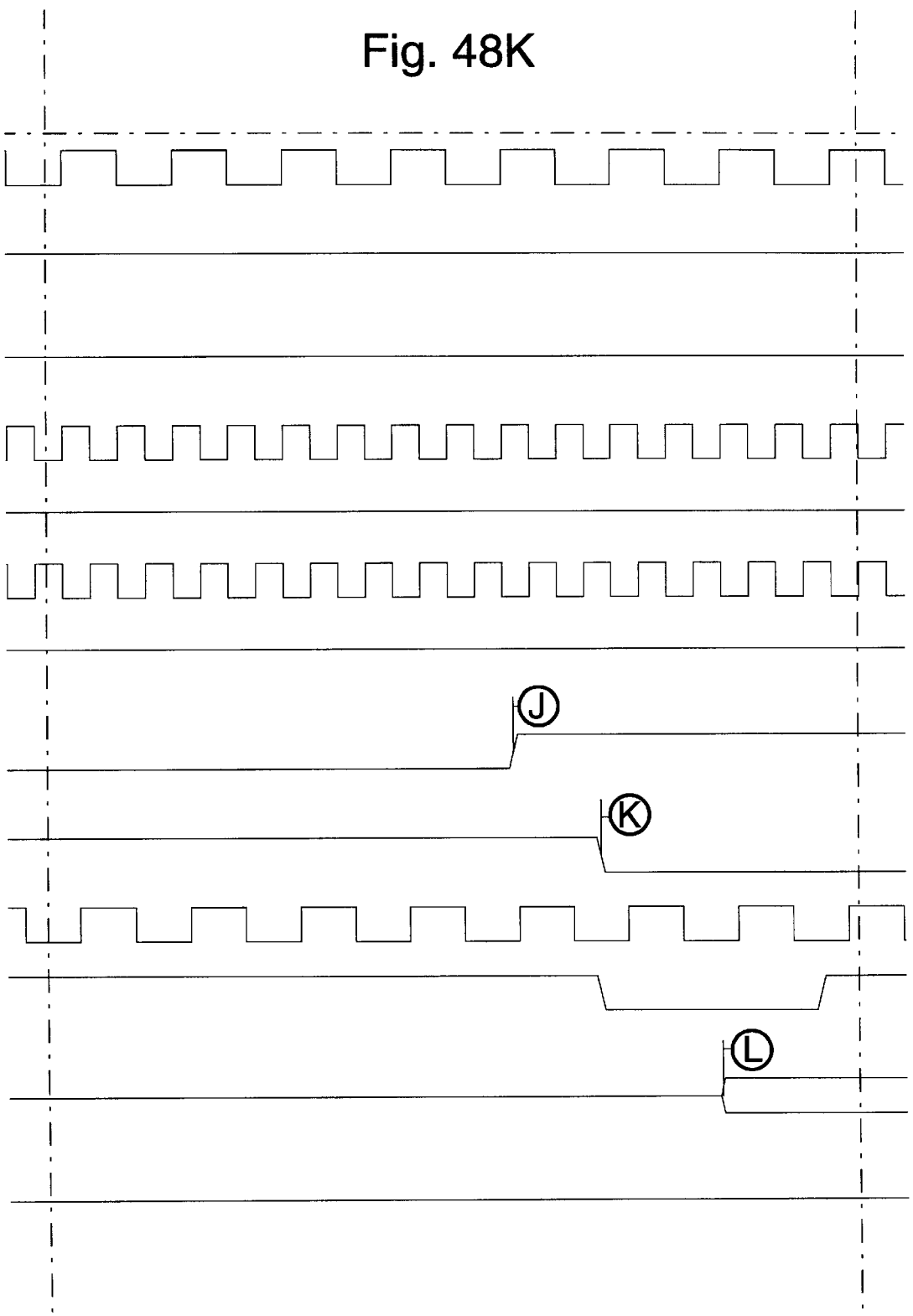
Figure 48L:
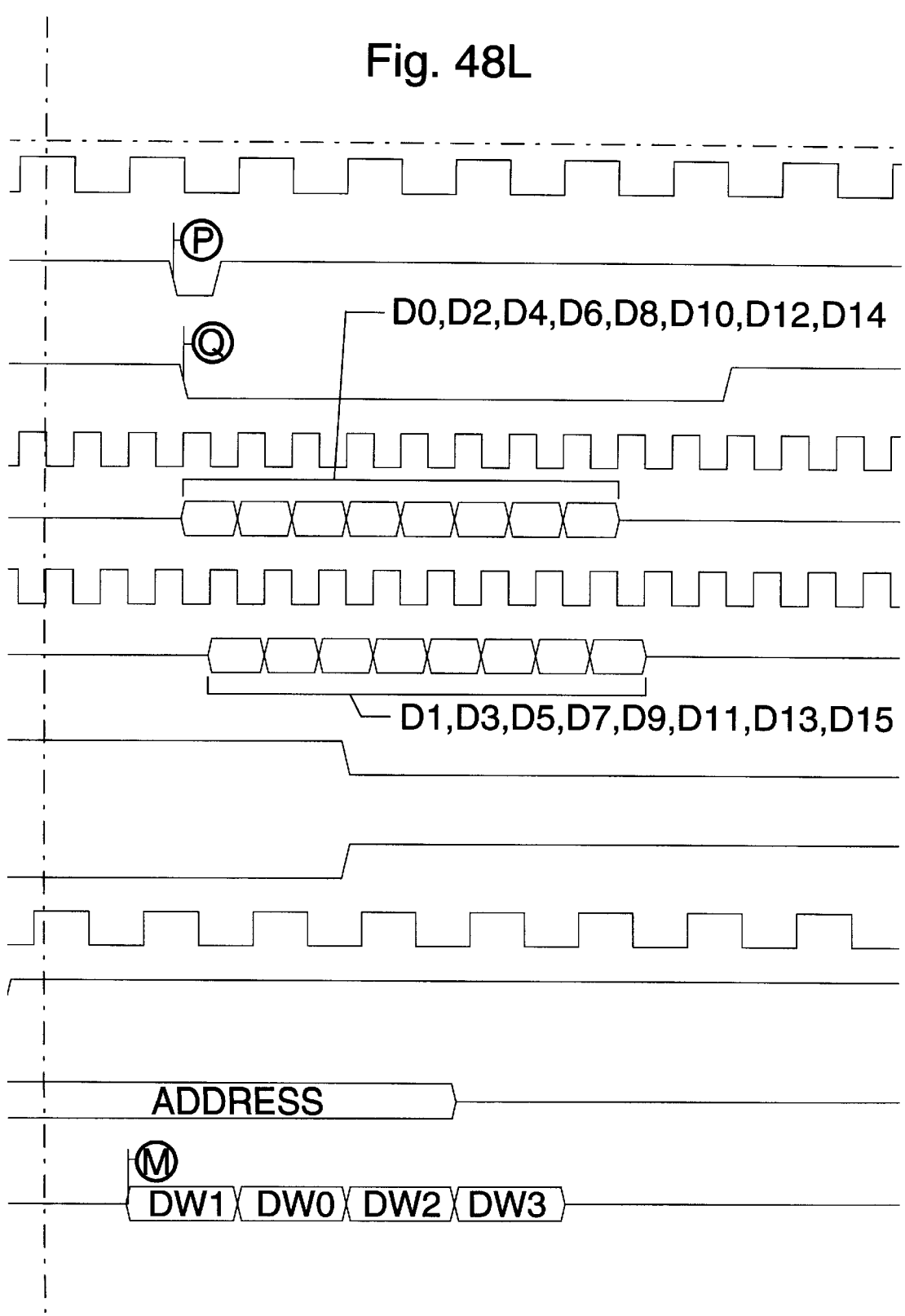
Figure 48M:
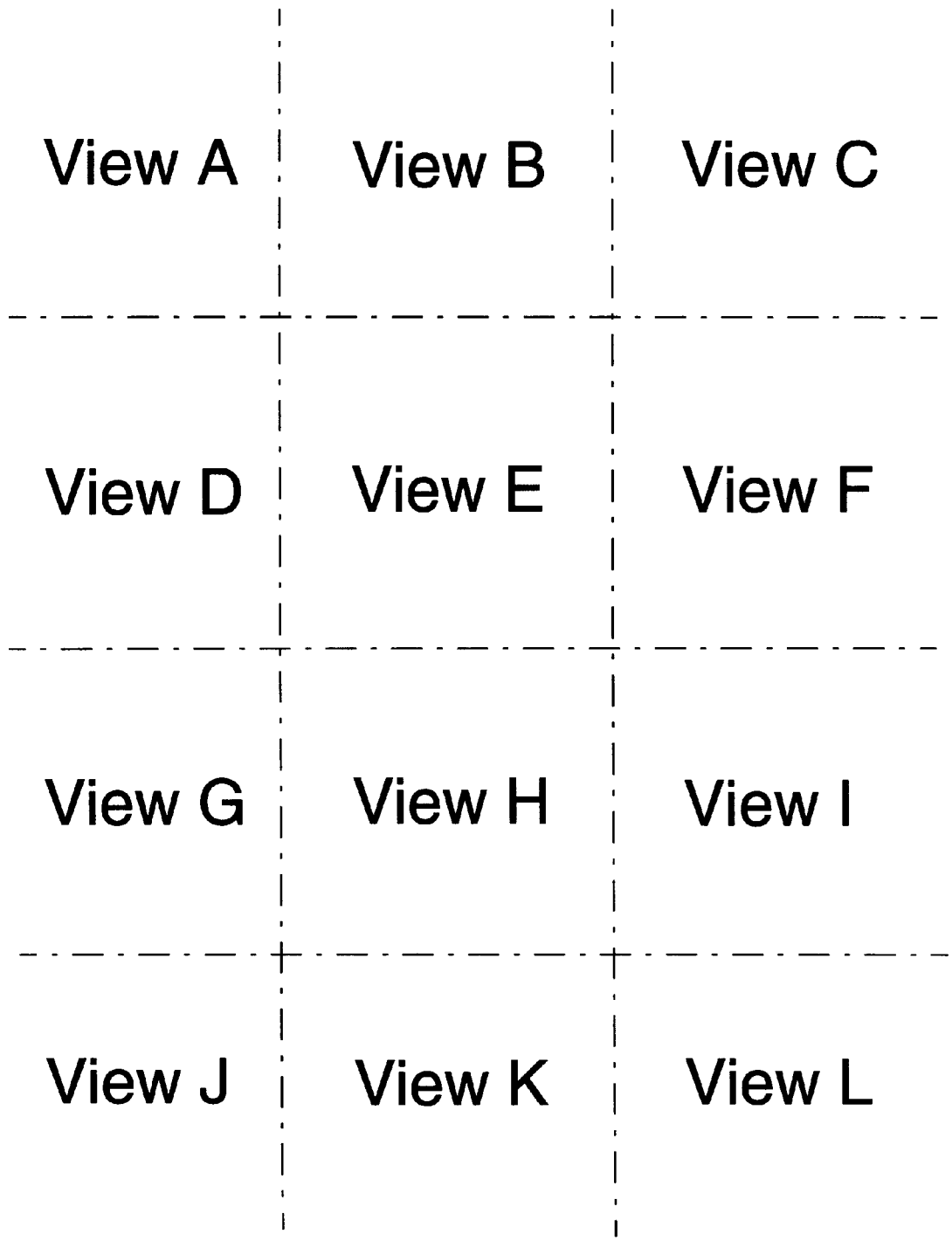
Figure 49A:
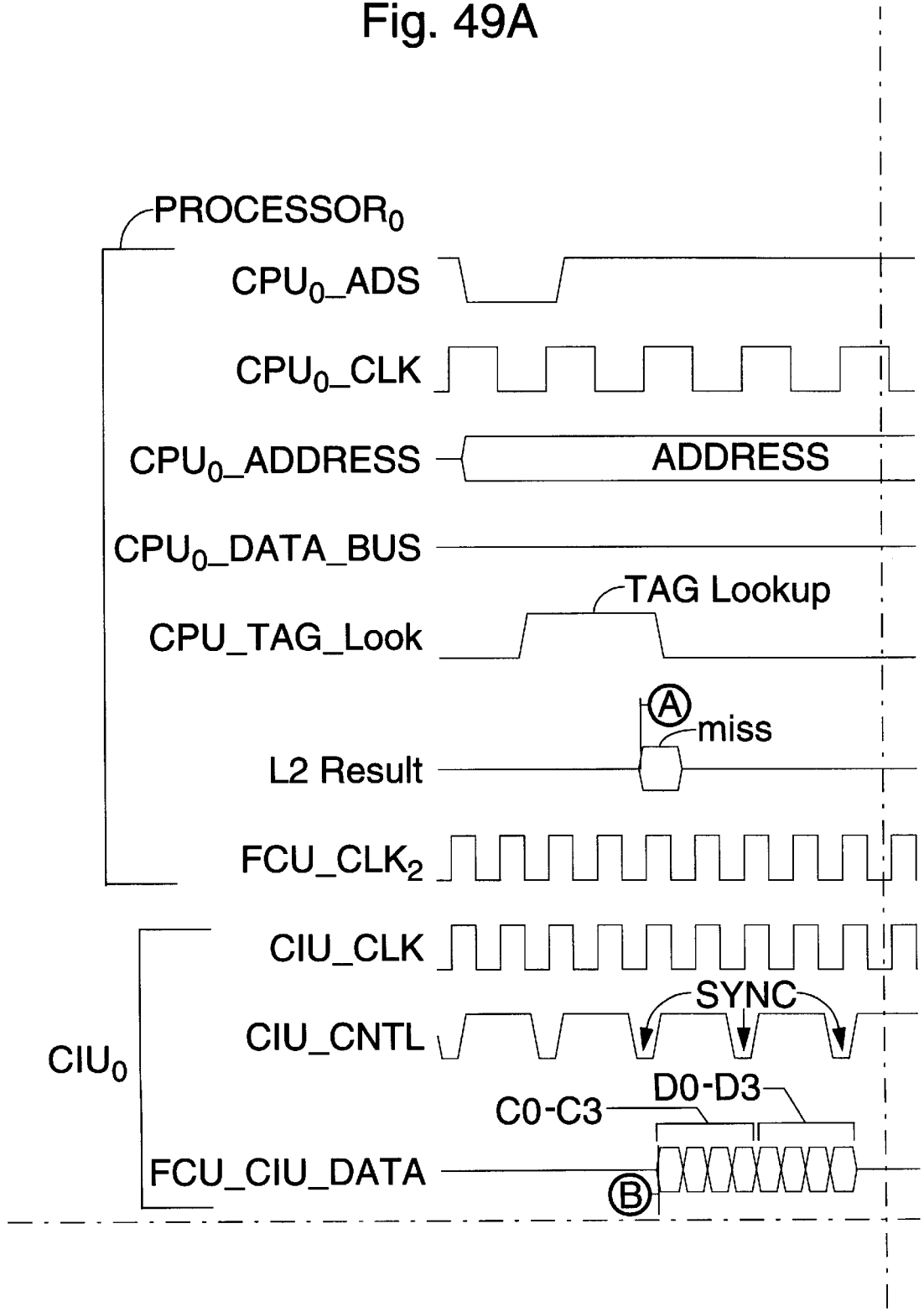
Figure 49B:
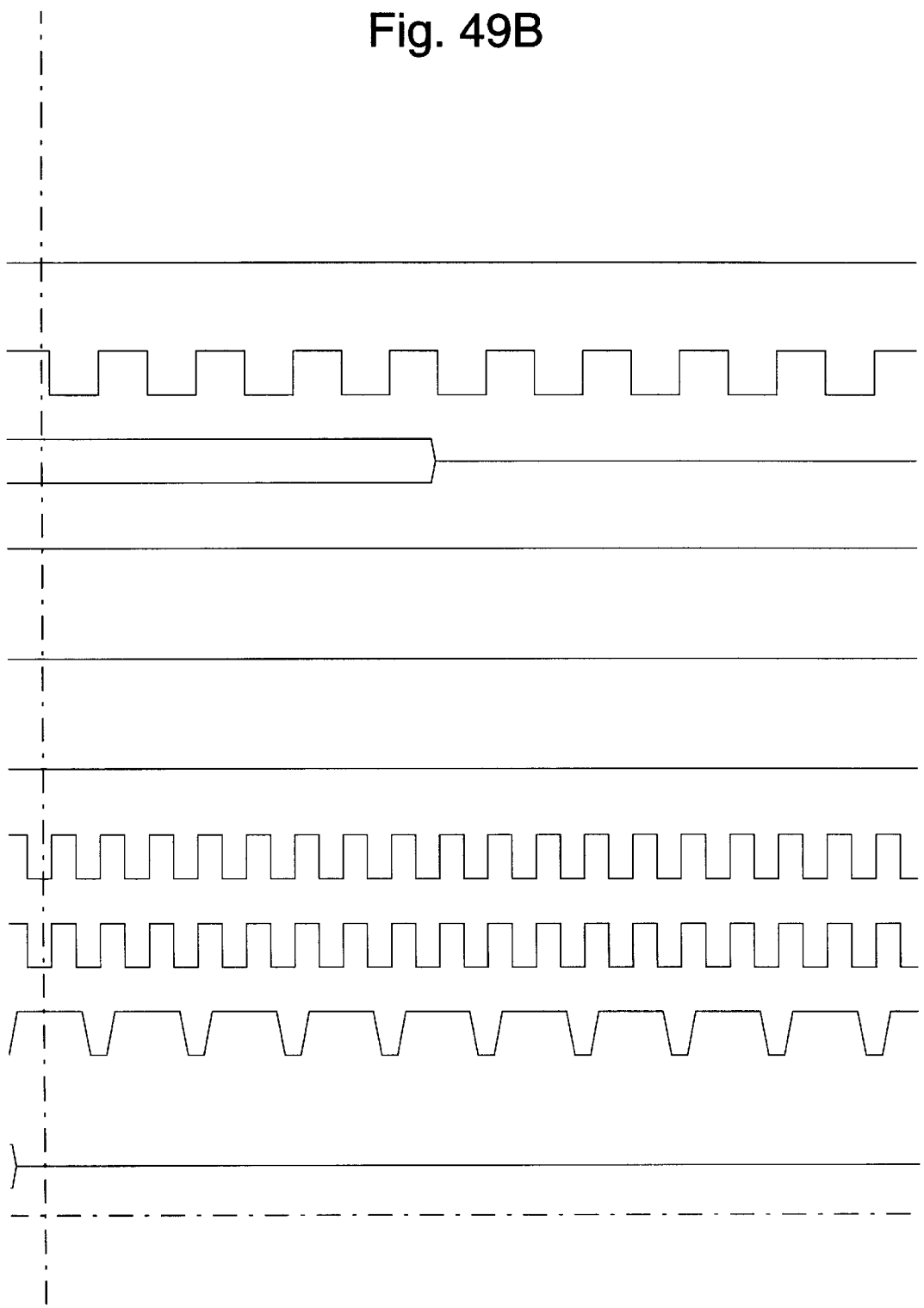
Figure 49C:
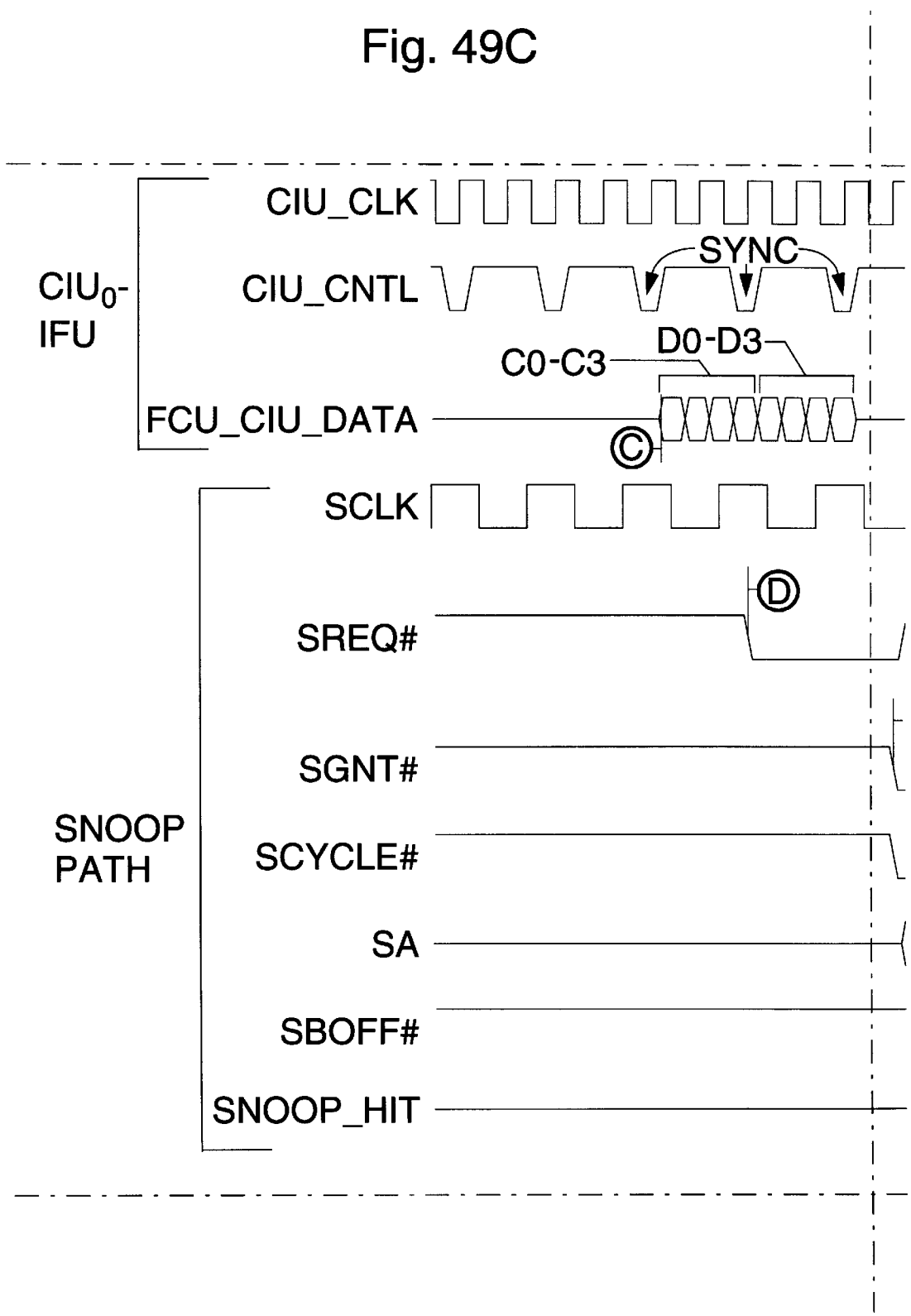
Figure 49D:
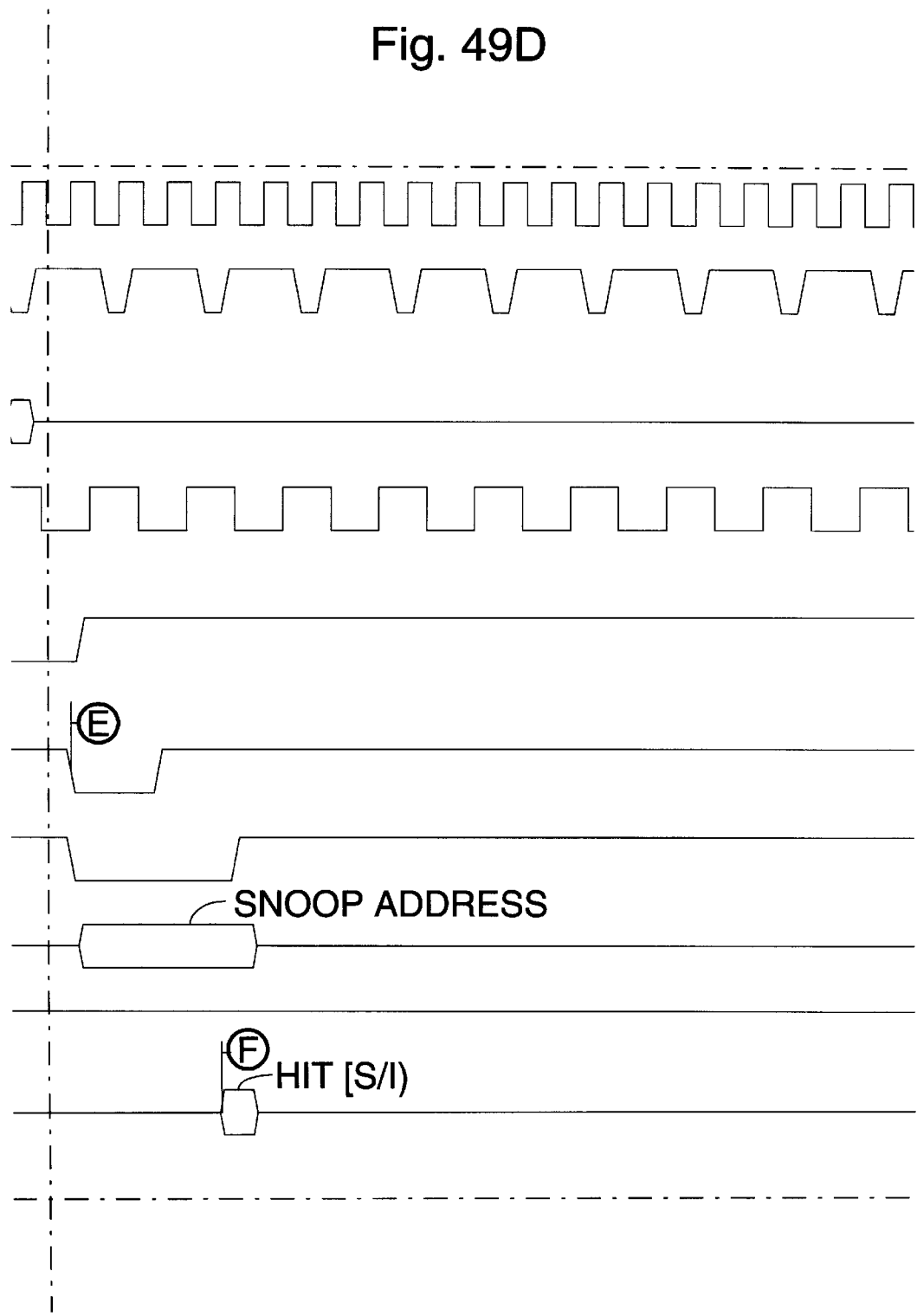
Figure 49E:
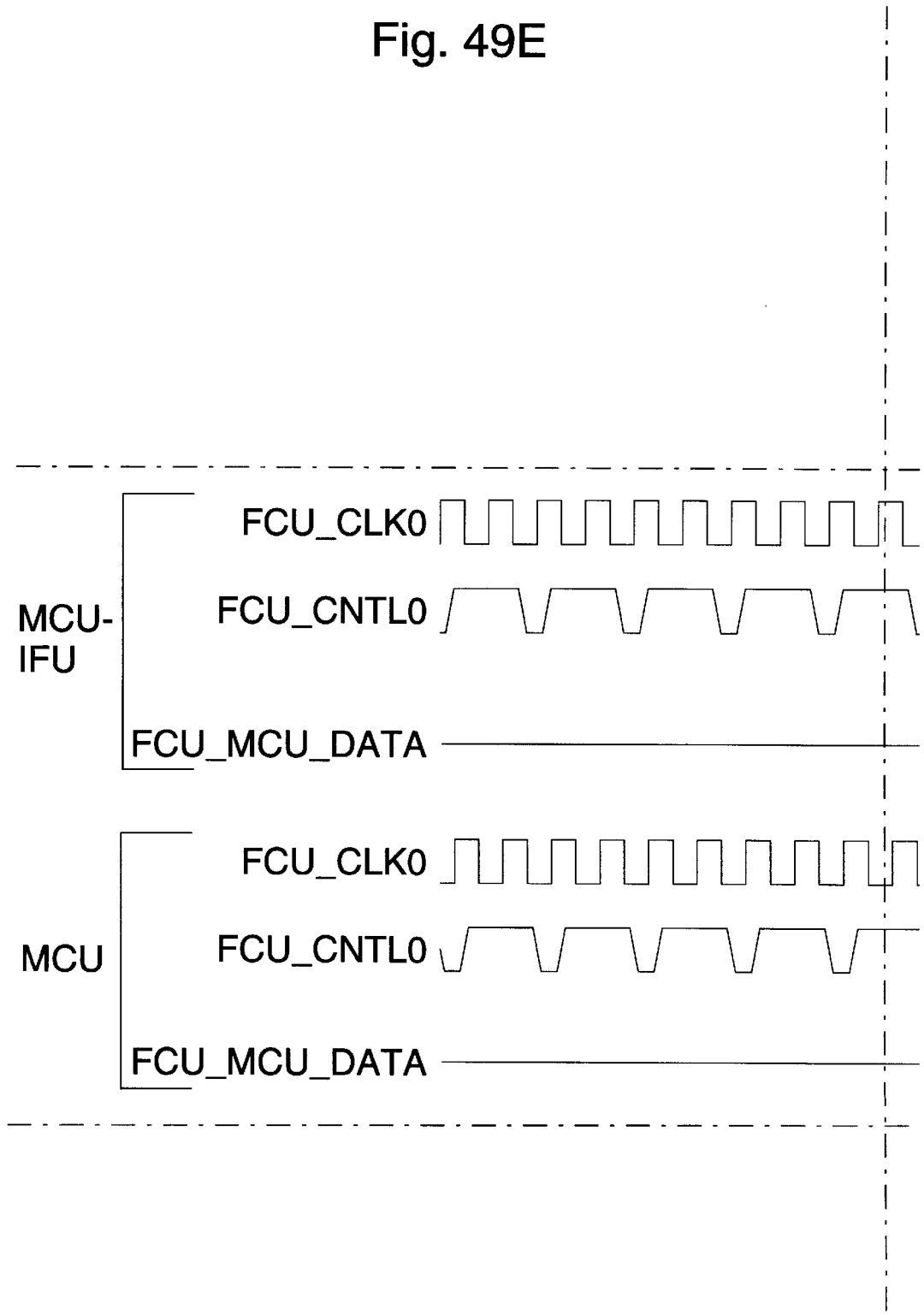
Figure 49F:
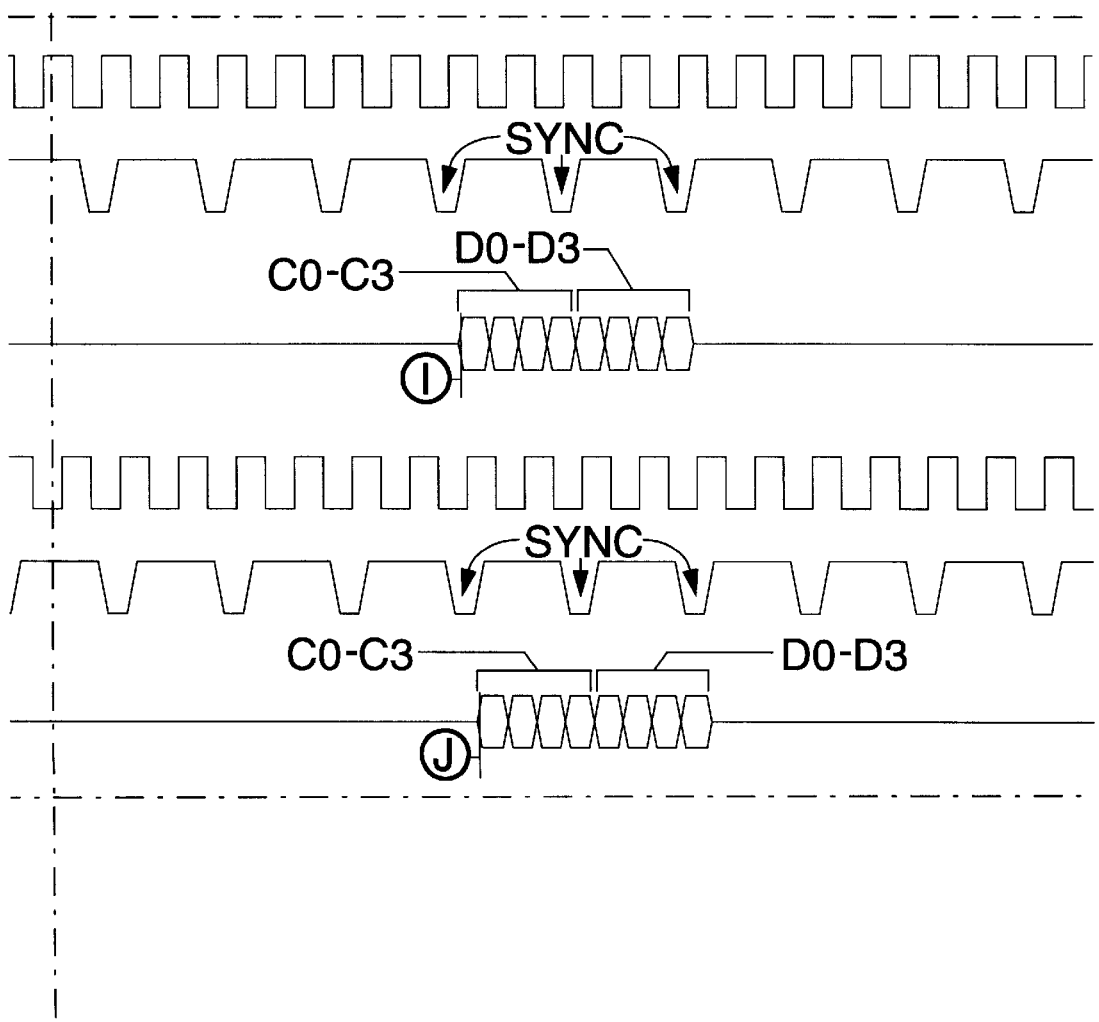
Figure 49G:
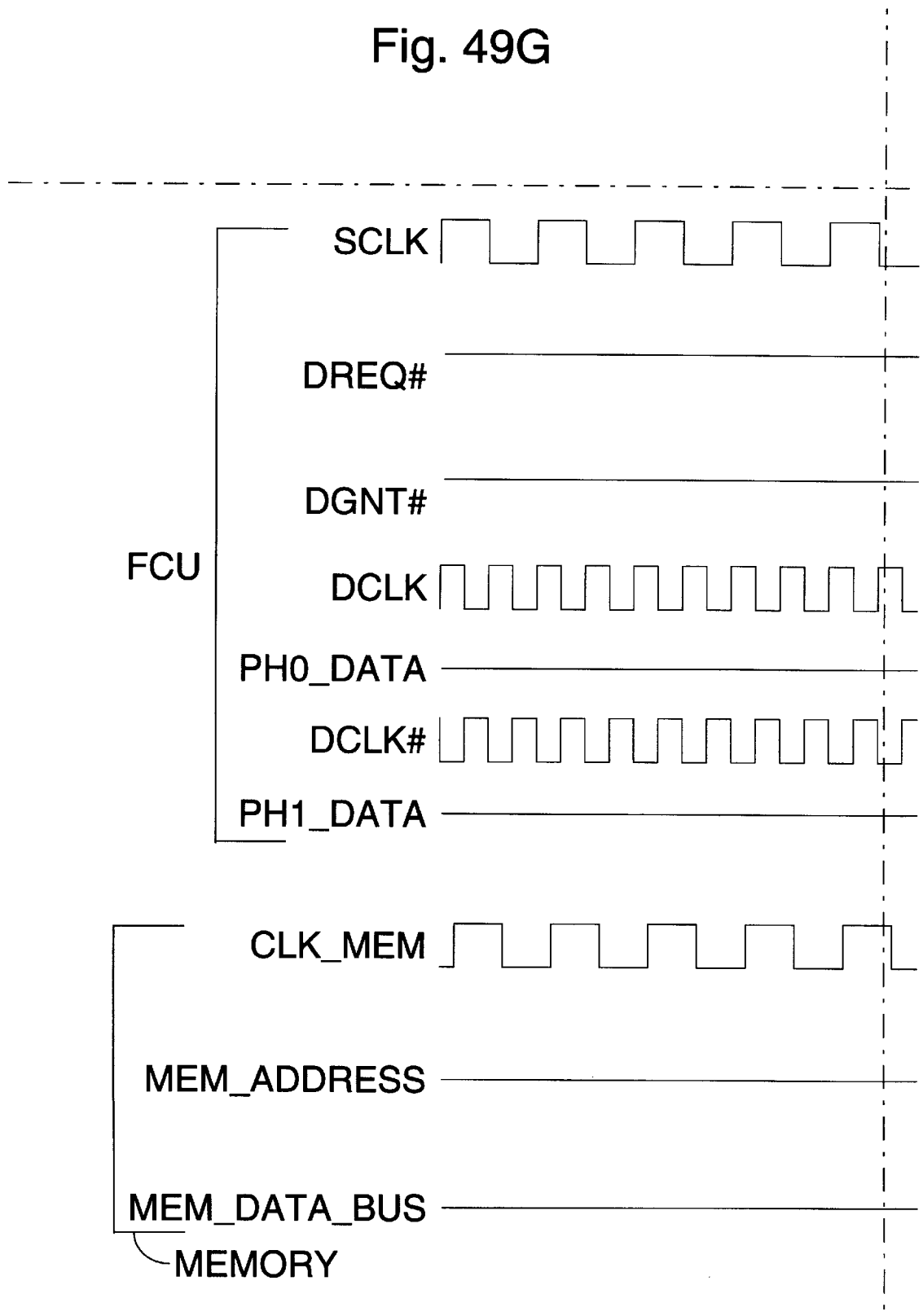
Figure 49H:
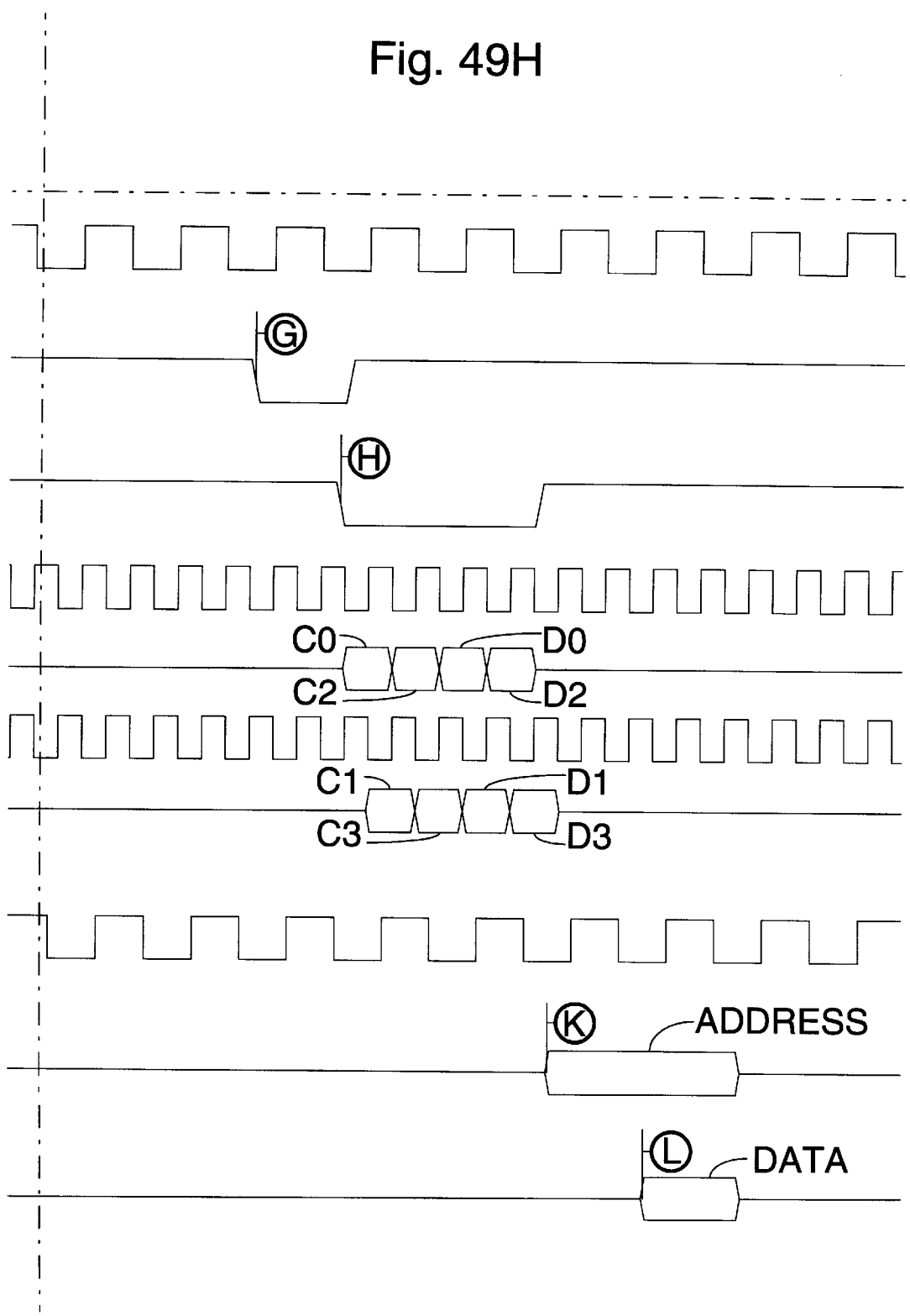
Figure 49I:
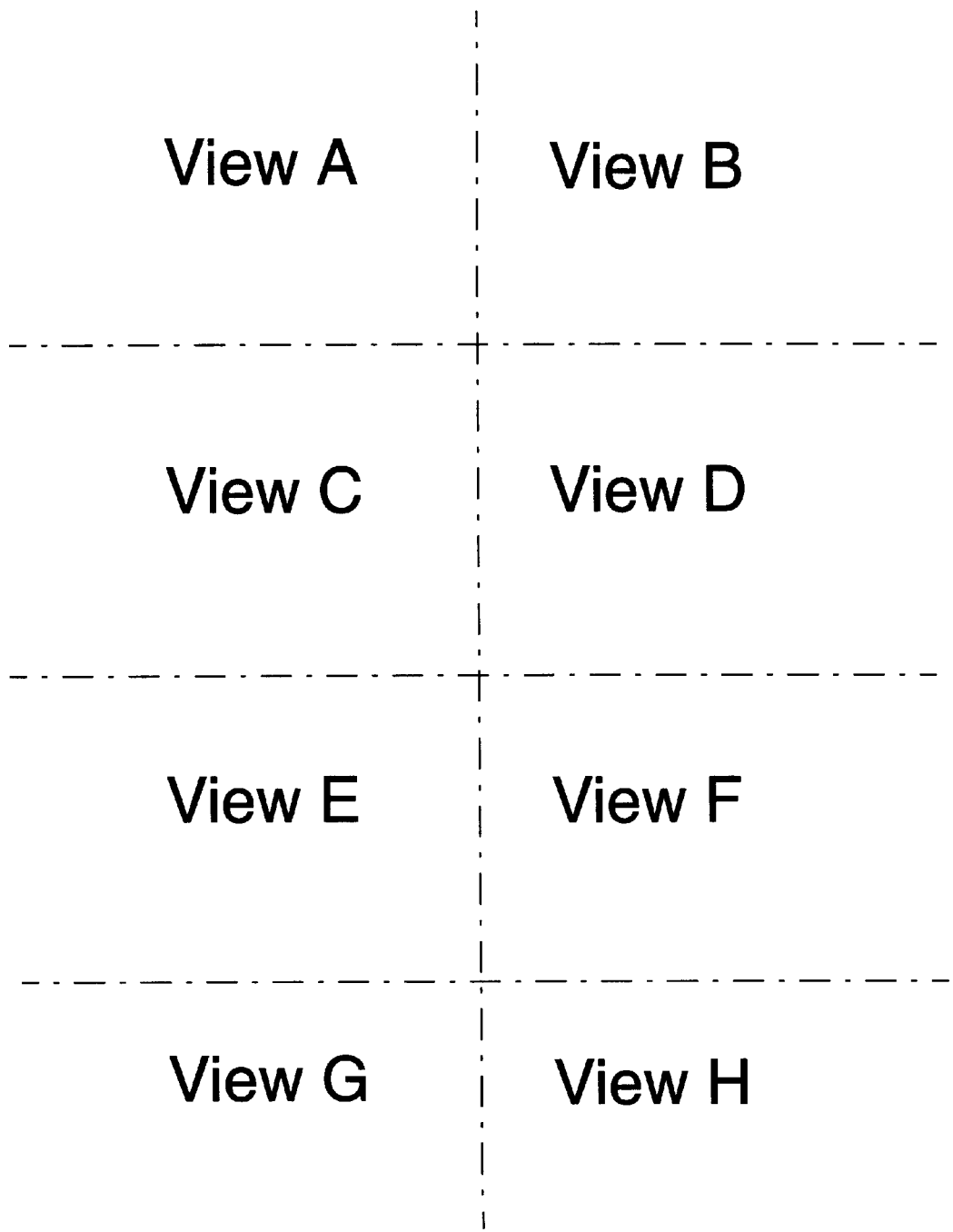
Figure 50A:
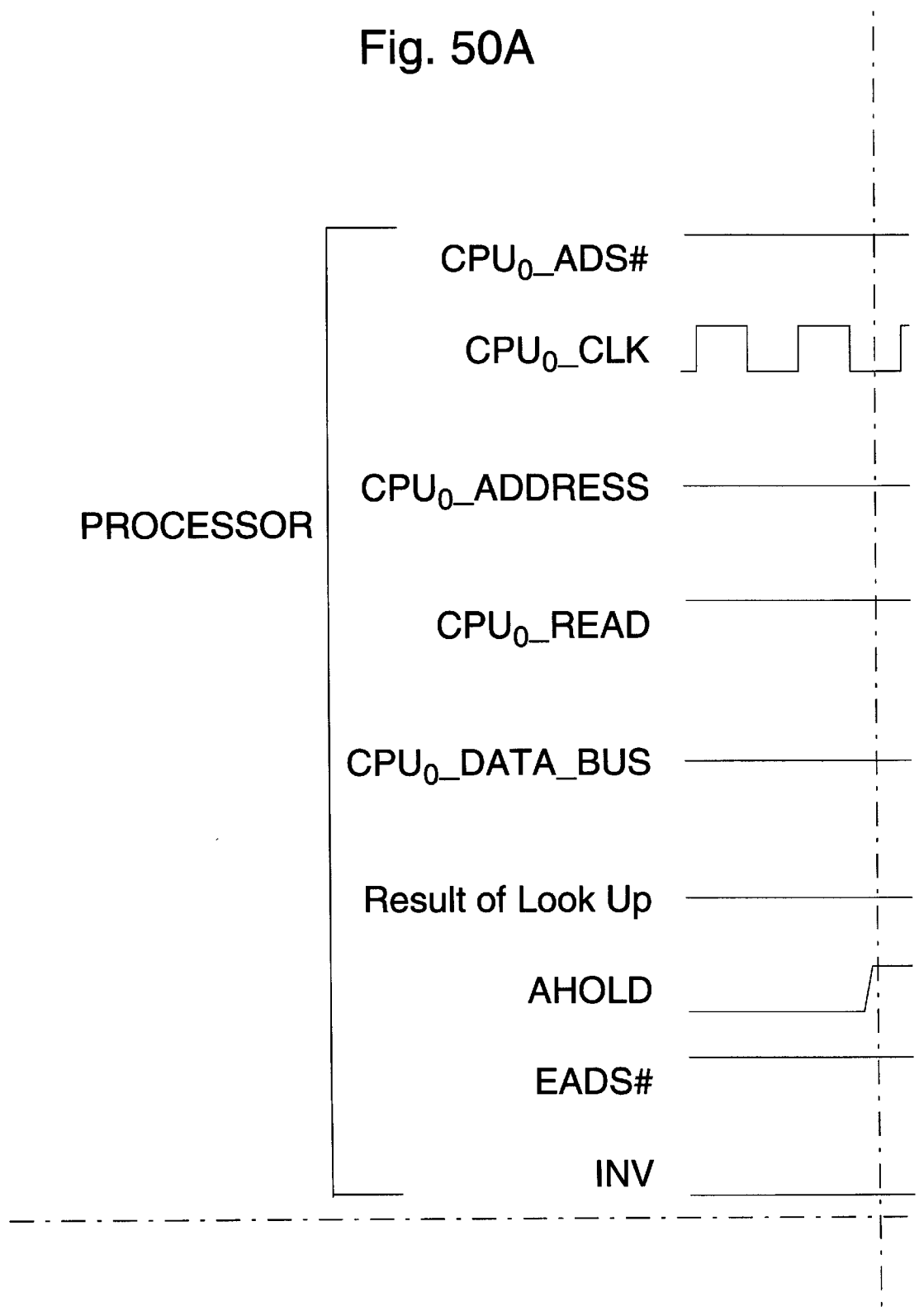
Figure 50B:
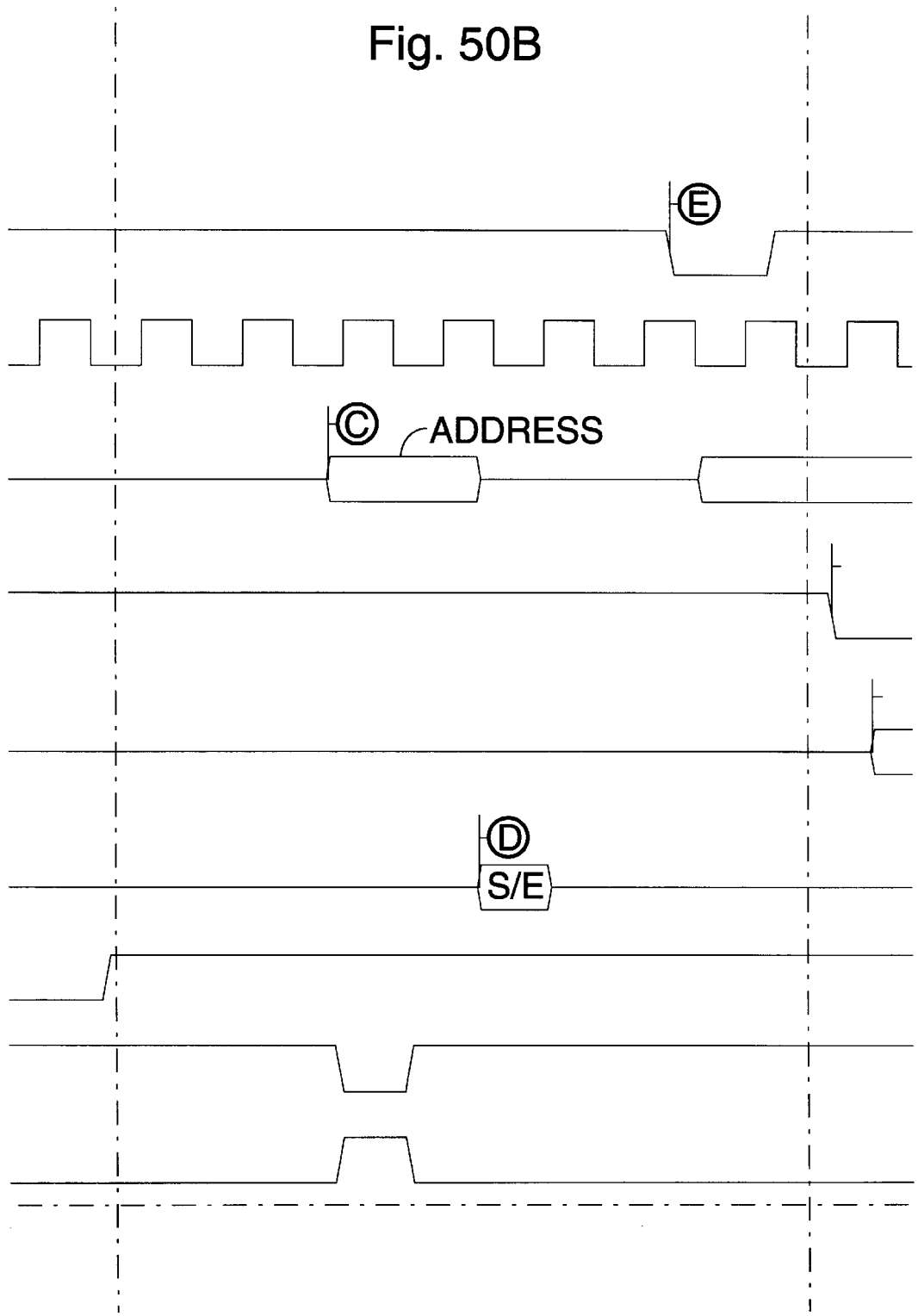
Figure 50C:
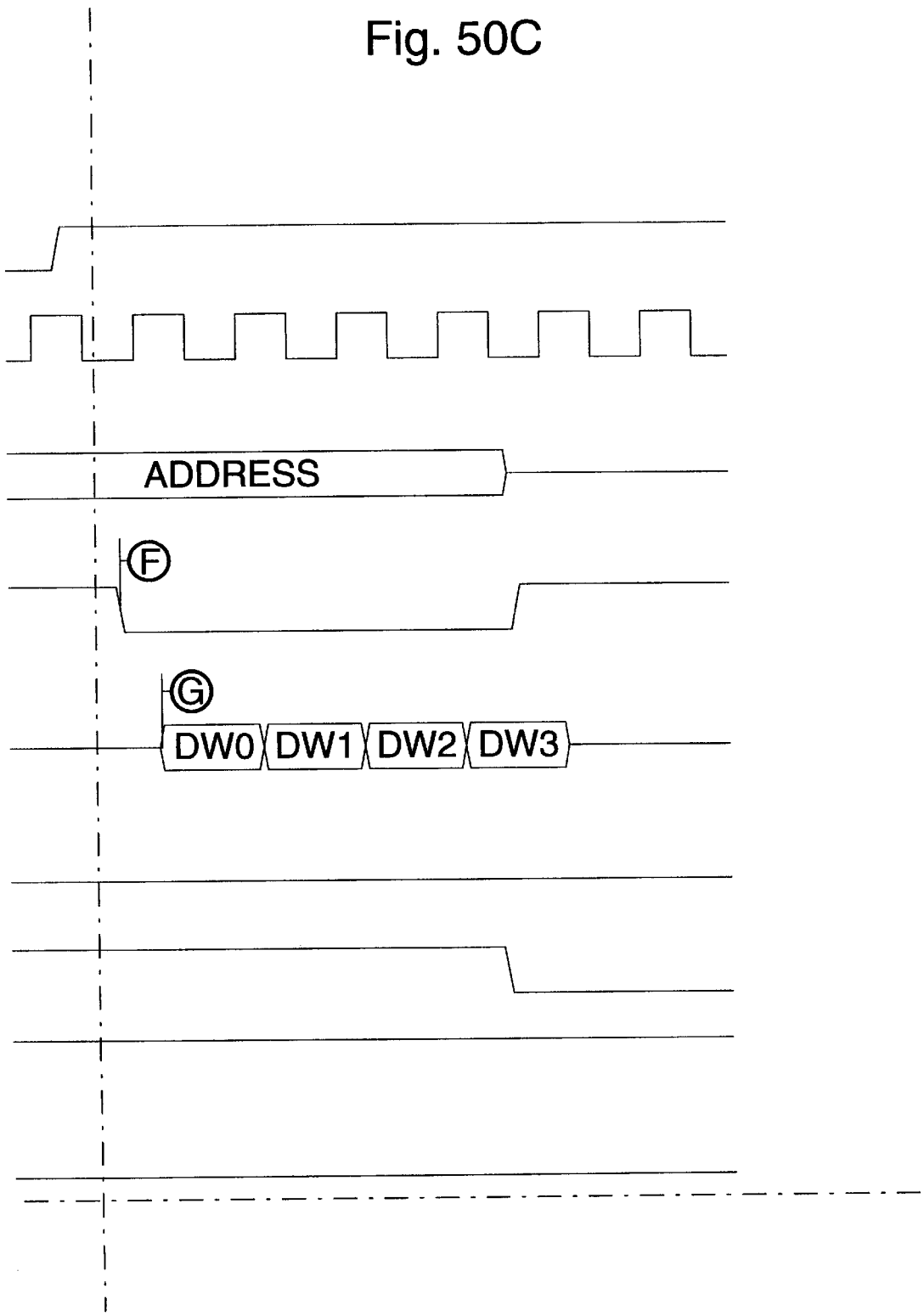
Figure 50D:
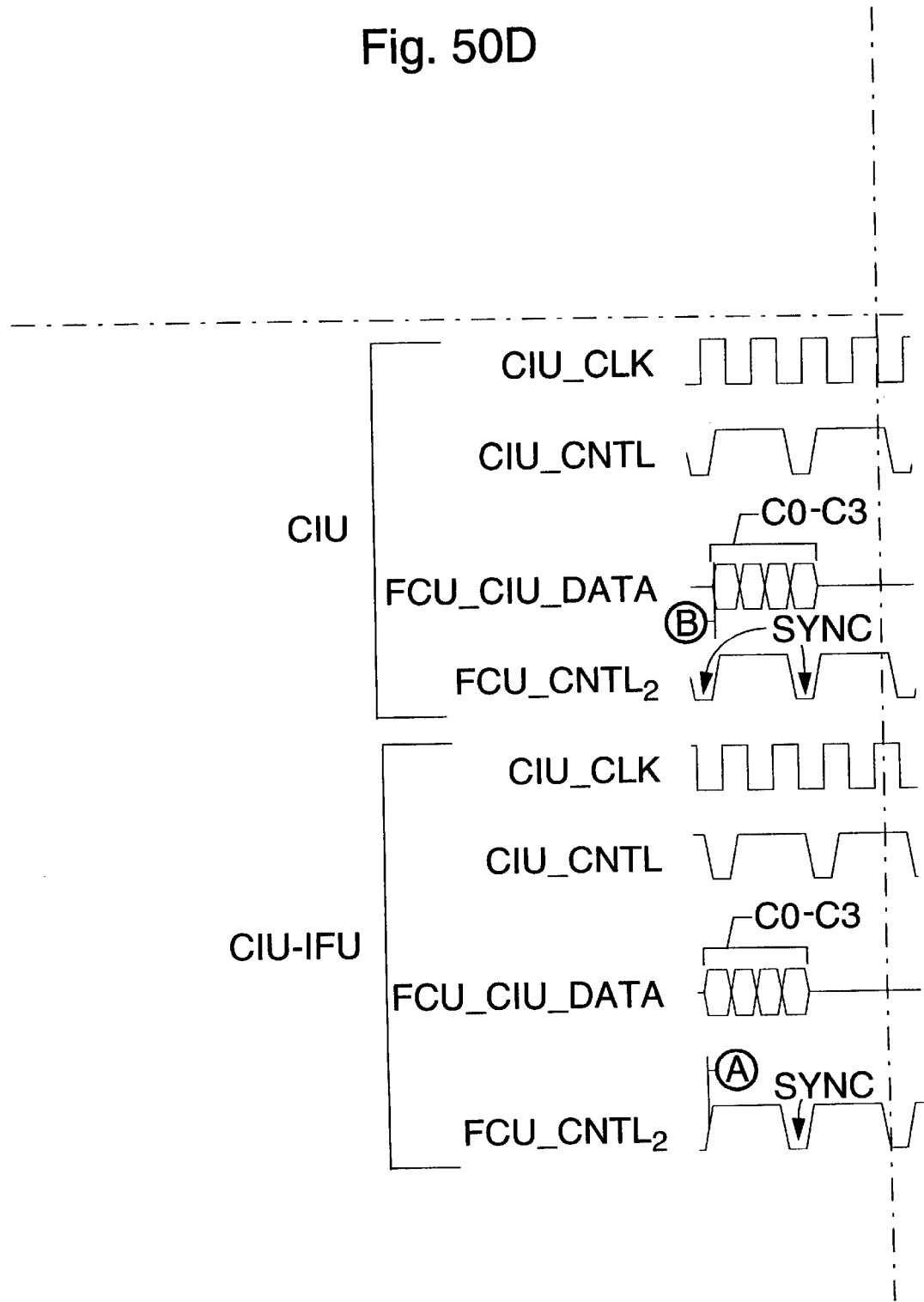
Figure 50E:
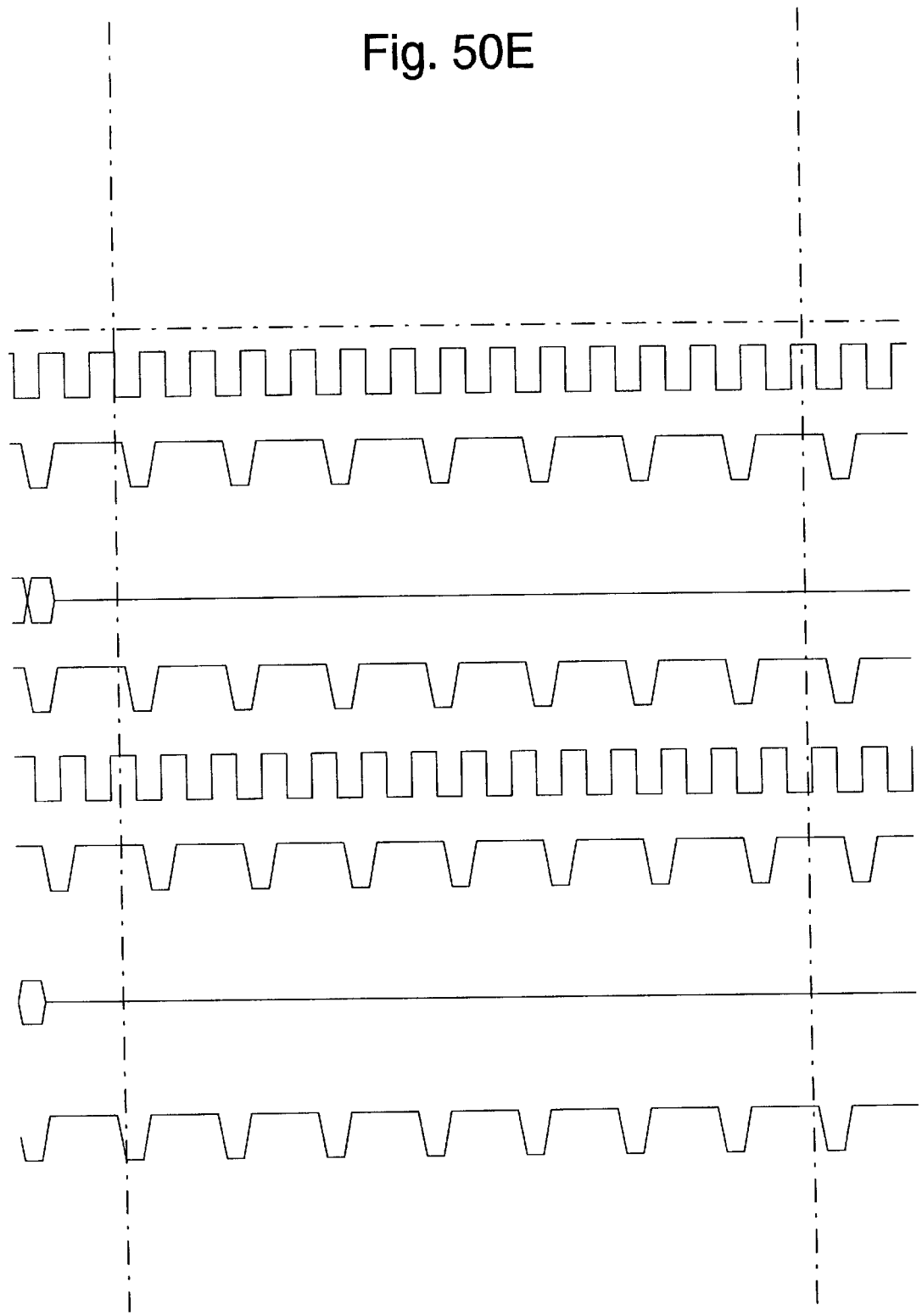
Figure 50F:
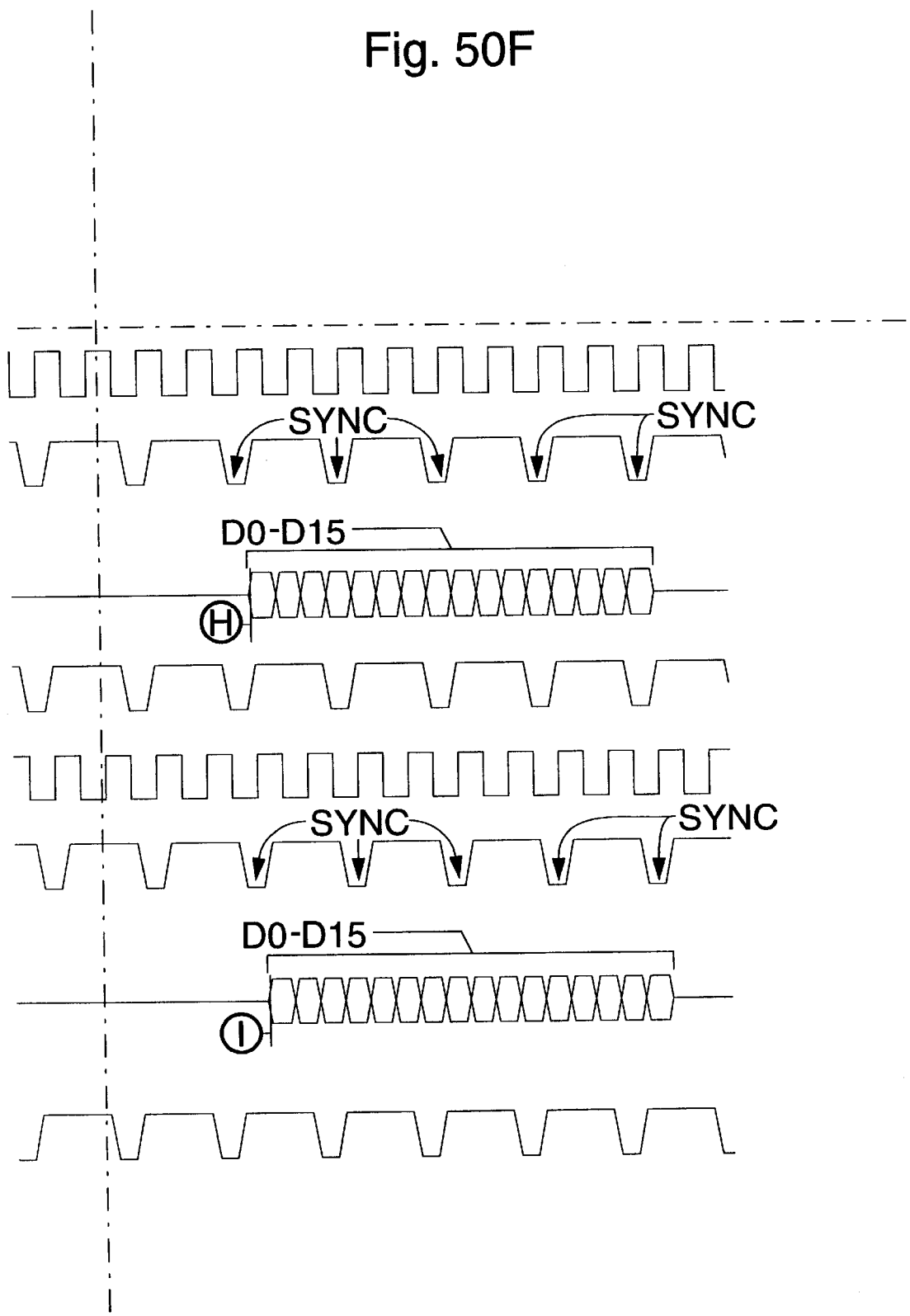
Figure 50G:
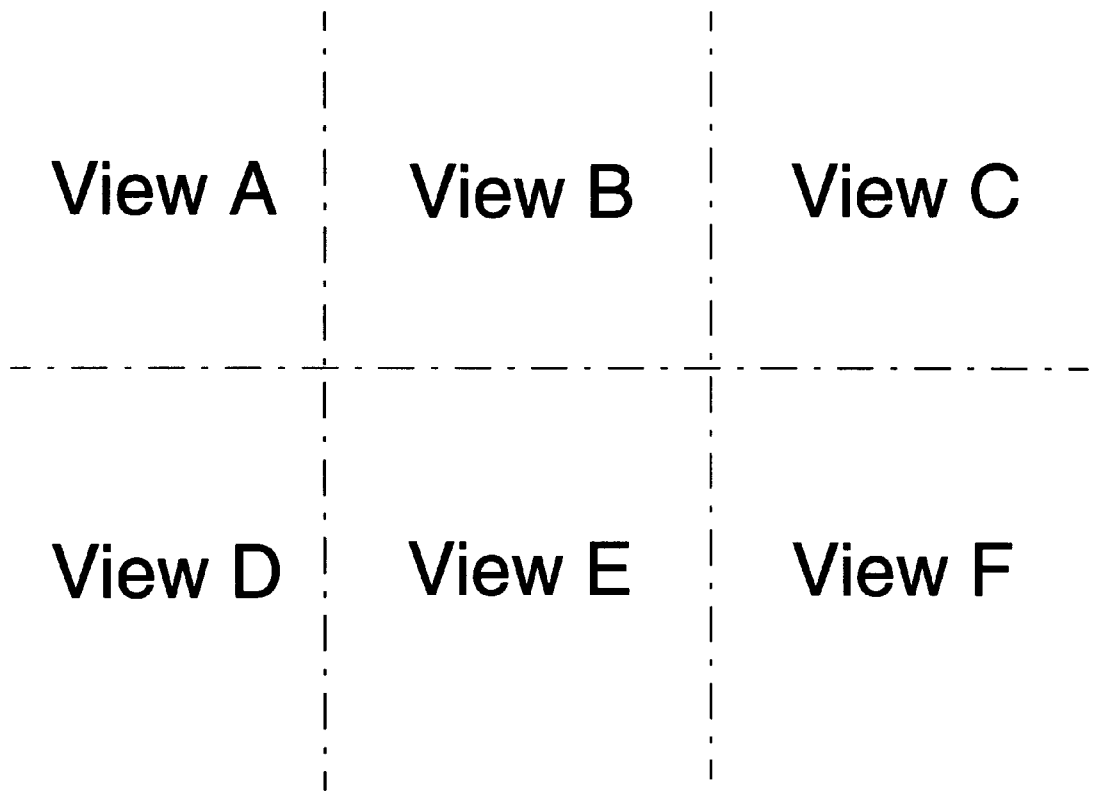
Figure 51A:
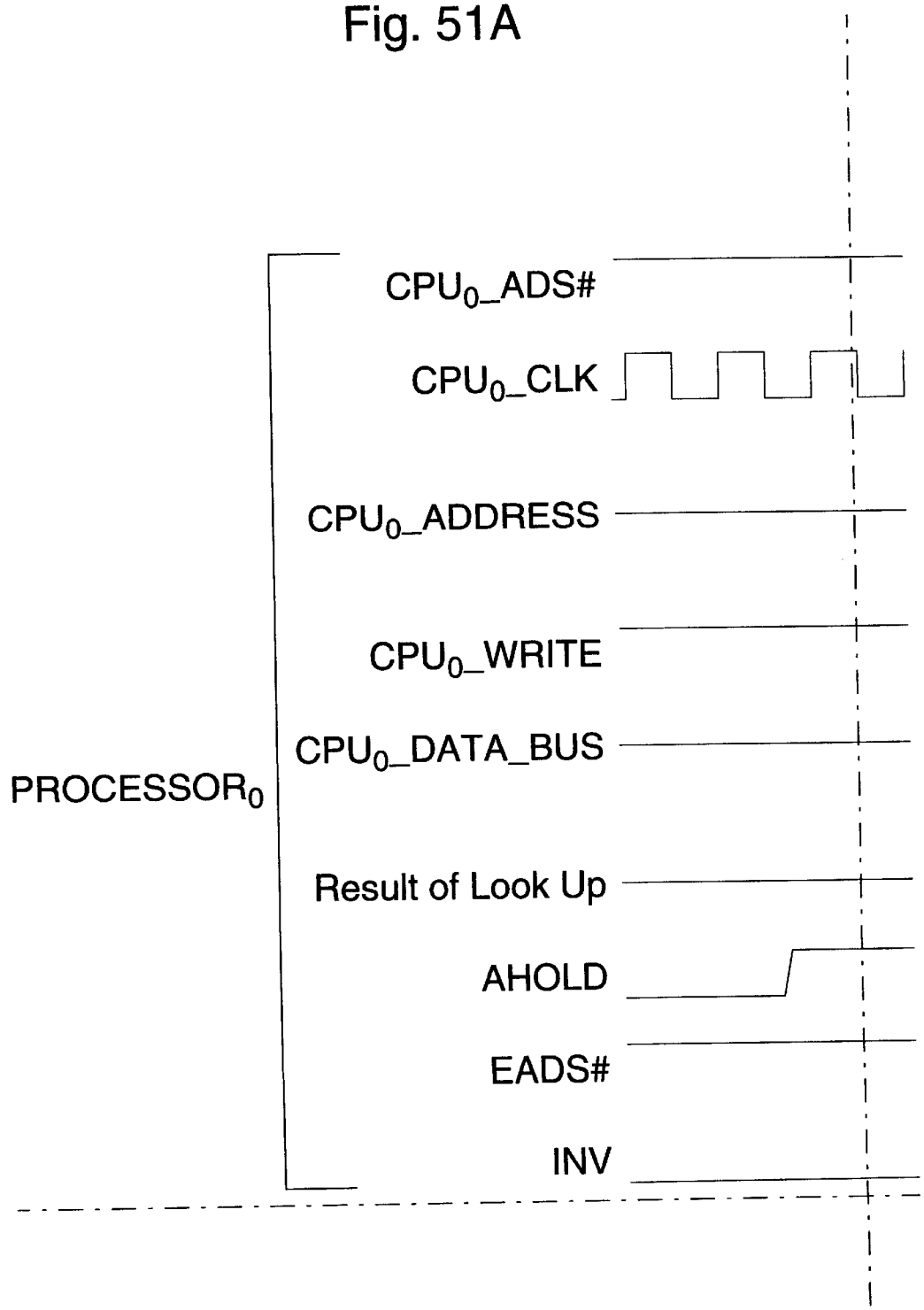
Figure 51B:
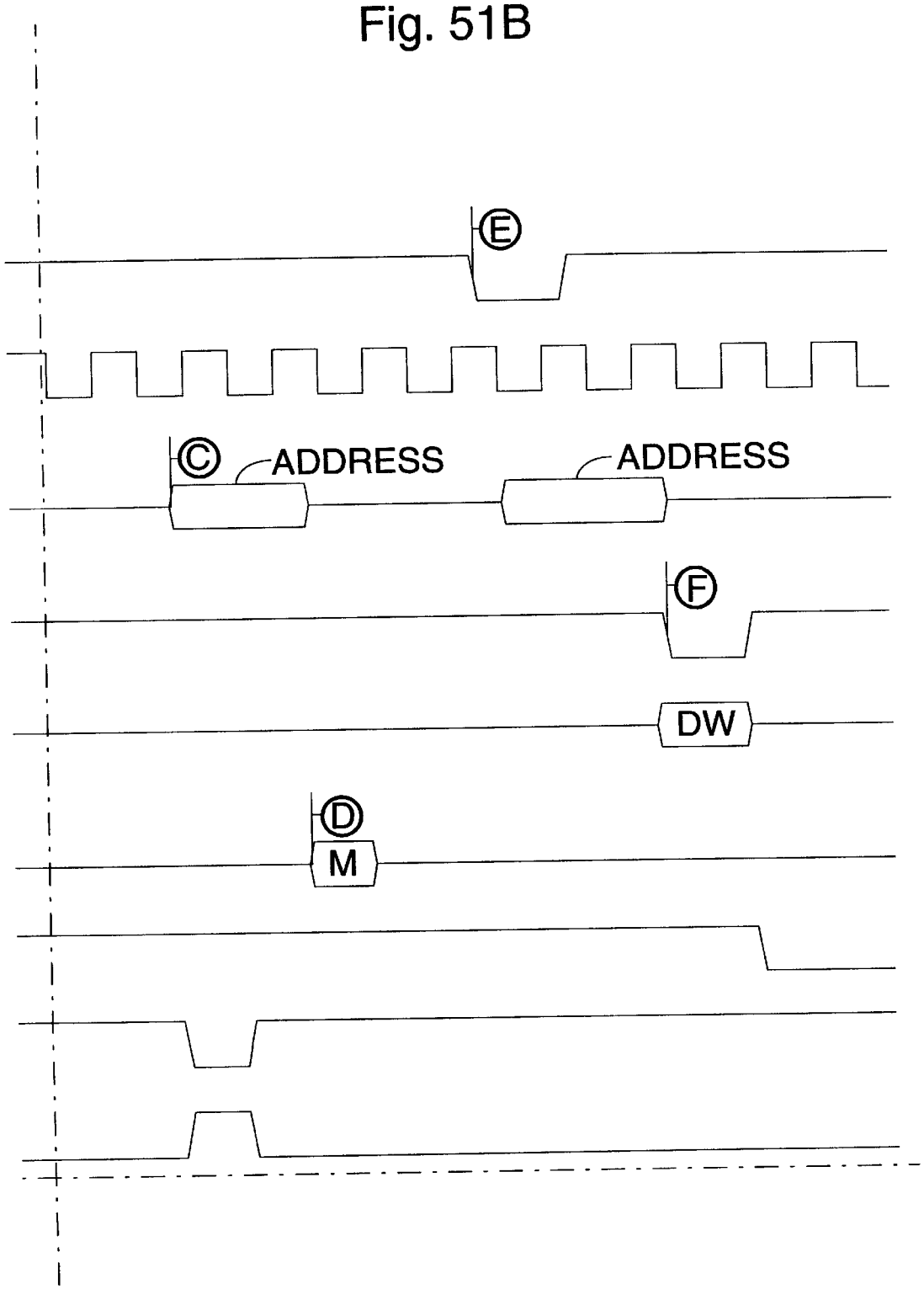
Figure 51C:
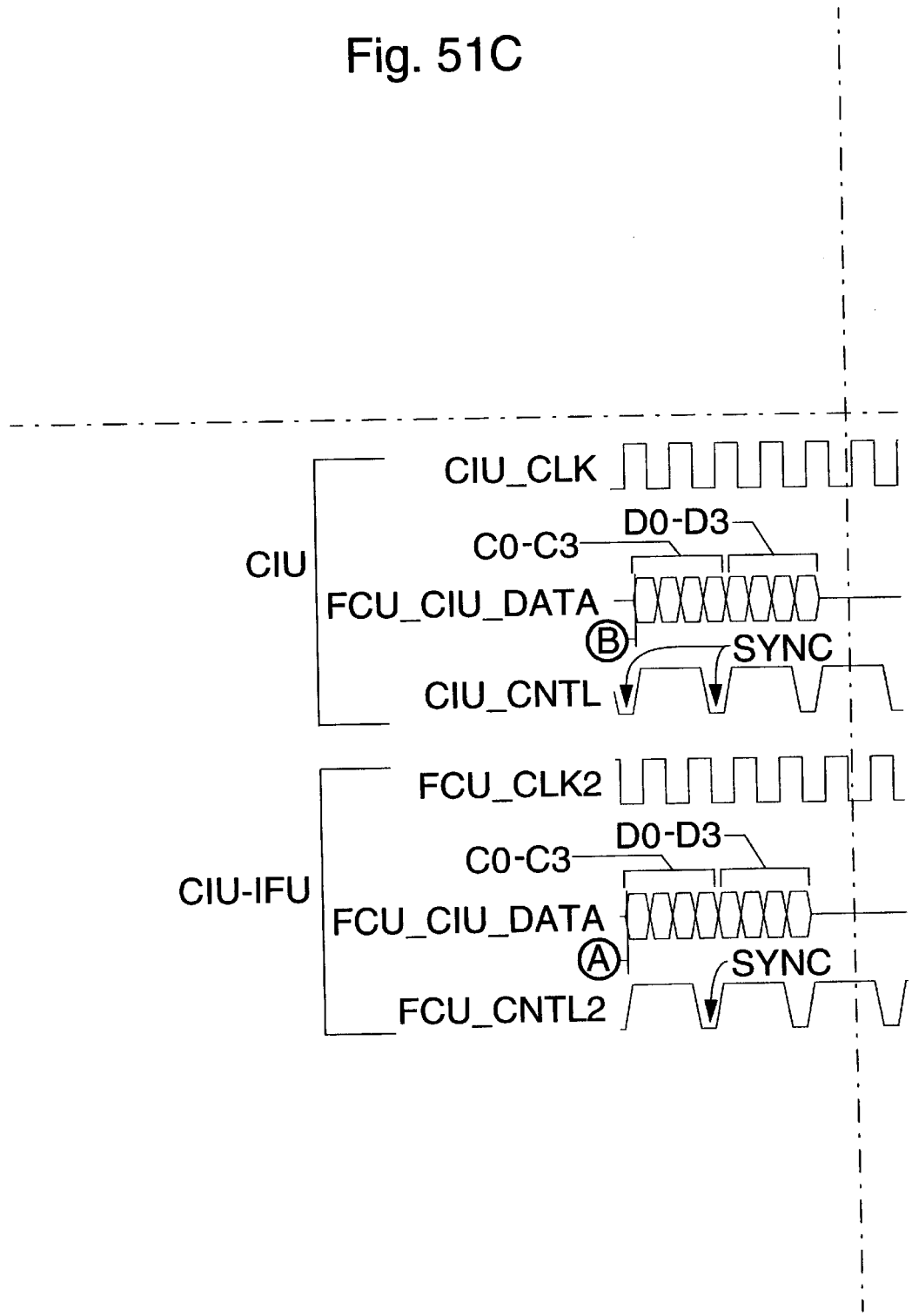
Figure 51D:
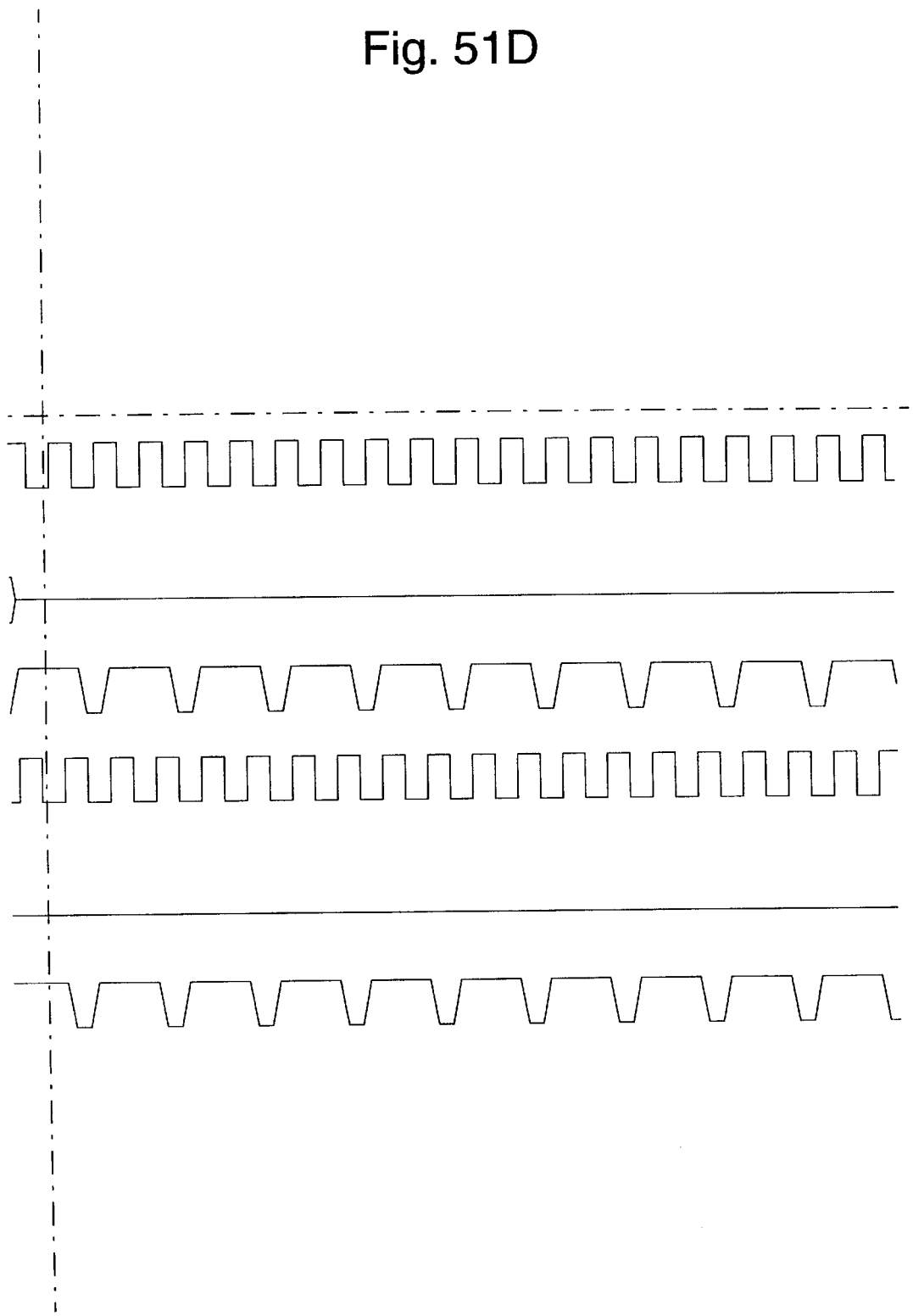
Figure 51E:
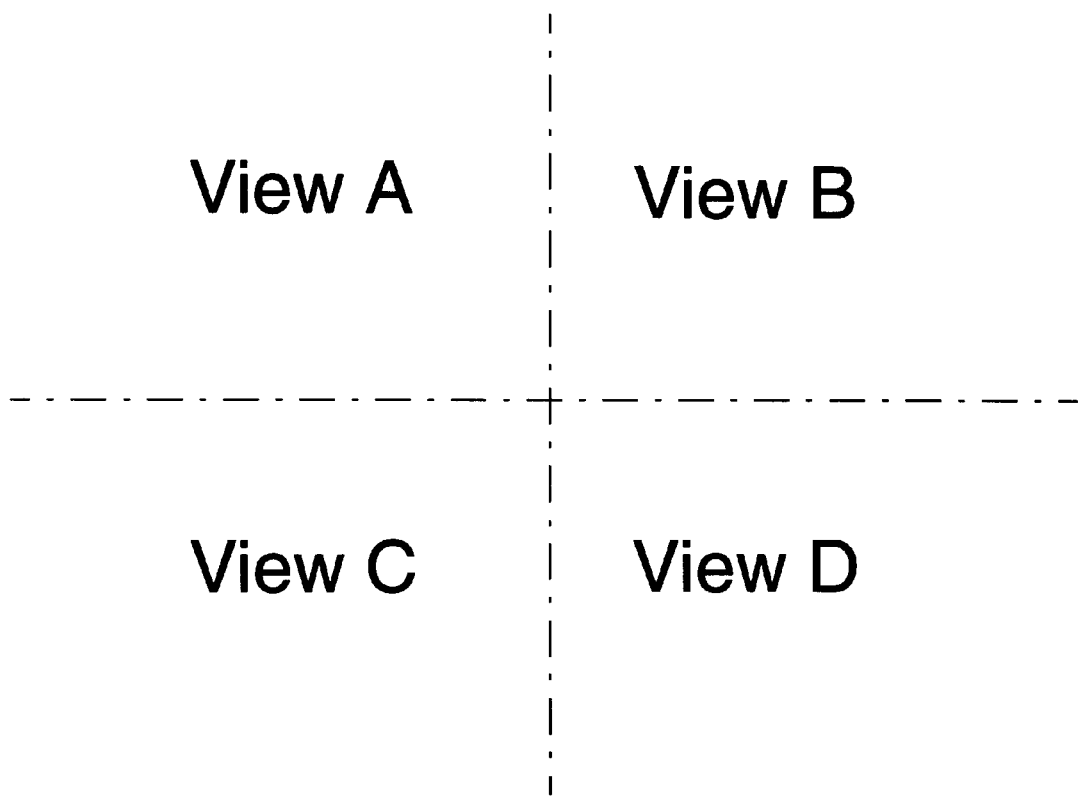
Figure 52A:
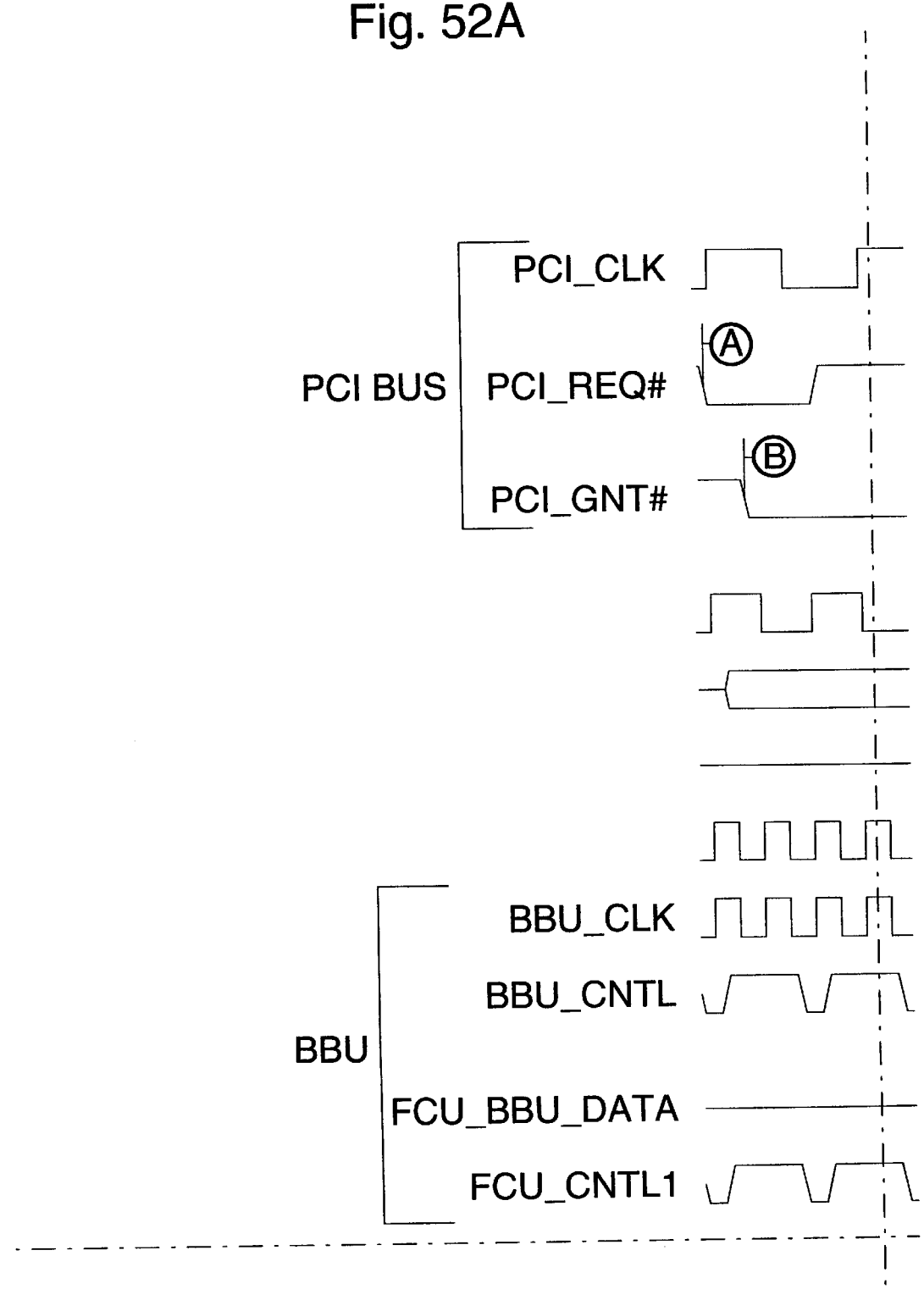
Figure 52B:
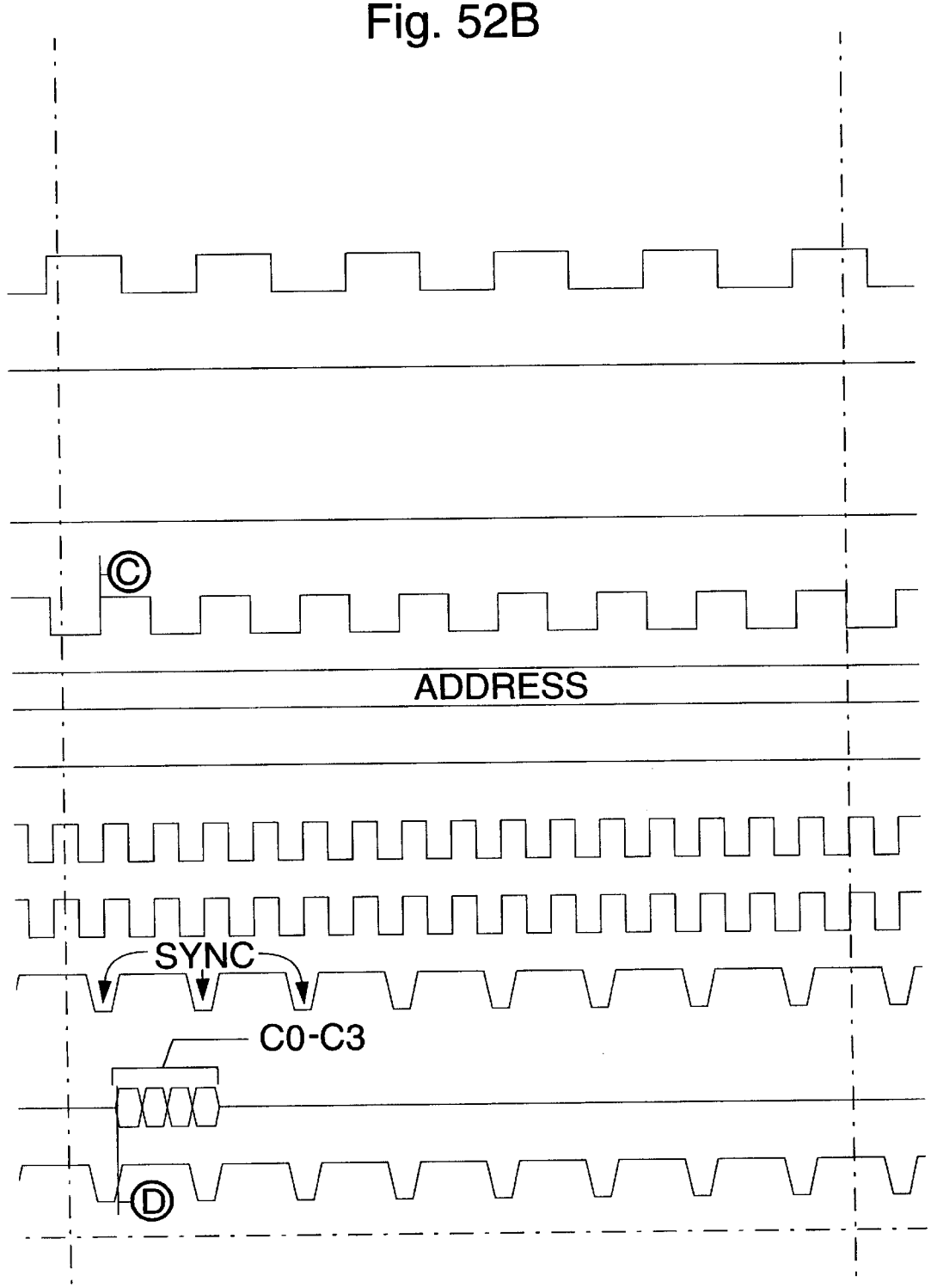
Figure 52C:
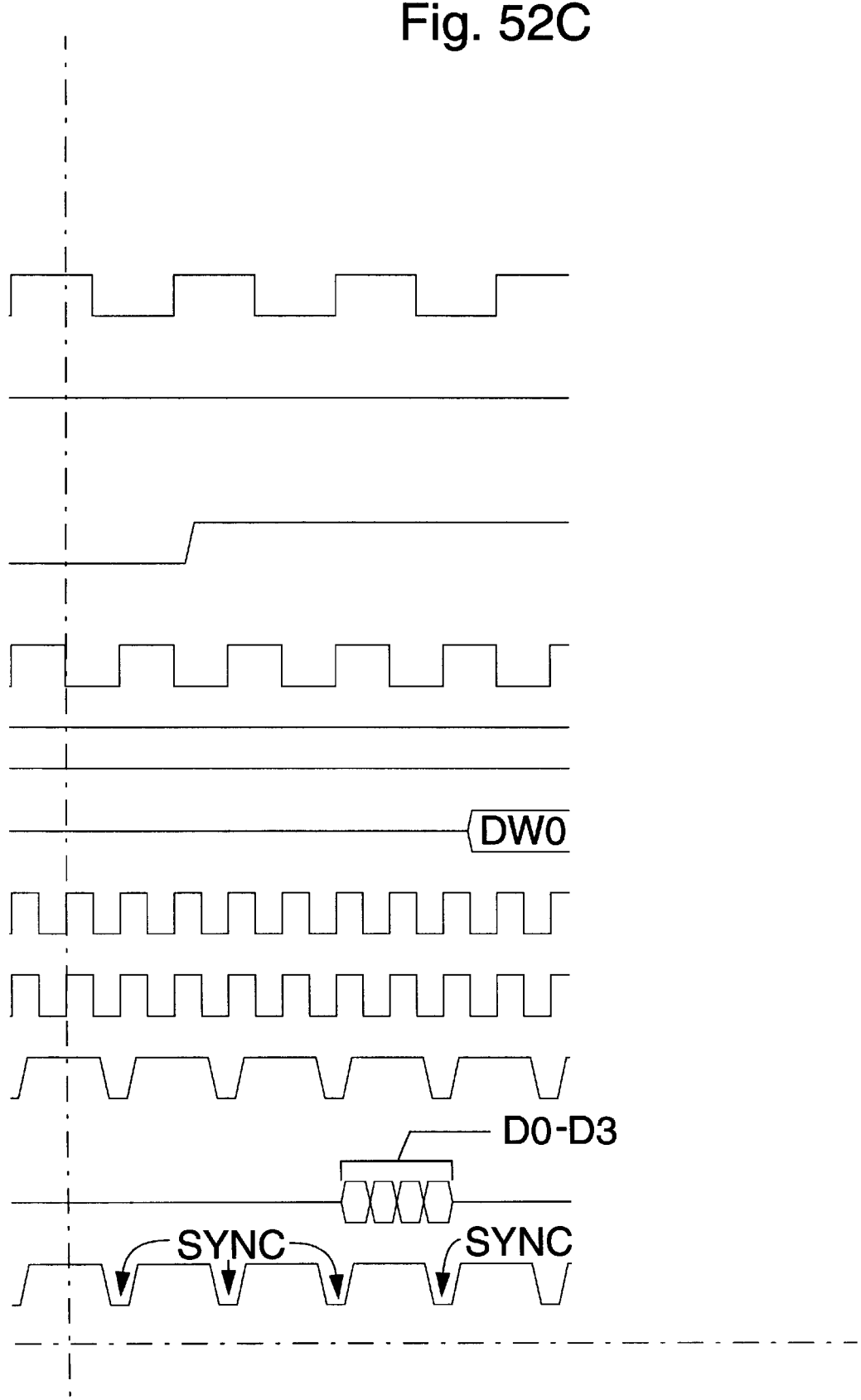
Figure 52D:
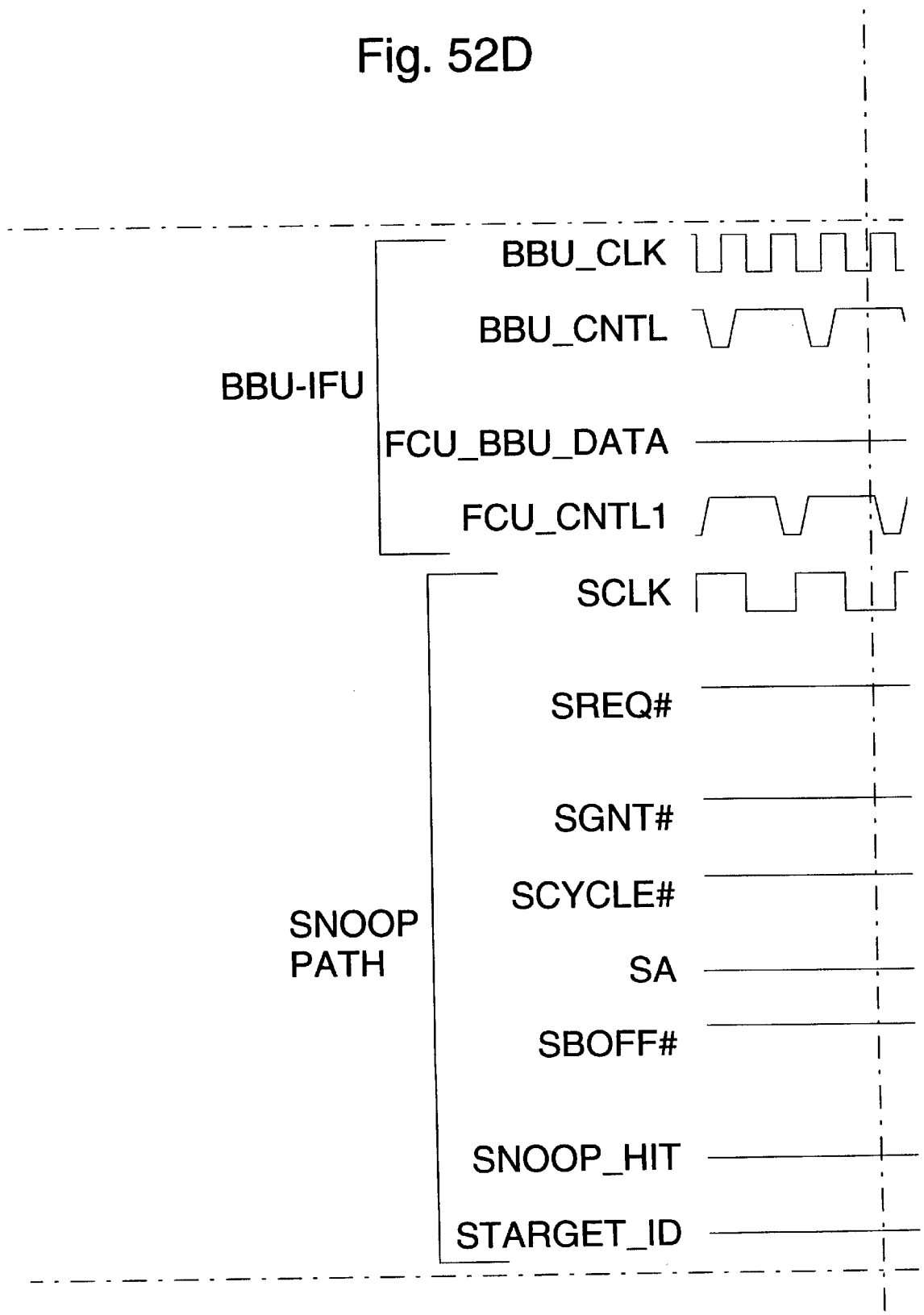
Figure 52E:
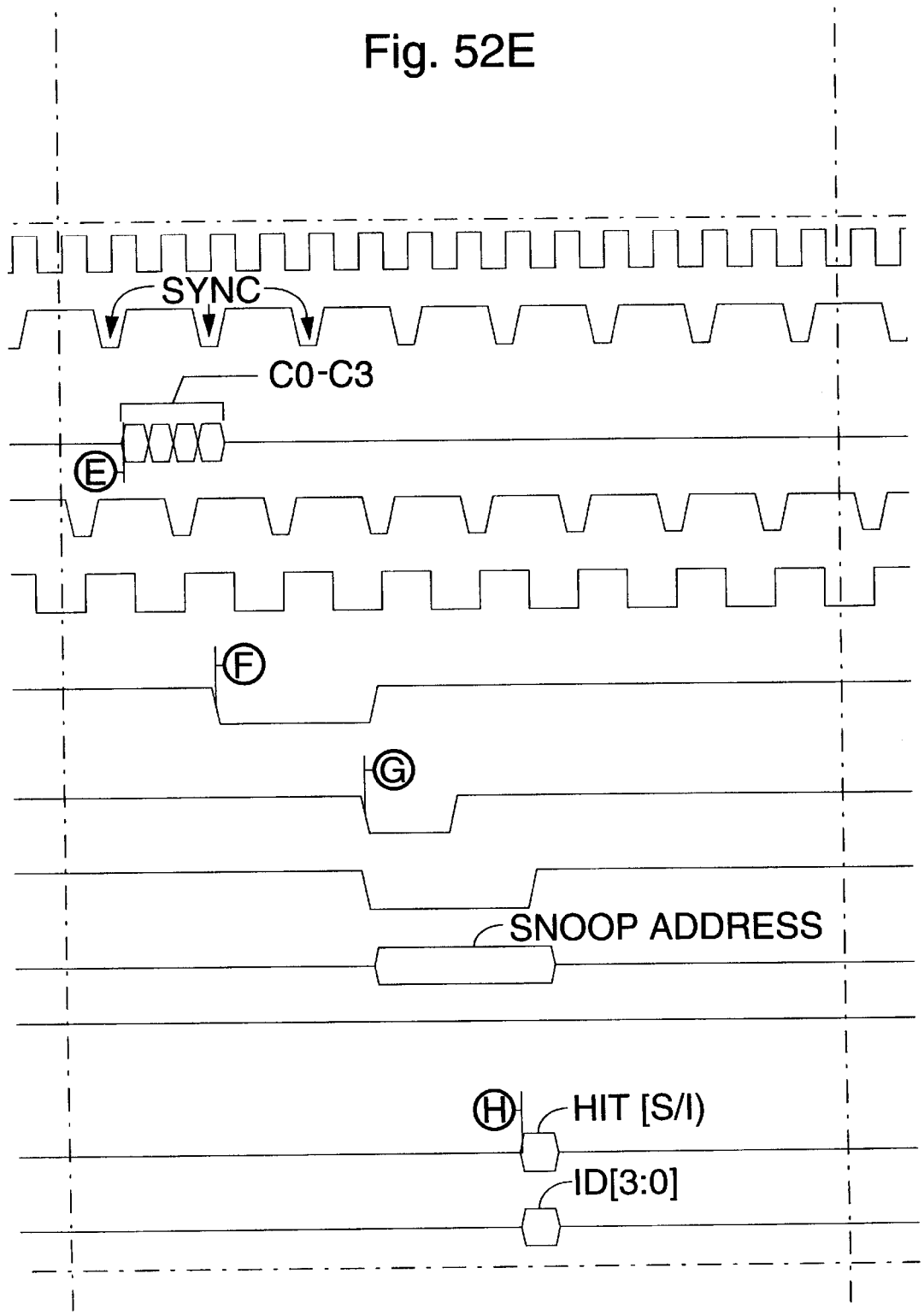
Figure 52F:
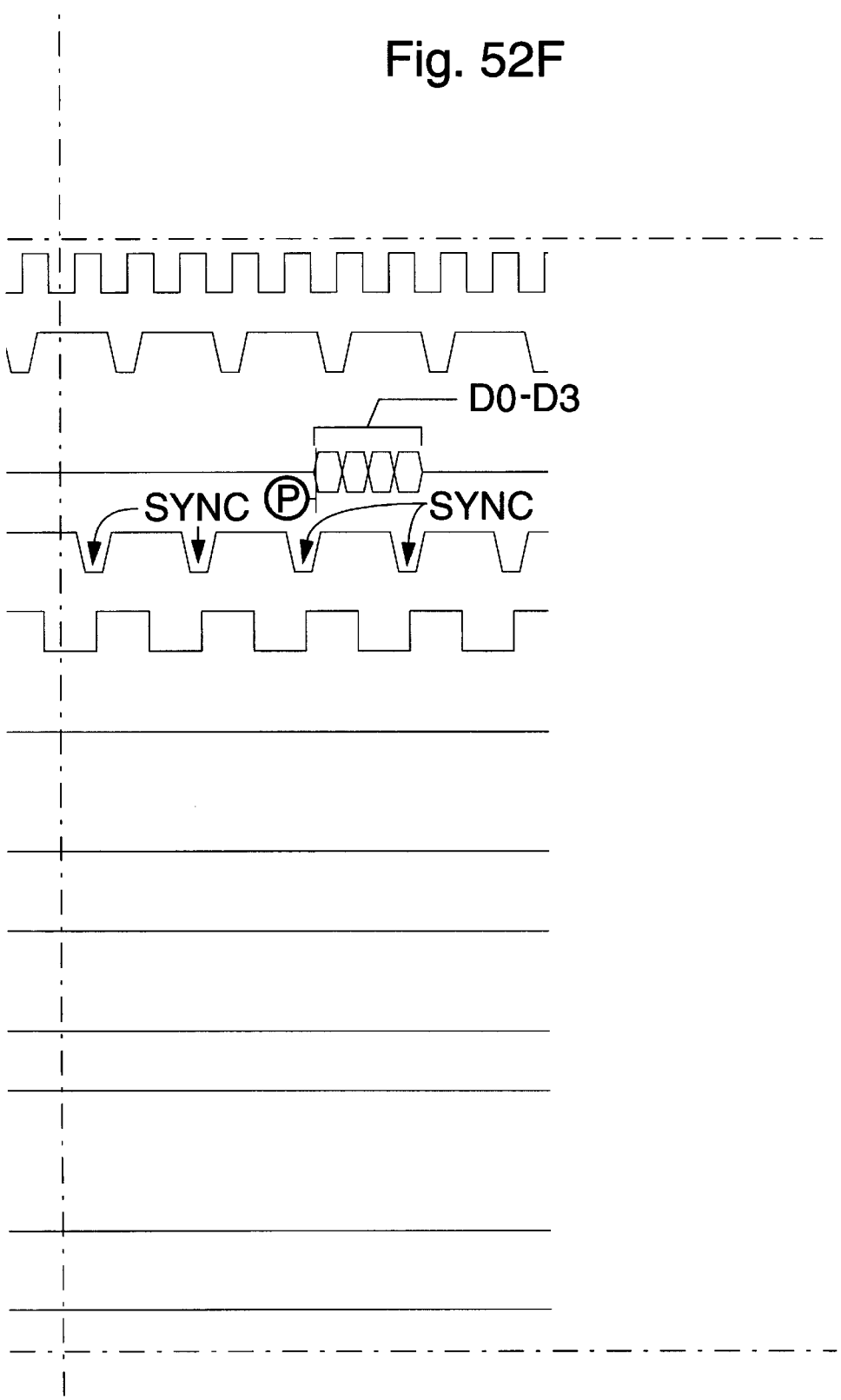
Figure 52G:
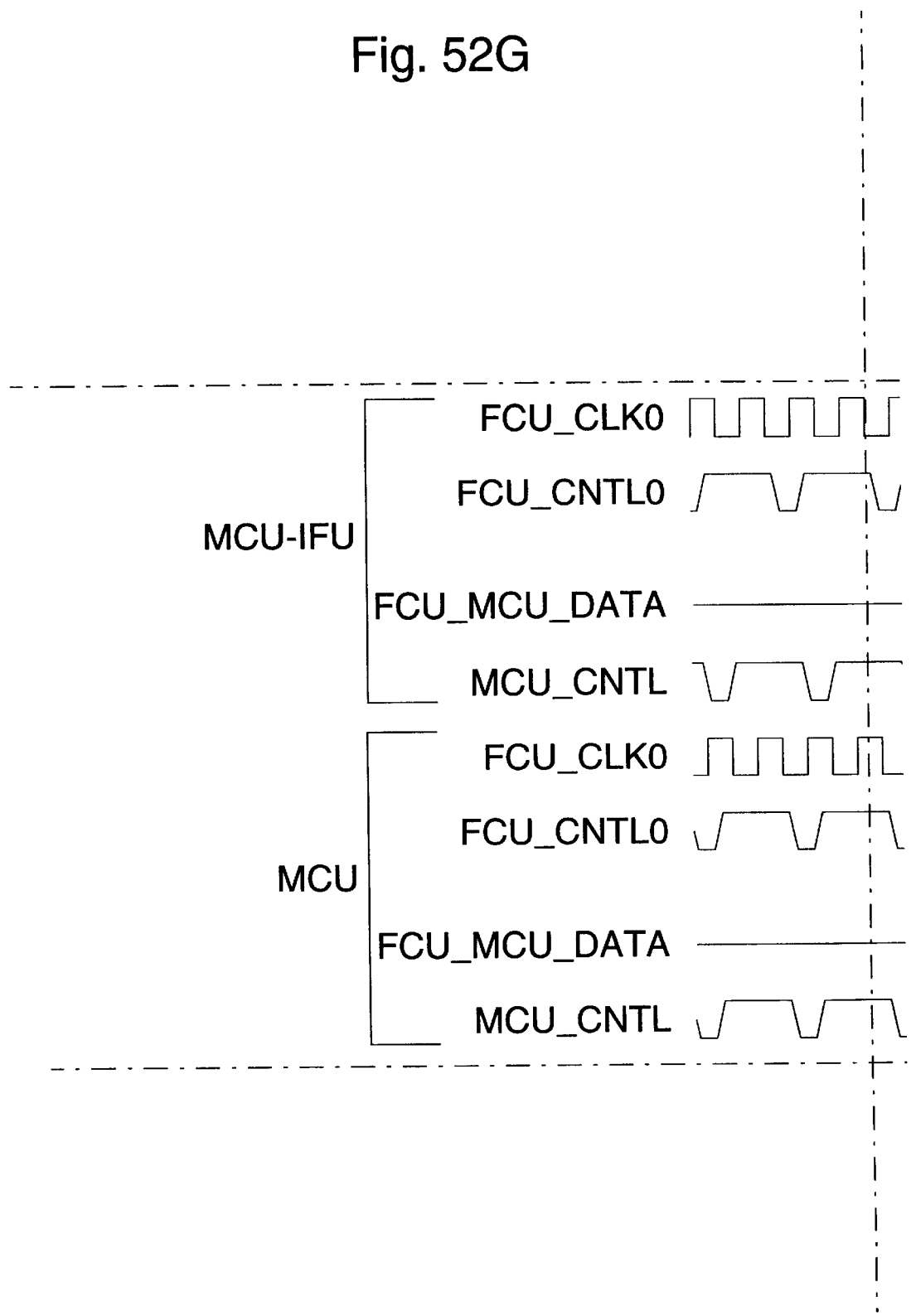
Figure 52H:
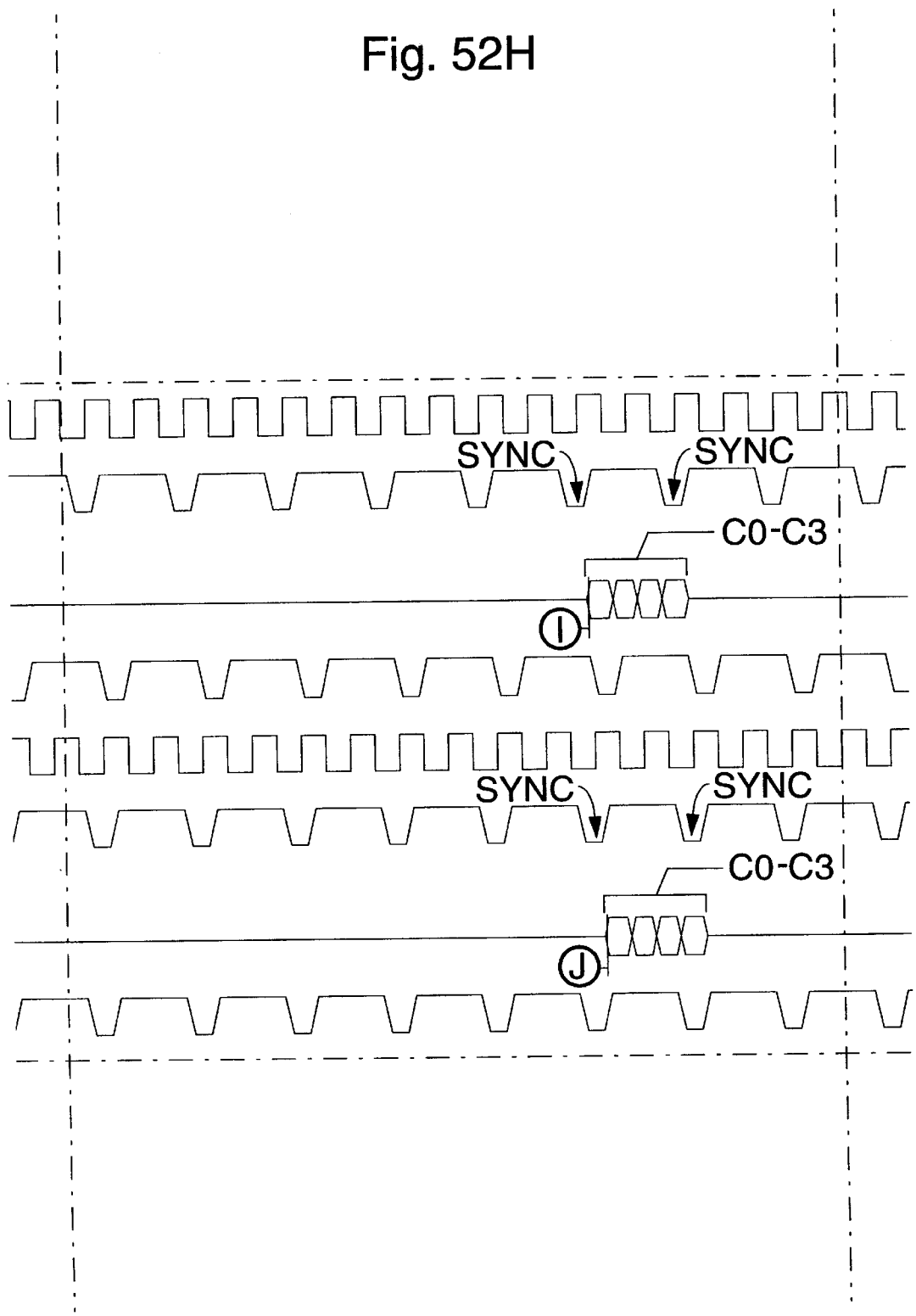
Figure 52I:
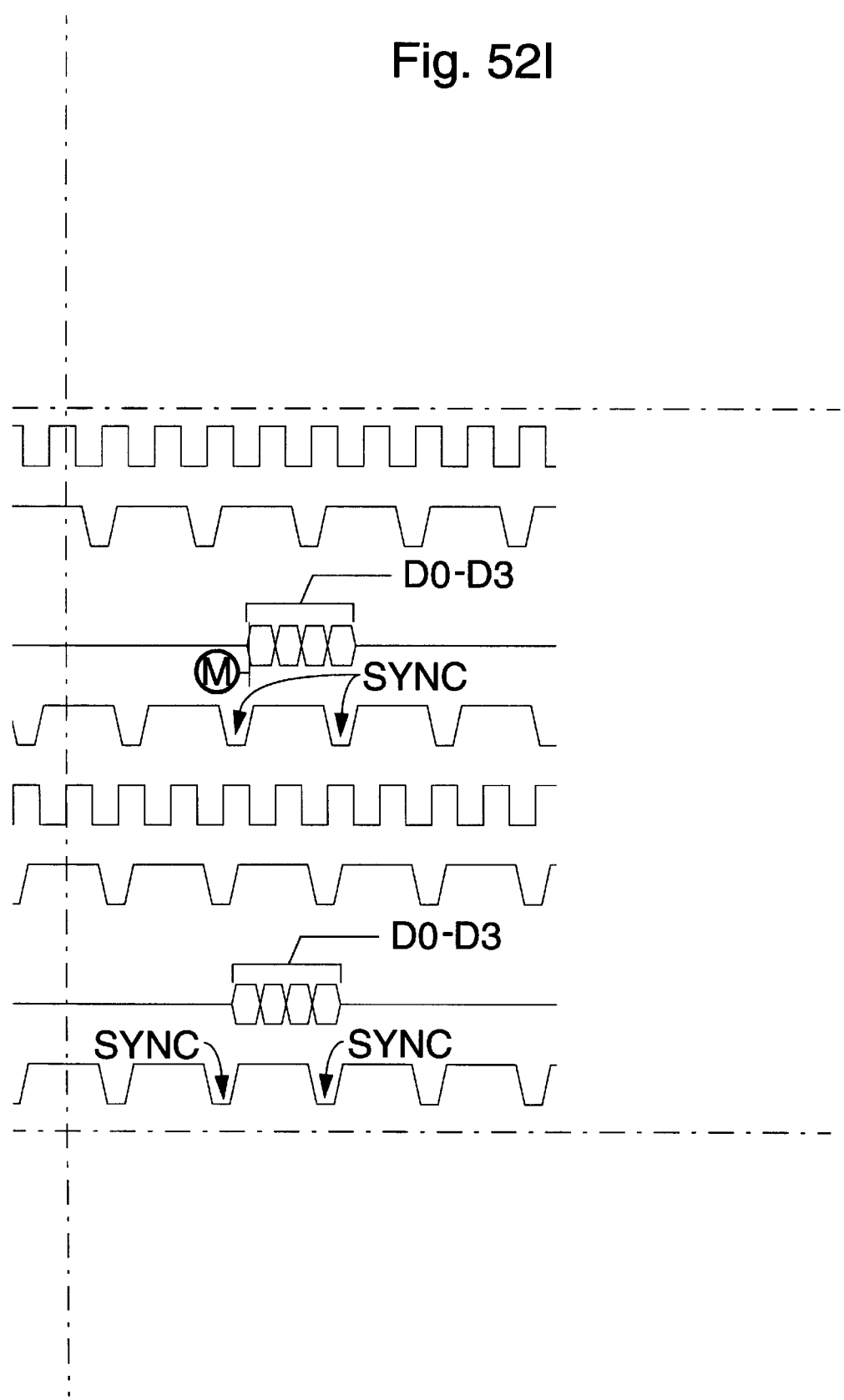
Figure 52J:
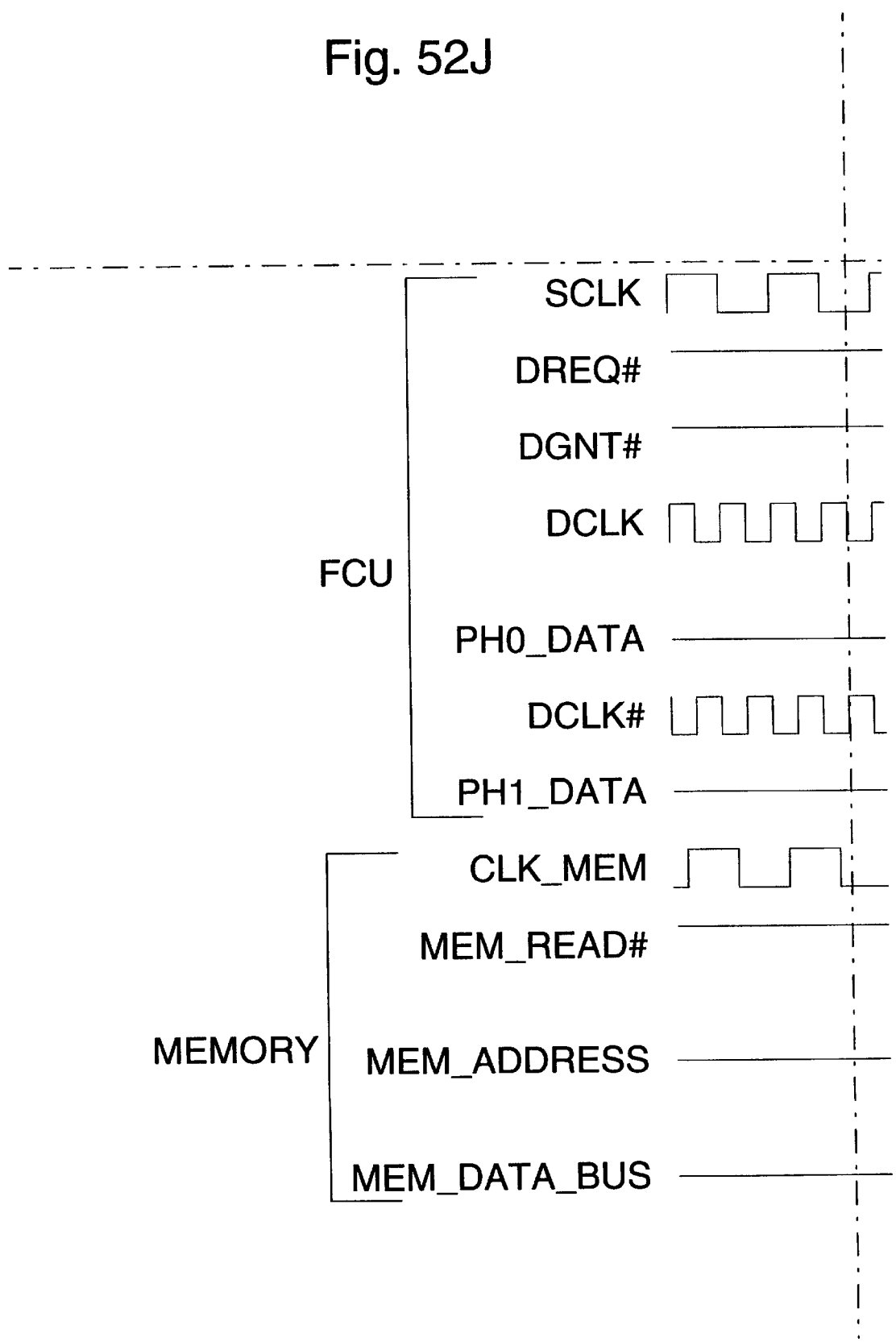
Figure 52K:
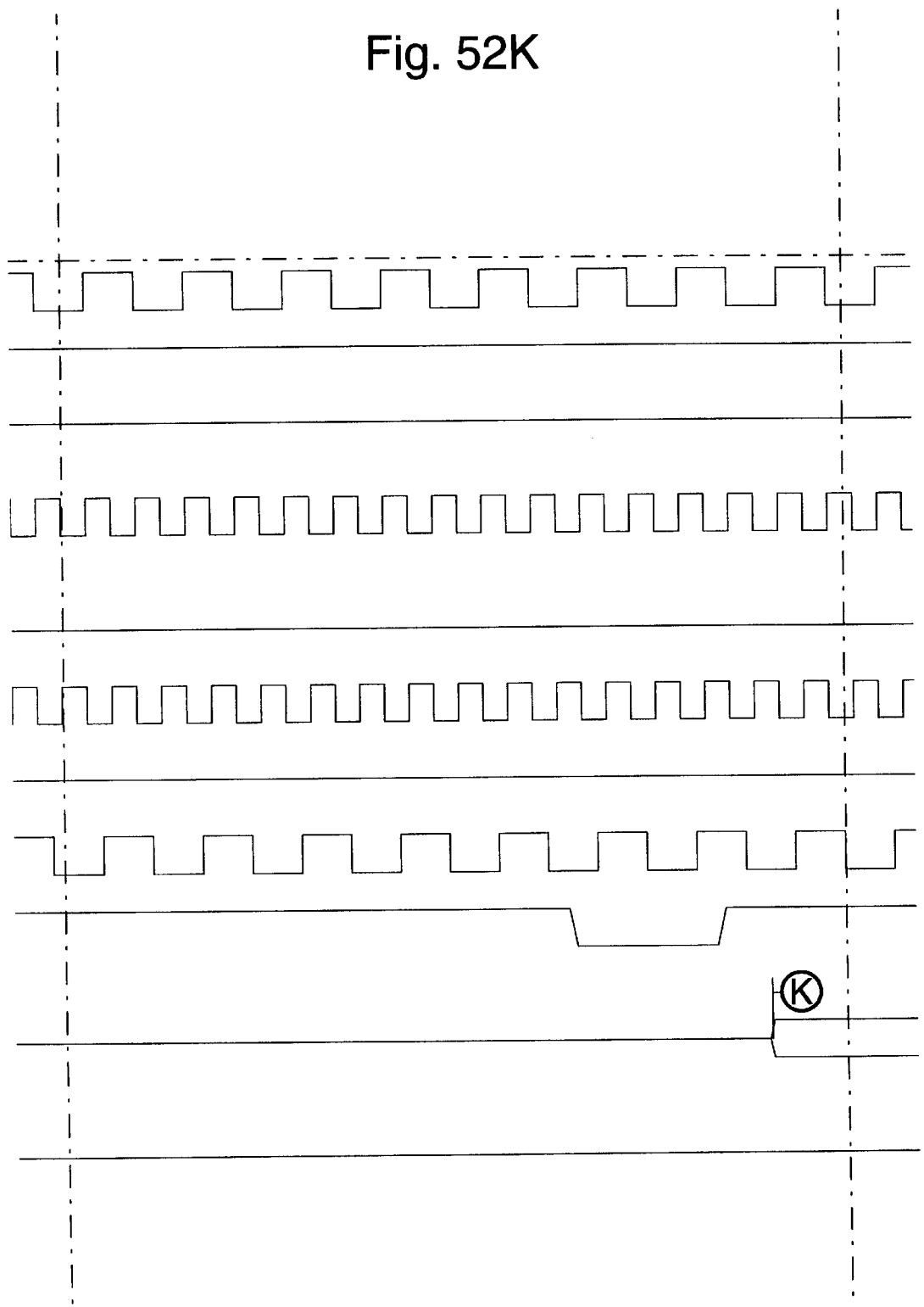
Figure 52L:
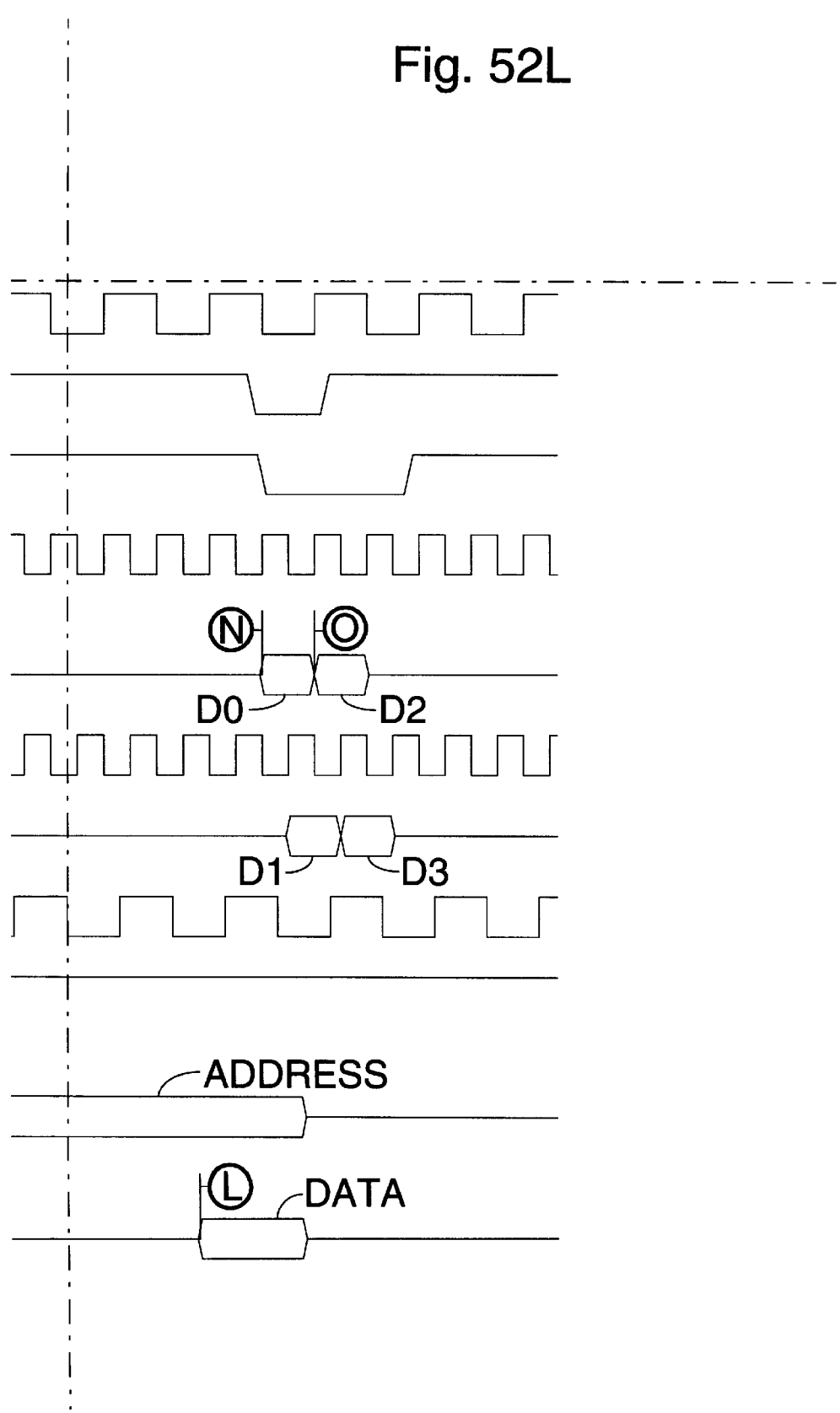
Figure 52M:
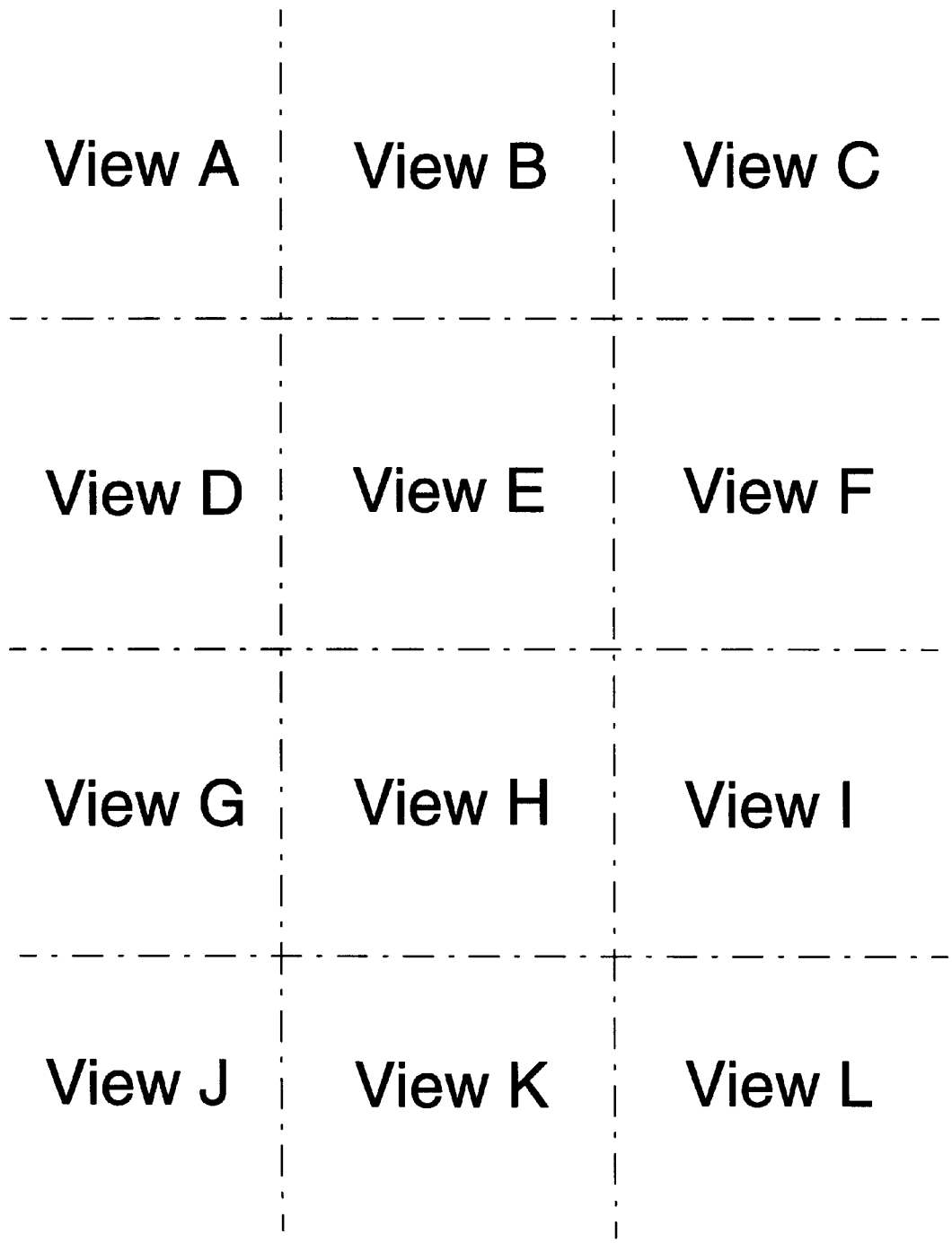
Figure 53A:
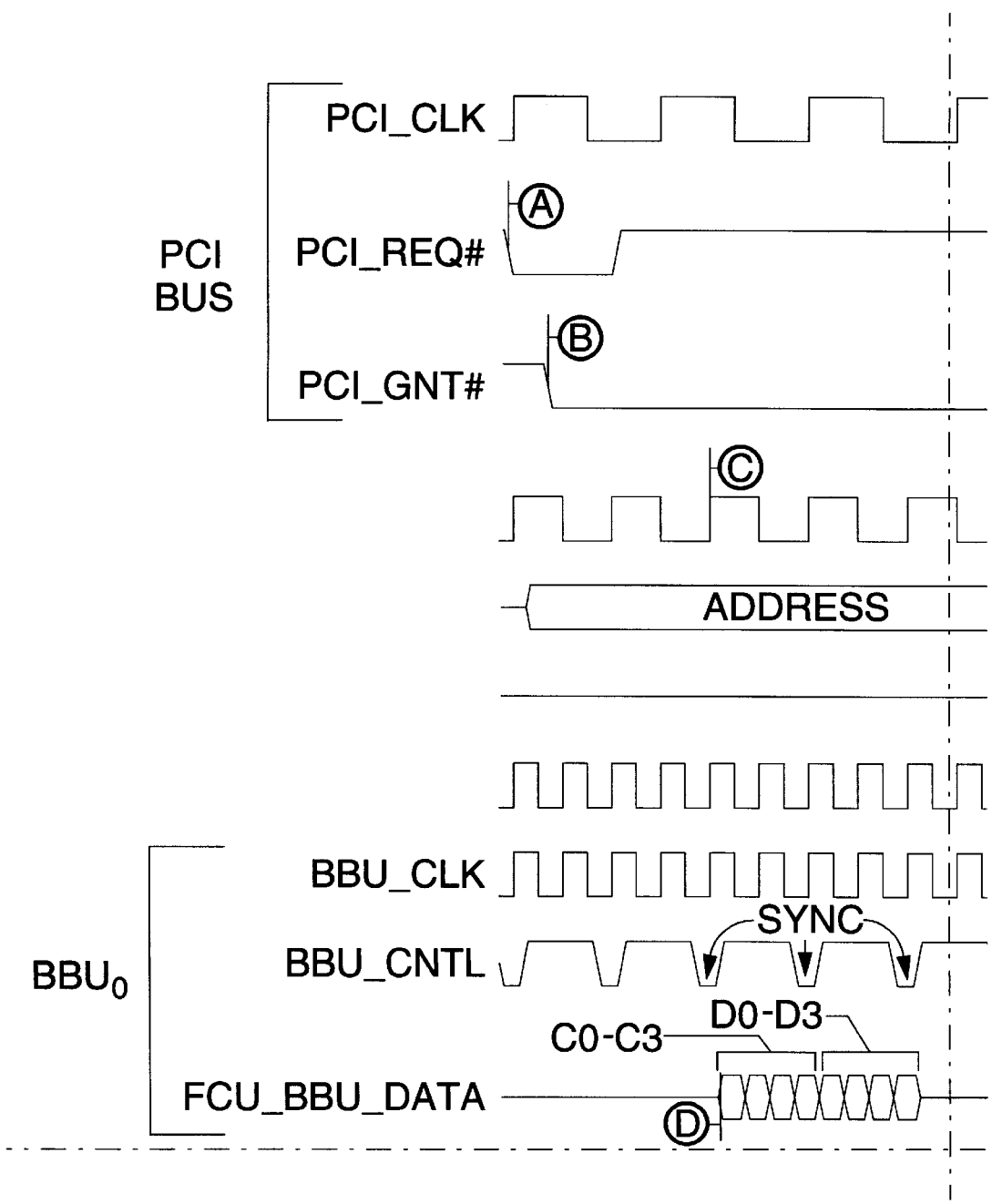
Figure 53B:
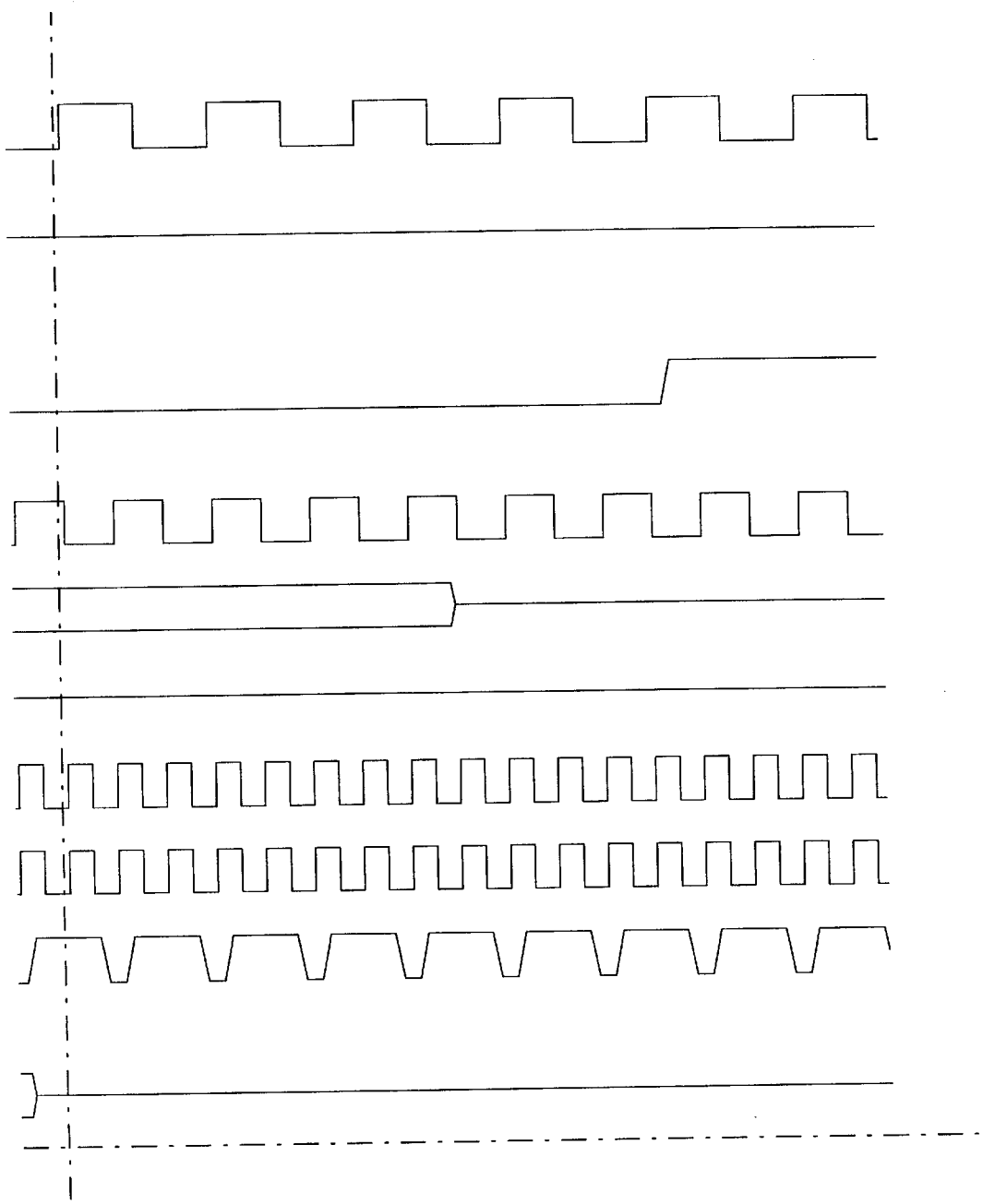
Figure 53C:
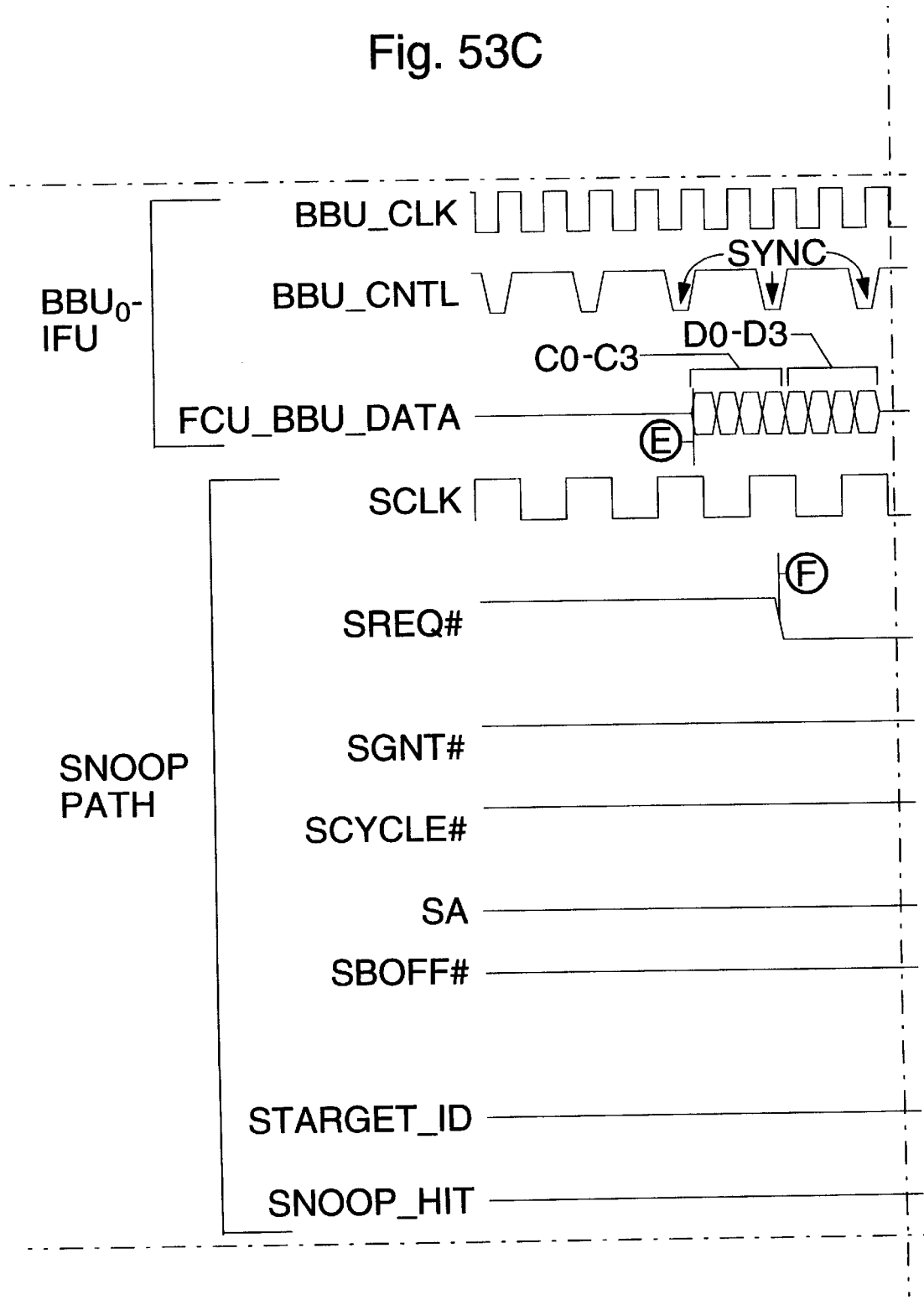
Figure 53D:
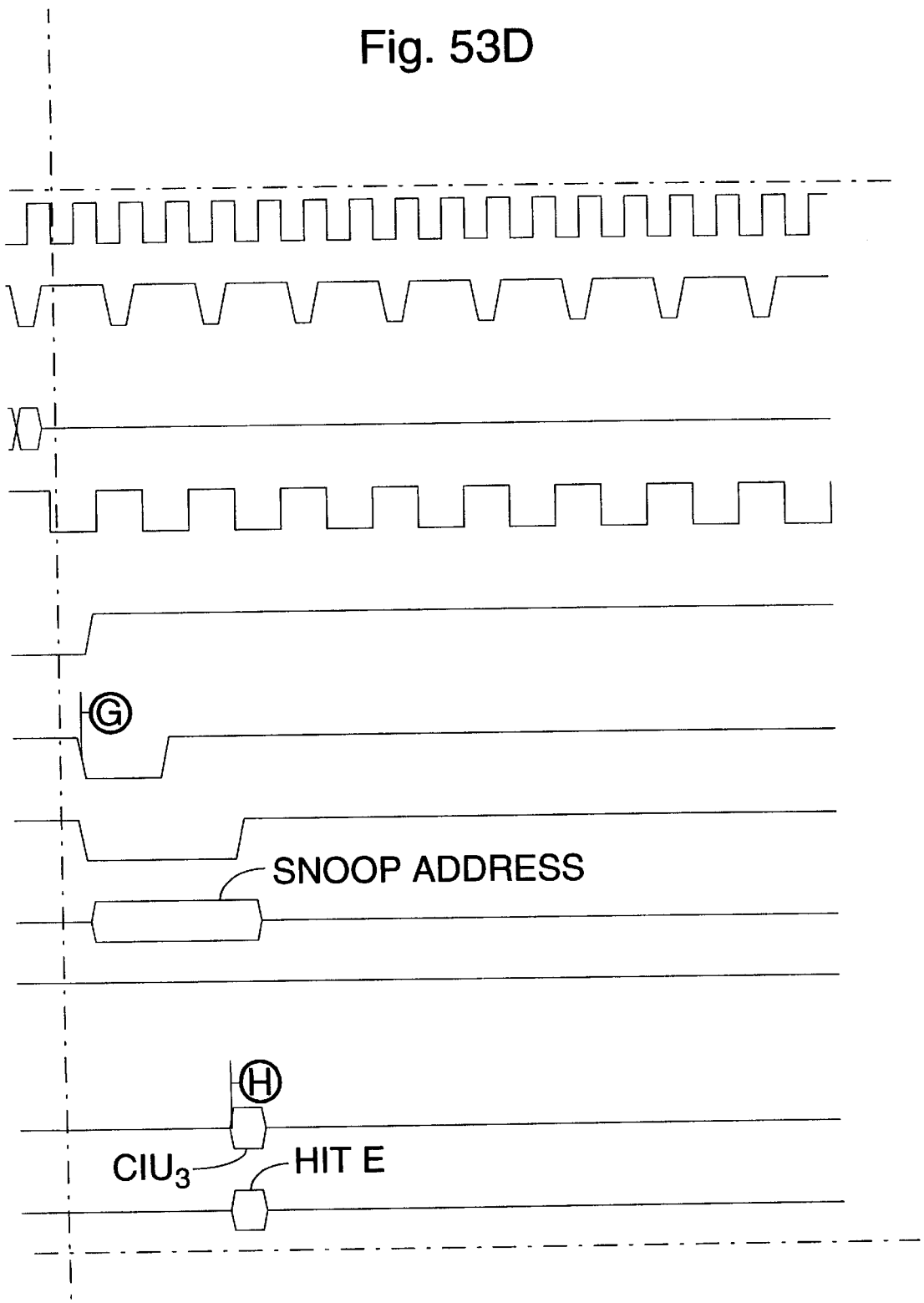
Figure 53E:
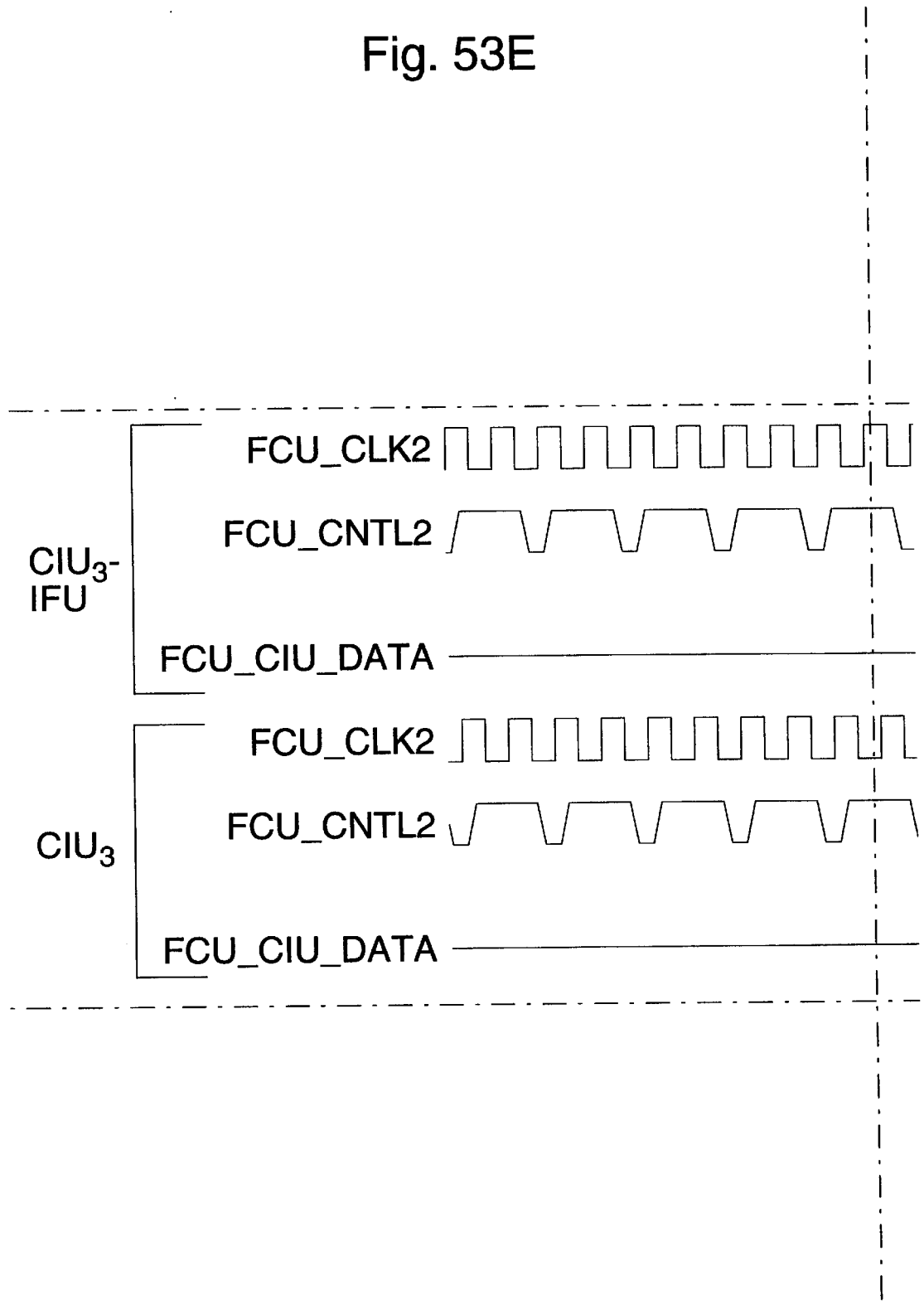
Figure 53F:
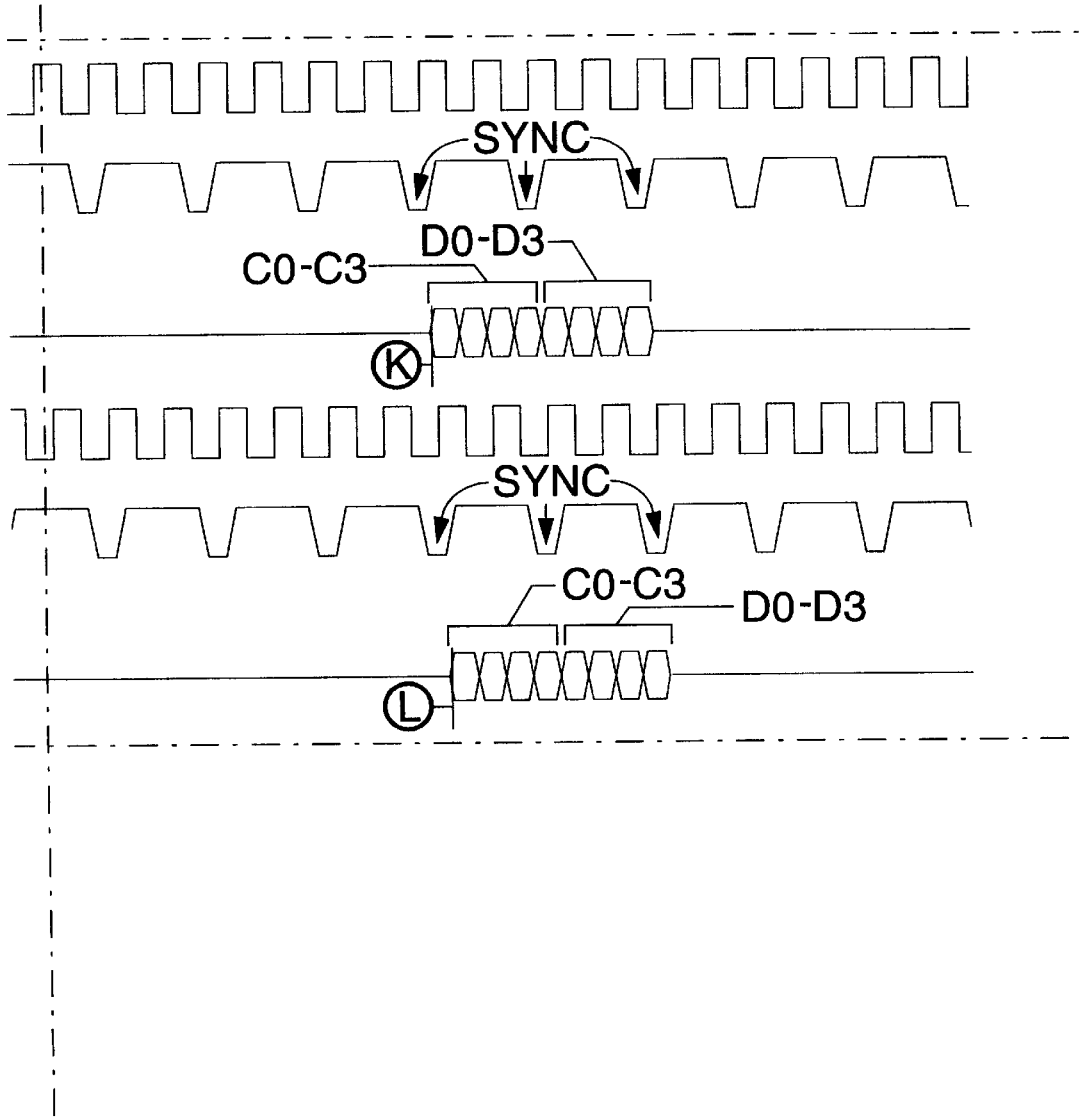
Figure 53G:
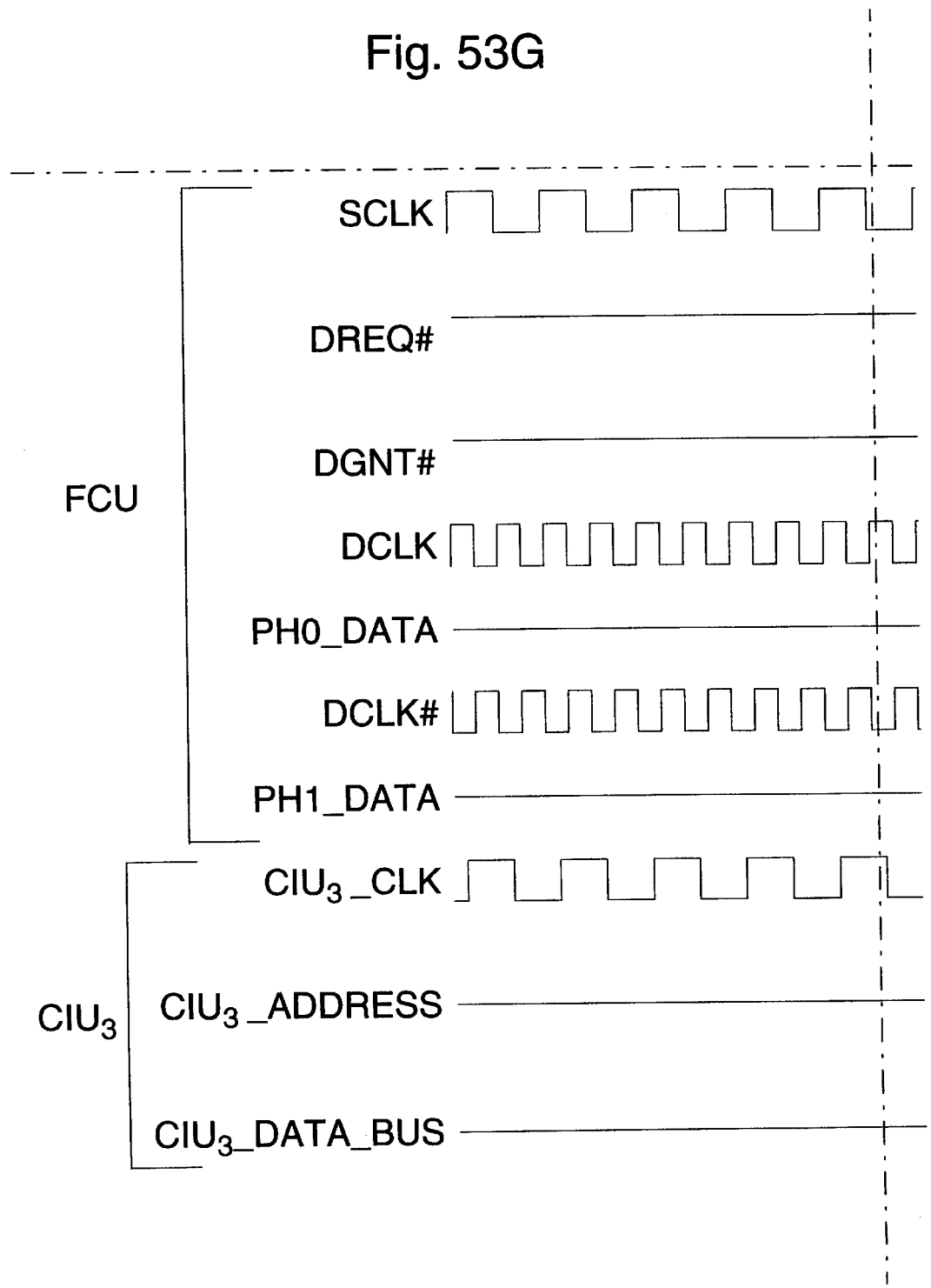
Figure 53H:
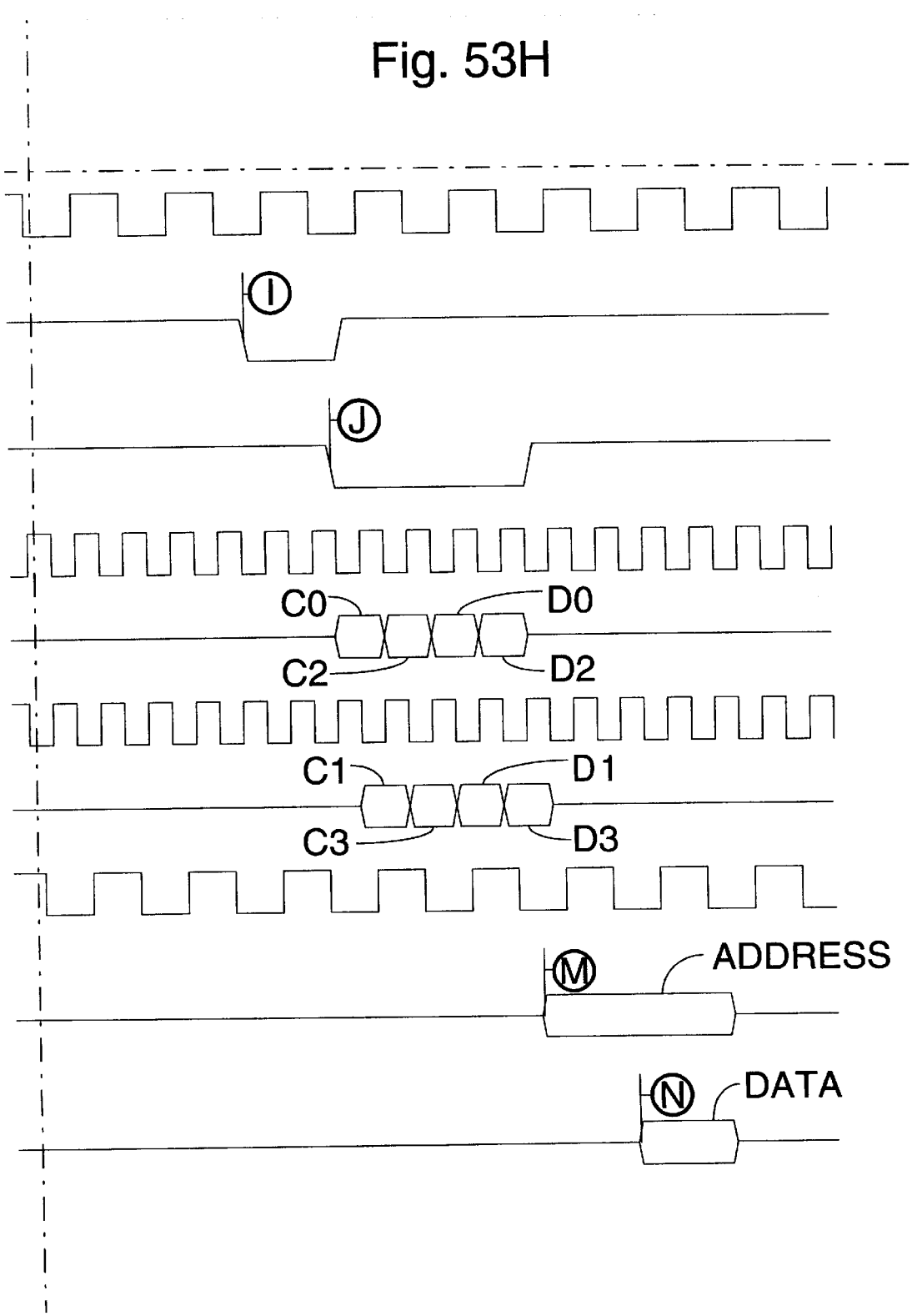
Figure 54A:
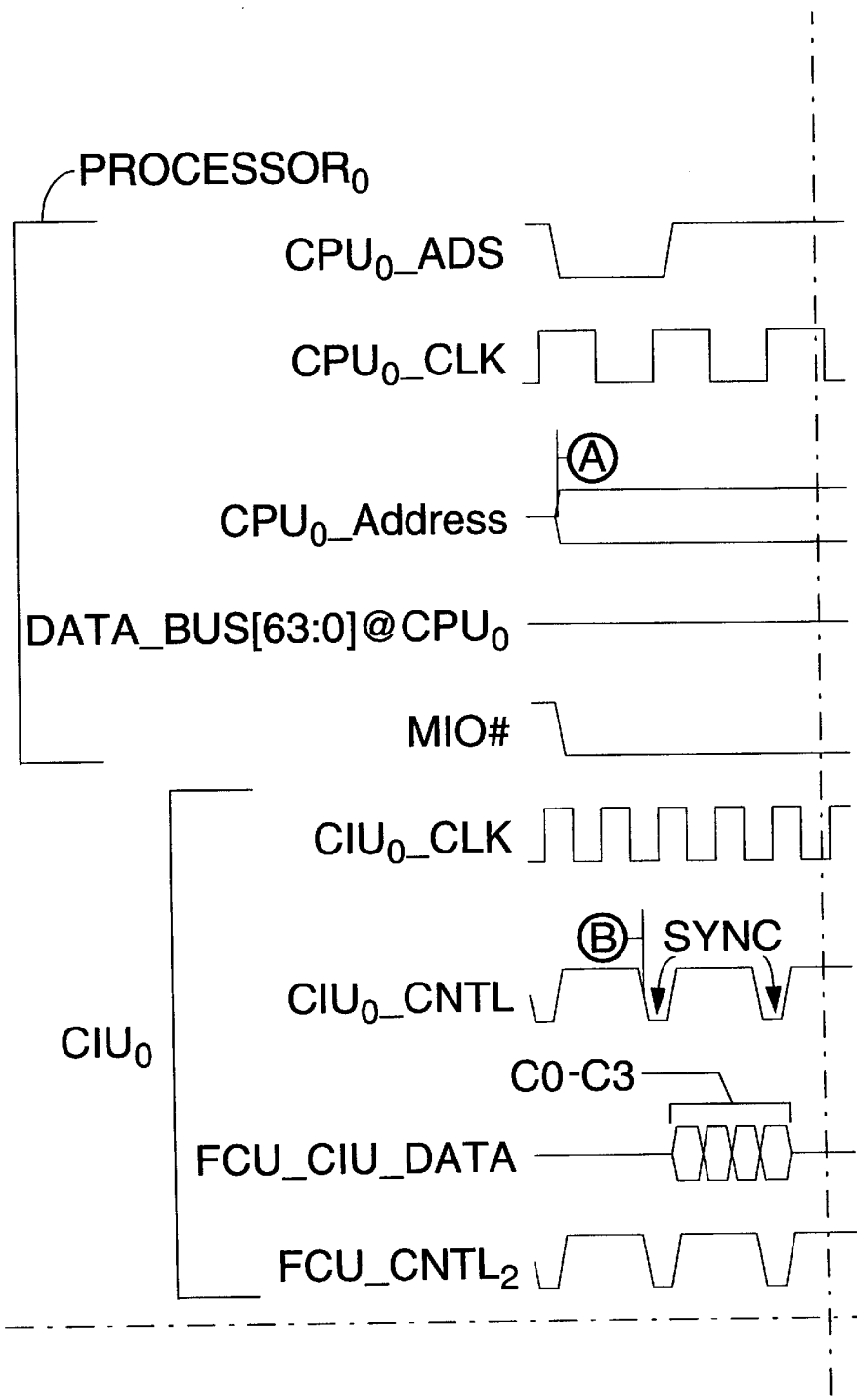
Figure 54B:
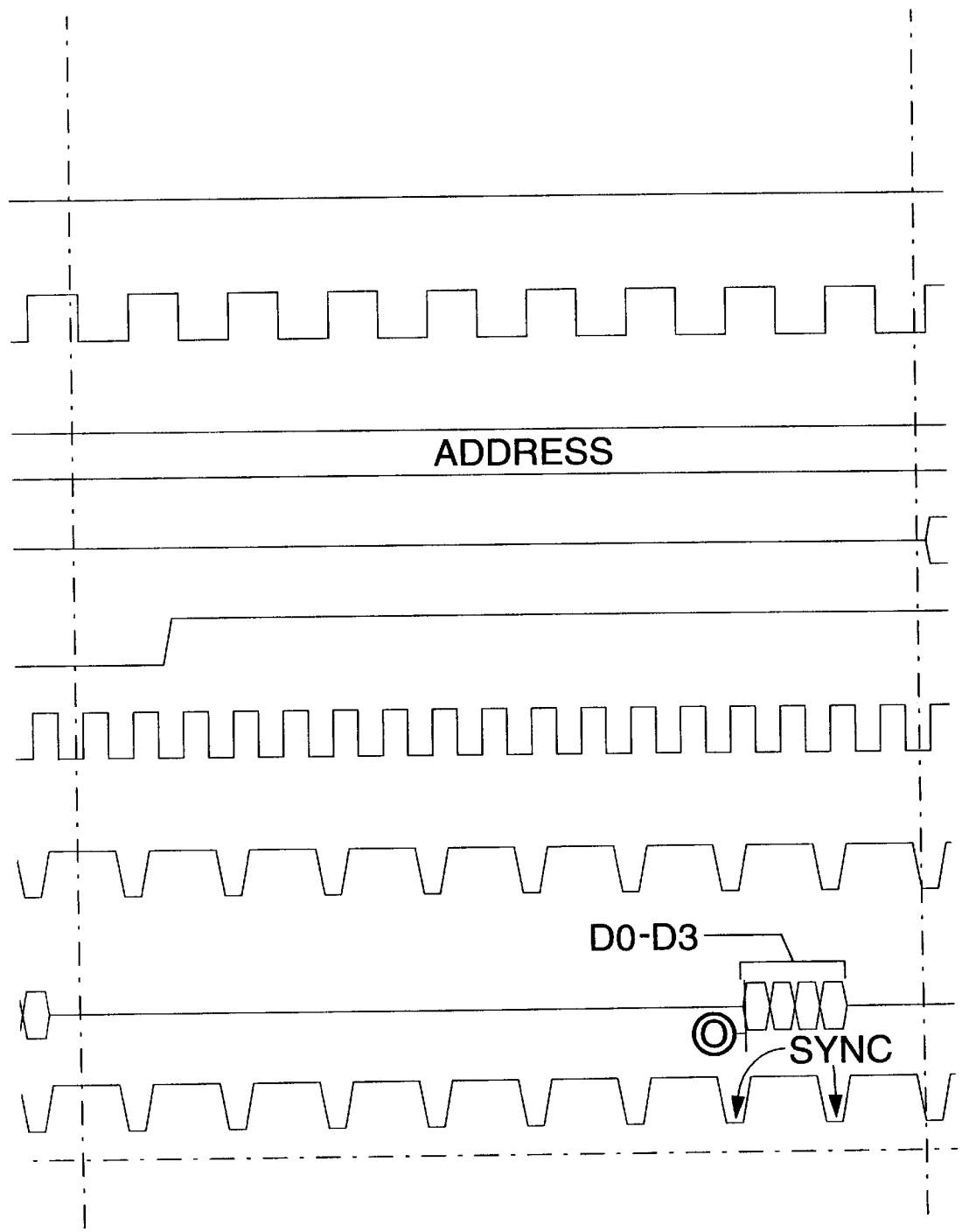
Figure 54C:
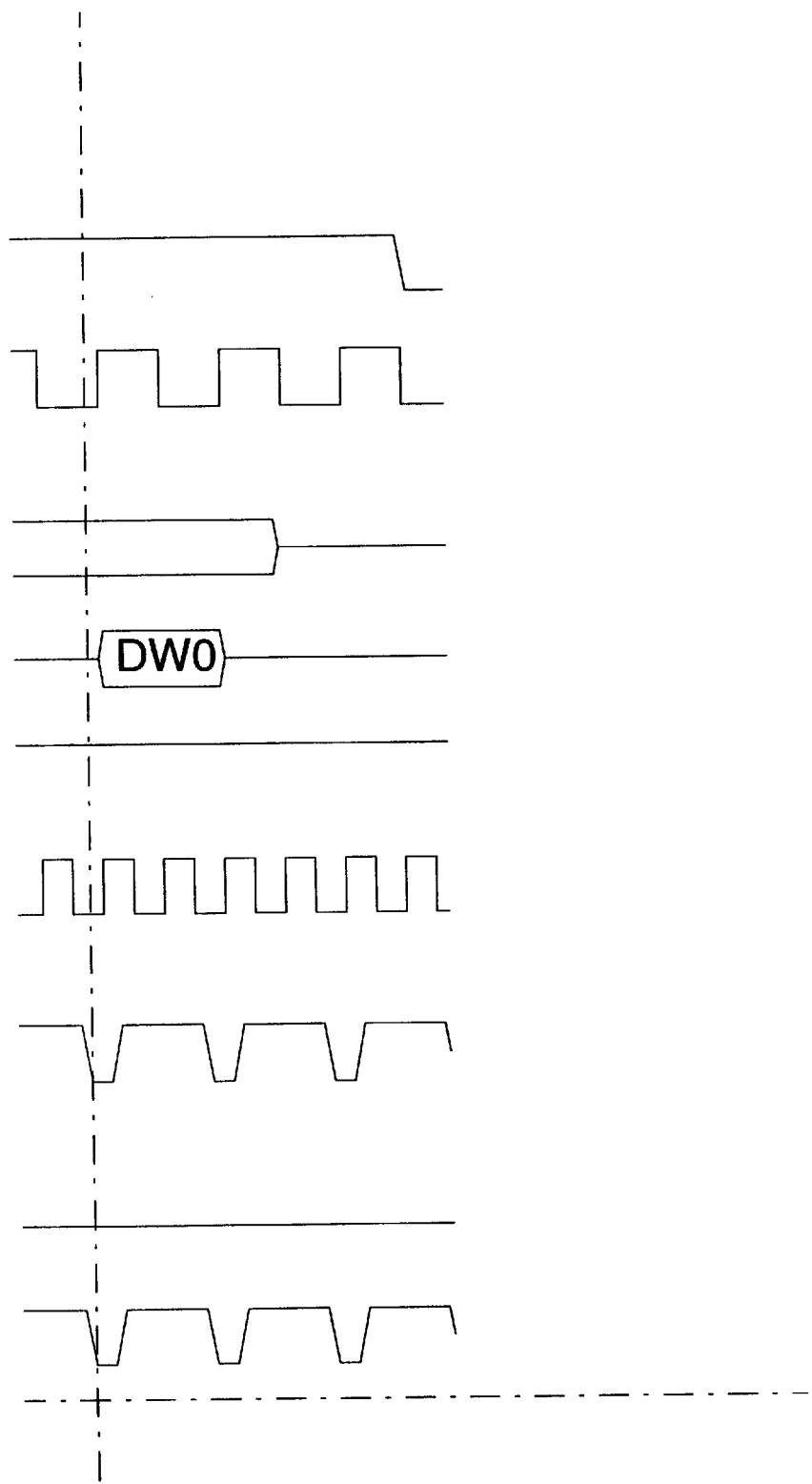
Figure 54D:
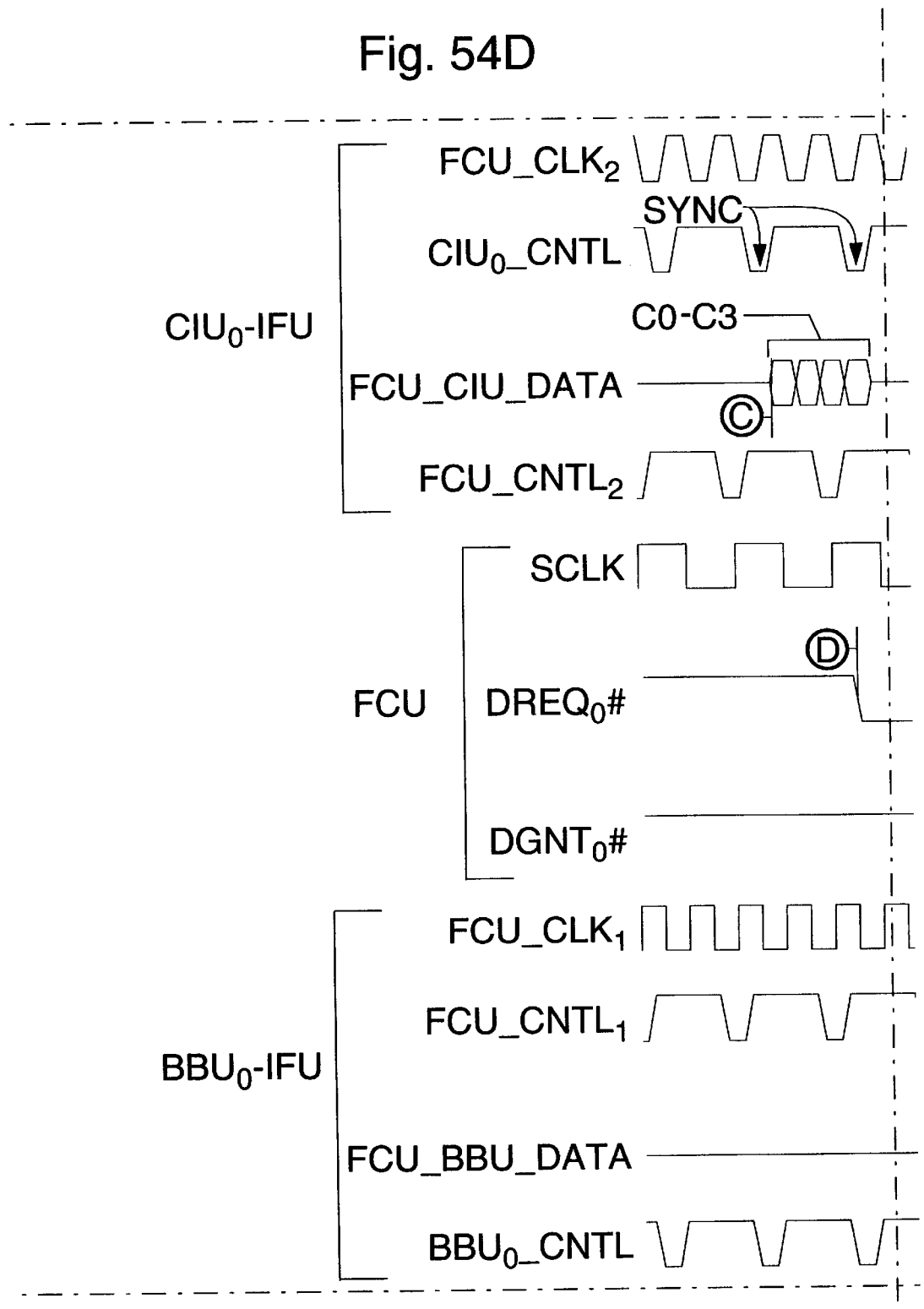
Figure 54E:
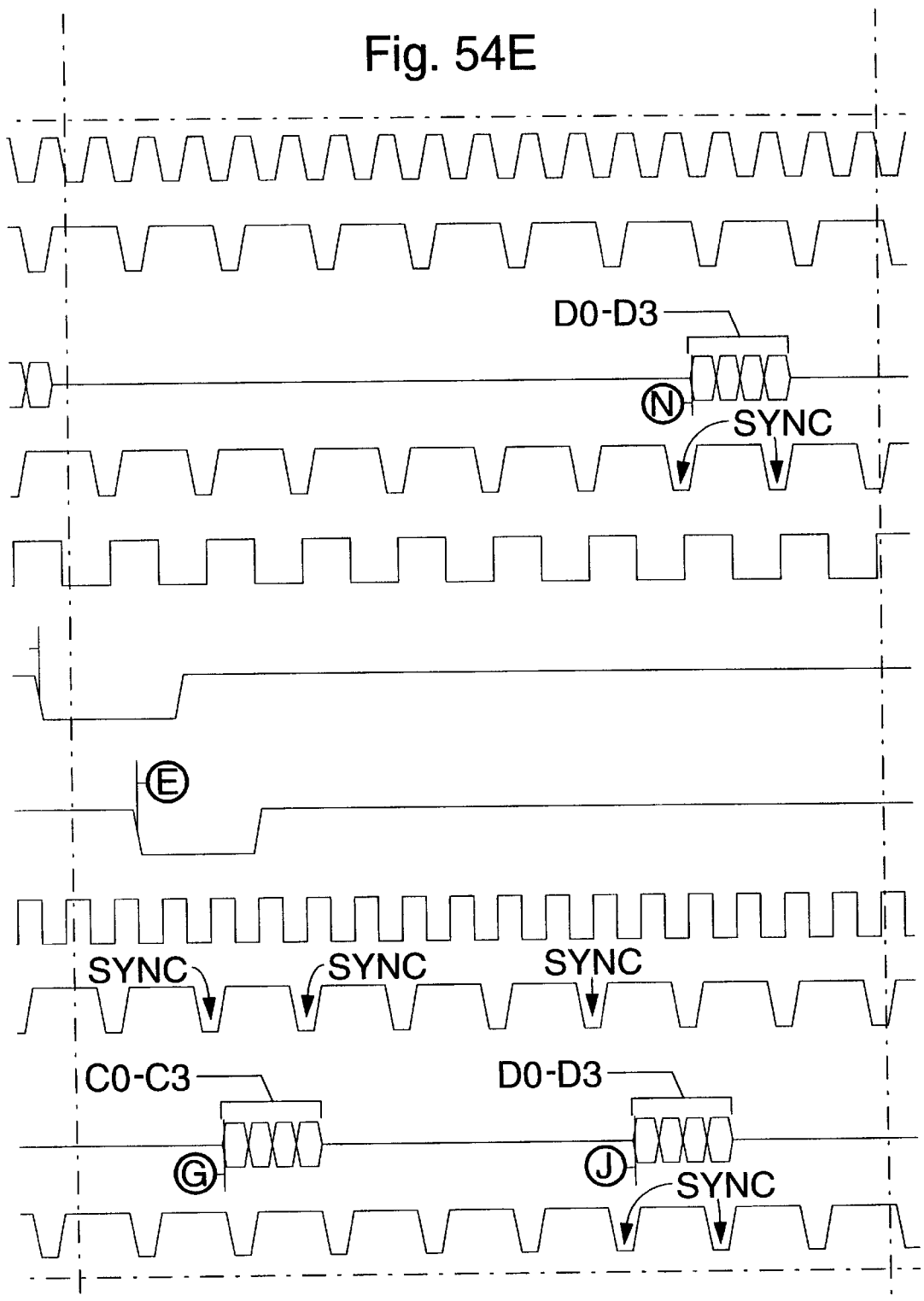
Figure 54F:
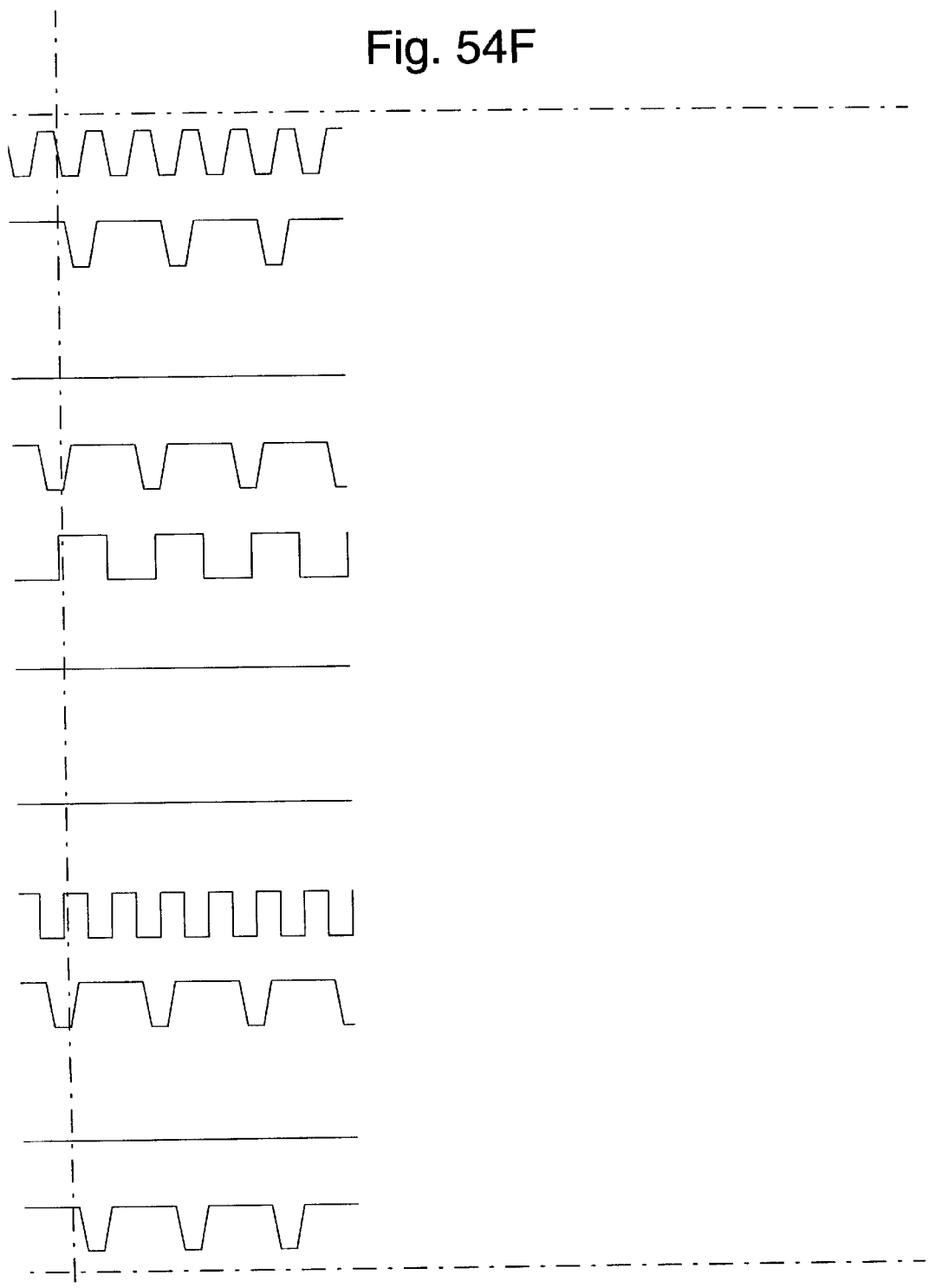
Figure 54G:
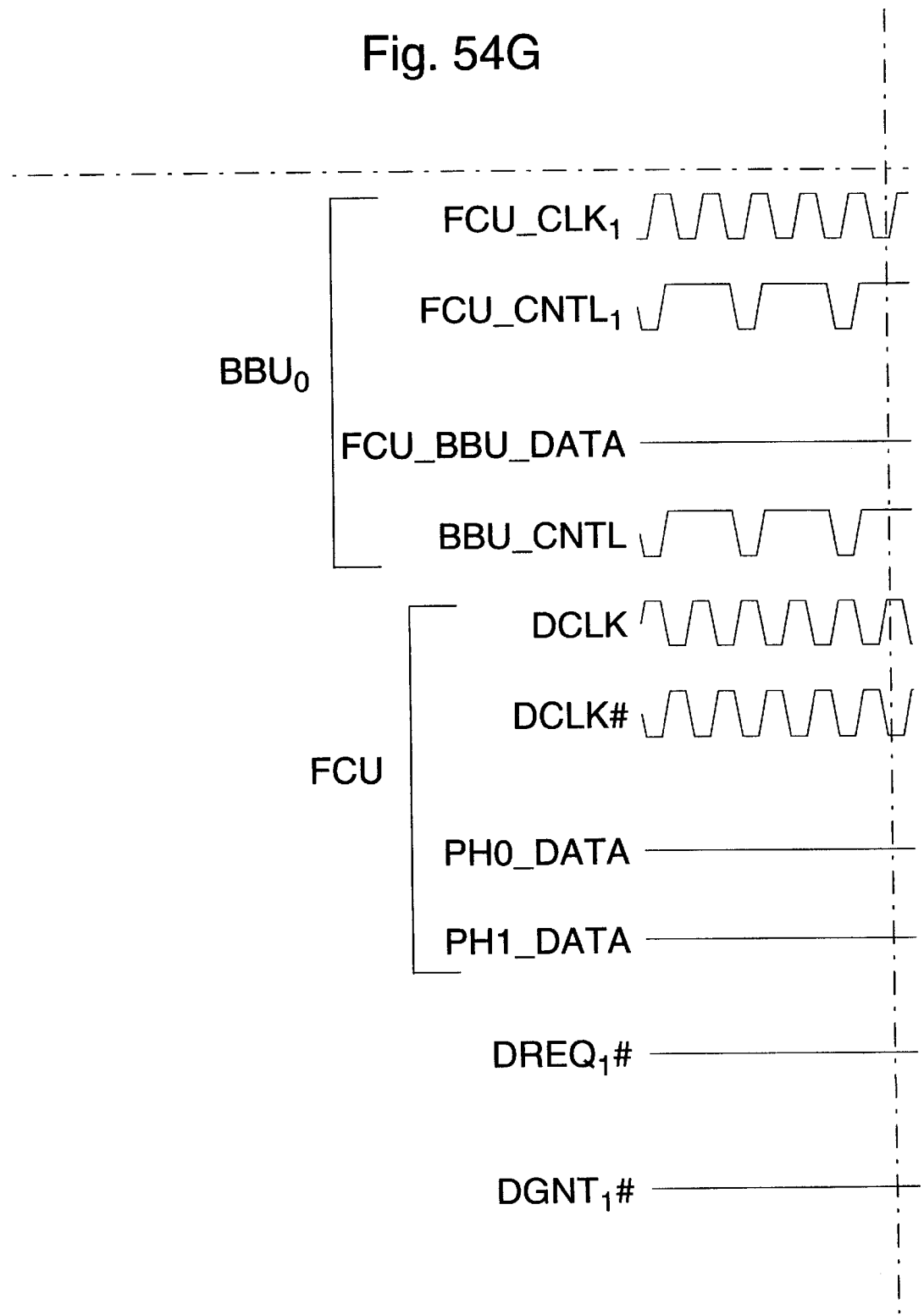
Figure 54H:
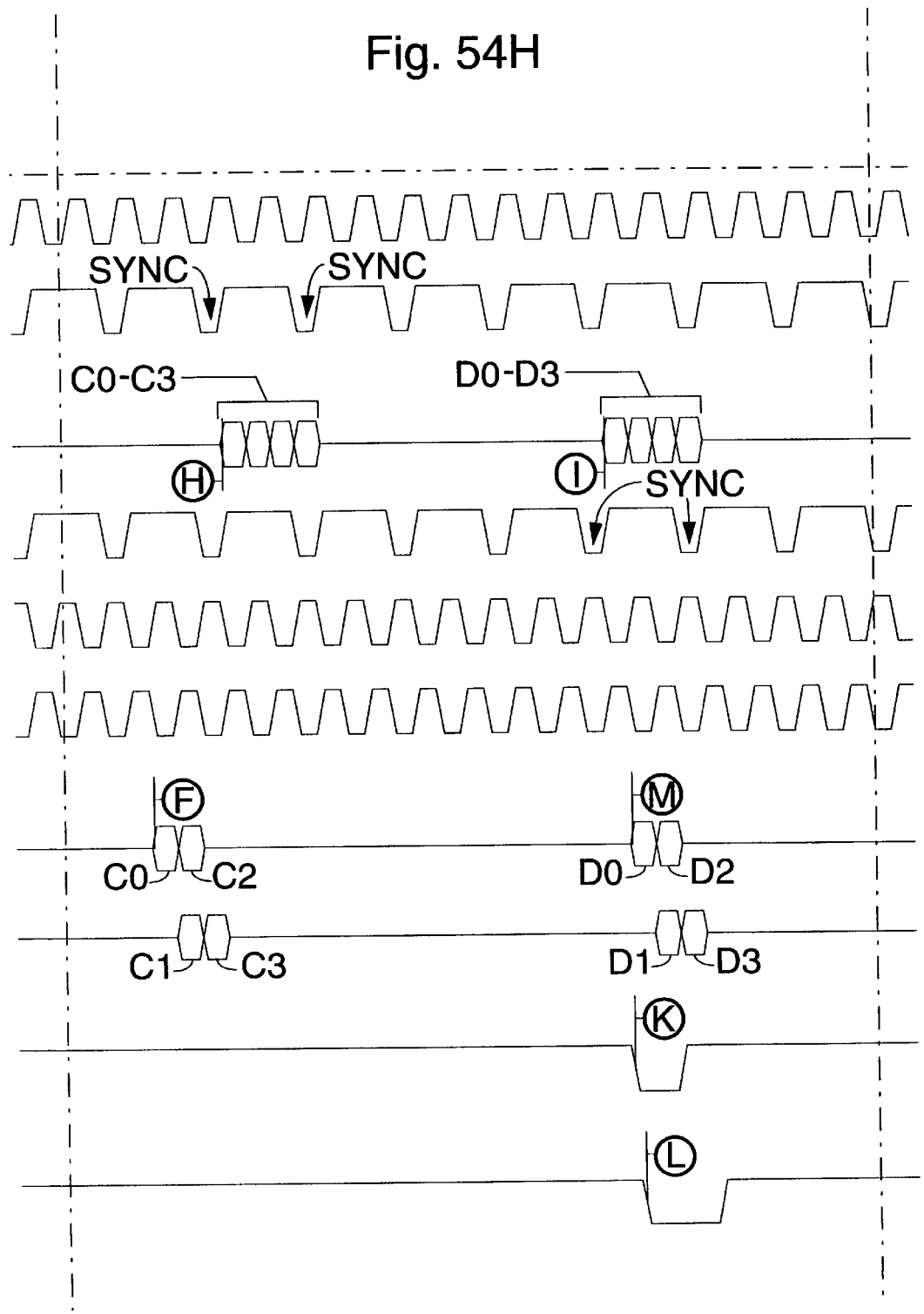
Figure 54I:
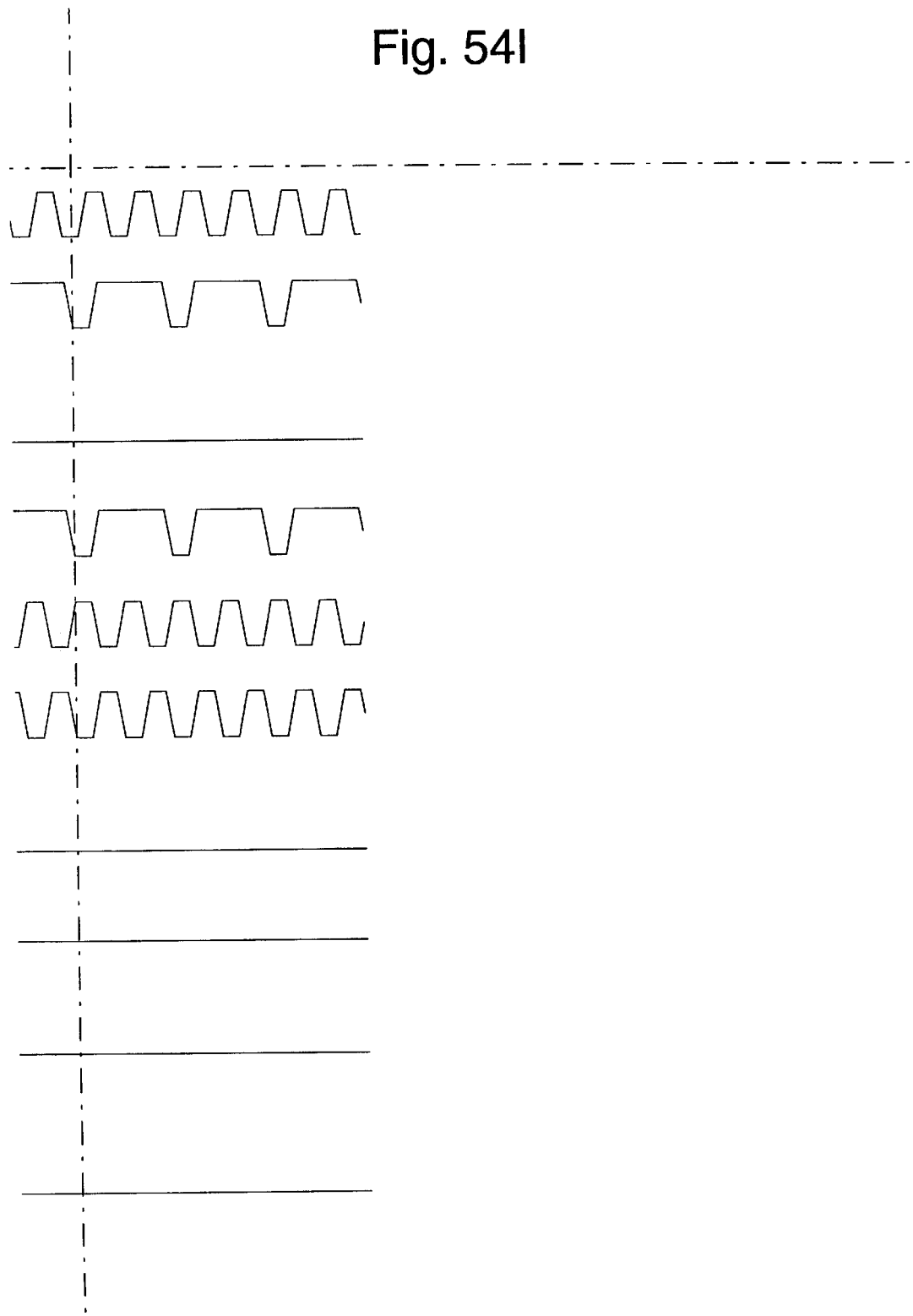
Figure 55A:
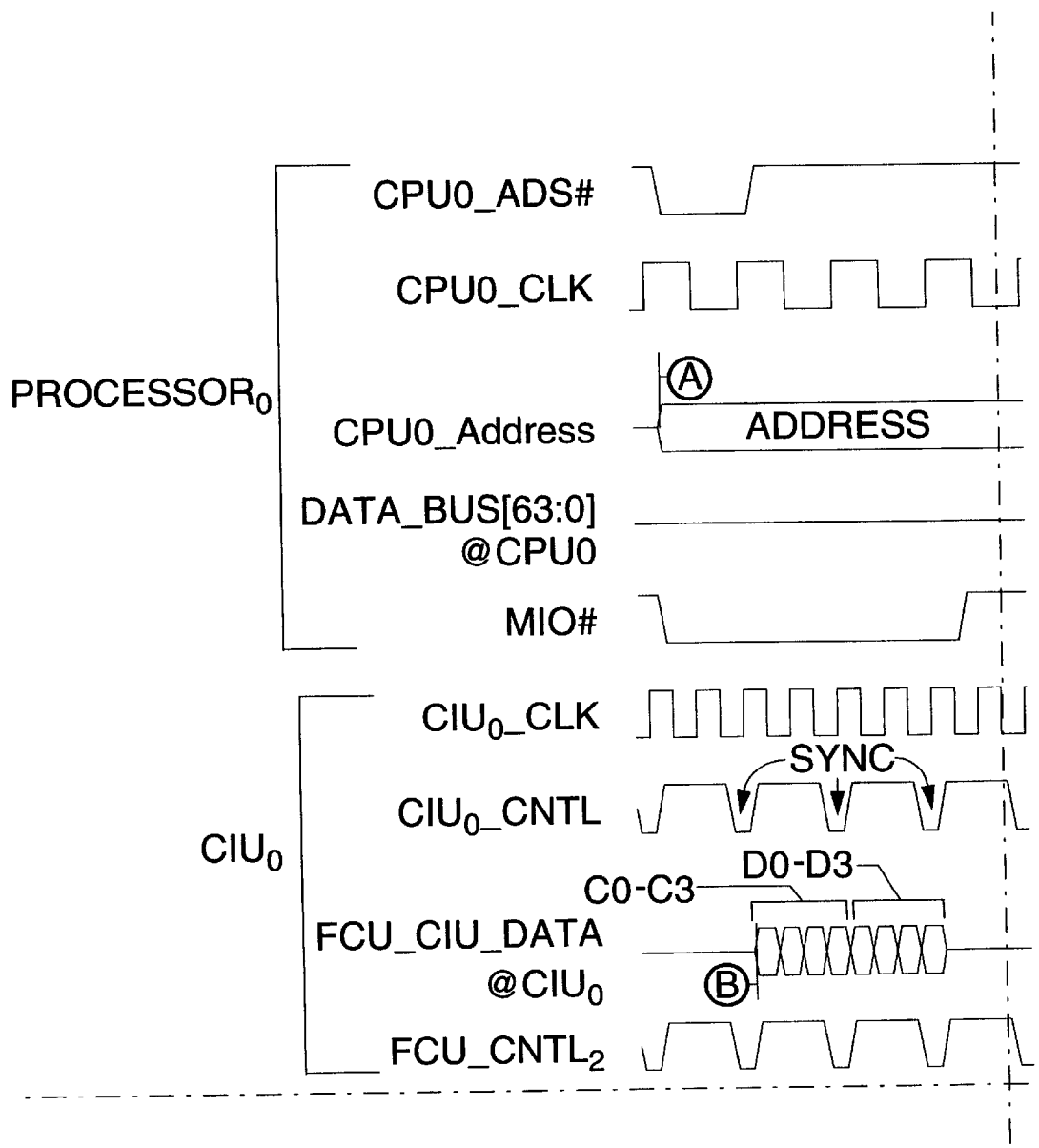
Figure 55B:
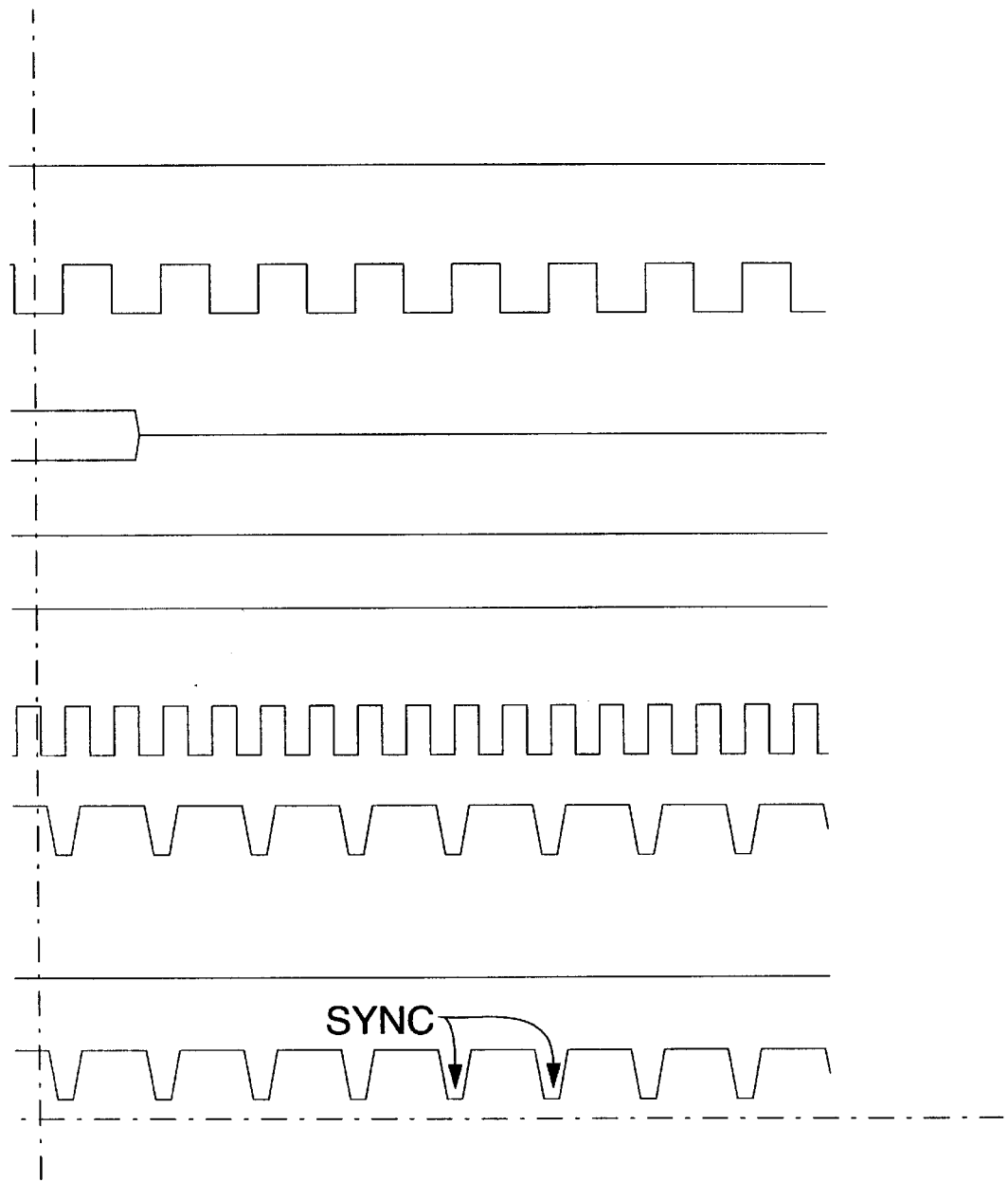
Figure 55D:
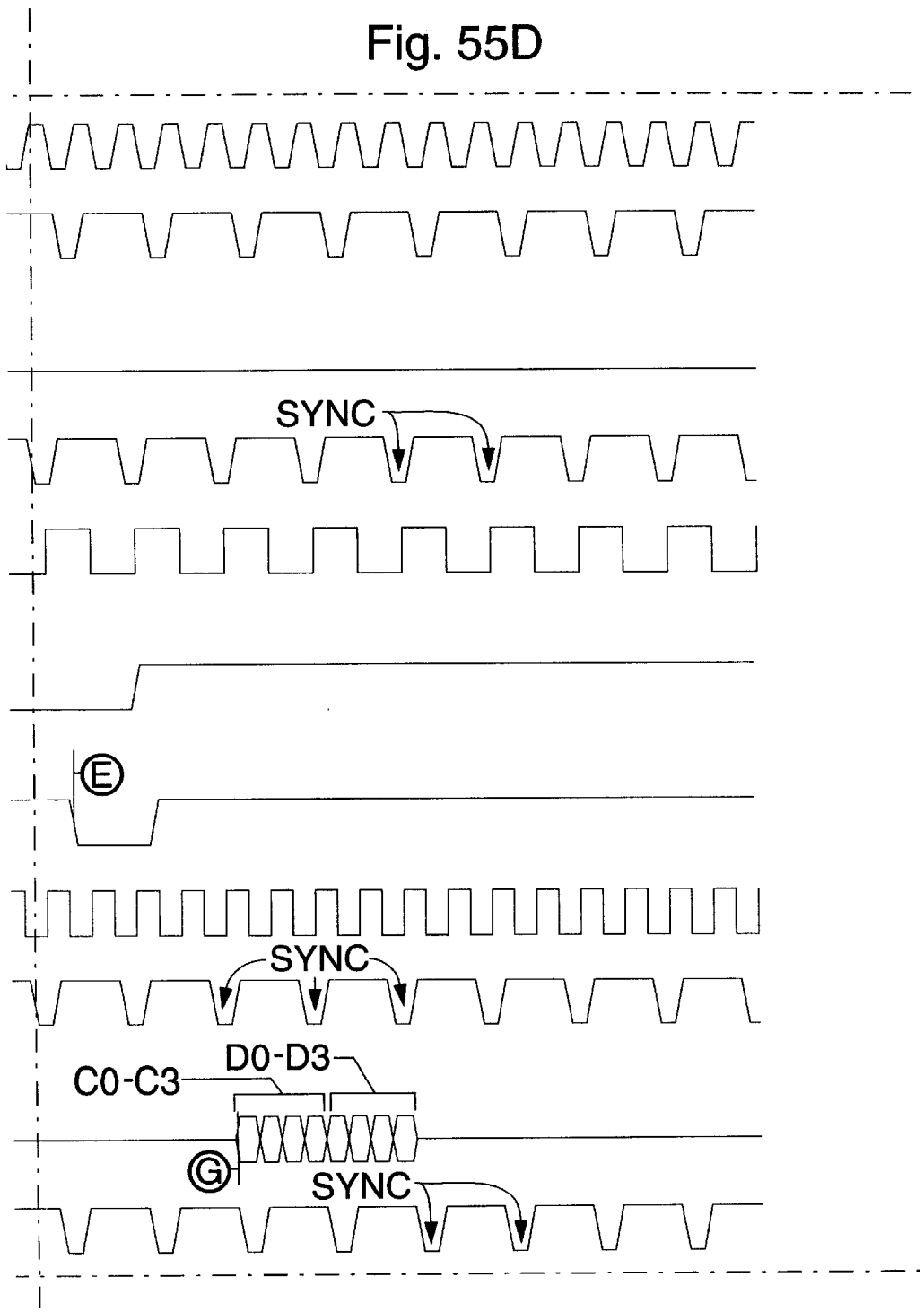
Figure 55E:
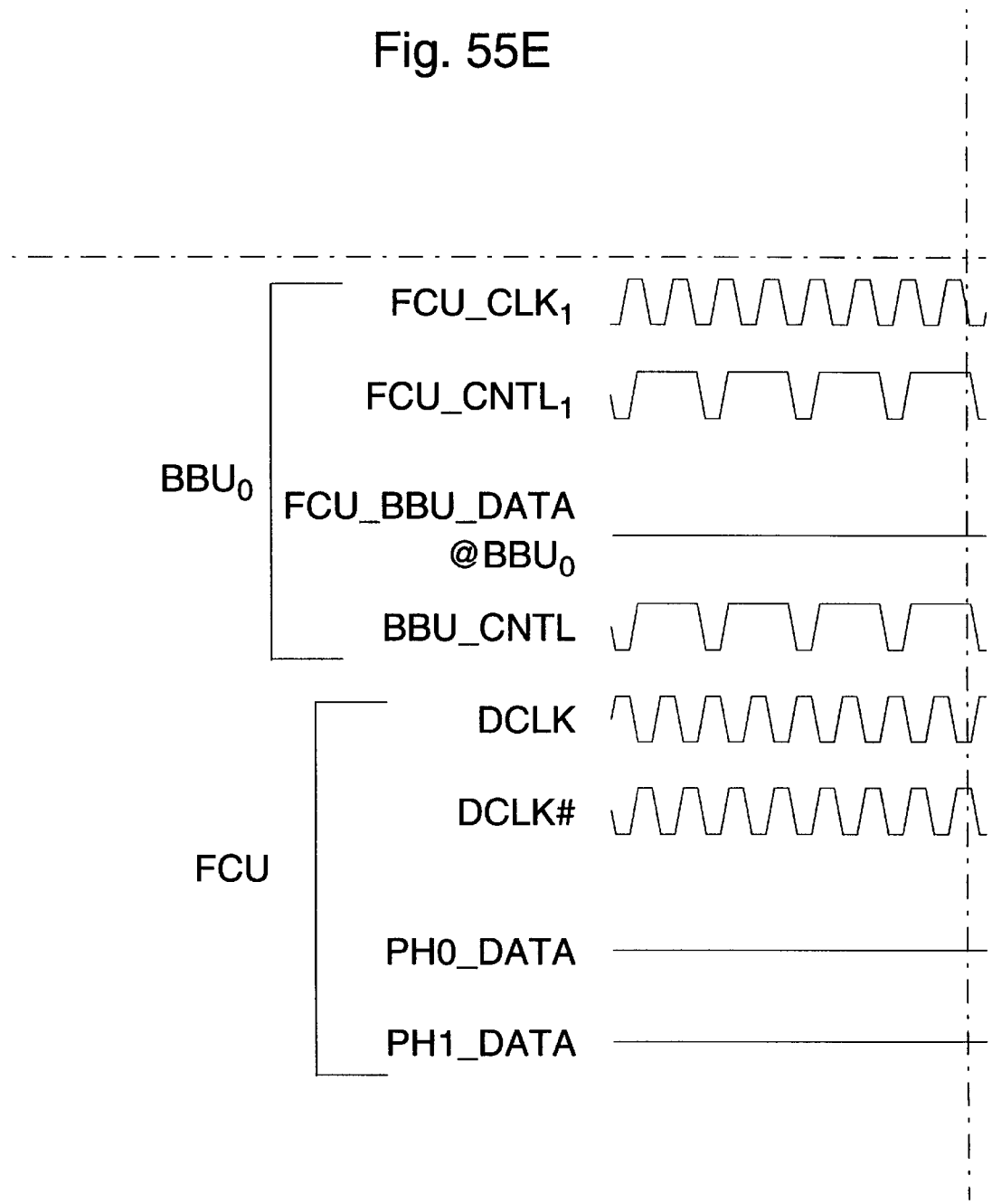
Figure 55F:
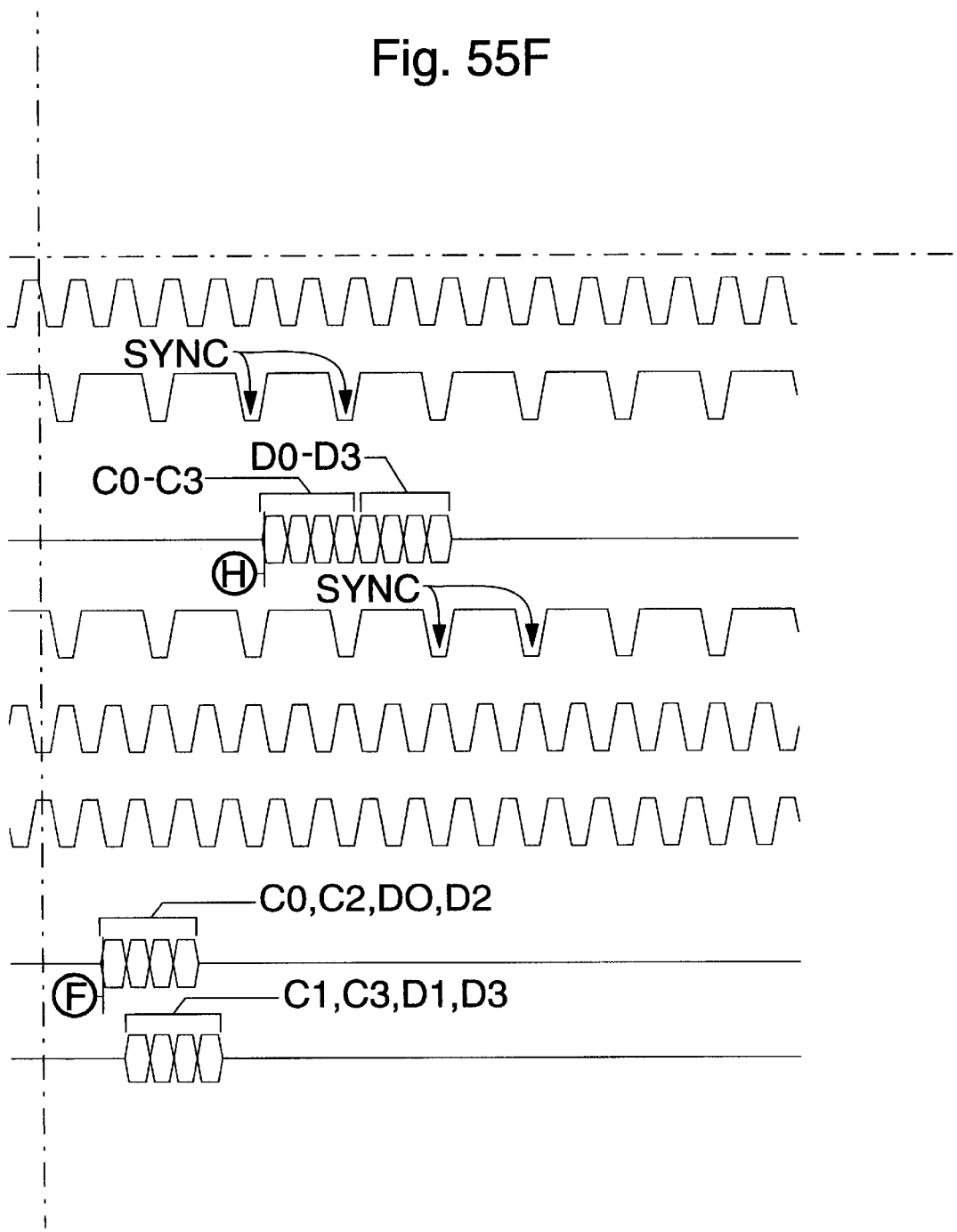
Figure 56A:
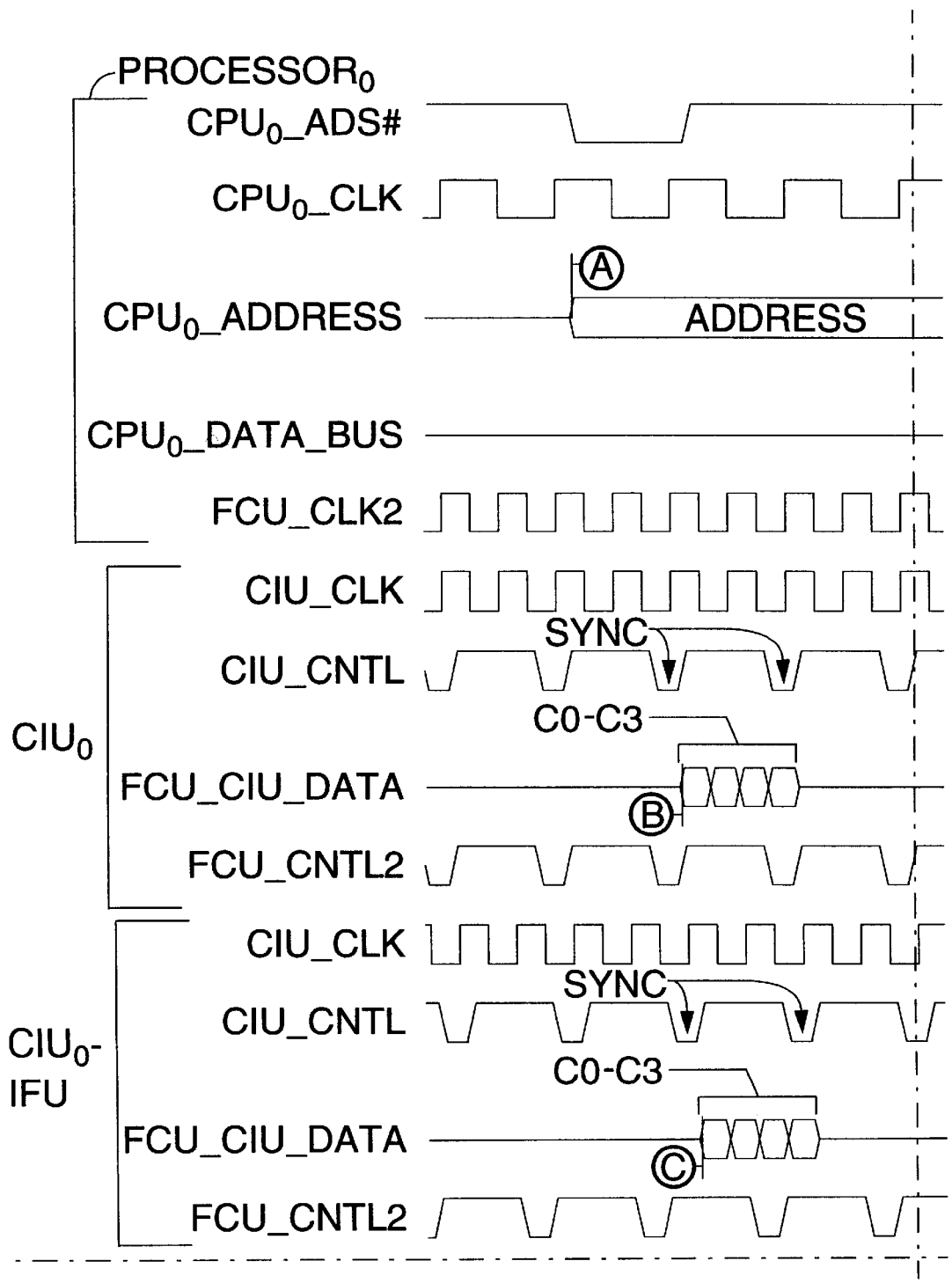
Figure 56B:
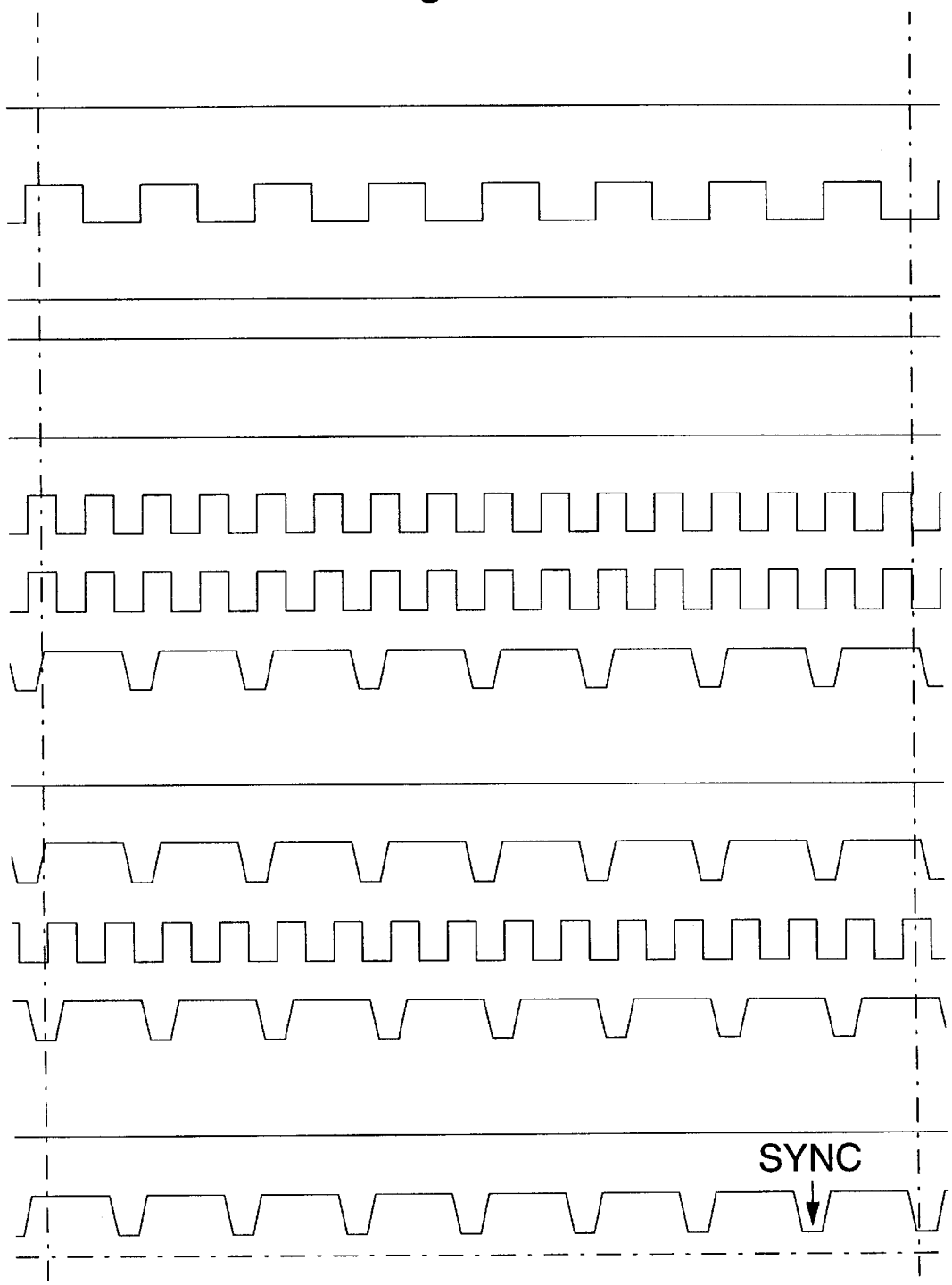
Figure 56C:
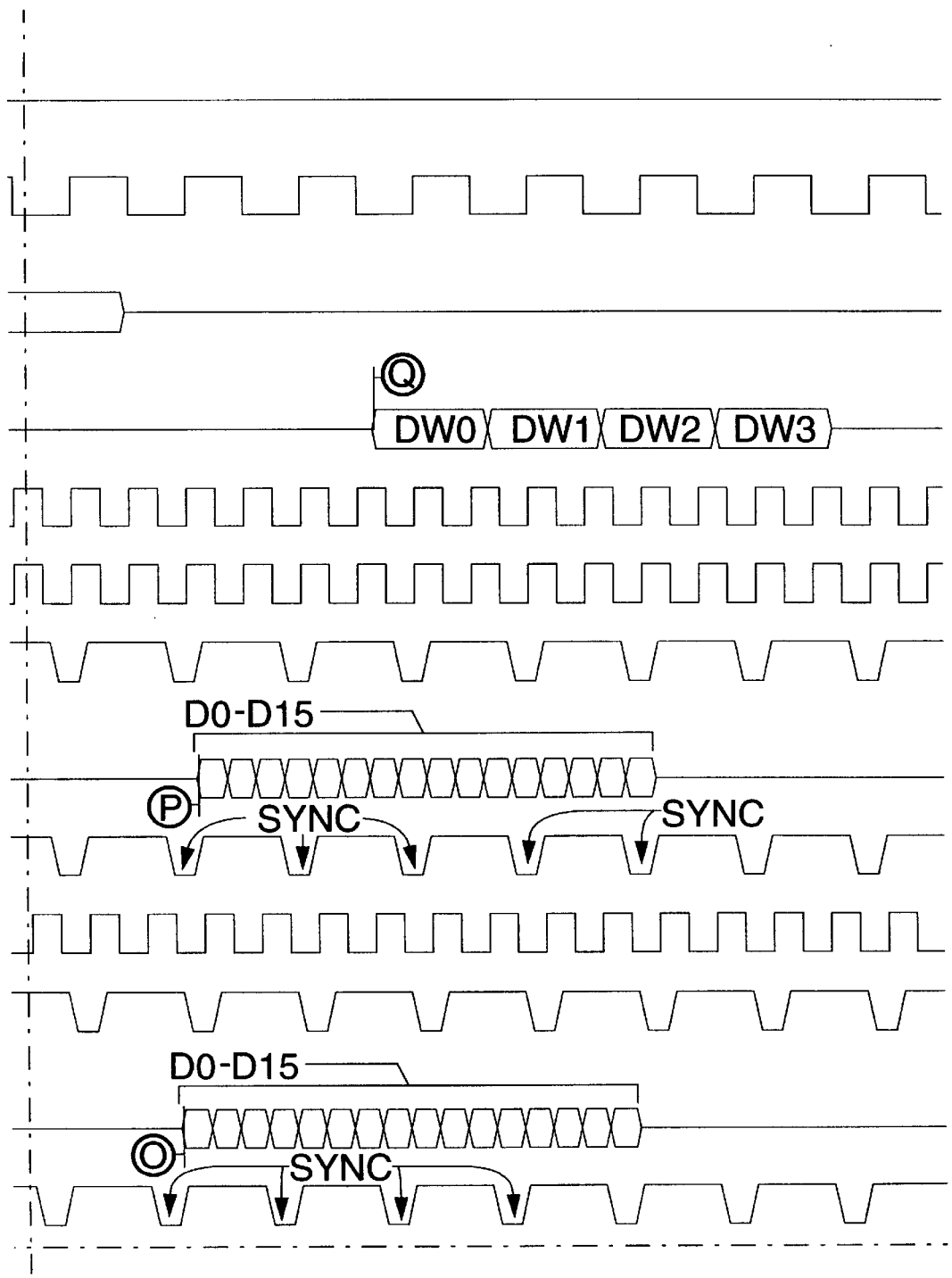
Figure 56D:
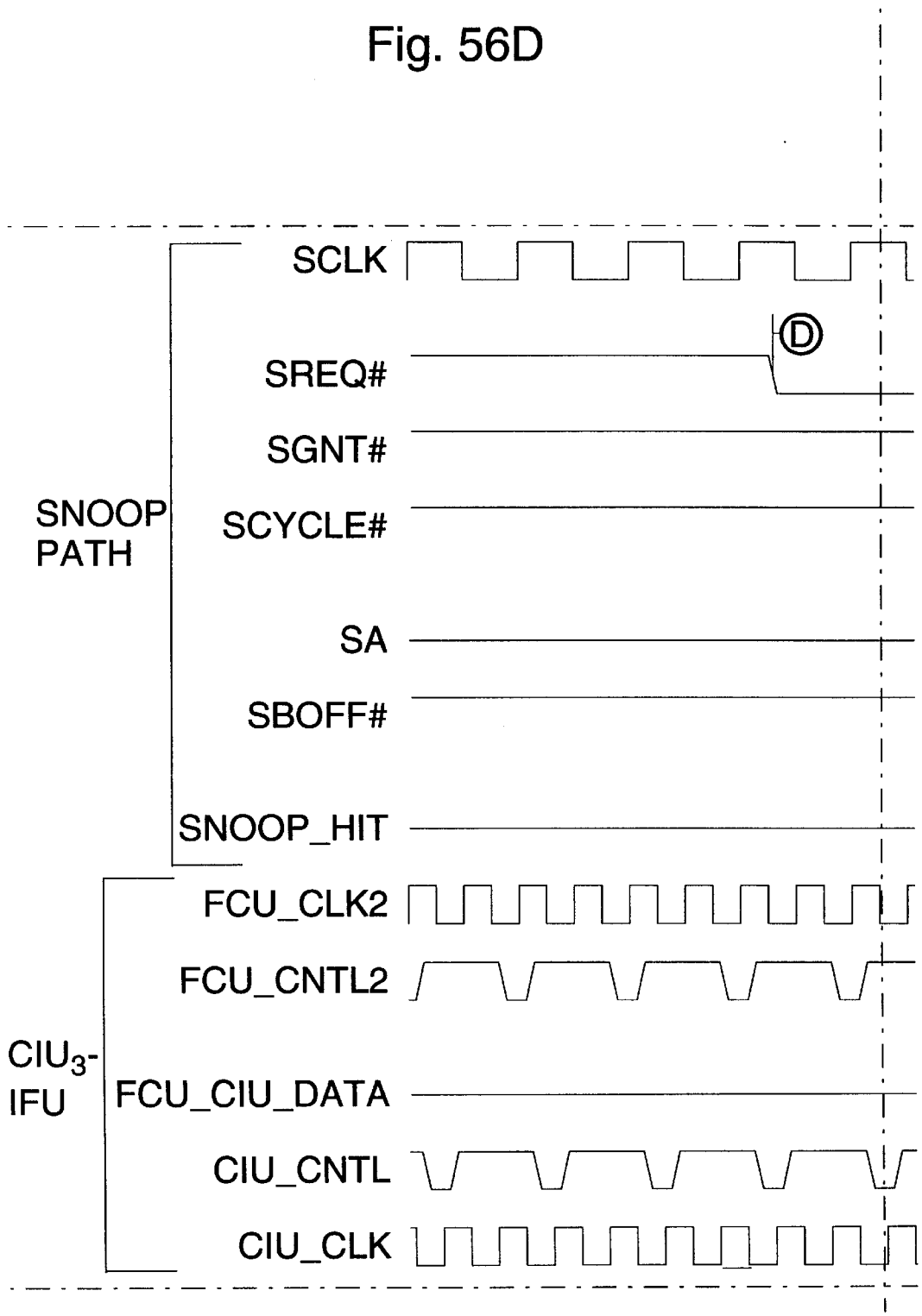
Figure 56E:
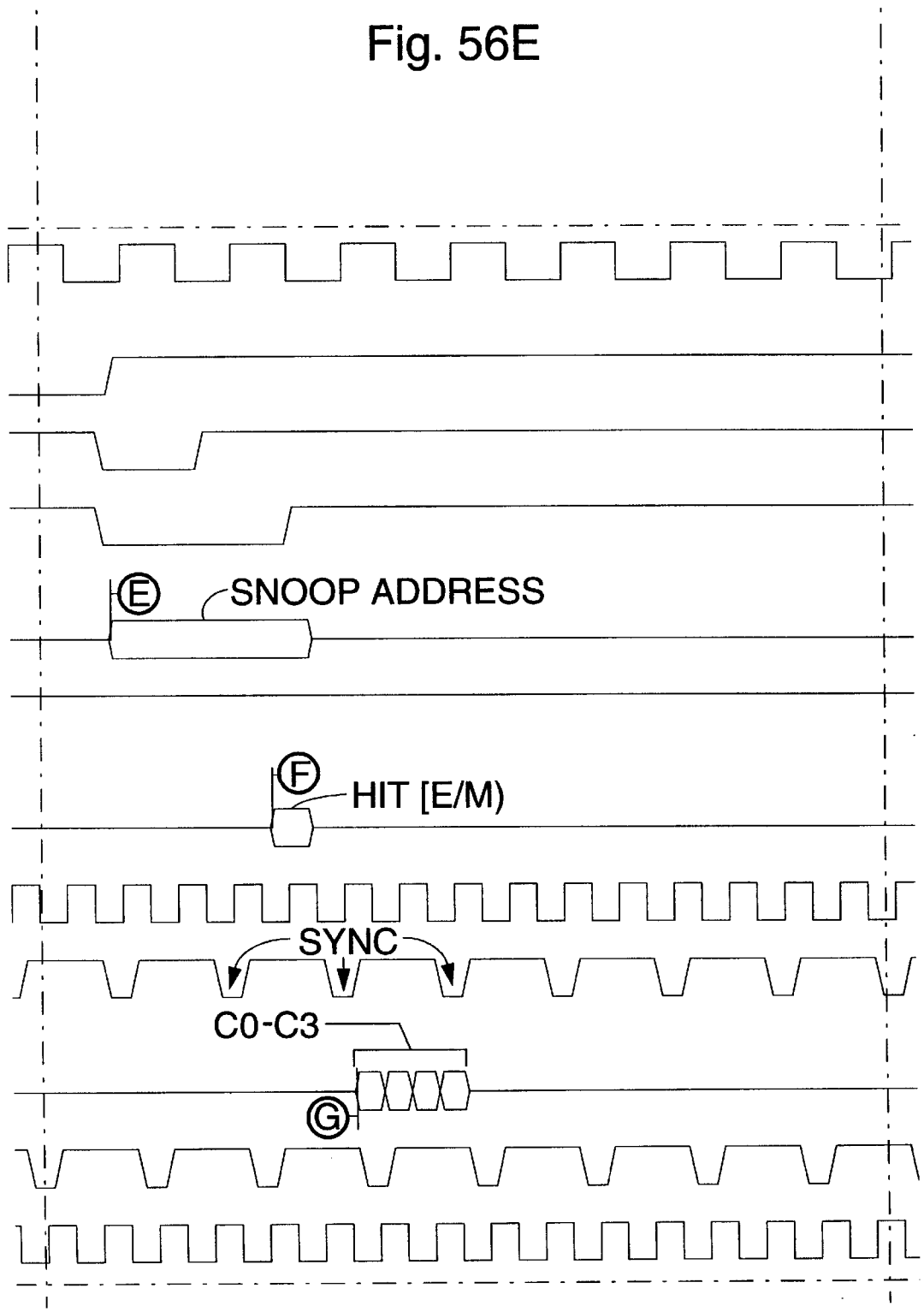
Figure 56F:
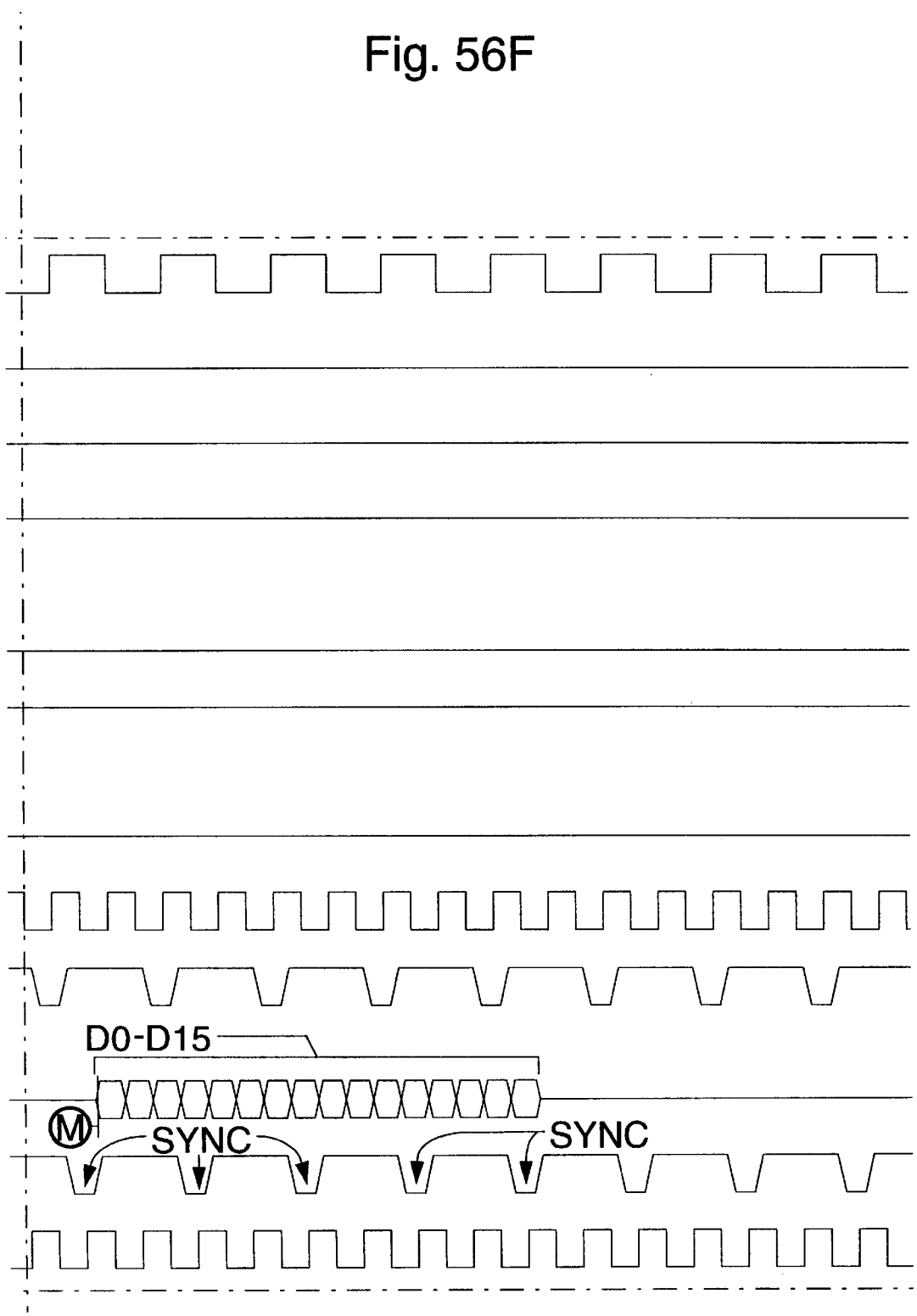
Figure 56G:
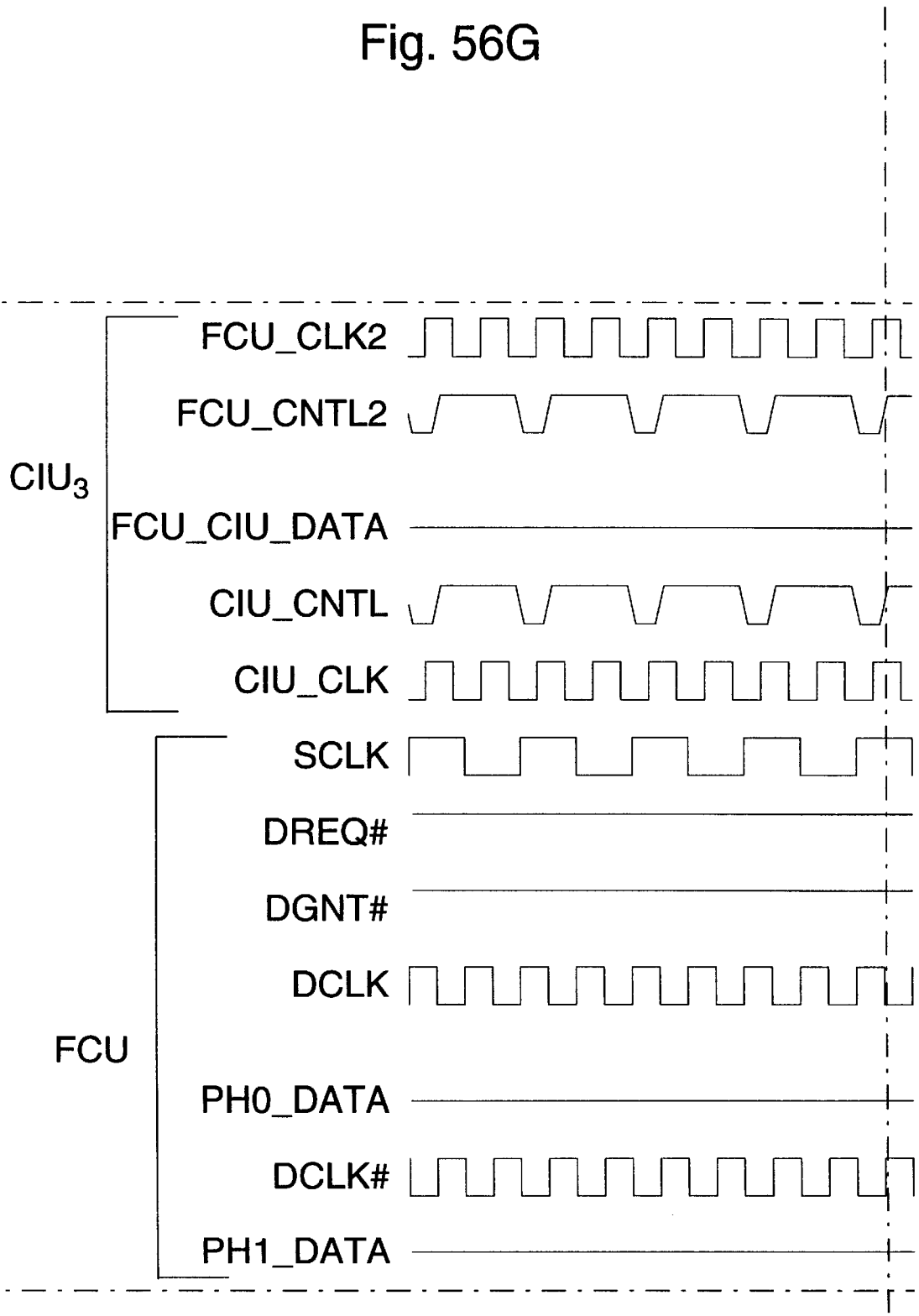
Figure 56H:
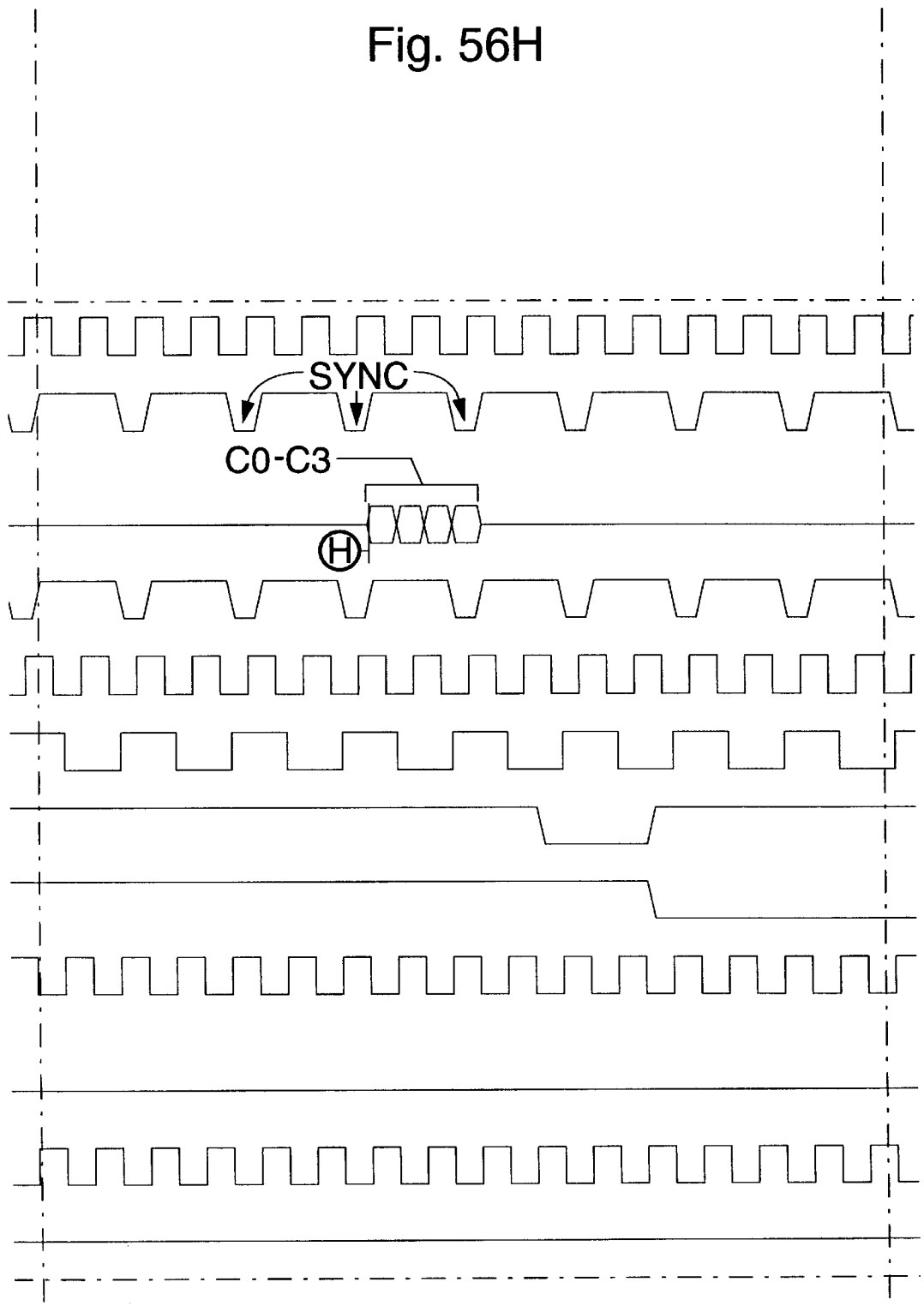
Figure 56I:
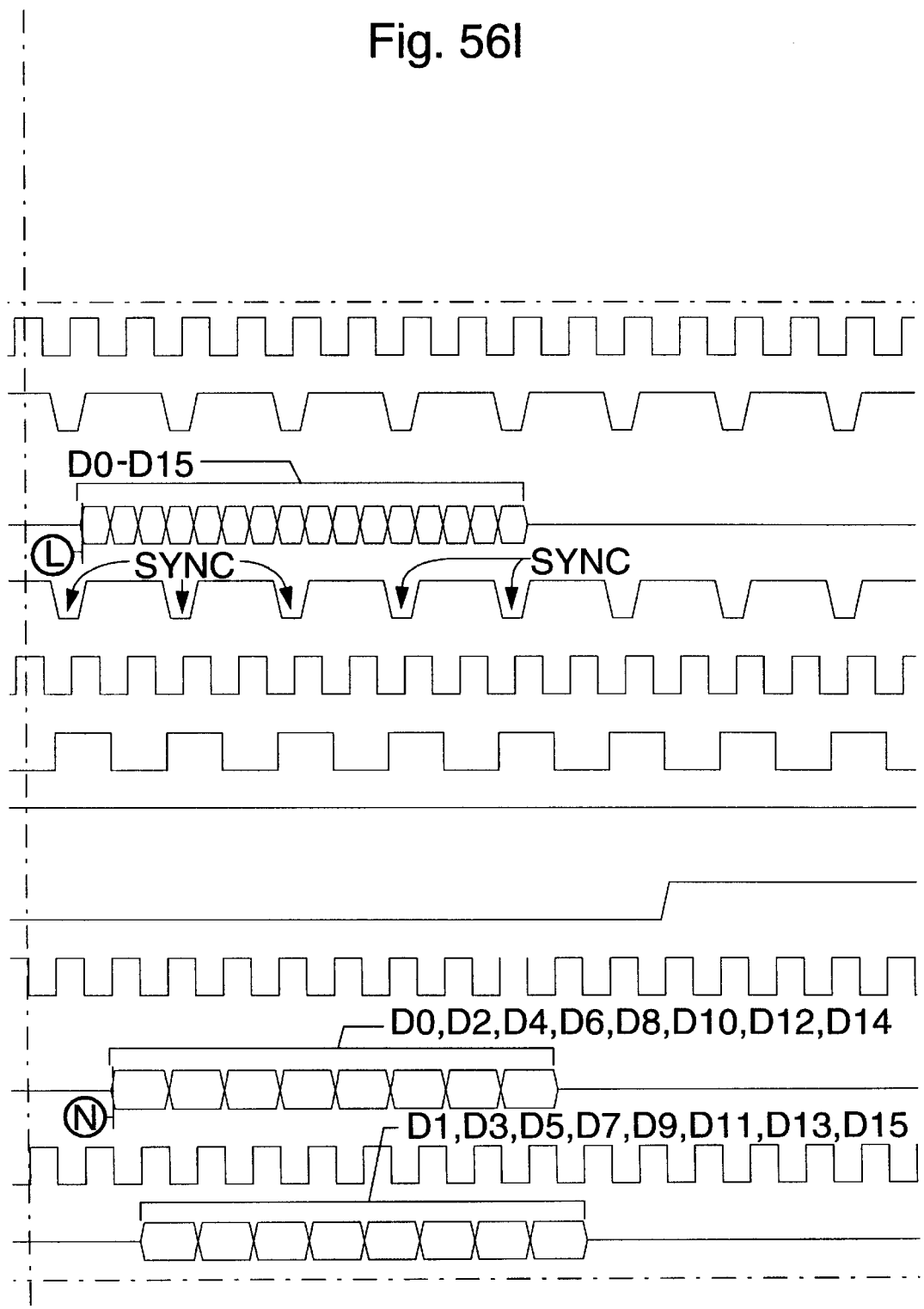
Figure 56J:
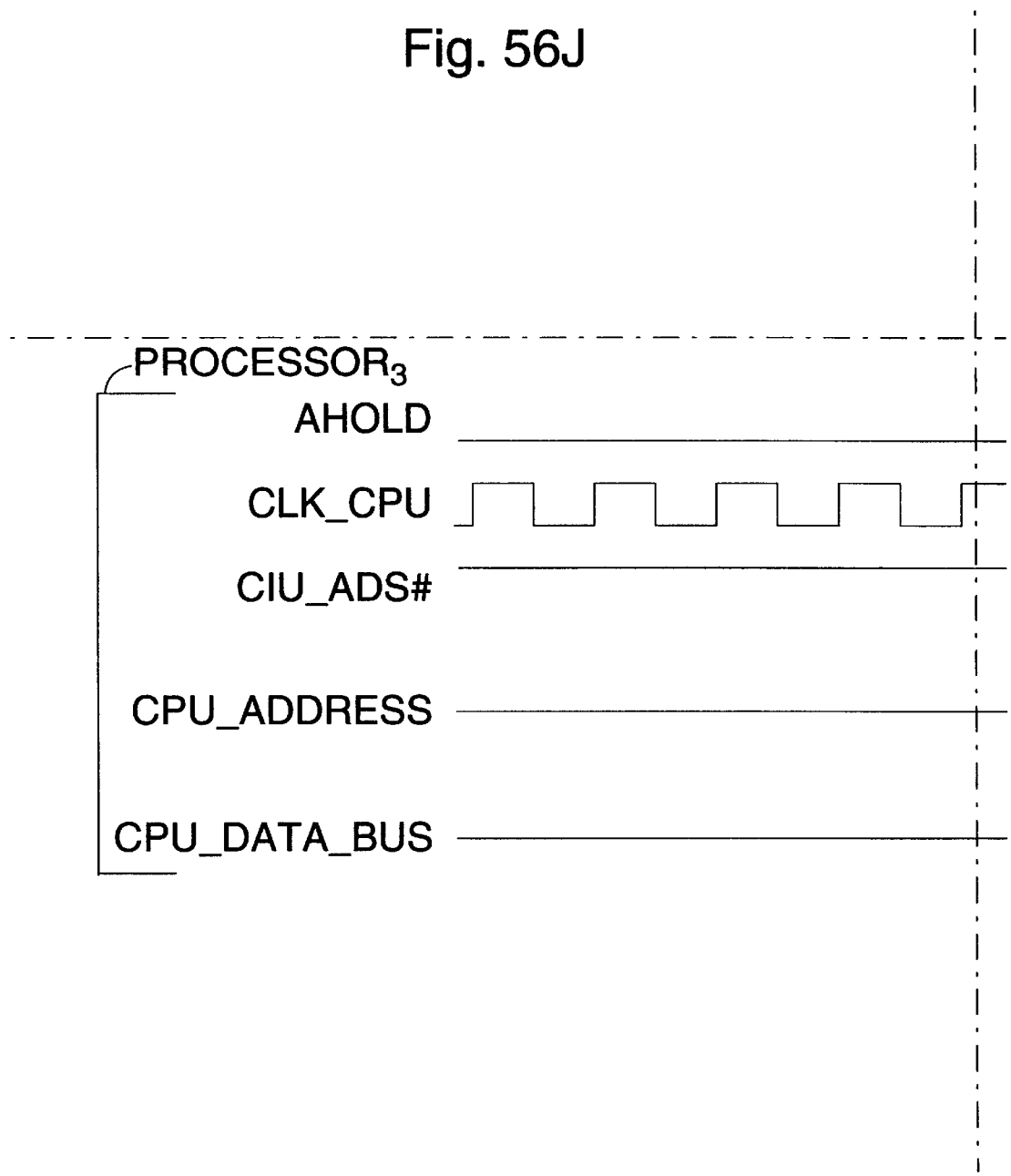
Figure 56K:
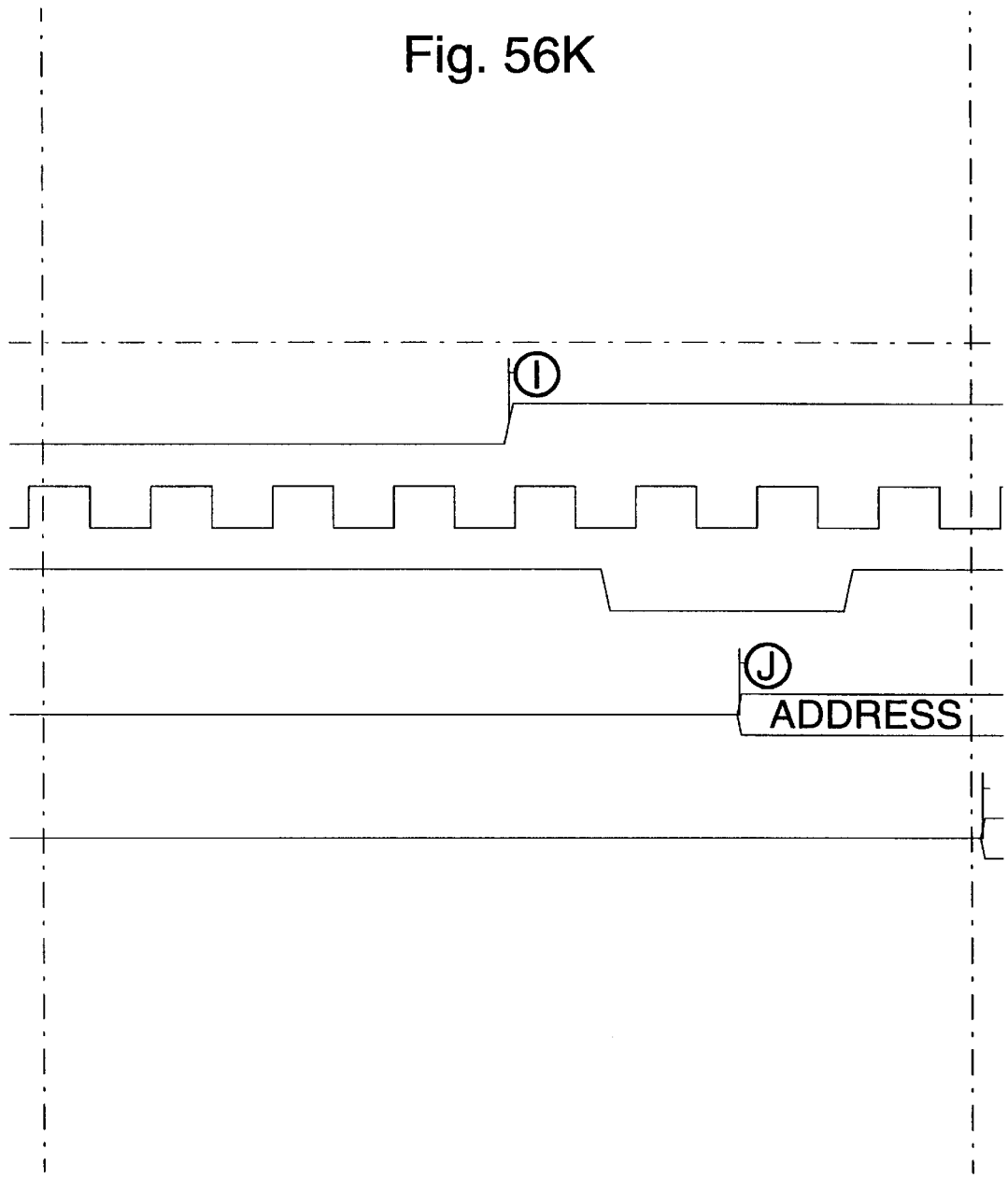
Figure 56L:
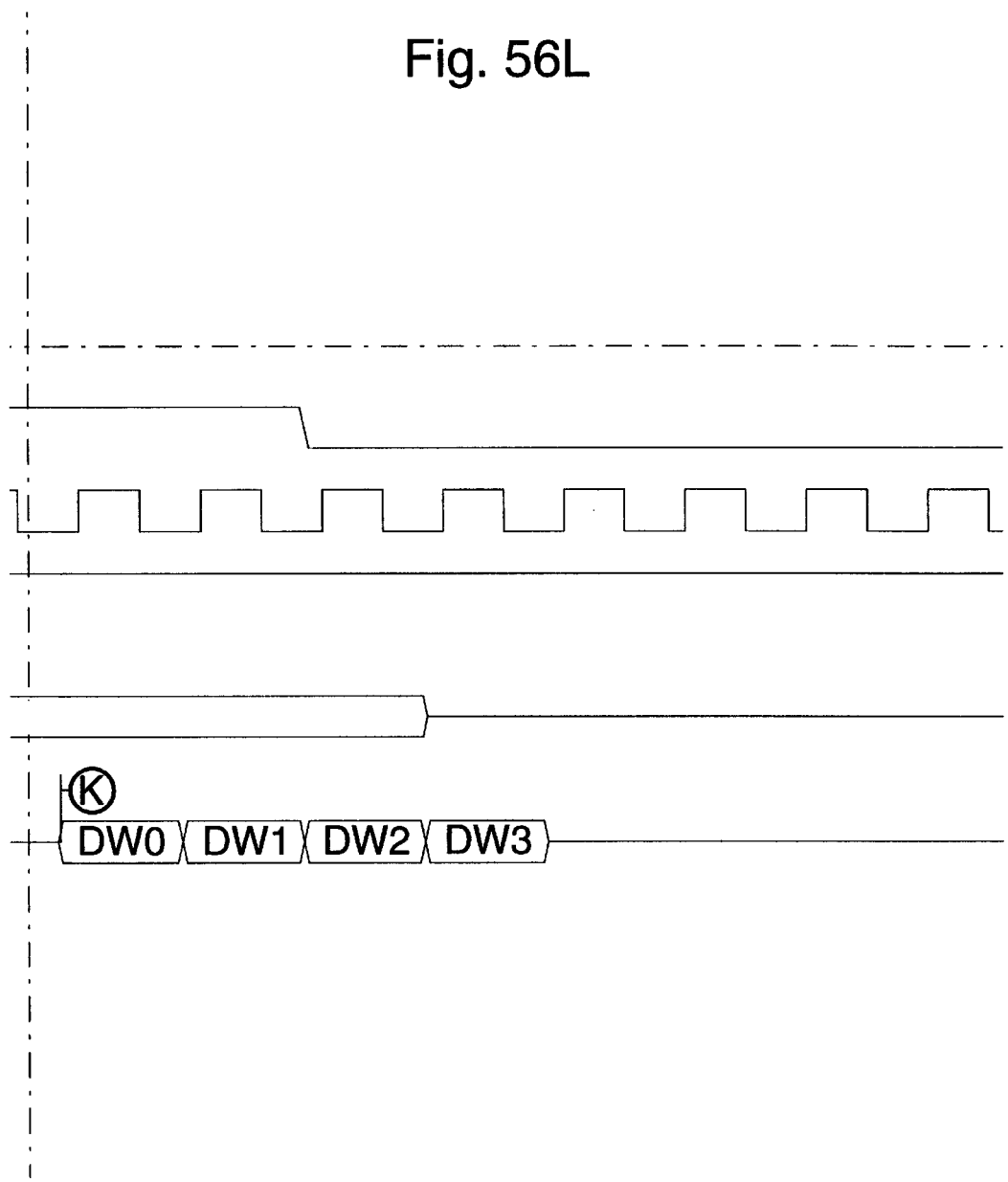
Figure 57A:
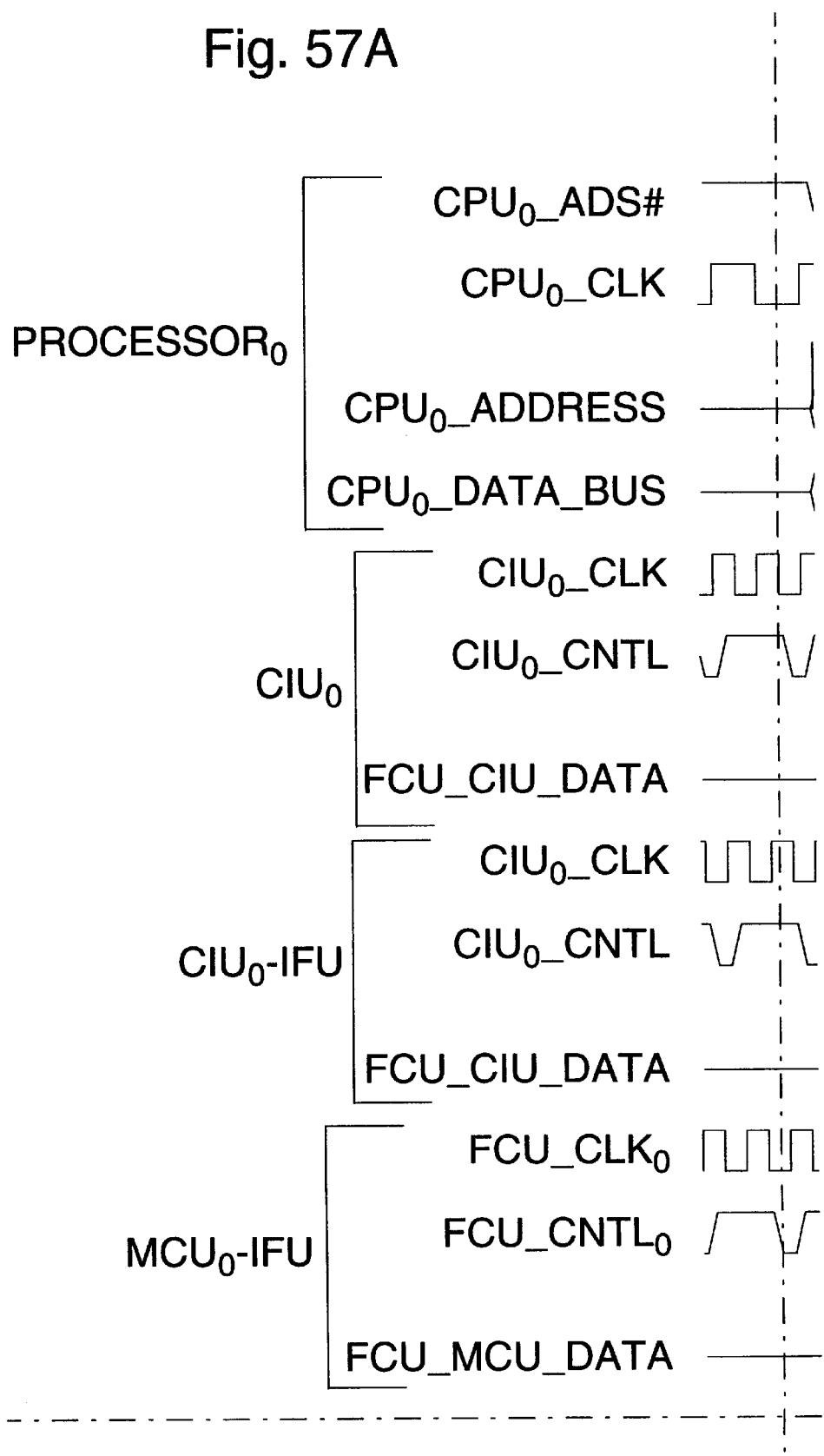
Figure 57B:
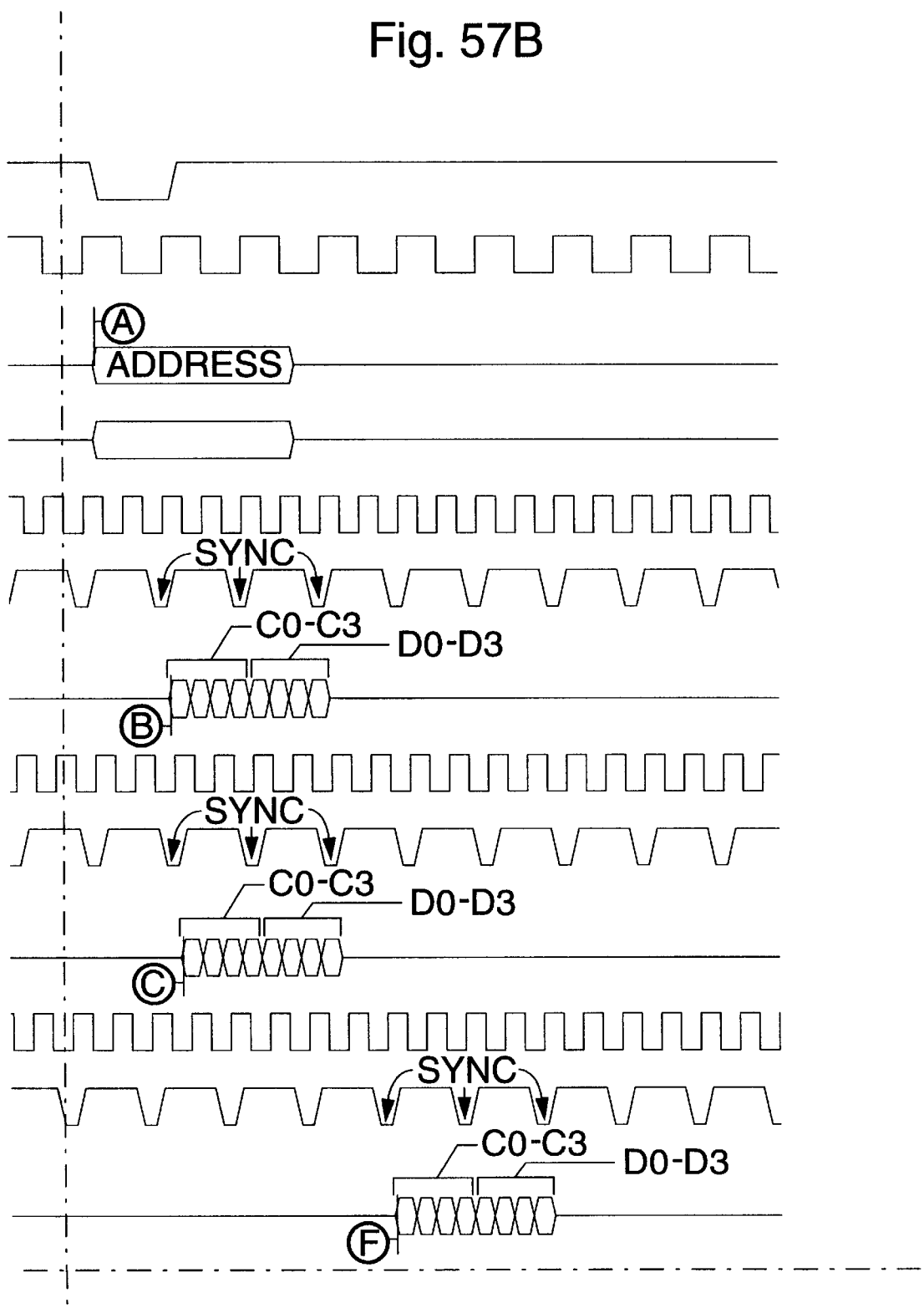
Figure 57C:
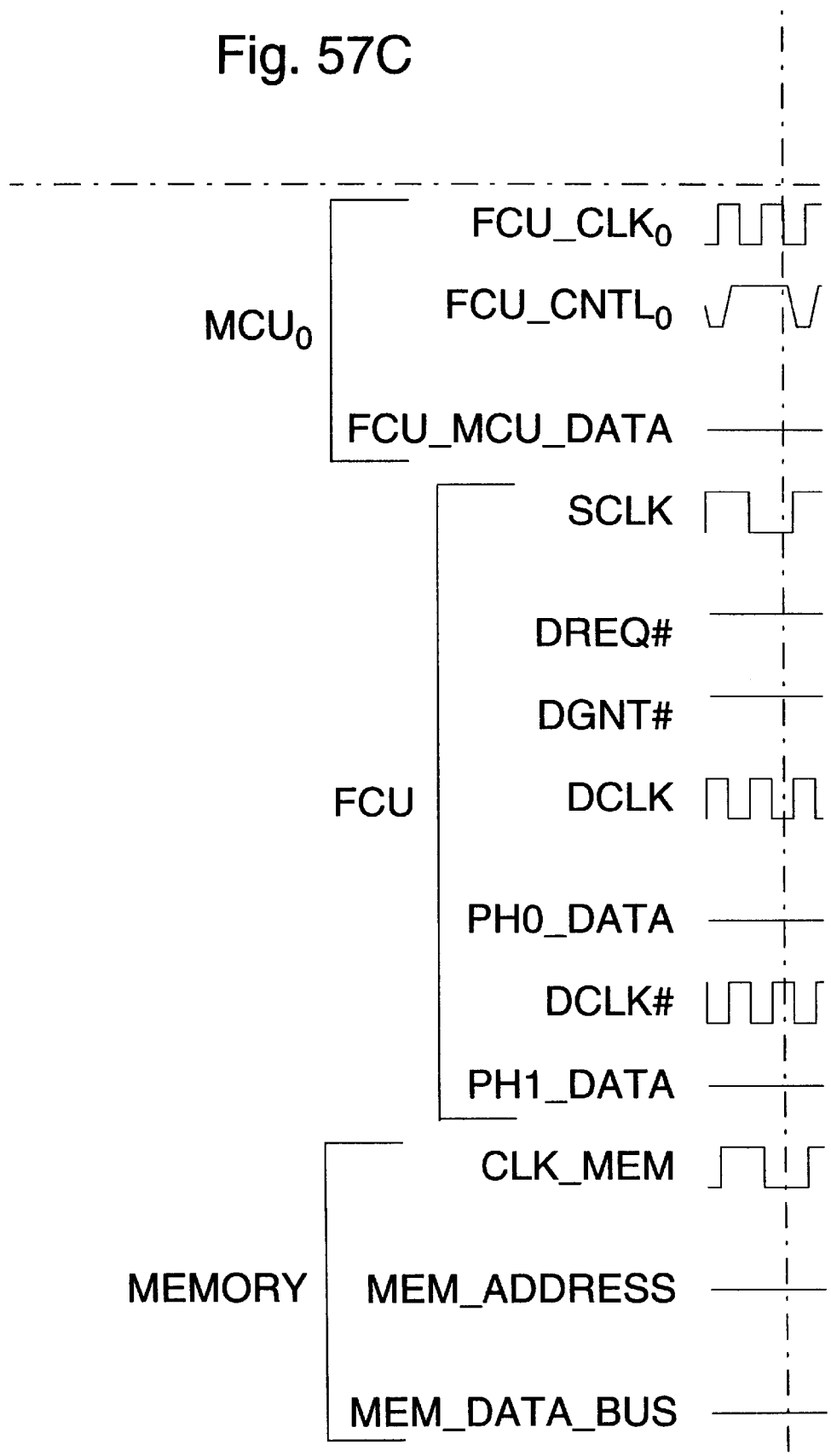
Figure 57D:
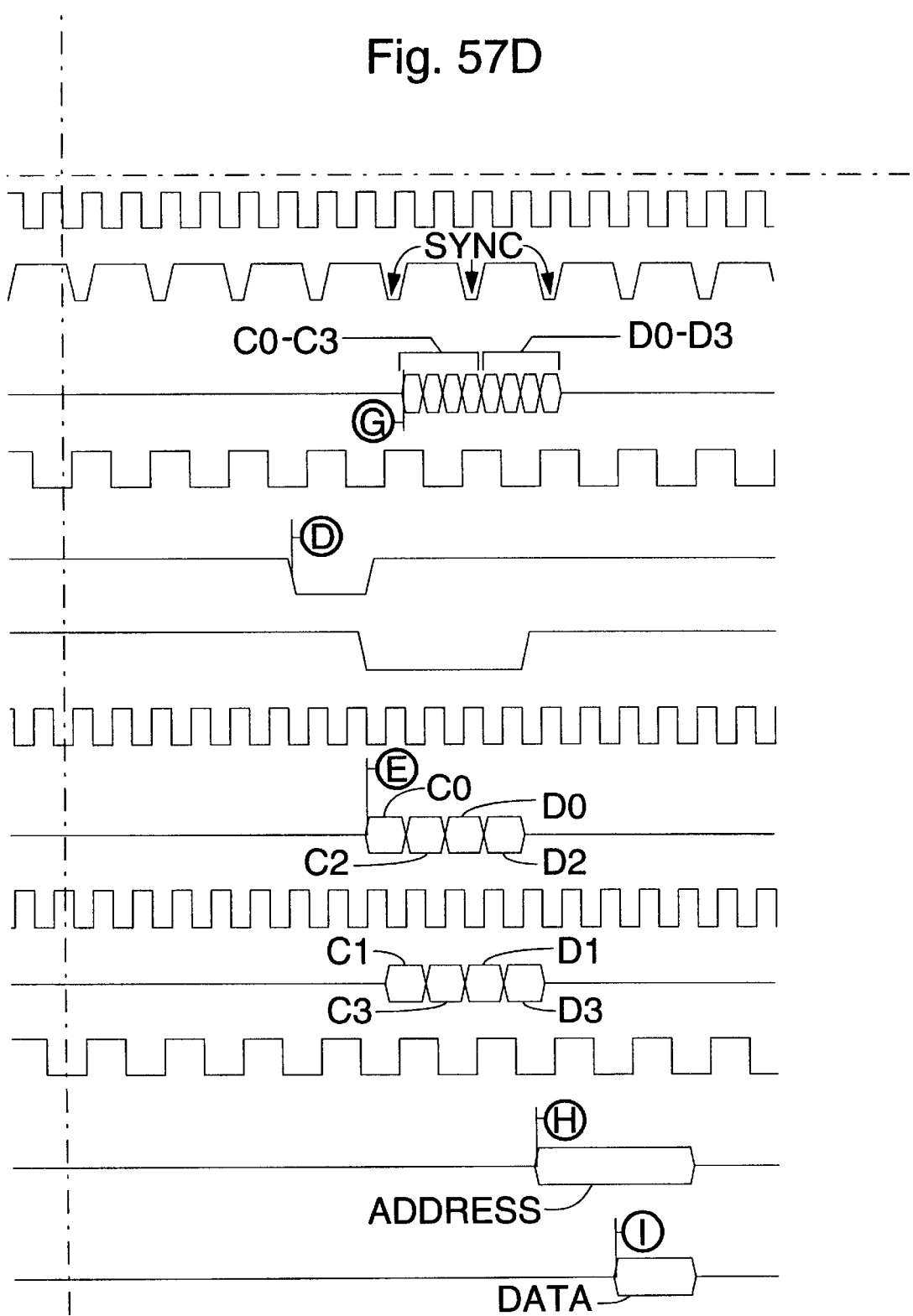
Figure 57E:
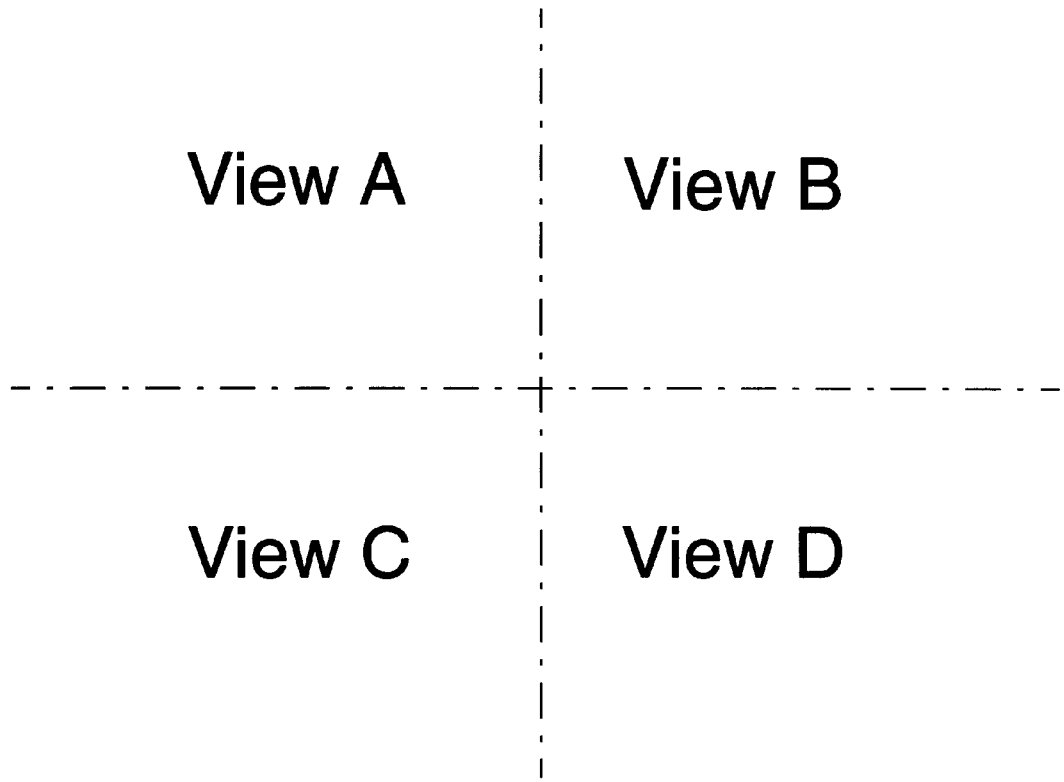
Figure 58A:
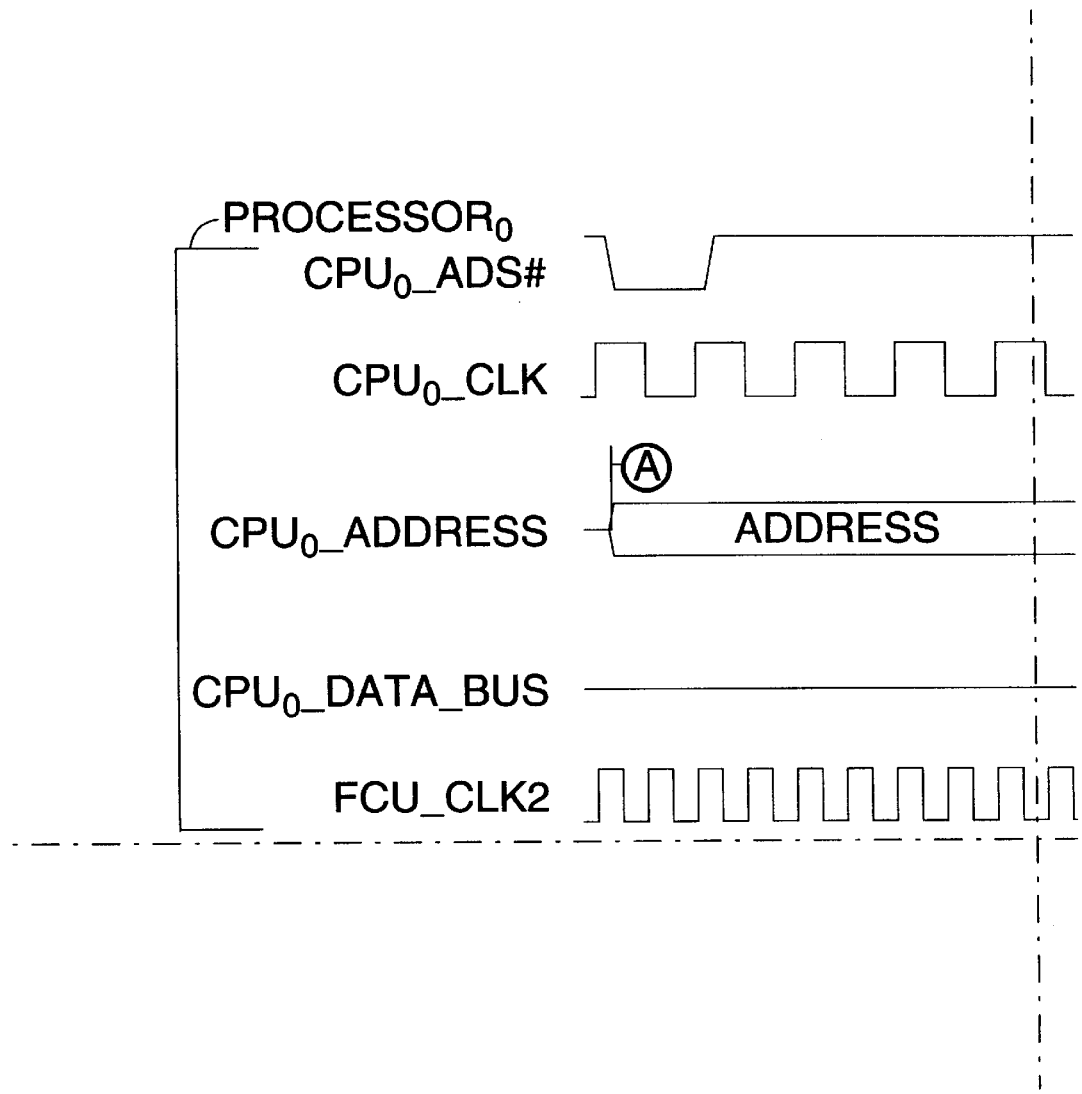
Figure 58B:
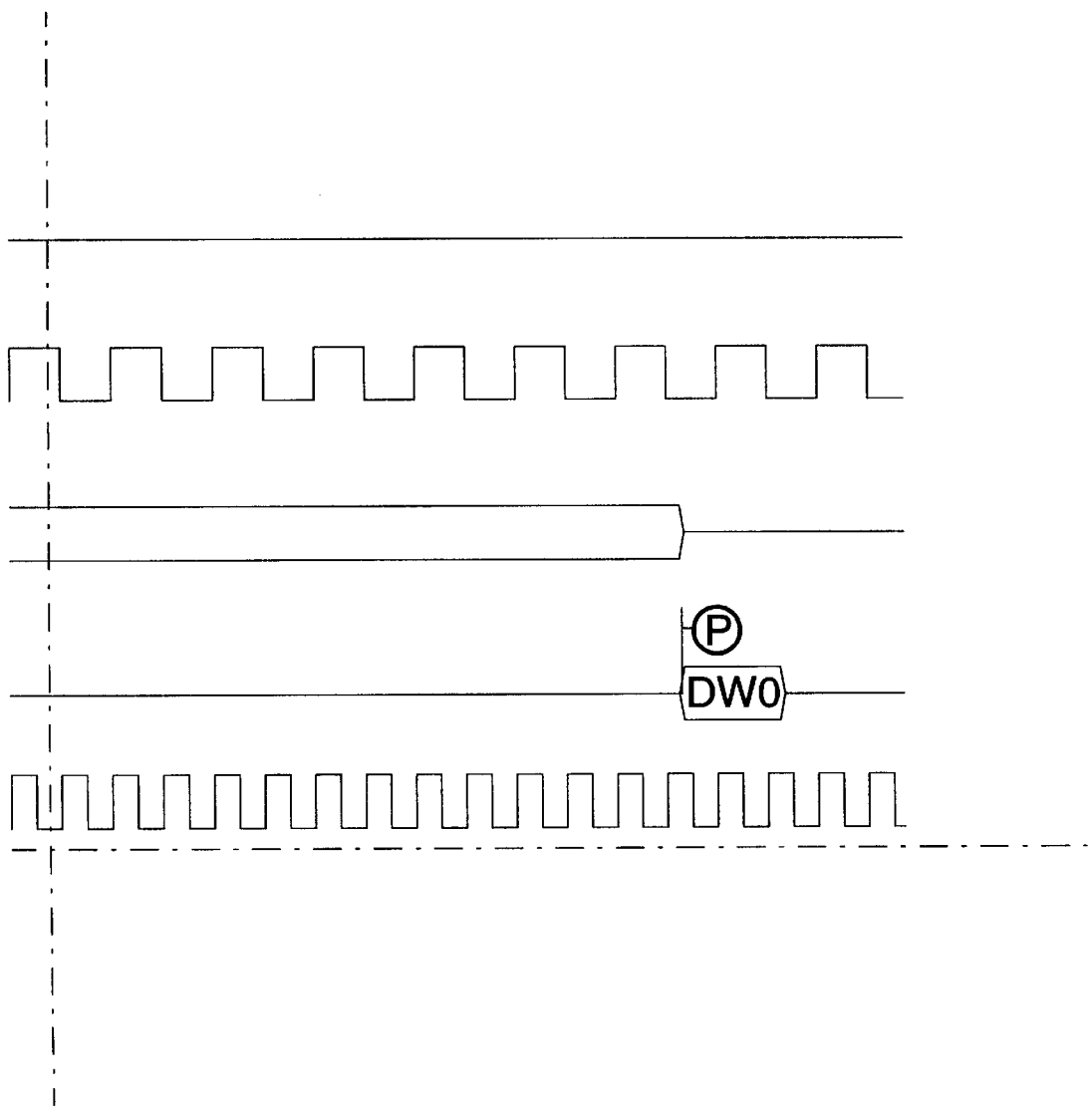
Figure 58C:
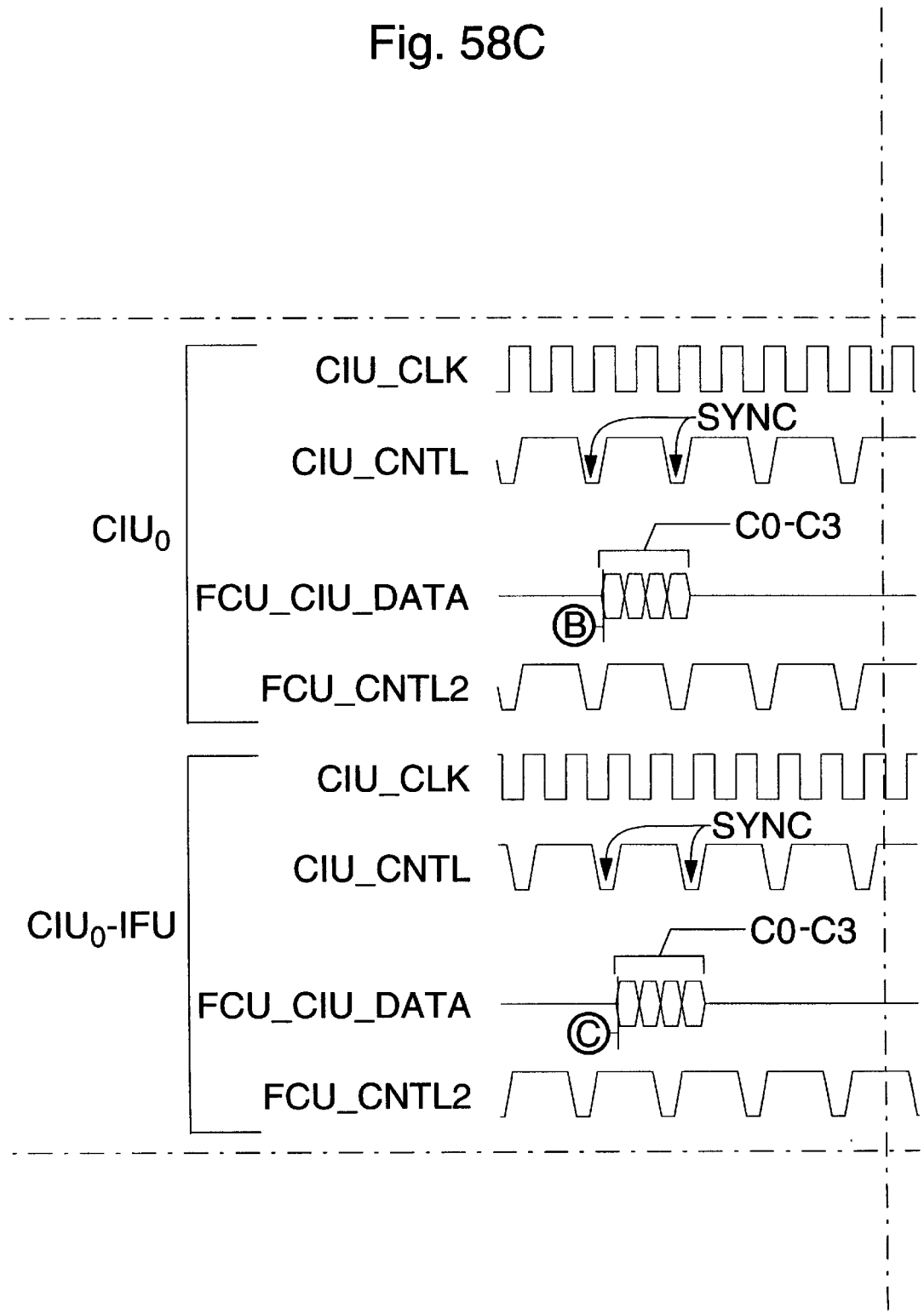
Figure 58D:
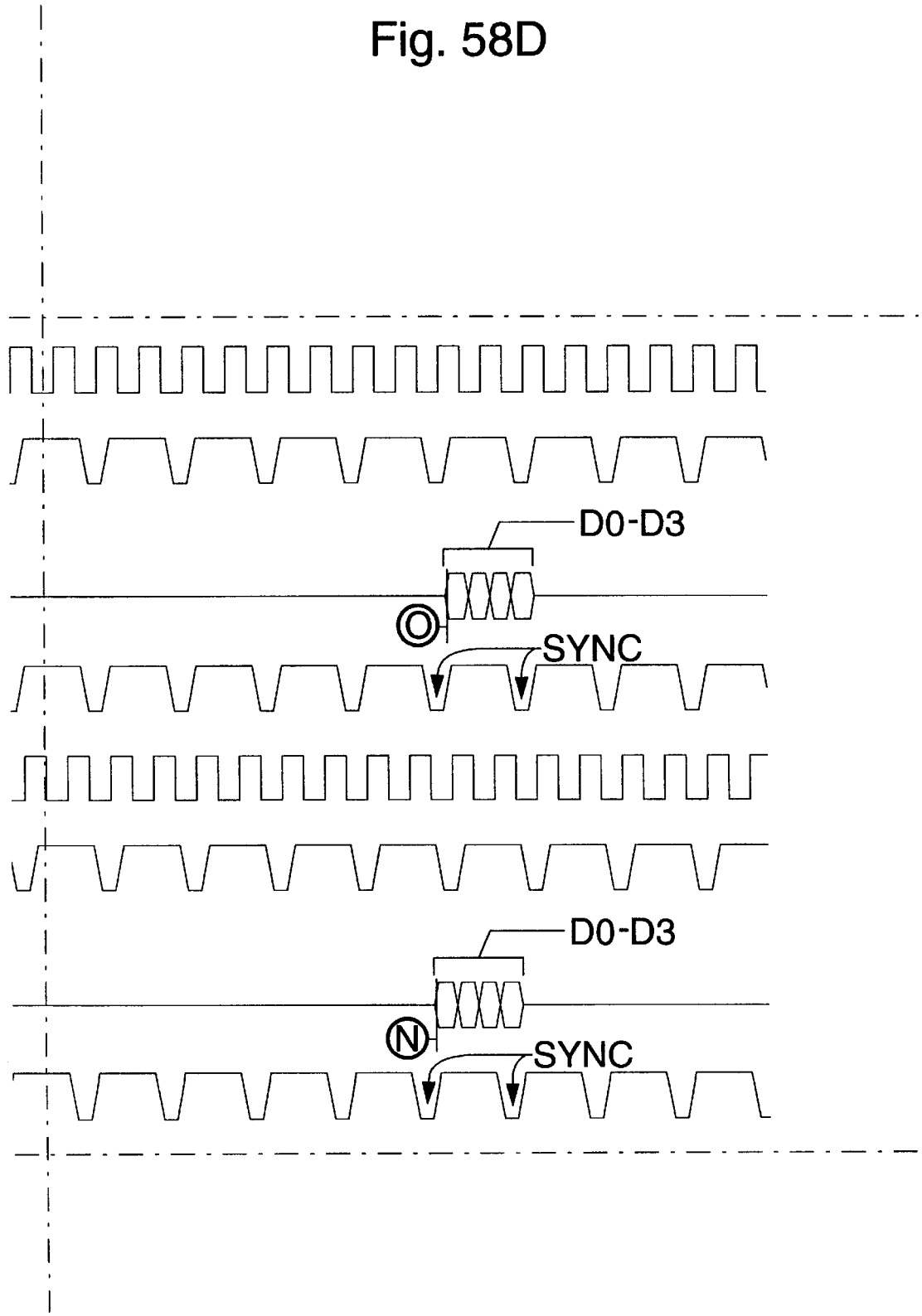
Figure 58E:
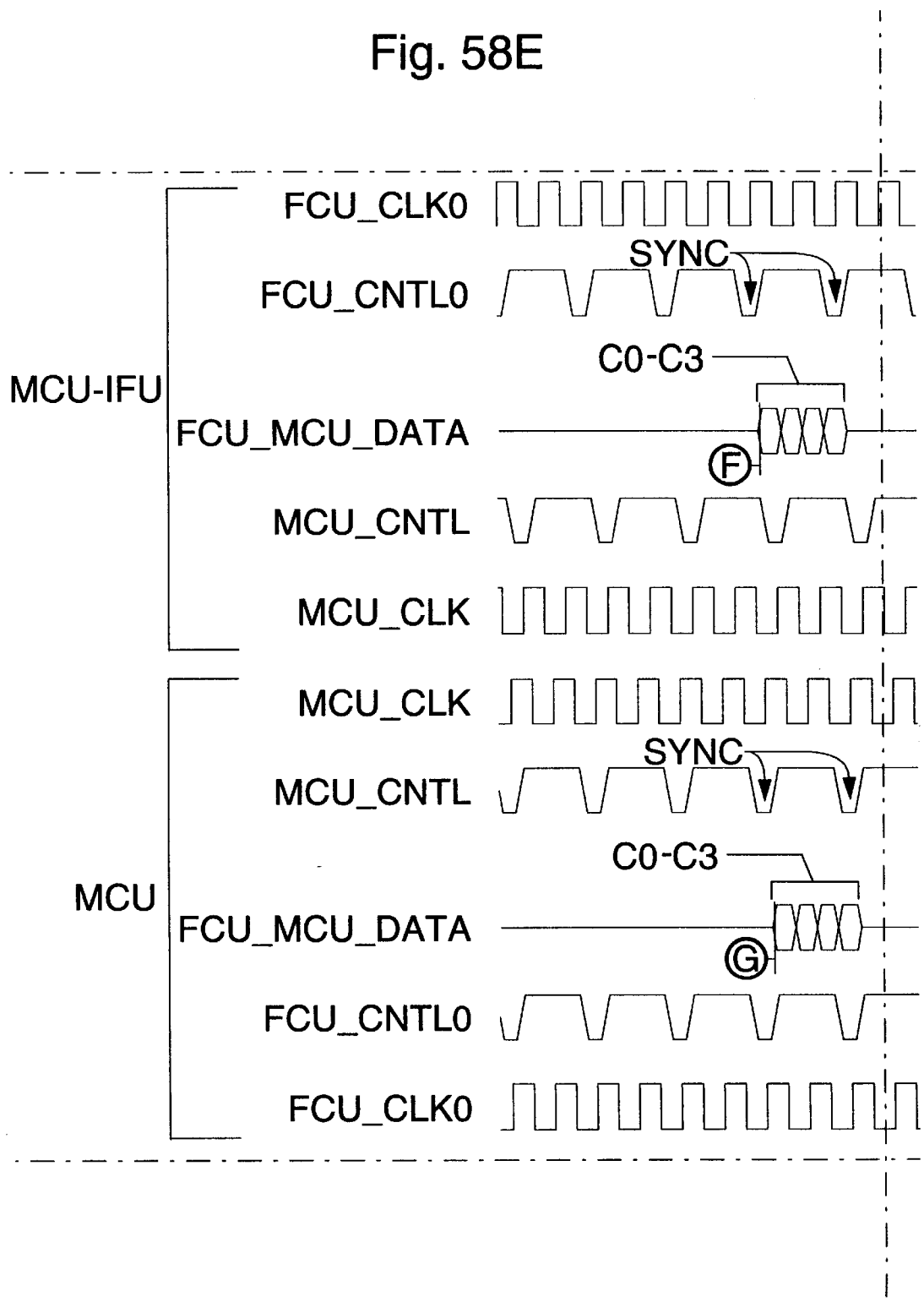
Figure 58F:
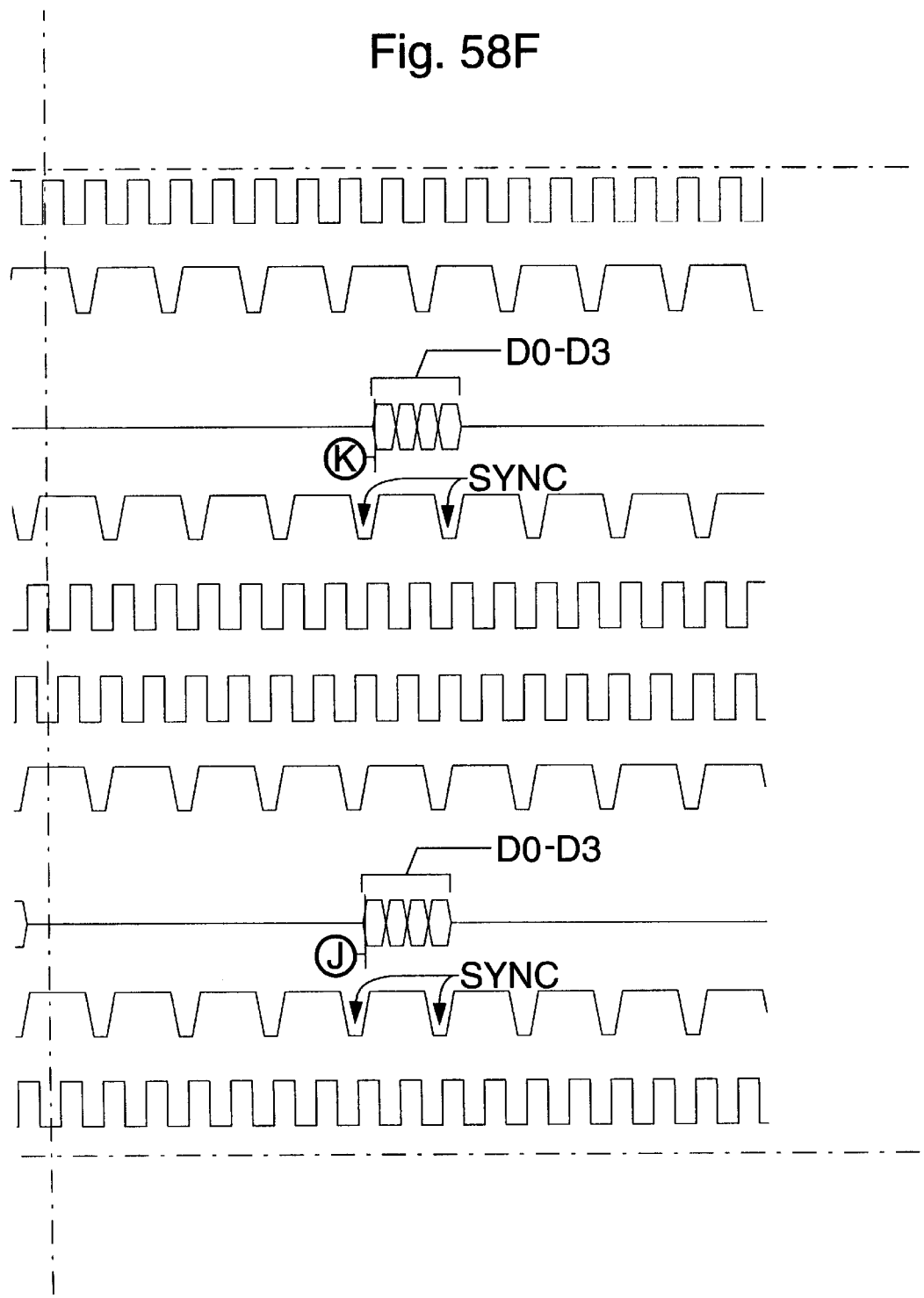
Figure 58G:
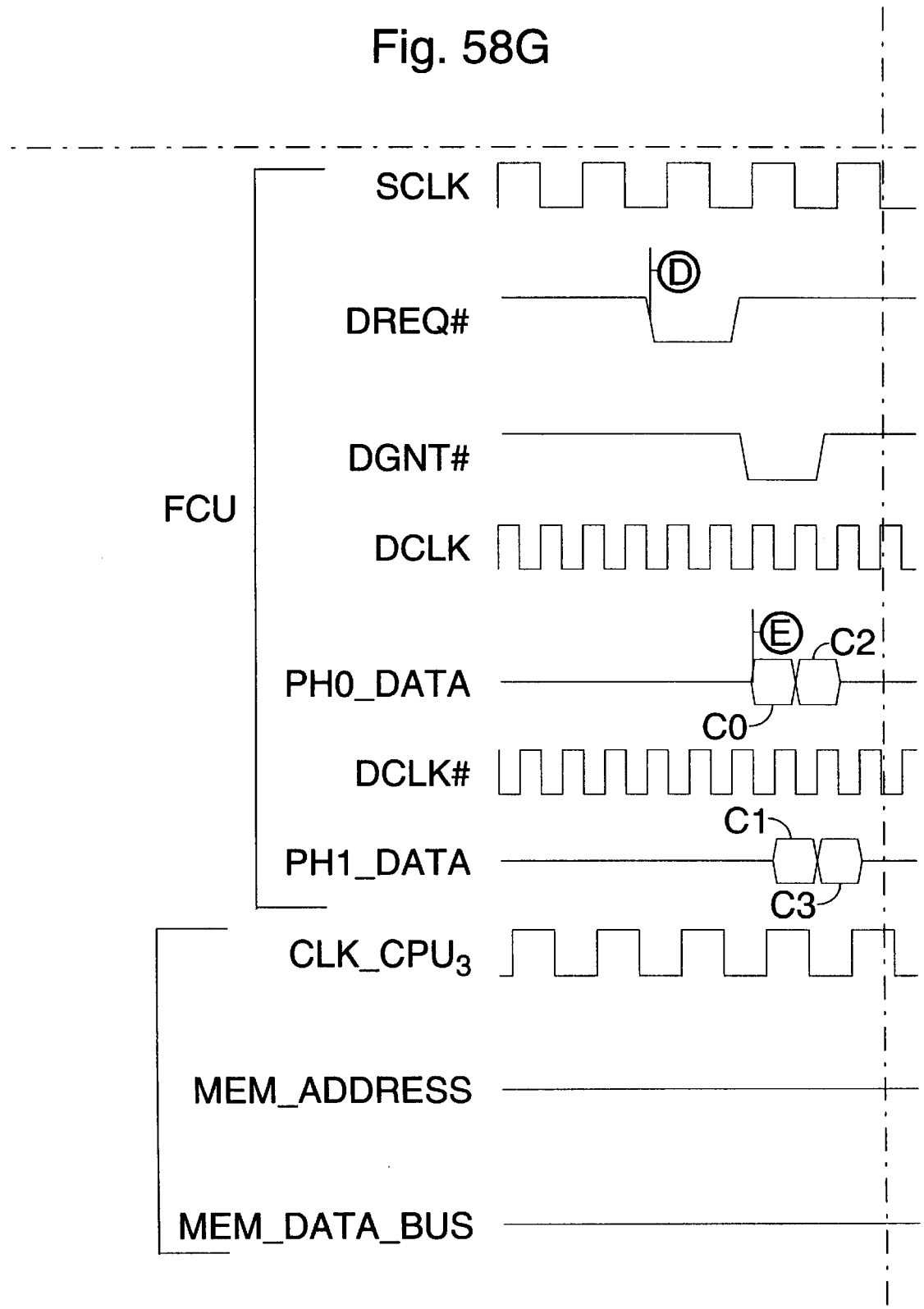
Figure 58H:
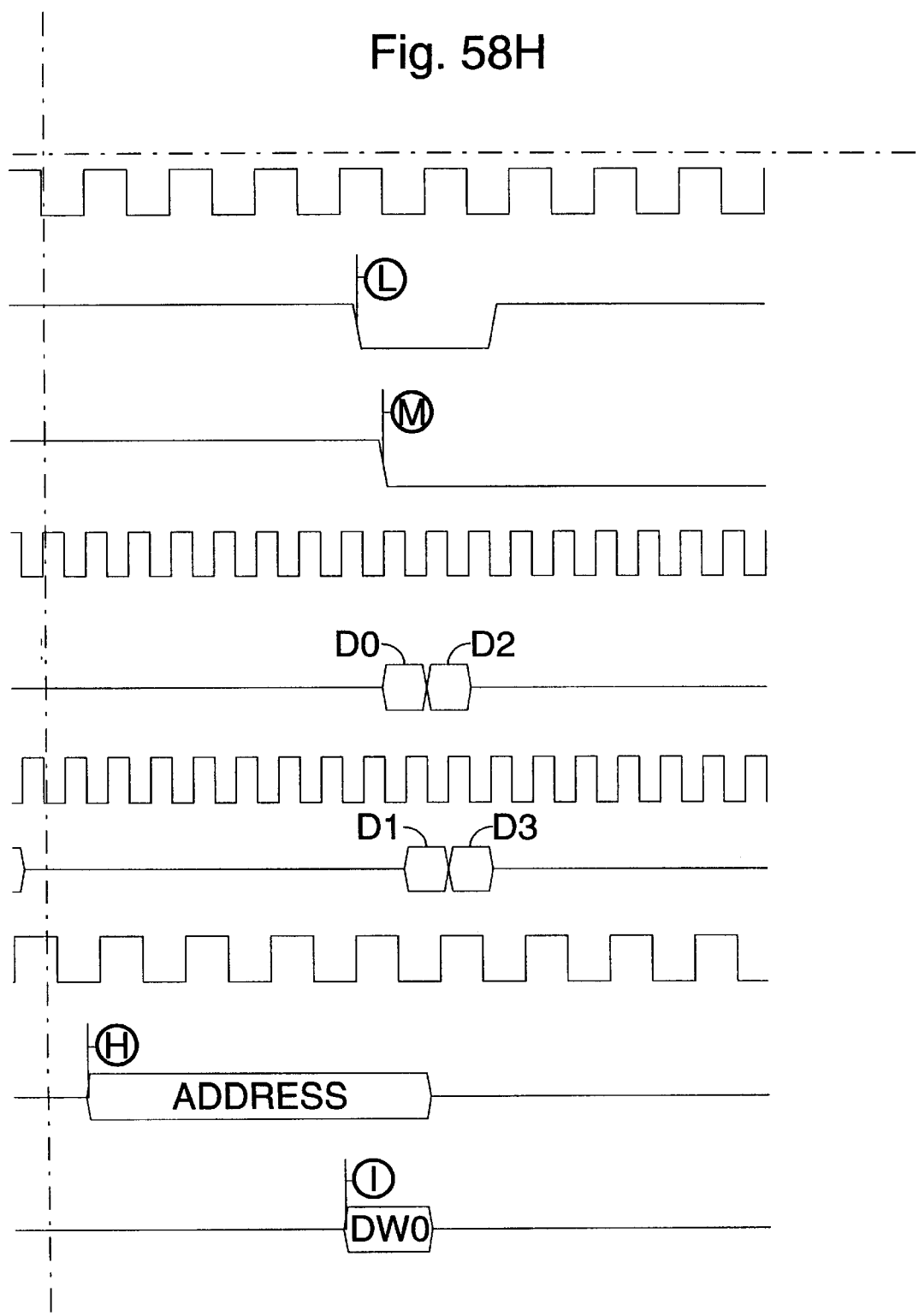
Figure 58I:
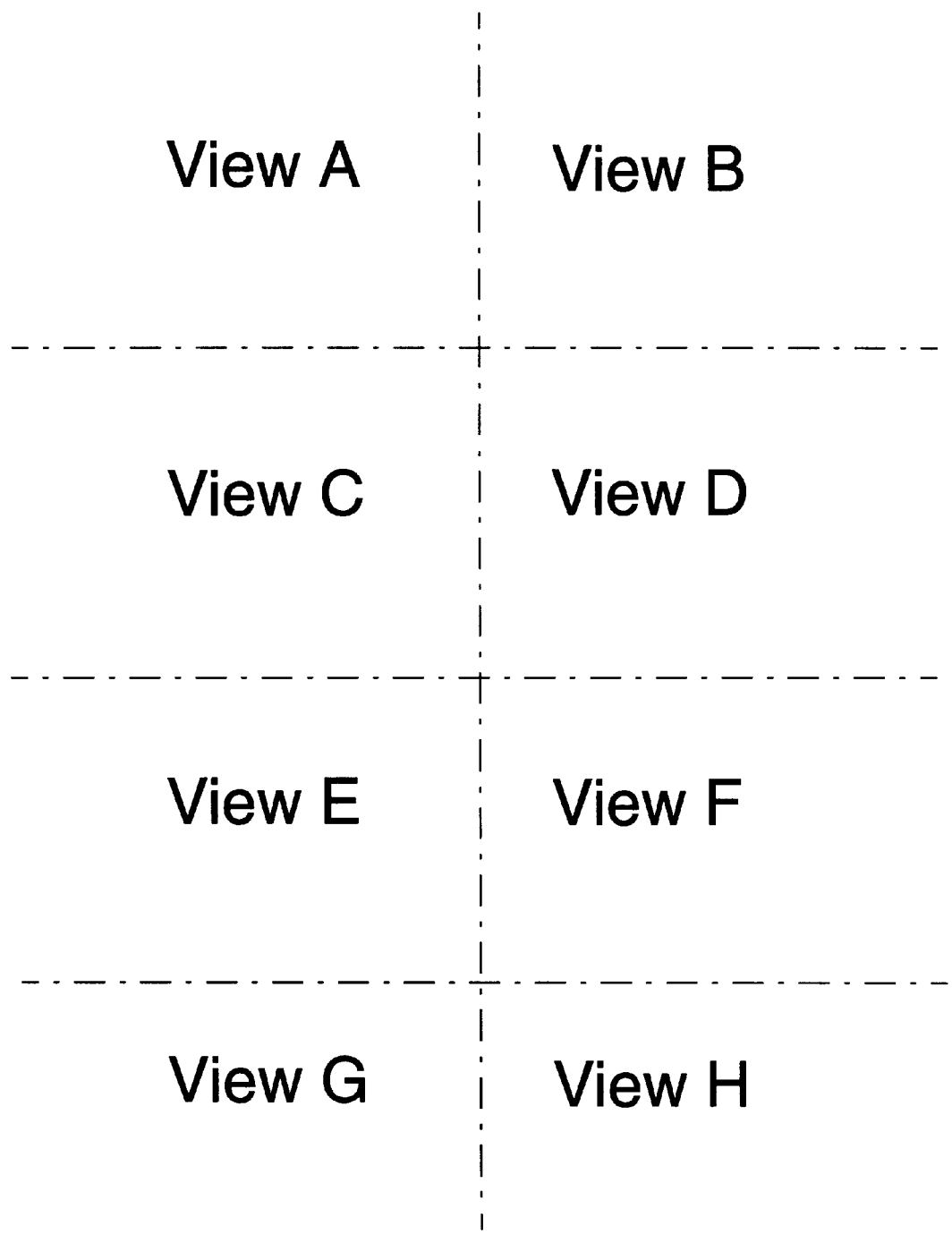
Figure 59A:
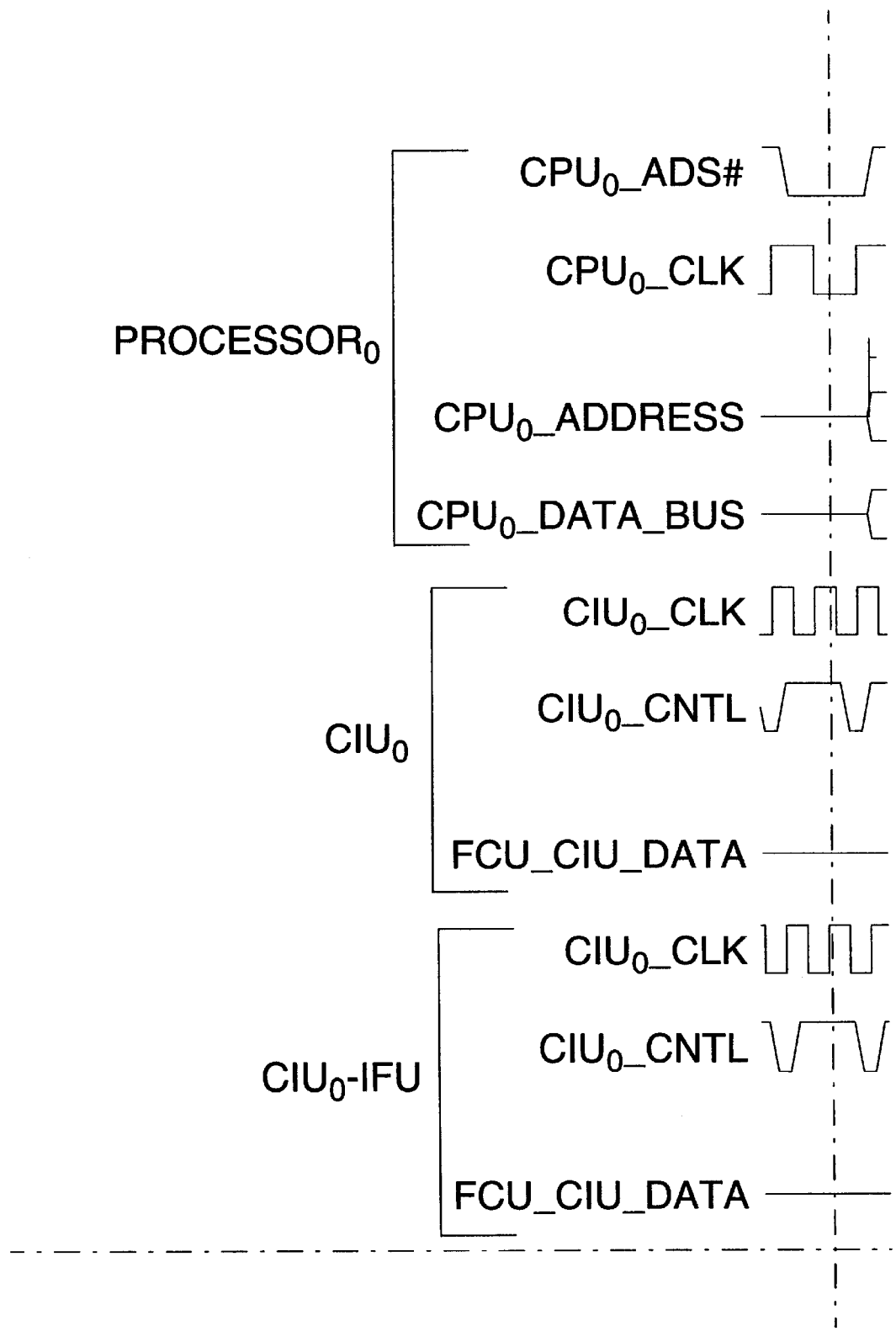
Figure 59B:
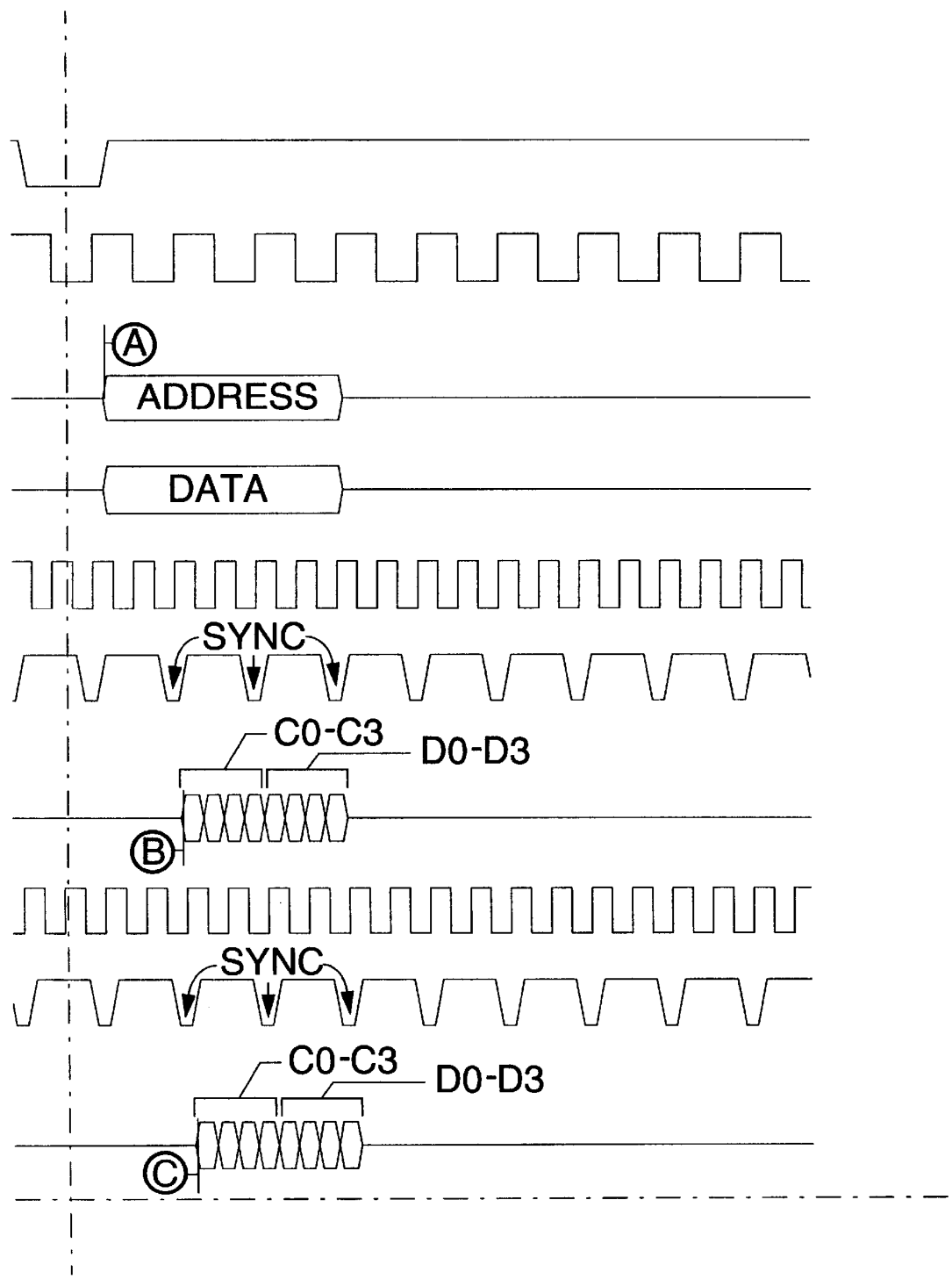
Figure 59C:
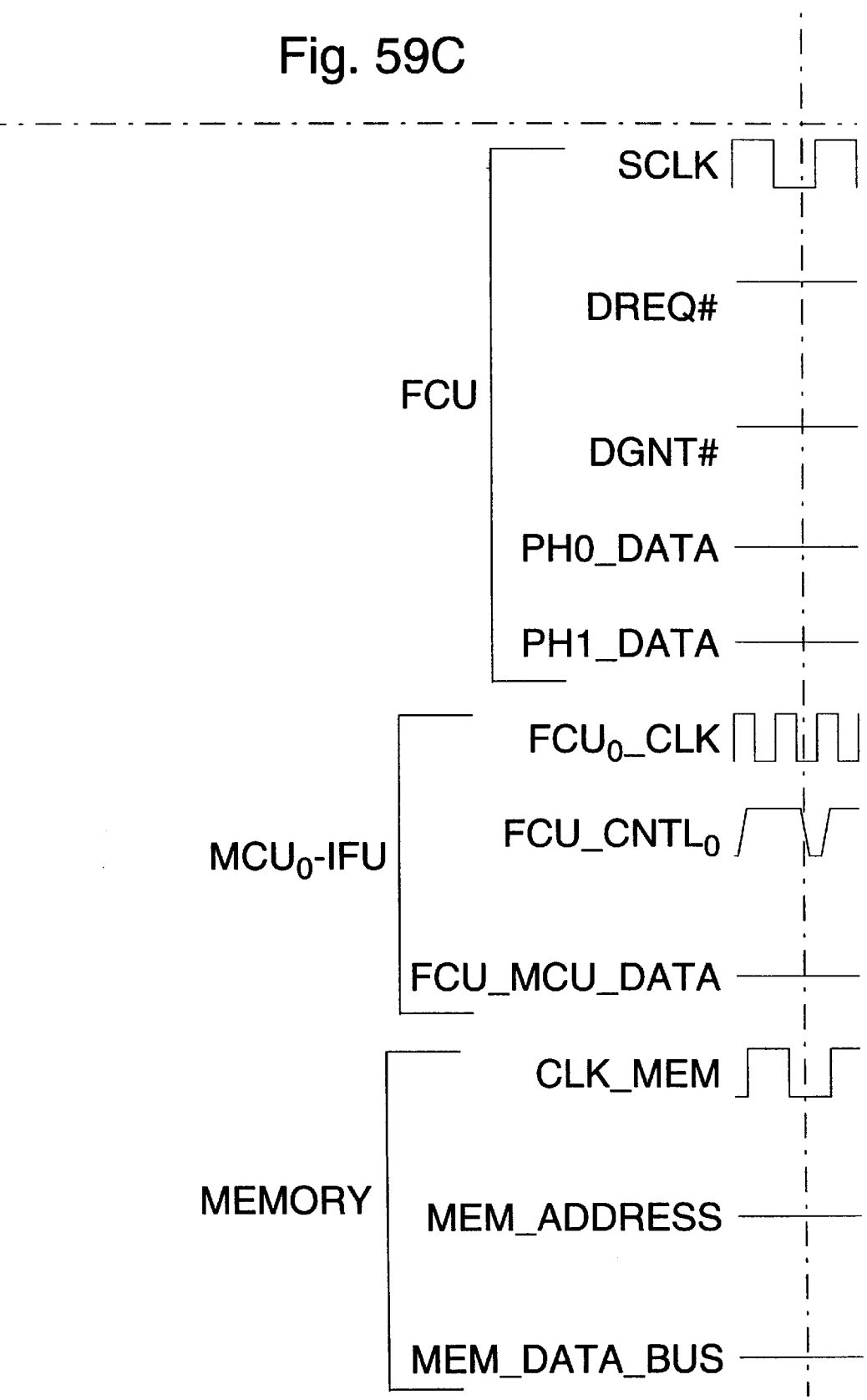
Figure 59D:
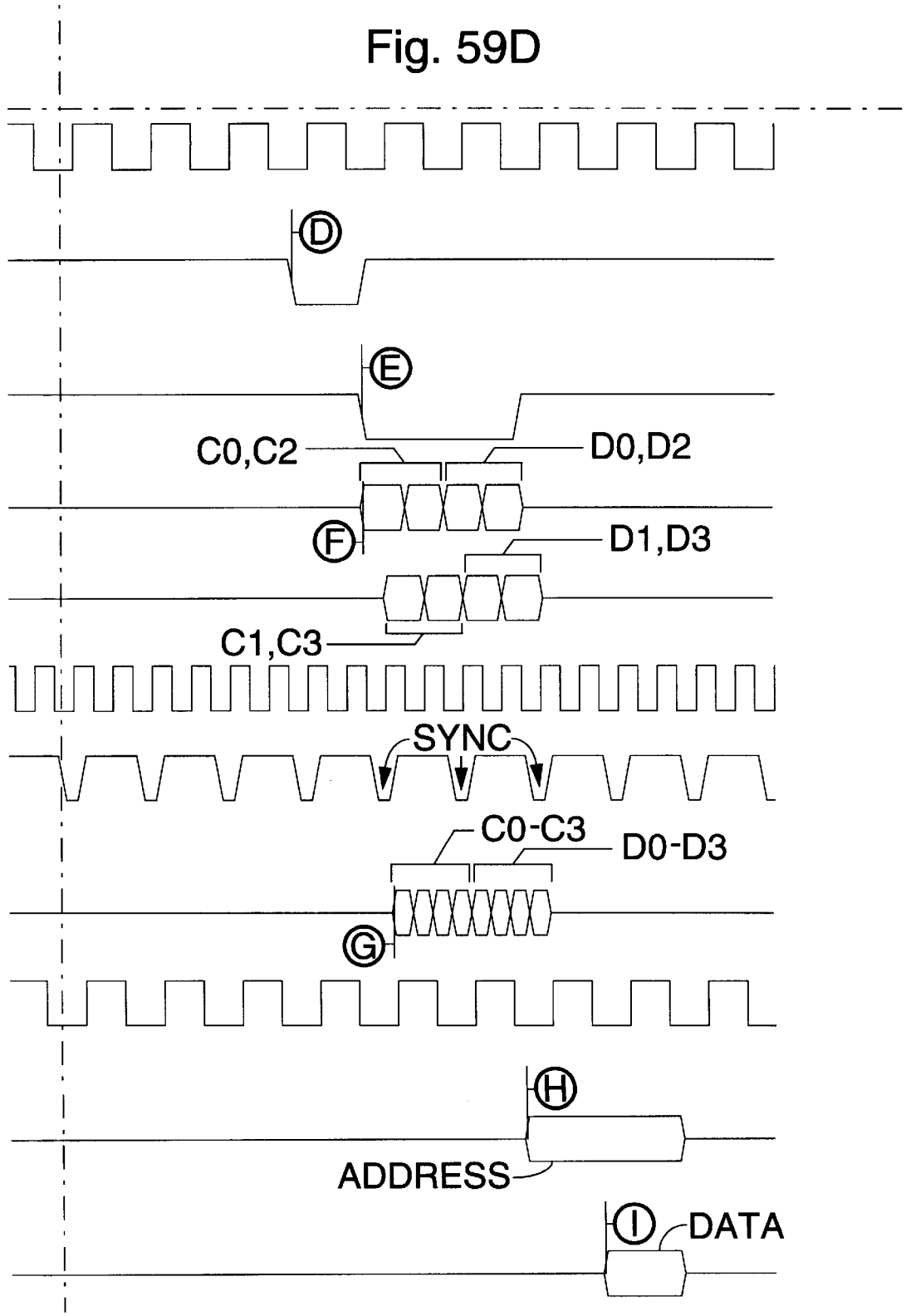
Figure 59E:
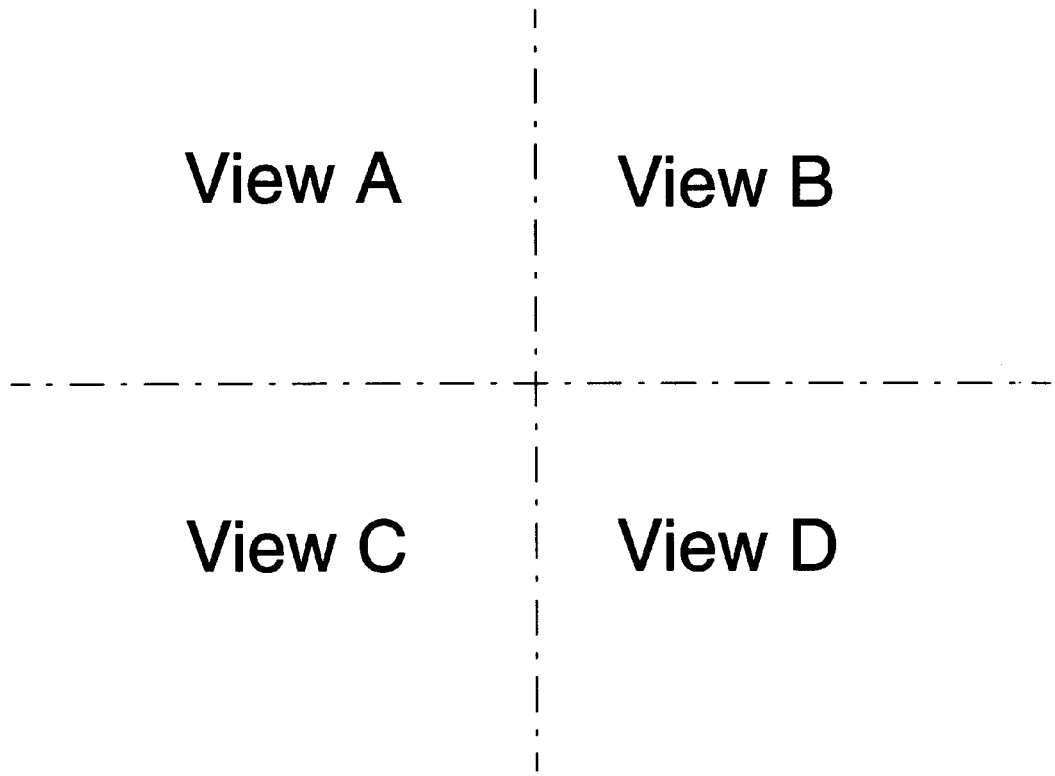

FIGS. 48A–B are exemplary timing diagrams illustrating a cacheable read transaction. In this example, Processor$_0$ 202 initiates the transaction when it receives a cache miss while attempting to read a specified cache line. CIU$_0$ 208 transmits the transaction through the channel to the corresponding CIU$_0$-IFU 310. The CIU$_0$-IFU 310 broadcasts the address and command on the snoop path 320. The result of the snoop operation indicates that the cache line is exclusive to Processor$_3$ 202. This results in CIU$_3$-IFU 310 transmitting the transaction to CIU$_3$ 208 which initiates a read external cache operation to obtain the read data. A deferred read reply including the read data is then transmitted through the channel 210 from CIU$_3$ 208 to CIU$_3$-IFU 310. The CIU$_3$-IFU 310 then obtains a communication path from the data path switch controller 358 to transmit the deferred read reply from CIU$_3$-IFU 310 to CIU$_0$-IFU 310. The CIU$_0$-IFU 310 then transmits the deferred read reply through the channel 210 to CIU$_0$ 208 which in turn places the read data in the Processor$_0$'s data bus thereby completing the transaction.

At time point A, Processor$_0$ 202 requests cacheable read data. At time point B, a cache miss is detected and CIU$_0$ 208 begins to transmit the cacheable read transaction through the channel to the CIU$_0$-IFU 310 as shown at time point C. The cacheable read transaction is packaged into 16-bit command packets that are shown as C0–C3. The command packets are received at starting time point D at CIU$_0$-IFU 310.

The CIU$_0$-IFU 310 requests access to the snoop path 320 at time point E by asserting its SREQ#signal and access is granted at time point F when its SGNT# signal is asserted. At this time, CIU$_0$-IFU 310 places the address in a lock buffer and broadcasts the address and command on the snoop path 320. The result of the snoop operation is made known at time point G and in this example indicates that the cache line is in the exclusive state in the external cache associated with Processor$_3$ 202.

The CIU$_3$-IFU 310 begins to transmit the command packets representing the cacheable read transaction through the channel 210 to the CIU$_3$ 208 at time point H and they are received at CIU$_3$ 208 starting at time point I. At time point J, the $CIU_3$ 208 asserts the processor's AHOLD signal which is used to request that the processor refrain from accessing the external cache. At time point K, the BOFF# signal is asserted which acknowledges the request thereby allowing $CIU_3$ 208 to place the address onto the processor's address bus as shown at time point L.

At time point M, the read data becomes available and the $CIU_3$ 208 begins at time point N to transmit the data in 16-bit data packets through the channel 210 to $CIU_3$-IFU 310. The data packets are received starting at time point O at the $CIU_3$-IFU 310. Once the data packets are received at the $CIU_3$-° FU, the $CIU_3$-IFU 310 requests a communication path from the data path switch controller from the $CIU_3$-IFU 310 to the $CIU_0$-IFU 310 as shown at time point P. When the communication path is granted (DGNT# signal asserted), the data packets are transmitted as shown at time point Q. The data packets begin to arrive at $CIU_0$-IFU 310 at time point R and the $CIU_0$-IFU 310 begins to transmit the data packets to $CIU_0$ 208 through the channel at time point S. $CIU_0$ 208 clears the address associated with the transaction from the lock buffer. At time point T, the data packets arrive on $Processor_0$'s data bus thereby completing the transaction.

Cacheable Write

FIG. 49 is an exemplary timing diagram illustrating a cacheable write transaction. In this example, the transaction is initiated by $Processor_0$ 202 when it receives a cache miss while attempting to write to a specified cache line. $CIU_0$ 208 transmits the transaction and writes data through the channel to the corresponding $CIU_0$-IFU 310. The $CIU_0$-IFU 310 broadcasts the address and command on the snoop path 320. The result of the snoop operation indicates that the cache line needs to be written to main memory since the cache line is resident in the shared and invalid states in one or more processors. This results in $CIU_0$-IFU 310 transmitting the transaction and write data to associated MCU-IFU 312 which in turn transmits the write data to main memory.

At time point A, $Processor_0$ 202 detects a cache miss and $CIU_0$ 208 begins to transmit the cacheable write transaction and the write data through the channel 210 to the $CIU_0$-IFU 310 as shown at time point B. The cacheable write transaction and write data is packaged into 16-bit command packets that are shown as C0–C3 and data packets shown as D0–D3. The command packets begin to be received at $CIU_1$-IFU 310 at time point C. The $CIU_0$-IFU 310 requests access to the snoop path 320 at time point D by asserting its SREQ#signal and access is granted at time point E when its SGNT# signal is asserted. At this time, $CIU_0$-IFU 310 places the address in a lock buffer and broadcasts the address and command on the snoop path 320. The result of the snoop operation is made known at time point F and in this example indicates that the cache line is in the shared and invalid states indicating that the write data will be written out to main memory.

The $CIU_0$-IFU 310 requests a communication path to the MCU-IFU 312 associated with the memory address range corresponding to the requested address. At time point D, $CIU_0$-IFU 310 asserts its DREQ# signal thereby initiating the request which is granted at time point H when its DGNT# signal is asserted. The $CIU_0$-IFU 310 clears the requested address from its lock buffer.

The command and data packets arrive at $MCU_0$-IFU 312 and the $MCU_0$-IFU 312 begins to transmit the command and data packets to the corresponding $MCU_0$ 204 through the channel 210 starting at time point I. The command and data packets are received at the $MCU_0$ 204 starting at time point J. The $MCU_0$ 204 then transmits the address to the memory at time point K and the write data at time point L thereby completing the transaction.

Inquire Internal Cache, Read External Cache (Inquire L1, Read L2)

The Inquire L1 and Read L2 operation is used by the CIU 208 to read the state of the requested cache line in the internal or L1 cache and to read the cache line from the external or L2 cache. The state of the cache line in the internal cache is read in order to determine the appropriate action that may be required in order to maintain the cache line in a consistent state in both caches. This operation is used in the following transaction and for the following cases:

cacheable read transaction where the requested cache line is in the modified or modified clean state;

read invalidate transaction where the requested cache line is in the modified or modified clean state; and I/O memory read transaction where the requested cache line in the modified or modified clean state.

FIG. 50 illustrates the Inquire L1, Read L2 operation. At time point A, the $CIU_0$-IFU 310 starts to transmit the read transaction through the channel to the $CIU_0$ 208 and the $CIU_0$ 208 starts to receive the read transaction at time point B. At time point C, the address is placed on the processor's address bus and the result of the L1 cache lookup is generated at time point D. The result is used by the cache controller in $CIU_0$ 208 to modify the state of the cache line if necessary.

At time point E, the $CPU_0\_ADS$#signal is asserted and the address is placed on the processor's address bus in order to read the cache line from the L2 cache. The $CPU_0\_READ$ signal is asserted at time point F and the data becomes available on the $Processor_0$'s data bus at time point G. The $CIU_0$ 208 starts to transmit the read data through the channel to the $CIU_0$-IFU 310 at time point H and is received at $CIU_0$-IFU 310 starting at time point I.

In addition, the Read L2 cache operation shown in FIG. 47 can be performed without the Inquire L1 operation when processing the following transactions and for the following cases:

cacheable read transaction where the requested cache line is in the exclusive state;

read invalidate transaction where the requested cache line is in the exclusive state; and I/O memory read transaction where the requested cache line in the exclusive state.

Inquire Internal Cache, Write External Cache—(Inquire L1, Write L2)

The Inquire L1 and Write L2 operation is used by the CIU 208 to read the state of the requested cache line in the internal or L1 cache and to write to the cache line in the external or L2 cache. The state of the cache line in the internal cache is read in order to determine the appropriate action that may be required in order to maintain the cache line in a consistent state in both caches. This operation is used in the following transaction and for the following cases:

cacheable write transaction where the requested cache line is in the modified or modified clean state; and I/O memory write transaction where the requested cache line in the modified or modified clean state.

FIG. 51 illustrates the Inquire L1, Write L2 operation. At time point A, the $CIU_0$-IFU 310 starts to transmit the read transaction through the channel 210 to the $CIU_0$ 208 and the $CIU_0$ 208 starts to receive the read transaction at time point B. At time point C, the address is placed on the processor's address bus and the result of the L1 cache lookup is generated at time point D. The result is used by the cache controller in $CIU_0$ 208 to modify the state of the cache line if necessary.

At time point E, the CPU$_0$_ADS#signal is asserted and the address is placed on the processor's address bus in order to write to the cache line in the L2 cache. The CPU$_0$_WRITE signal is asserted at time point F and the data is written onto the Processor$_0$'s data bus at time point G.

In addition, the Write L2 cache operation shown in FIG. 50 can be performed without the Inquire L1 operation when processing the following transactions and for the following cases:

cacheable write transaction where the requested cache line is in the exclusive state; and I/O memory write transaction where the requested cache line in the exclusive state.

I/O Memory Read

FIG. 52 is an exemplary timing diagram illustrating an I/O memory read transaction. In this example, the I/O memory read transaction is initiated by a PCI bus that is connected to BBU, 206. The BBU$_0$ 206 transmits the read transaction into 16-bit command packets shown as C0–C3 through the channel 210 to the BBU$_0$-IFU 300. The BBU$_0$-IFU 300 broadcasts the transaction on the snoop path 320. There is a cache miss and the associated MCU$_0$-IFU 312 transmits the transaction through the channel 210 to the MCU 204 and awaits a deferred read reply. The read data is accessed from the memory and transmitted to the MCU 204. The MCU 204 forwards the deferred read reply to the MCU$_0$-IFU 312. The MCU$_0$-IFU 312 then requests a communication path from the MCU$_0$-IFU 312 to the BBU$_0$-IFU 300. The BBU$_0$-IFU 300 transmits the deferred read reply to the BBU$_0$ 206 which in turn transmits the read data to the PCI bus.

At time point A, the PCI_REQ# signal is asserted and access to the PCI bus is granted at time point B when the PCI_GNT# signal is asserted. An address is placed on the bus representing the I/O memory read transaction. After the second rising edge of the BBU_CLK signal (time point C), the BBU$_0$ 206 transmits command packets C0–C3 representing the I/O memory read transaction to the BBU$_0$-IFU 300 as shown at time point D. The command packets are received at the BBU$_0$-IFU 300 at time point E.

The BBU$_0$-IFU 300 requests access to the snoop path 320 by asserting its SREQ# signal at time point F. Access is granted when its SGNT# signal is asserted at time point G. The BBU$_0$-IFU 300 places the address associated with the transaction in a lock buffer. The address and command is broadcasted on the snoop path 320. At time point H, the result of the snoop operation is generated and in this example is a cache miss (SNOOP_HIT=I/S).

At the next clock cycle (time point I), the MCU$_0$-IFU 312 associated with the memory address transfers through the channel 210 the command packets to the associated MCU$_0$ 204 which are received at time point J. The MCU$_0$ 204 initiates the appropriate actions to retrieve the read data from the requested memory access. The memory is accessed at time point K and the read data is transmitted to the MCU 204. At time point L, the MCU 204 transfers through the channel 210 a deferred read reply including the read data to the MCU$_0$-IFU 312 which is received by the MCU$_0$-IFU 312 at time point M. The MCU$_0$-IFU 312 then requests from the data path switch controller 358 a communication path to the BBU$_0$-IFU 300 by asserting its DREQ# signal. The communication path is granted when the DGNT# signal is asserted and the deferred read reply is then transmitted to the BBU$_0$-IFU 300 starting at time point N.

The BBU$_0$-IFU 300 then transmits the deferred read reply through the channel to the BBU$_0$ 206 as shown at time point O and clears the transaction from the lock buffer. The BBU$_0$ 206 receives the deferred read reply at time point P which is then transmitted to the PCI bus, thereby completing the transaction.

I/O Memory Write

FIG. 53 illustrates an I/O memory write transaction that is initiated by an external I/O device coupled to the PCI bus. In this illustration, the requested address is located in an L2 cache associated with CIU$_3$ 208 and the write data is then written to the L2 cache.

At time point A, the PCI_REQ# signal is asserted and access to the PCI bus is granted at time point B when the PCI_GNT# signal is asserted. An address is placed on the bus representing the I/O memory write transaction. After the second rising edge of the BBU_CLK signal (time point C), the BBU$_0$ 206 transmits command packets C0–C3 and data packets D0–D3 to the BBU$_0$-IFU 300 as shown at time point D. The command and data packets are received at the BBU$_0$-IFU 300 starting at time point E. The BBU$_0$-IFU 300 then asserts the SREQ# signal to request the snoop path 320 as shown at time point F. The snoop path 320 is granted when the SGNT# signal is asserted as shown at time point G. At this time the BBU$_0$-IFU 300 places the address corresponding to the transaction in a lock buffer. The address is then broadcasted on the snoop path 320 and the result indicates that the L2 cache associated with CIU$_3$ 208 has the cache line in an exclusive state as shown at time point H. The BBU$_0$-IFU 300 samples the identifier on the STARGET_ID signal as the target interface device that receives the write data.

The BBU$_0$-IFU 300 then requests from the data path switch controller a communication path to CIU$_3$-IFU 310 by asserting its DREQ# signal as shown at time point I. The request is granted when its DGNT# signal is asserted and the command and data packets are transmitted to CIU$_3$-IFU 310 as shown at time point J. The BBU$_0$-IFU 300 clears the address corresponding to the transaction from the lock buffer. The CIU$_3$-IFU 310 transmits the command and data packets at time point K through the channel to CIU$_3$ 208 which are received starting at time point L and placed on the appropriate address and data buses to be written to the L2 cache as shown at time points M and N.

I/O Read

FIG. 54 illustrates an I/O read transaction. The I/O read transaction is used to read data from an external I/O device connected to BBU$_0$ 206 to Processor$_0$ 202. The transaction is initiated by Processor$_0$ 202 and transmitted by CIU$_0$ 208 through the channel 210 to the FCU 212. The CIU$_0$-IFU 310 receives the command, obtains a communication path to the associated BBU$_0$-IFU 300, and transmits the command to the BBU$_0$-IFU 300 The BBU$_0$-IFU 300 transmits the command to the respective BBU$_0$ 206 through the channel 210 and awaits a deferred read reply. The BBU$_0$-IFU 300 receives the deferred read reply, obtains a communication path to the CIU$_0$-IFU 310, and transmits the read data to the CIU$_0$-IFU 310. The CIU$_0$-IFU 310 then transmits the read data through the associated channel 210 to the CIU$_0$ 208 which then transmits the read data to Processor$_0$ 202.

At time point A, Processor$_0$ 202 issues an address on the CPU$_0$_Address signal representing an I/O read request. The CIU$_0$ 208 formulates the I/O read request into a transaction that is composed of four 16-bit command packets referred to as C0–C3. At time point B, the CIU$_0$ 208 transmits the command packets through the channel 210 to the CIU$_0$-IFU 310 and the command packets are received by the CIU$_0$-IFU 310 at time point C. The CIU$_0$-IFU 310 requests a communication path from the data path switch controller 358 to the BBU$_0$-IFU 300 by asserting its DREQ$_0$# signal as shown at time point D. At time point E, CIU$_0$-IFU's DGNT$_0$# signal is asserted and at time point F, CIU$_0$-IFU 310 transmits the command to the BBU$_0$-IFU 300. The BBU$_0$-IFU 300 receives the command at time point G and transmits the command to the $BBU_0$ 206 through the channel at time point H. The $BBU_0$-IFU 300 then awaits the deferred read reply.

At time point I, the $BBU_0$ 206 transmits the deferred read reply to the $BBU_0$-IFU 300 through the associated channel 210 which is received at the $BBU_0$-IFU 300 at time point J. The $BBU_0$-IFU 300 then requests a communication path from the data path switch controller 358 by asserting its $DREQ_1\#$ signal as shown at time point K. At time point L, the $CIU_0$-IFU's $DGNT_1\#$ signal is asserted at time point L, and the $BBU_0$-IFU 300 transmits the read data to the initiator $CIU_0$-IFU 310 as shown at time point M. The $CIU_0$-IFU 310 places the read data on the channel at time point N which is received by $CIU_0$ 208 at time point O. The $CIU_0$ 208 then transmits the read data onto the $Processor_0$'s data bus which completes the transaction.

I/O Write

FIG. 55 is an exemplary timing diagram illustrating an I/O write transaction. In this example, the I/O write transaction is used to write data from $Processor_0$ 202 to an external I/O device connected to $BBU_0$ 206. The transaction is initiated by $Processor_0$ 202 and transmitted to the FCU 212 through $CIU_0$ 208. The $CIU_0$-IFU 310 receives the command and data from the channel 210, obtains a communication path to the associated $BBU$-$IFU_0$ 300, and transmits the command and data to the $BBU$-$IF_0$ 300. The $BBU$-$IFU_0$ 300 transmits the command and data to the respective $BBU_0$ 206 through the channel 210.

At time point A, an address is placed on the processor bus indicating an I/O write to a specified memory location. At time point B, the associated $CIU_0$ 208 obtains the channel and transmits the transaction and write data to the corresponding $CIU_0$-IFU 310. The transaction is transmitted as 16-bit command packets shown as C0–C3 and the write data is transmitted as 16-bit data packets shown as D0–D3. The transaction adheres to the data format shown in FIG. 9. The transaction and write data are transmitted through the channel 210 as described above with respect to FIGS. 12A–12B.

The command and data packets are received at $CIU_0$-IFU 310 starting at time point C. The $CIU_0$-IFU 310 then requests from the data path switch controller 358 a communication path from $CIU_0$-IFU 310 to $BBU_0$-IFU 300. At time point D, $CIU_0$-IFU 310 asserts its $DREQ_0\#$ signal and the communication path is granted at time point E when its associated $DGNT_0\#$ signal is asserted. At time point F, the command and data packets are transmitted on the communication path to $BBU_0$-IFU 300. At time point G, the $BBU_0$-IFU 300 obtains the channel 210 and transmits the command and data packets through the channel 210 to $BBU_0$ 206.

Read Invalidate

FIG. 56 is an exemplary timing diagram illustrating a read invalidate transaction. In this example, $Processor_0$ initiates the read invalidate command to obtain sole ownership of a cache line that resides in $Processor_3$'s external cache. The read data is obtained from $Processor_3$'s external cache, invalidated in $Processor_3$'s external cache, and transmitted to $Processor_1$.

At time point A, $Processor_0$ 202 initiates the read invalidate and $CIU_0$ 208 begins to transmit the read invalidate transaction through the channel to the $CIU_0$-IFU 310 as shown at time point B. The cacheable read transaction is packaged into 16-bit command packets that are shown as C0–C3. The command packets start to arrive at $CIU_0$-IFU 310 at time point C.

The $CIU_0$-IFU 310 requests access to the snoop path 320 at time point D by asserting its SREQ# signal and access is granted at time point E when its SGNT# signal is asserted. At this time, $CIU_0$-IFU 310 places the address in a lock buffer and broadcasts the address and command on the snoop path 320. The result of the snoop operation is made known at time point F and in this example indicates that the cache line is in the exclusive state in the external cache associated with $Processor_3$ 202.

The $CIU_3$-IFU 310 begins to transmit the command packets representing the read invalidate transaction through the channel 210 to the $CIU_3$ 208 at time point G and they are received at $CIU_3$ 208 starting at time point H. At time point I, the $CIU_3$ 208 asserts the processor's AHOLD signal which is used to request that the processor refrain from accessing the external cache. At time point J, $CIU_3$ 208 places the address onto the processor's address bus and the read data becomes available at time point K.

The $CIU_3$ 208 begins at time point L to transmit the data in 16-bit data packets through the channel 210 to $CIU_3$-IFU 310. The data packets are received starting at time point M at the $CIU_3$-IFU 310. Once the data packets are received at the $CIU_3$-IFU, the $CIU_3$-IFU 310 requests a communication path from the data path switch controller from the $CIU_3$-IFU 310 to the $CIU_0$-IFU 310 as shown at time point N. When the communication path is granted (DGNT# signal asserted), the data packets are transmitted starting at time point N. The data packets begin to arrive at $CIU_0$-IFU 310 at time point O and the $CIU_0$-IFU 310 begins to transmit the data packets to $CIU_0$ 208 through the channel at time point P. $CIU_0$ 208 clears the address associated with the transaction from the lock buffer. At time point Q, the data packets arrive on $Processor_0$'s data bus thereby completing the transaction. The data is stored in $Processor_0$'s external cache in the exclusive state and is invalidated in $Processor_3$'s external cache.

Memory Writeback

FIG. 57 is an exemplary timing diagram illustrating a memory writeback transaction. In this example, the transaction is initiated by $Processor_0$ 202 and is transmitted to the FCU 212 through $CIU_0$ 208. The $CIU_0$-IFU 310 receives the command and write data from the channel 210, obtains a communication path to the $MCU$-$IFU_0$ 312 associated with the requested address, and transmits the command and write data to the $MCU$-$IFU_0$ 312. The $MCU$-$IFU_0$ 312 transmits the command and data to the respective $MCU_0$ 204 through the channel 210.

At time point A, an address is placed on the processor bus indicating a specified memory location and write data is placed on the processor data bus. At time point B, the associated $CIU_0$ 208 obtains the channel and transmits the transaction and write data to the corresponding $CIU_0$-IFU 310. The transaction is transmitted as 16-bit command packets shown as C0–C3 and the write data is transmitted as 16-bit data packets shown as D0–D3. The transaction adheres to the data format shown in FIG. 10. The transaction and write data are transmitted through the channel 210 as described above.

The command and data packets are received at $CIU_0$-IFU 310 starting at time point C. The $CIU_0$-IFU 310 then requests from the data path switch controller 358 a communication path from $CIU_0$-IFU 310 to $MCU_0$-IFU 312. At time point D, $CIU_0$-IFU 310 asserts its $DREQ_0\#$ signal and the communication path is granted at time point E when its associated $DGNT_0\#$ signal is asserted. Starting at time point F, the command and data packets are transmitted on the communication path to $MCU_0$-IFU 312. At time point G, the $MCU_0$-IFU 312 starts to transmit the command and data packets through the channel 210 to $MCU_0$ 204. The $MCU_0$ 204 then writes out the write data to the specified location by first addressing the requested memory location as shown at time point H and by placing the write data on the memory data bus as shown at time point I.

Non-Cacheable Read

FIG. 58 is an exemplary timing diagram illustrating a non-cacheable read transaction. In this example, Processor$_0$ 202 initiates the transaction which is transmitted by CIU$_0$ 208 through the channel 210 to CIU$_0$-IFU 310. The CIU$_0$-IFU 310 requests a communication path from the data path switch controller 358 to the MCU-IFU 312 associated with the requested address in order to transmit the read transaction to the corresponding memory. A deferred read reply is generated by the MCU 204 including the read data and transmitted to the MCU-IFU 312. The MCU-IFU 312 then requests another communication path from the MCU-IFU 312 to the CIU$_0$-IFU 310 in order to transmit the deferred read reply to the CIU$_0$-IFU 310. The CIU$_0$-IFU 310 then transmits the deferred read reply to the CIU$_0$ 208 which places the read data on Processor$_0$'s data bus. It should be noted that the non-cacheable read command can also be initiated by the BBU 206 in response to such a request from an associated external I/O device.

At time point A, Processor$_0$ 202 initiates the non-cacheable read transaction and CIU$_0$ 208 transmits the transaction through a set of 16-bit command packets shown as C0–C3 through the channel to CIU$_0$-IFU 310 starting at time point B. The command packets are received at CIU$_0$-IFU 310 starting at time point C and at time point D, the CIU$_0$-IFU 310 requests a communication path to MCU$_0$-IFU 312 by asserting its DREQ# signal. The request is granted at time point E when its DGNT# signal is asserted and the command packets are transmitted to MCU$_0$-IFU 312 which is associated with the requested address. The MCU$_0$-IFU 312 then transmits the command packets through the channel to the associated MCU$_0$ 204 starting at time point F and the command packets are received at MCU$_0$ 204 starting at time point G.

The memory is accessed at time point H by asserting the requested address on the memory address bus and the read data is accessed at time point I. A deferred read reply is generated and transmitted from MCU$_0$ 204 starting at time point J and received at MCU$_0$-IFU 312 starting at time point K. The MCU$_0$-IFU 312 then requests a communication path to CIU$_0$_IFU 310 by asserting its DREQ# signal as shown at time point L. At time point M, the MCU$_0$-IFU's DGNT# signal is asserted and the deferred read reply is transmitted to CIU$_0$_IFU 310. The CIU$_0$_IFU 310 begins to transmit the deferred read reply through the channel 210 to CIU$_0$ 208 at time point N and is received at CIU$_0$ 208 starting at time point 0. The data is then placed on Processor$_0$'s data bus at time point P thereby completing the transaction.

Non-Cacheable Write

FIG. 59 is an exemplary timing diagram illustrating a non-cacheable write transaction. A non-cacheable write transaction can be initiated by either a processor or an external I/O device. In this example, the transaction is initiated by Processor$_0$ 202 and is transmitted to the FCU 212 through CIU$_0$ 208. The CIU$_0$-IFU 310 receives the command and write data from the channel 210, obtains a communication path to the MCU-IFU$_0$ 312 associated with the requested address, and transmits the command and write data to the MCU-IFU$_0$ 312. The MCU-IFU$_0$ 312 transmits the command and data to the respective MCU$_0$ 204 through the channel 210.

At time point A, an address is placed on the processor bus indicating a specified memory location and write data is placed on the processor data bus. At time point B, the associated CIU$_0$ 208 obtains the channel and transmits the transaction and write data to the corresponding CIU$_0$-IFU 310. The transaction is transmitted as 16-bit command packets shown as C0–C3 and the write data is transmitted as 16-bit data packets shown as D0–D3. The transaction adheres to the data format shown in FIG. 10. The transaction and write data are transmitted through the channel 210 as described above.

The command and data packets are received at CIU$_0$-IFU 310 starting at time point C. The CIU$_0$-IFU 310 then requests from the data path switch controller 358 a communication path from CIU$_0$-IFU 310 to MCU$_0$-IFU 312. At time point D, CIU$_0$-IFU 310 asserts its DREQ$_0$# signal and the communication path is granted at time point E when its associated DGNT$_0$# signal is asserted. Starting at time point F, the command and data packets are transmitted on the communication path to MCU$_0$-IFU 312. At time point G, the MCU$_0$-IFU 312 starts to transmit the command and data packets through the channel 210 to MCU$_0$ 204. The MCU$_0$ 204 then writes out the write data to the specified location by first addressing the requested memory location as shown at time point H and by placing the write data on the memory data bus as shown at time point I.

The foregoing description has shown the operation of a few exemplary transactions. However, it should be noted that the technology of the present invention allows several of these transactions to be processed simultaneously thereby increasing the throughput of the system.

In addition, the technology of the present invention is advantageous over the prior art for several reasons. The use of the point-to-point interconnect structure or channel improves the system's throughput since it eliminates contention delays and transmission line effects typically associated with bus interconnect structures.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The technology of the present invention has been described with reference to digital interconnect structures such as the channel, snoop path, and data paths. However, the present invention is not constrained to this particular technology and can be practiced with other types of interconnect technologies such as but not limited to fiber optic, optical, radio wave interconnect structures, and the like.

I claim:

1. An apparatus for executing a plurality of transactions in a processing system, the system having a first command initiator device, a first memory device, and a plurality of point-to-point links, the apparatus comprising:

a plurality of channel interface units, each channel interface unit having at least one first-in-first-out buffer and first, second, and third ports for communication in two directions, each port including at least one communication interface enabling communication in at least one direction, at least the first command initiator device and at least the first memory device being coupled to said apparatus via a respective one of the first ports and a respective one of the links, each of the links enabling communication in two directions, each link including at least one communication path enabling communication in at least one direction, wherein for each of at least some of the plurality of transactions an associated transaction header and any associated transaction data are communicated between each command initiator device coupled to said apparatus and the respective channel interface unit via a plurality of associated bit-groups transferred over the respective link, each bit-group having a common predetermined number of information bits, each information said bit of each bit-group having a bit-group-sequence-dependent one of a plurality of associated functions, the same communication path of the said at least one communication path of the respective link being used for all bit-groups transferred in each direction, each of said bit-groups being transferred over said respective link one at a time via at least a first transfer, at least some of said bit-groups being unsuccessfully communicated during the first transfer and having at least one additional transfer over said respective link, each transfer over said respective link being performed in a predetermined fixed-length time-interval, at least some of said bit-groups being queued in the at least one said first-in-first-out buffer, and at least some of the transaction headers including a transaction command and a transaction address;

configurable multipurpose interconnect, the second port of each said channel interface unit being coupled to the configurable multipurpose interconnect, said configurable multipurpose interconnect enabling inter-device communication of at least some of the transaction data for a transaction-dependent first croup of the devices coupled to said apparatus, the configurable multipurpose interconnect enabled said inter-device communication being via the coupling to said second ports of the respective channel interface units;

a command serialization resource, the third port of each said channel interface unit being coupled to said command serialization resource, said command serialization resource enabling said inter-device communication of at least some of said transaction headers for a transaction-dependent second group of the devices coupled to the apparatus, said command serialization resource enabled said inter-device communication being via the coupling to said third ports of the respective channel interface units; and command control logic, said command control logic coupled to monitor at least part of each said transaction header communicated to said command serialization resource, said command control logic ascertaining the transaction-dependent first and second groups, said first group including the command initiator device initiating the transaction and said target device associated with said transaction, the target device being selected from the devices coupled to the apparatus, the second group including each device coupled to a respective channel interface unit for which the transaction is relevant to consistent operation of the system.

2. A processing system for executing a plurality of transactions, the system comprising:

a plurality of point-to-point links;

a central shared memory having a single address space having a plurality of addressable locations, the central shared memory including at least one memory device;

a plurality of command initiator devices, at least one of the command initiator devices being a processor device, each processor device having at least one cache memory for selectively caching at least some of the locations of the central shared memory, none of the at least one processor device having a resident portion of the central shared memory;

a plurality of channel interface units, each channel interface unit having at least one first-in-first-out buffer and first, second, and third ports for communication in two directions, each port including at least one communication interface enabling communication in at least one direction, at least the plurality of command initiator devices and the at least one memory device being coupled to the apparatus via a respective one of the first ports and a respective one of the links, each of the links enabling communication in two directions, each link including at least one communication path enabling communication in at least one direction, wherein for each of at least some of the plurality of transactions an associated transaction header and any associated transaction data are communicated between each command initiator device coupled to the apparatus and the respective channel interface unit via a plurality of associated bit-groups transferred over the respective link, each bit-group having a common predetermined number of information bits, each information bit of each bit-group having a bit-group-sequence-dependent one of a plurality of associated functions, the same communication path of the at least one communication path of the respective link being used for all bit-groups transferred in each direction, each of the bit-groups being transferred over the respective link one at a time via at least a first transfer, at least some of the bit-groups being unsuccessfully communicated during the first transfer and having at least one additional transfer over the respective link, each transfer over the respective link being performed in a predetermined fixed-length time-interval, at least some of the bit-groups being queued in the at least one first-in-first-out buffer, at least some of the transaction headers including a transaction command and a transaction address, each processor device transmitting one or more of the transaction headers to the respective channel interface unit to access at least one of the locations of the central shared memory;

configurable multipurpose interconnect, the second port of each channel interface unit being coupled to the configurable multipurpose interconnect, the configurable multipurpose interconnect enabling inter-device communication of at least some of the transaction data for a transaction-dependent first group of the devices coupled to the apparatus, the configurable multipurpose interconnect enabled inter-device communication being via the coupling to the second ports of the respective channel interface units;

a command serialization resource, the command serialization resource being a cache-coherence point, the third port of each channel interface unit being coupled to the command serialization resource, the command serialization resource enabling inter-device communication of at least some of the transaction headers for a transaction-dependent second group of the devices coupled to the apparatus, the command serialization resource enabled inter-device communication being via the coupling to the third ports of the respective channel interface units; and command control logic, the command control logic coupled to monitor at least part of each transaction header communicated to the command serialization resource, the command control logic ascertaining the transaction-dependent first and second groups, the first group including the command initiator device initiating the transaction and a target device associated with the transaction, the target device being selected from the devices coupled to the apparatus, the second group including the first group and any additional transaction-dependent devices necessary to maintain the central shared memory in accordance with a cache-coherency protocol that appears to the command initiators to be a snoopy-based cache-coherency protocol.

3. The apparatus of claim 1, further wherein:

the second port of each channel interface unit enabling communication of the transaction data and communication of a first type and a third type of the transaction commands, the third port of each channel interface unit enabling communication of a second type and the third type of the transaction commands;

the command control logic coupled to monitor each transaction command communicated to each channel interface unit, the command control logic ascertaining for each transaction command a type of the first, second, and third types; and wherein the first type of the transaction commands includes a first plurality of non-cacheable transaction commands including non-cacheable read transaction commands and non-cacheable write transaction commands, the second type of the transaction commands includes a first plurality of cacheable transaction commands including cacheable read transaction commands, and the third type of the transaction commands includes a second plurality of cacheable transaction commands including cacheable write transaction commands.

4. The apparatus of claim 1, further wherein:

the configurable multipurpose interconnect further enabling inter-device communication of at least some of the transaction headers for the transaction-dependent first group;

the command control logic ascertaining which of the transactions headers are communicated using at least the configurable multipurpose interconnect and which of the transaction headers are communicated using at least the command serialization resource.

5. The apparatus of claim 1, further wherein:
the apparatus is integrated on a single integrated circuit.

6. The apparatus of claim 1, further wherein:

each link having associated link signaling and link protocols, the at least one command initiator device including at least one command initiator device having at least one bus having associated bus signaling and bus protocols, the at least one bus being connected to an associated bus bridge, the bus bridge being connected to the respective point-to-point link coupled to the command initiator device, each bus bridge translating between the bus signaling and bus protocols and the link signaling and link protocols.

7. The apparatus of claim 1, further wherein:

for at least a particular one of the at least one memory device, the coupling between the apparatus and the particular one memory device includes a memory controller, each memory controller being connected to at least the particular one memory device, each memory controller being connected to the point-to-point link associated with the particular one memory device, the memory controller executing data access requests to at least the particular one memory device, the requests being from other of the devices coupled to the apparatus.

8. The apparatus of claim 1, further wherein:

the configurable multipurpose interconnect including a plurality of data signal paths providing at least one communication path for the inter-device communication enabled by the configurable multipurpose interconnect, the apparatus receiving one or more transactions to exchange data via the at least one communication path between the first group of the devices coupled to the apparatus;

a first subset of the data signal paths being associated with the memory devices coupled to the apparatus and a second subset of the data signal paths being associated with the command initiator devices coupled to the apparatus, each of the memory associated data signal paths being parallel with a first direction, each of the command initiator associated data signal paths being parallel with a second direction, the second port coupling to the configurable multipurpose interconnect including coupling the memory associated data signal paths respectively to the second ports of a first set of the channel interface units and coupling the command initiator associated data signal paths respectively to the second ports of a second set of the channel interface units, the first set of the channel interface units including the channel interface units coupled to each memory device coupled to the apparatus, the second set of the channel interfaces units including the channel interface units coupled to each command initiator device coupled to the apparatus, a combination of the memory associated data signal paths and the command initiator associated data signal paths forming the at least one communication path for the inter-device communication; and; and the apparatus at least in part servicing at least one of the transactions by selecting one of the at least one communication path of the configurable multipurpose interconnect, the selected communication path enabling the inter-device communication between two of the devices coupled to the apparatus and exchanging data between the two devices.

9. The apparatus of claim 8, further wherein:

each memory associated data signal path and the respective channel interface unit corresponding to a particular set of memory locations; and the at least one transaction being serviced accessing memory at a specific memory location, the selected communication path of the at least one transaction being serviced including the memory associated data signal path corresponding to the specified memory location.

10. The apparatus of claim 8, further wherein:

each command initiator associated data path corresponds to only one of the command initiator devices coupled to the apparatus; and the at least one transaction being serviced transmitting data to a specific command initiator, the selected communication path of the at least one transaction being serviced including the command initiator associated data signal path corresponding to the specific command initiator.

11. The apparatus of claim 8, further wherein:

the configurable multipurpose interconnect includes a plurality of node switches, each node switch being connected to a particular memory associated data signal path and a particular command initiator associated data signal path, each node switch transferring data between the particular memory associated data signal path and the particular command initiator associated data signal path; and the apparatus includes a central data path switch controller for controlling the data signal paths, the central data path switch controller having control coupling with each of the channel interface units and with each of the node switches, the central data path switch controller enabling one or more of the node switches in order to form the selected communication path between the two devices.

12. In a processing system having at least first and second external command initiator subsystems and at least first and second memory subsystems, each of the command initiator subsystems including at least one external command initiator device, at least one of the command initiator subsystems including a cache for cacheable memory locations, each of the memory subsystems including at least one external memory device, a method of processing a plurality of transactions, the method comprising:

representing each of the plurality of transactions by a corresponding command, at least some of the commands having corresponding data, at least some of the commands including an address, and at least some of the addresses being cacheable memory addresses;

communicating the transaction command and any corresponding transaction data of each of the plurality of transactions via transfers of a plurality of associated bit-groups, each bit-group having a common predetermined number of information bits, each information bit of each bit-group having a bit-group-sequence-dependent one of a plurality of associated functions, each of the bit-groups being transferred via at least a first transfer, at least some of the bit-groups being unsuccessfully communicated during the first transfer and having at least one additional transfer over the respective link, each transfer over the respective link being performed in a predetermined fixed-length time-interval, and each bit-group being selectively buffered in one or more stages of clocked storage;

providing a plurality of point-to-point communication links, each link communicating at least some of the bit-groups;

providing a central multiple channel interface having a plurality of interface paths, each interface path communicating at least some of the bit-groups between a link-signaling-side and a transaction-processing-side of the central multiple channel interface;

coupling each of the subsystems via a respective one of the links to the link-signaling side of a respective one of the interface paths of the central multiple channel interface, the coupling establishing concurrent static communication channels corresponding to each subsystem for communicating at least some of the bit-groups between each subsystem and the transaction-processing-side of the central multiple channel interface;

providing a cache-coherence point on the transaction-processing-side of the central multiple channel interface;

providing a dynamically configurable interconnect on the transaction-processing-side of the central multiple channel interface, the dynamically configurable interconnect having communication paths that are configurable to enable transaction-related bit-group transfers between selected pairs of the subsystems in accordance with at least some of the transaction commands;

communicating the transaction commands from the command initiator subsystems via the corresponding channels of the subsystems to the transaction-processing-side of the central multiple channel interface;

communicating to the cache-coherence point the addresses of at least some of the transaction commands received on the transaction-processing-side of the central multiple channel interface;

for each of at least some of the cacheable memory addressees communicated to the cache-coherence point and as required to maintain the system in accordance with a cache-coherency protocol that appears to the command initiators to be a snoopy-based cache-coherency protocol, communicating the corresponding transaction command to a select plurality of the subsystems, the select plurality not including the initiator of the transaction command;

communicating the transaction data corresponding to a first transaction command between the first external command initiator subsystem and the first memory subsystem via the channel of the first external command initiator subsystem, a first of the paths of the dynamically configurable interconnect, and the channel of the first memory subsystem; and communicating the transaction data corresponding to a second transaction command between the second command initiator subsystem and the second memory subsystem via the channel of the second command initiator subsystem, a second of the paths of the dynamically configurable interconnect, and the channel of the second memory subsystem, at least a portion of the transaction data for the first and second transactions being communicated simultaneously by the dynamically configurable interconnect.

13. The method of claim 12, further wherein the central multiple channel interface, the cache coherence point, and the dynamically configurable interconnect, are implemented on a single integrated circuit, and the links coupling the subsystems to the central multiple channel interface are external to the single integrated circuit.

14. The method of claim 12, further wherein the central multiple channel interface, the cache coherence point, and the dynamically configurable interconnect, are implemented on a plurality of integrated circuits coupled to each other, each of the integrated circuits being coupled to at least one of the external devices.

15. The method of claim 13, wherein at least one of the memory subsystems includes an external memory controller, each external memory controller being coupled to the single integrated circuit.

16. The method of claim 15, wherein the at least one external memory device of at least one memory subsystem includes SDRAM.

17. The method of claim 12, the method further comprising:

providing at least one of the memory subsystems with at least one memory controller;

mapping each memory subsystem to respective address regions collectively comprising a single address space, the external memory devices of the memory subsystems collectively comprising a central main memory of the processing system; and wherein none of the command initiators has preferential latency or rate over another of the command initiators in performing the data accesses to each of the memory subsystems.

18. The method of claim 17, wherein:

the central multiple channel interface, the cache coherence point, the dynamically configurable interconnect, and the memory controller, are implemented on a single integrated circuit, each of the links coupling the central multiple channel interface to the at least one memory subsystem having the at least one memory controller is internal to the single integrated circuit, and the links associated with the external command initiator subsystems are external to the single integrated circuit.

19. The method of claim 18, further wherein:

the at least one external memory device of at least one of tie memory subsystems includes at least one high-speed narrow link-based DRAM device using a Rambus approach, and the at least one memory controller associated with at least one memory subsystem includes coupling to an external link compatible with the Rambus approach.

20. The method of claim 18, further wherein:

the at least one external memory device of at least one of the memory subsystems includes at least one high-speed narrow link-based DRAM device using a SLDRAM approach, and the at least one memory controller associated with at least one of the memory subsystems includes coupling to an external link compatible with the SLDRAM approach.

21. The method of claim 17, wherein the central multiple channel interface, the cache coherence point, the dynamically configurable interconnect, the memory controller, and logic required by the mapping step, are implemented on a plurality of integrated circuits coupled to each other, each of the integrated circuits being coupled to at least one of the external devices, the links coupling the external command initiator subsystems to the central multiple channel interface being external to the plurality of integrated circuits, the at least one external memory device of at least one of the memory subsystems includes at least one high-speed narrow link-based DRAM device using a Rambus approach, and the at least one memory controller associated with at least one of the memory subsystems includes coupling to an external link compatible with the Rambus approach.

22. The method of claim 17, wherein the central multiple channel interface, the cache coherence point, the dynamically configurable interconnect, and the memory controller, are implemented on a plurality of integrated circuits coupled to each other, each of the integrated circuits being coupled to at least one of the external devices, the links coupling the external command initiator subsystems to the central multiple channel interface being external to the plurality of integrated circuits, the at least one external memory device of at least one of the memory subsystems includes at least one high-speed narrow link-based DRAM device using a SLDRAM approach, and the at least one memory controller associated with at least one of the memory subsystems includes coupling to an external link compatible with the SLDRAM approach.

23. The method of claim 12, further comprising:

communicating the transaction data corresponding to a third transaction command between the first external command initiator subsystem and the second memory subsystem via the channel of the first external command initiator subsystem, a third of the paths of the dynamically configurable interconnect, and the channel of the second memory subsystem; and communicating the transaction data corresponding to a fourth transaction command between the second command initiator subsystem and the first memory subsystem via the channel of the second command initiator subsystem, a fourth of the paths of the dynamically configurable interconnect, and the channel of the first memory subsystem, at least a portion of the transaction data for the third and fourth transactions being communicated simultaneously by the dynamically configurable interconnect.

24. The method of claim 12, further comprising:

maintaining cache-coherence information on the transaction-processing-side of the central multiple channel interface, the cache-coherence information including information about each of the cacheable memory locations held in each cache, querying the cache-coherence information for each address communicated to the cache-coherence point, the cache-coherence information enabling a reduction in the number transaction commands communicated to the subsystems while continuing to maintain the system in accordance with a cache-coherency protocol that appears to the command initiators to be a snoopy-based cache-coherency protocol;

preventing a plurality of transaction commands from concurrently modifying a memory location associated with a common one of the addresses; and mapping each memory subsystem to respective address regions collectively comprising a single address space, the external memory devices of the memory subsystems collectively comprising a central main memory of the processing system, and accessing each of the memory subsystems without preferential latency or rate for one of the command initiators over another of the command initiators.

25. The method of claim 24, further wherein the central multiple channel interface, the cache coherence point, the dynamically configurable interconnect, the memory controller, and logic required by the maintaining, preventing, and mapping steps, are implemented on a single integrated circuit, and the links coupling the external command initiator subsystems to the central multiple channel interface are external to the single integrated circuit.

26. The method of claim 24, wherein the predetermined cache coherency protocol consists of modified, modified clean, exclusive, shared, and invalid states.

27. The method of claim 12, further comprising:

mapping each memory subsystem to respective address regions collectively comprising a single address space, the external memory devices of the memory subsystems collectively comprising a central main memory of the processing system, and accessing each of the memory subsystems without preferential latency or rate for one of the command initiators over another of the command initiators; and executing a plurality of the transaction commands simultaneously while maintaining sequential command consistency and accordance with a predetermined cache coherency protocol.

28. The method of claim 27, further wherein the central multiple channel interface, the address interconnect, the dynamically configurable interconnect, the memory controller, and logic required by the mapping and executing steps, are implemented on a single integrated circuit, and the links coupling the external command initiator subsystems to the central multiple channel interface are external to the single integrated circuit.

29. The method of claim 27, wherein the predetermined cache coherency protocol consists of modified, modified clean, exclusive, shared, and invalid states.

30. The method of claim 27, further wherein:
the central multiple channel interface includes a channel interface corresponding to each interface path;
at least a portion of the cache-coherence point is distributed, a sub-portion of the distributed portion of the cache-coherence point being proximate to each channel interface; and
at least a portion of the logic required by the executing step is distributed, a sub-portion of the distributed portion of the logic required by the executing step being proximate to each channel interface.

31. The method of claim 13, wherein the external command initiator devices have predetermined external data interconnect bit-widths, and the link bit-widths are a fraction of the external data interconnect bit-widths of the external command initiator devices.

32. The method of claim 18, wherein the external command initiator devices have predetermined external data interconnect bit-widths, and the link bit-widths are a fraction of the external data interconnect bit-widths of the external command initiator devices.

33. The method of claim 25, wherein the external command initiator devices have predetermined external data interconnect bit-widths, and the link bit-widths are a fraction of the external data interconnect bit-widths of the external command initiator devices.

34. The method of claim 28, wherein the external command initiator devices have predetermined external data interconnect bit-widths, and the link bit-widths are a fraction of the external data interconnect bit-widths of the external command initiator devices.

35. The method of claim 13, further wherein the links coupled to the central multiple channel interface are of a predetermined number, the single integrated circuit has a predetermined number of interconnect pins, and the number of links that can be accommodated within the number of interconnect pins of the single integrated circuit is in inverse proportion to the link bit-widths.

36. The method of claim 18, further wherein the links coupled to the central multiple channel interface are of a predetermined number, the single integrated circuit has a predetermined number of interconnect pins, and the number of links that can be accommodated within the number of interconnect pins of the single integrated circuit is in inverse proportion to the link bit-widths.

37. The method of claim 25, further wherein the links coupled to the central multiple channel interface are of a predetermined number, the single integrated circuit has a predetermined number of interconnect pins, and the number of links that can be accommodated within the number of interconnect pins of the single integrated circuit is in inverse proportion to the link bit-widths.

38. The method of claim 28, further wherein the links coupled to the central multiple channel interface are of a predetermined number, the single integrated circuit has a predetermined number of interconnect pins, and the number of links that can be accommodated within the number of interconnect pins of the single integrated circuit is in inverse proportion to the links bit-widths.

39. The method of claim 12, further wherein the first external command initiator subsystem is a first external processor subsystem, the second external command initiator subsystem is a first external I/O subsystem, and the at least one external command initiator devices of the first and second command initiator subsystems are an external processor device and an external I/O device, respectively.

40. The method of claim 17, further wherein the first external command initiator subsystem is a first external processor subsystem, the second external command initiator subsystem is a first external I/O subsystem, and the at least one external command initiator devices of the first and second command initiator subsystems are an external processor device and an external I/O device, respectively.

41. The method of claim 24, further wherein the first external command initiator subsystem is a first external processor subsystem, the second external command initiator subsystem is a first external I/O subsystem, and the at least one external command initiator devices of the first and second command initiator subsystems are an external processor device and an external I/O device, respectively.

42. The method of claim 27, further wherein the first external command initiator subsystem is a first external processor subsystem, the second external command initiator subsystem is a first external I/O subsystem, and the at least one external command initiator devices of the first and second command initiator subsystems are an external processor device and an external I/O device, respectively.

43. The method of claim 12, further wherein the first external command initiator subsystem is a first external processor subsystem, the second external command initiator subsystem is a second external processor subsystem, and the at least one external command initiator devices of the first and second command initiator subsystems are external processor devices.

44. The method of claim 17, further wherein the first external command initiator subsystem is a first external processor subsystem, the second external command initiator subsystem is a second external processor subsystem, and the at least one external command initiator devices of the first and second command initiator subsystems are external processor devices.

45. The method of claim 24, further wherein the first external command initiator subsystem is a first external processor subsystem, the second external command initiator subsystem is a second external processor subsystem, and the at least one external command initiator devices of the first and second command initiator subsystems are external processor devices.

46. The method of claim 27, further wherein the first external command initiator subsystem is a first external processor subsystem, the second external command initiator subsystem is a second external processor subsystem, and the at least one external command initiator devices of the first and second command initiator subsystems are external processor devices.

47. In a processing system, a method of processing, a plurality of transactions in parallel, the method comprising:

defining a bounded region;

providing on the inside periphery of the bounded region at least one processor channel interface unit;

coupling each processor channel interface unit to a respective processor subsystem external to the bounded region, each processor subsystem including at least one processor device having at least one associated cache, each processor device and each associated cache being external to the bounded region;

providing on the inside periphery of the bounded region at least two memory channel interface units;

coupling each memory channel interface unit to a respective memory subsystem, each memory subsystem including at least one memory device;

providing on the inside periphery of the bounded region at least one I/O channel interface unit;

coupling each I/O channel interface unit to a respective I/O subsystem external to the bounded region, each I/O subsystem including at least one I/O device external to the bounded region;

communicating as required a transaction command and any corresponding transaction data for each of the plurality of transactions, each of the plurality of transactions having an associated initiator and target, at least some of the communicating as required using a bit-group-based transfer technique wherein the transaction commands and the transaction data of each of the plurality of transactions are communicated via transfers of a plurality of associated bit-groups, each bit-group having a common predetermined number of information bits, each information bit of each bit-group having a bit-group-sequence-dependent one of a plurality of associated functions, each of the bit-groups being transferred via at least a first transfer, at least some of the bit-groups being unsuccessfully communicated during the first transfer and having at least one additional transfer over the respective link, each transfer over the respective link being performed in a predetermined fixed-length time-interval, and each bit-group being selectively buffered in one or more stages of clocked storage, at least some of the transaction commands including addresses;

wherein each transaction command and each transaction data that is communicated between each external device and the inside of the bounded region is communicated via the channel interface units using the bit-group-based techniques, the coupling to each channel interface having an associated channel interface-protocol and channel bit-width, and each external device having an associated native interface-protocol and bit-width;

external to the bounded region, converting as required between the channel interface-protocols and channel bit-widths and the respective native interface-protocols and native bit-widths of each external device;

providing on the inside of the bounded region an initiator communication path for and respectively coupled to each of the processor channel interface units and the I/O channel interface units;

providing on the inside of the bounded region a memory communication path for and respectively coupled to each of the memory channel interface units;

providing on the inside of the bounded region a cache-coherence point coupled to each of the channel interface units;

issuing each transaction command by the associated initiator;

receiving each transaction command by the channel interface unit respectively coupled to the associated initiator;

for each transaction command having an address corresponding to a cacheable memory location, subsequent to the receiving and prior to any memory subsystem access, communicating the transaction command from the channel interface unit of the initiator to the cache-coherence point;

for at least some of the transaction commands, propagating the transaction command to the target of the transaction from the cache-coherence point and via the channel interface unit of the target, additionally selectively propagating the transaction command to a dynamically determined set of zero or more of the external processor devices having at least one associated cache, the selectively propagating being from the cache-coherence point and via the channel interface units corresponding to the dynamically determined set of external processor devices, the set being dynamically determined solely within the bounded region in accordance with a cache-coherency protocol that appears to the command initiators to be a snoopy-based cache-coherency protocol;

internal to the bounded region and in accordance with a first of the transaction commands, coupling at least a first of the initiator communication paths to at least a first of the memory communication paths, and communicating first transaction data between the initiator and the target of the first transaction command via the coupled first communication paths, the channel interfaces, and the couplings associated with the initiator and the target of the first transaction command; and internal to the bounded region and in accordance with a second of the transaction commands, coupling at least a second of the initiator communication paths to at least a second of the memory communication paths, and communicating second transaction data between the initiator and the target of the second transaction command via the coupled second communication paths, the channel interfaces, and the couplings associated with the initiator and the target of the second transaction command;

wherein at least some of the first transaction data and second transaction data are communicated in parallel.

48. The method of claim 47, wherein the bounded region is a single integrated-circuit.

49. The method of claim 48, wherein the channel bit-widths of the couplings to the external devices are less than the native bit-widths of the external devices.

50. The method of claim 48, wherein the single integrated circuit has a predetermined number of interconnect pins, and the number of channel interface units that can be accommodated within the number of interconnect pins of the single integrated circuit is in inverse proportion to the channel bit-widths.

51. The method of claim 47, wherein each processor subsystem has at least one cache and no local main memory.

52. The method of claim 47, wherein the channel interface protocols communicate the bit-groups using bidirectional point-to-point signaling.

53. The method of claim 47, wherein the predetermined cache coherency protocol insures that all transactions are sequentially consistent.

54. The method of claim 47, wherein the transaction data is transferred between initiators and targets through only a single switch stage.

55. The method of claim 47, wherein the transaction command, the address associated with the transaction command, and the transaction data of at least one transaction are communicated between the initiator and target of the transaction only via the bounded region and the couplings thereto and no other path.

* * * * *